US006801822B1

(12) United States Patent
Fujiwara et al.

(10) Patent No.: US 6,801,822 B1
(45) Date of Patent: Oct. 5, 2004

(54) PRODUCTION MANAGEMENT SYSTEM, CLIENT IN THE PRODUCTION MANAGEMENT SYSTEM, PRODUCTION MANAGEMENT METHOD IN THE PRODUCTION MANAGEMENT SYSTEM, DATA RETRIEVAL METHOD IN THE PRODUCTION MANAGEMENT SYSTEM, AND COMPUTER PRODUCT

(75) Inventors: Hitoshi Fujiwara, Kanagawa (JP); Yasuhiro Yamaguchi, Kanagawa (JP); Hidenori Umeda, Kanagawa (JP); Tatsuya Sakiyama, Shizuoka (JP); Yuichi Jibiki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 963 days.

(21) Appl. No.: 09/654,052

(22) Filed: Sep. 1, 2000

(30) Foreign Application Priority Data

| | | | |
|---|---|---|---|
| Sep. 2, 1999 | (JP) | ........................................... | 11-249182 |
| Jul. 31, 2000 | (JP) | ....................................... | 2000-232532 |
| Aug. 10, 2000 | (JP) | ....................................... | 2000-243459 |

(51) Int. Cl.[7] .......................... G06F 19/00; G06F 17/30

(52) U.S. Cl. .................... 700/108; 700/174; 707/104.1; 345/968

(58) Field of Search .............................. 700/28, 83, 95, 700/108–111, 173, 174, 213–216, 219–225; 707/3, 10, 100, 102, 104.1; 345/744–749, 771–773, 965–970; 702/81, 84, 182–185

(56) References Cited

U.S. PATENT DOCUMENTS

| | | | | | |
|---|---|---|---|---|---|
| 5,245,554 A | * | 9/1993 | Tsuyama et al. | ............ | 702/185 |
| 5,461,570 A | | 10/1995 | Wang et al. | ................ | 700/110 |
| 5,596,712 A | * | 1/1997 | Tsuyama et al. | .............. | 714/26 |
| 5,696,686 A | * | 12/1997 | Sanka et al. | ................ | 700/110 |
| 5,706,213 A | | 1/1998 | Takakura et al. | ............. | 702/84 |
| 5,777,876 A | | 7/1998 | Beauchesne | ................. | 700/95 |
| 5,787,021 A | * | 7/1998 | Samaha | ....................... | 702/84 |
| 5,806,069 A | * | 9/1998 | Wakiyama et al. | ......... | 707/102 |
| 5,940,300 A | * | 8/1999 | Ozaki | ......................... | 700/121 |
| 6,522,939 B1 | * | 2/2003 | Strauch et al. | ............. | 700/116 |
| 6,574,522 B1 | * | 6/2003 | Douglas | ..................... | 700/109 |
| 6,708,130 B1 | * | 3/2004 | Yamazaki et al. | ............ | 702/82 |

FOREIGN PATENT DOCUMENTS

| | | |
|---|---|---|
| EP | 0 785 491 A2 | 7/1997 |

* cited by examiner

*Primary Examiner*—Maria N. Von Buhr
(74) *Attorney, Agent, or Firm*—Oblon, Spivak, McClelland, Maier & Neustadt, P.C.

(57) ABSTRACT

In the production management system, supervisors of manufacturing and production check section, component check section, and manufacturing technical section set retrieval conditions for retrieving data stored in a database of a step-monitoring server in order to obtain information on daily, hourly and monthly statuses of products in the production management system by using output system clients. The input retrieval conditions are transmitted to the step-monitoring server. Data matching with these retrieval conditions are retrieved from the database of the step-monitoring server. The retrieved data is chronologically processed and displayed on screens of the clients which requested the data.

90 Claims, 123 Drawing Sheets

FIG.14

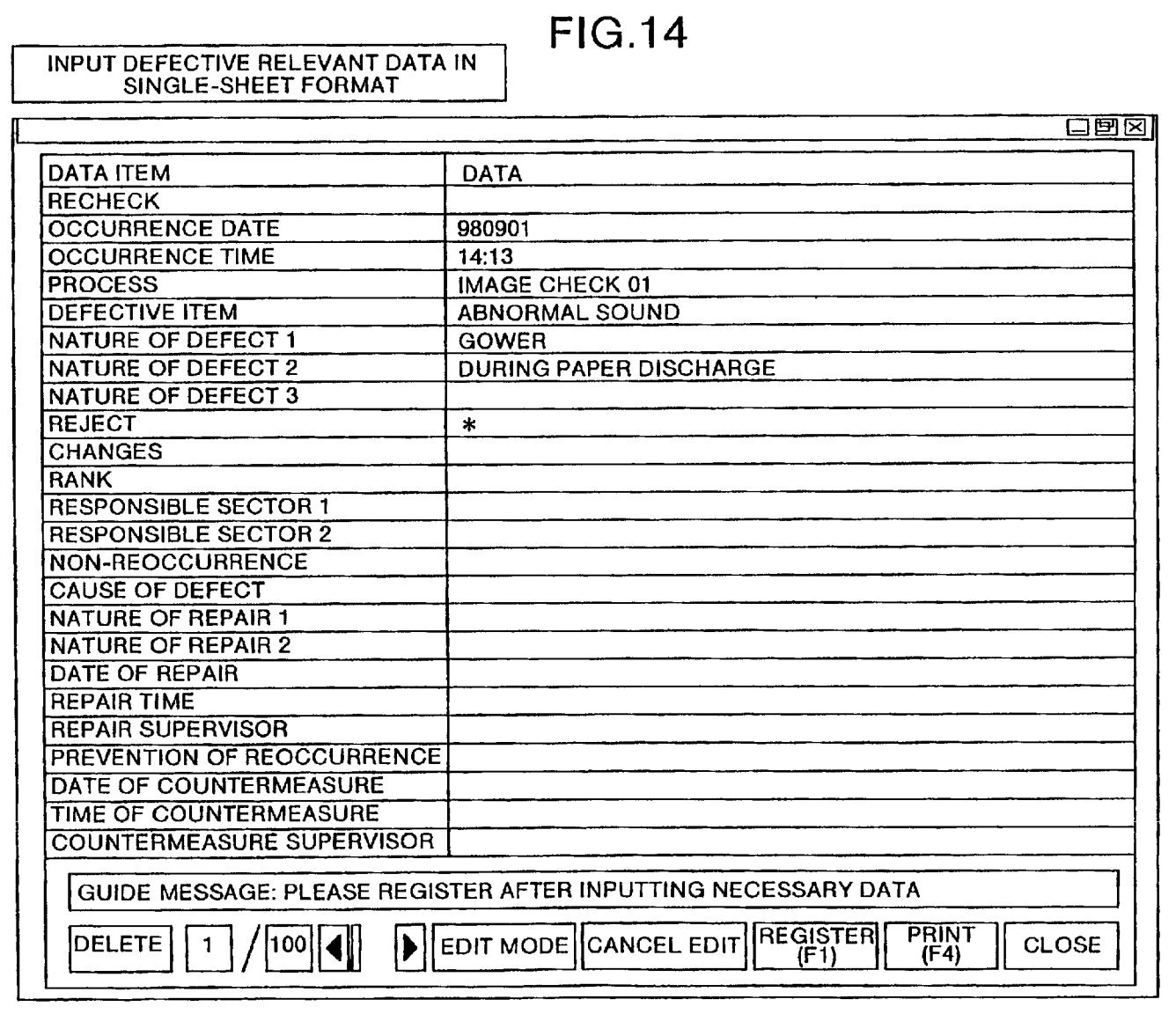

INPUT DEFECTIVE RELEVANT DATA IN SINGLE-SHEET FORMAT

| DATA ITEM | DATA |
|---|---|
| RECHECK | |
| OCCURRENCE DATE | 980901 |
| OCCURRENCE TIME | 14:13 |
| PROCESS | IMAGE CHECK 01 |
| DEFECTIVE ITEM | ABNORMAL SOUND |
| NATURE OF DEFECT 1 | GOWER |
| NATURE OF DEFECT 2 | DURING PAPER DISCHARGE |
| NATURE OF DEFECT 3 | |
| REJECT | * |
| CHANGES | |
| RANK | |
| RESPONSIBLE SECTOR 1 | |
| RESPONSIBLE SECTOR 2 | |
| NON-REOCCURRENCE | |
| CAUSE OF DEFECT | |
| NATURE OF REPAIR 1 | |
| NATURE OF REPAIR 2 | |
| DATE OF REPAIR | |
| REPAIR TIME | |
| REPAIR SUPERVISOR | |
| PREVENTION OF REOCCURRENCE | |
| DATE OF COUNTERMEASURE | |
| TIME OF COUNTERMEASURE | |
| COUNTERMEASURE SUPERVISOR | |

GUIDE MESSAGE: PLEASE REGISTER AFTER INPUTTING NECESSARY DATA

DELETE 1 / 100 ◀ ▶ EDIT MODE CANCEL EDIT REGISTER (F1) PRINT (F4) CLOSE

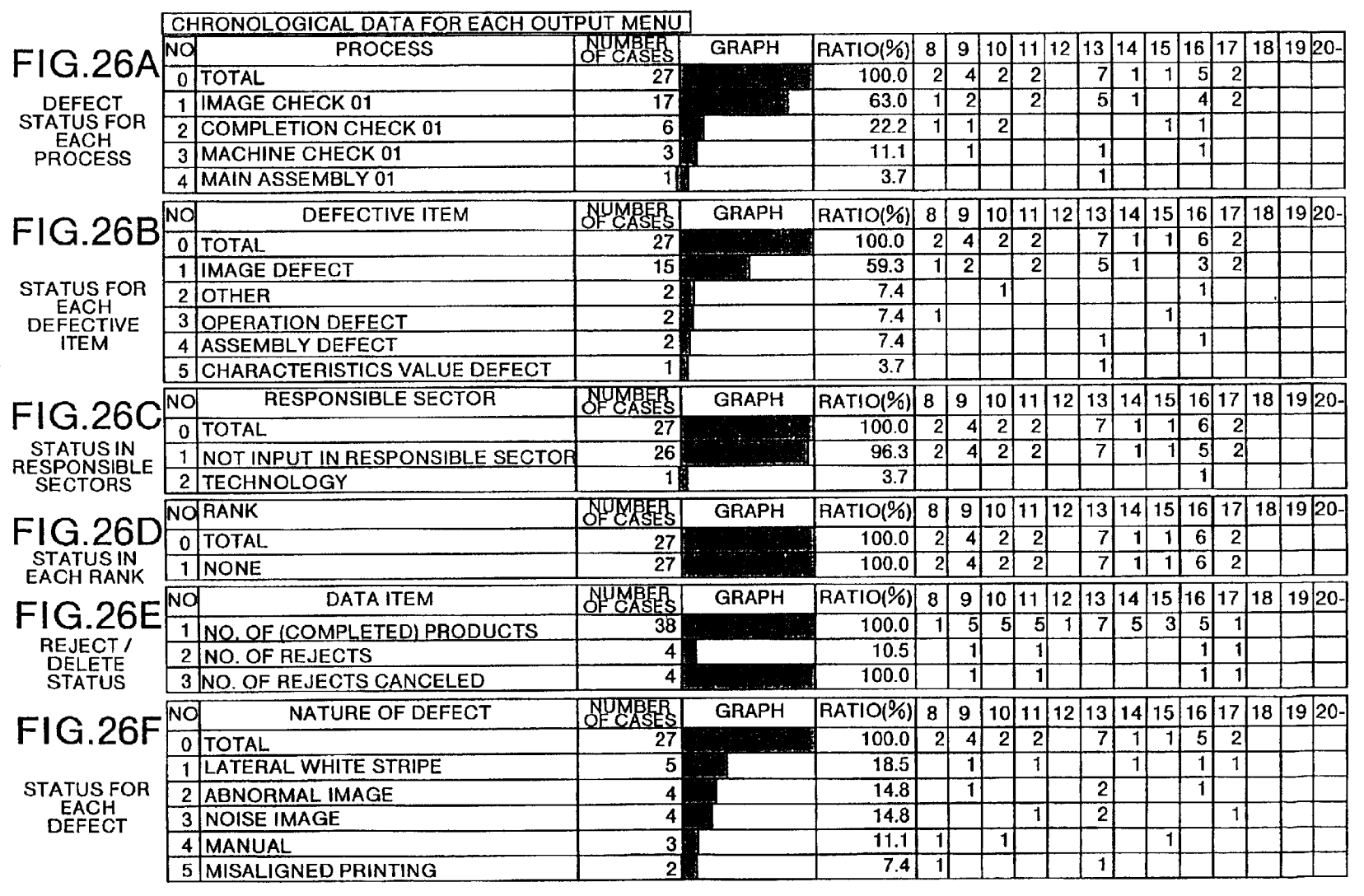

CHRONOLOGICAL DATA FOR EACH OUTPUT MENU

FIG.26A
DEFECT STATUS FOR EACH PROCESS

| NO | PROCESS | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 5 | 2 | | | |
| 1 | IMAGE CHECK 01 | 17 | | 63.0 | 1 | 2 | | 2 | | 5 | 1 | | 4 | 2 | | | |
| 2 | COMPLETION CHECK 01 | 6 | | 22.2 | 1 | 1 | 2 | | | | | 1 | 1 | | | | |
| 3 | MACHINE CHECK 01 | 3 | | 11.1 | | 1 | | | | 1 | | | 1 | | | | |
| 4 | MAIN ASSEMBLY 01 | 1 | | 3.7 | | | | | | 1 | | | | | | | |

FIG.26B
STATUS FOR EACH DEFECTIVE ITEM

| NO | DEFECTIVE ITEM | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | IMAGE DEFECT | 15 | | 59.3 | 1 | 2 | | 2 | | 5 | 1 | | 3 | 2 | | | |
| 2 | OTHER | 2 | | 7.4 | | | 1 | | | | | | 1 | | | | |
| 3 | OPERATION DEFECT | 2 | | 7.4 | 1 | | | | | | | 1 | | | | | |
| 4 | ASSEMBLY DEFECT | 2 | | 7.4 | | | | | | 1 | | | 1 | | | | |
| 5 | CHARACTERISTICS VALUE DEFECT | 1 | | 3.7 | | | | | | 1 | | | | | | | |

FIG.26C
STATUS IN RESPONSIBLE SECTORS

| NO | RESPONSIBLE SECTOR | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | NOT INPUT IN RESPONSIBLE SECTOR | 26 | | 96.3 | 2 | 4 | 2 | 2 | | 7 | 1 | 1 | 5 | 2 | | | |
| 2 | TECHNOLOGY | 1 | | 3.7 | | | | | | | | | 1 | | | | |

FIG.26D
STATUS IN EACH RANK

| NO | RANK | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 6 | 2 | | | |
| 1 | NONE | 27 | | 100.0 | 2 | 4 | 2 | 2 | | 7 | 1 | 1 | 6 | 2 | | | |

FIG.26E
REJECT / DELETE STATUS

| NO | DATA ITEM | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 1 | NO. OF (COMPLETED) PRODUCTS | 38 | | 100.0 | 1 | 5 | 5 | 5 | 1 | 7 | 5 | 3 | 5 | 1 | | | |
| 2 | NO. OF REJECTS | 4 | | 10.5 | | 1 | | 1 | | | | | 1 | 1 | | | |
| 3 | NO. OF REJECTS CANCELED | 4 | | 100.0 | | 1 | | 1 | | | | | 1 | 1 | | | |

FIG.26F
STATUS FOR EACH DEFECT

| NO | NATURE OF DEFECT | NUMBER OF CASES | GRAPH | RATIO(%) | 8 | 9 | 10 | 11 | 12 | 13 | 14 | 15 | 16 | 17 | 18 | 19 | 20- |
|---|---|---|---|---|---|---|---|---|---|---|---|---|---|---|---|---|---|
| 0 | TOTAL | 27 | | 100.0 | 2 | 4 | 2 | 2 | | 7 | 1 | 1 | 5 | 2 | | | |
| 1 | LATERAL WHITE STRIPE | 5 | | 18.5 | | 1 | | 1 | | | 1 | | 1 | 1 | | | |
| 2 | ABNORMAL IMAGE | 4 | | 14.8 | | 1 | | | | 2 | | | 1 | | | | |
| 3 | NOISE IMAGE | 4 | | 14.8 | | | | 1 | | 2 | | | | 1 | | | |
| 4 | MANUAL | 3 | | 11.1 | 1 | | 1 | | | | | 1 | | | | | |
| 5 | MISALIGNED PRINTING | 2 | | 7.4 | 1 | | | | | 1 | | | | | | | |

CHRONOLOGICAL DATA FOR EACH OUTPUT MENU

FIG.31A
DEFECT STATUS FOR EACH PROCESS

| NO | PROCESS | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | IMAGE CHECK 01 | 380 | | 77.1 | 14 | 34 | 28 | 22 | 21 | 32 | 32 | 20 | 16 | 23 | 28 | |
| 2 | COMPLETION CHECK 01 | 85 | | 17.2 | 1 | 5 | 2 | 2 | 4 | 3 | 3 | 5 | 4 | 8 | 9 | |
| 3 | MACHINE CHECK 01 | 17 | | 3.4 | 1 | 1 | 1 | 1 | | 1 | | 4 | 1 | 2 | | |
| 4 | STA(QA) | 6 | | 1.2 | | | | 2 | 1 | | | | 1 | 1 | | |

FIG.31B
STATUS FOR EACH DEFECTIVE ITEM

| NO | DEFECTIVE ITEM | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | IMAGE DEFECT | 346 | | 73.8 | 14 | 33 | 28 | 23 | 21 | 27 | 31 | 20 | 16 | 21 | 24 | |
| 2 | OTHER | 33 | | 6.7 | 1 | | | | | 1 | | 2 | 1 | 4 | 5 | |
| 3 | OPERATION DEFECT | 29 | | 5.9 | | 1 | 2 | 2 | | 3 | | 2 | 2 | 3 | 4 | |
| 4 | ASSEMBLY DEFECT | 17 | | 3.4 | | 4 | | | 2 | | 3 | 2 | 1 | 1 | 1 | |
| 5 | CHARACTERISTICS VALUE DEFECT | 15 | | 3.0 | 2 | 1 | 1 | | 1 | 1 | | 1 | 2 | 1 | | |

FIG.31C
STATUS IN RESPONSIBLE SECTORS

| NO | RESPONSIBLE SECTOR | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | NOT INPUT IN RESPONSIBLE SECTOR | 471 | | 95.5 | 17 | 41 | 31 | 25 | 25 | 35 | 34 | 25 | 18 | 31 | 35 | |
| 2 | ASSEMBLY | 11 | | 2.2 | | | | 2 | 1 | 1 | | 3 | 1 | 2 | | |
| 3 | TECHNOLOGY | 5 | | 1.0 | | | | | | | | | 3 | | | |

FIG.31D
STATUS IN EACH RANK

| NO | RANK | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 17 | 41 | 31 | 27 | 26 | 36 | 36 | 29 | 22 | 34 | 37 | |
| 1 | NONE | 482 | | 97.8 | 17 | 41 | 31 | 25 | 25 | 36 | 35 | 29 | 20 | 31 | 36 | |
| 2 | ASSEMBLY | 7 | | 1.4 | | | | 2 | 1 | | | | 1 | 2 | | |
| 3 | TECHNOLOGY | 2 | | 0.4 | | | | | | | | | 1 | 1 | | |

FIG.31E
REJECT / DELETE STATUS

| NO | DATA ITEM | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 1 | NO. OF (COMPLETED) PRODUCTS | 697 | | 100.0 | 17 | 41 | 31 | 25 | 25 | 36 | 35 | 29 | 20 | 31 | 36 | |
| 2 | NO. OF REJECTS | 56 | | 8.0 | | | | 2 | 1 | | | | 1 | 2 | | |
| 3 | NO. OF REJECTS CANCELED | 56 | | 100.0 | | | | | | | | | 1 | 1 | | |

FIG.31F
STATUS FOR EACH DEFECT

| NO | NATURE OF DEFECT | NUMBER OF CASES | GRAPH | RATIO(%) | 01 | 03 | 06 | 07 | 08 | 09 | 10 | 13 | 14 | 15 | 16 | 17 |
|---|---|---|---|---|---|---|---|---|---|---|---|---|---|---|---|---|
| 0 | TOTAL | 493 | | 100.0 | 7 | 41 | 31 | 27 | 26 | 36 | 36 | 29 | 22 | 34 | 37 | |
| 1 | LATERAL WHITE STRIPE | 133 | | 27.0 | 1 | 10 | 8 | 3 | 5 | 14 | 11 | 7 | 5 | 9 | 10 | |
| 2 | NOISE IMAGE | 79 | | 16.0 | 3 | 6 | 2 | 5 | 4 | 6 | 6 | 8 | 4 | 6 | 8 | |
| 3 | NOISE IMAGE | 69 | | 14.0 | 1 | 11 | 5 | 12 | 11 | 5 | 7 | 2 | | 4 | 3 | |
| 4 | ABNORMAL IMAGE | 39 | | 7.9 | | 3 | 8 | 1 | | 2 | 1 | 1 | | | | |

BASIC OPERATIONS OF OUTPUT SYSTEM

BASIC OPERATIONS OF CONTROL SYSTEM

FIG.47

FIRST DATABASE 3708

MASTER TABLES

| | |
|---|---|
| MACHINE TYPE CODE MASTER TABLE | 3708a |
| FACTORY NAME MASTER TABLE | 3708b |
| PRODUCT FIELD MASTER TABLE | 3708c |
| PRODUCTION STEP MASTER TABLE | 3708d |
| LINE NO MASTER TABLE | 3708e |
| RANK MASTER TABLE | 3708f |
| INPUT SUPERVISOR MASTER TABLE | 3708g |
| RESPONSIBILE SECTOR MASTER TABLE | 3708h |
| REPAIR CONTENTS MASTER TABLE | 3708i |
| UNIT CHECK ITEM MASTER TABLE | 3708j |
| REPAIR SUPERVISOR MASTER TABLE | 3708k |
| IN-PROCESSING CHECK ITEM MASTER TABLE | 3708l |
| COUNTERMEASURE SUPERVISOR MASTER TABLE | 3708m |
| PROCESSING OPERATION SETTINGS MASTER TABLE | 3708n |
| ALARM RECEIVER MASTER TABLE | 3708o |
| CHECK TABLE ITEM MASTER TABLE | 3708p |
| UNIT NAME MASTER TABLE | 3708q |
| MACHINE NAME MASTER TABLE | 3708r |
| ALARM CONTROL MASTER TABLE | 3708s |
| ALARM VALUE MASTER TABLE | 3708t |
| NATURE OF DEFECTS MASTER TABLE | 3708u |
| UNIT CHECK TABLE ITEM MASTER TABLE | 3708v |

FIG.49

MACHINE TYPE CODE NAME MASTER TABLE 3708a

| KEY | ITEMS | DATA | | | |
|---|---|---|---|---|---|
| | NO. | 01 | 02 | 03 | ... |
| ◎ | MACHINE TYPE CODE | A25700 | A25715 | A25717 | ... |
| | MACHINE TYPE NAME | 3101 | 3B6 | H11 | ... |
| | PRODUCT NAME | imagioCoLor 4000 | SavinSDC 410 | AficioColor 6010 | ... |
| | VOLTAGE DISPLAY | 100V 50/60Hz | 115V 50/60Hz | 115V 50/60Hz | ... |
| | MACHINE CODE | A | B | C | ... |

FIG.50

FACTORY NAME MASTER TABLE 3708b

| KEY | ITEMS | DATA | | |
|---|---|---|---|---|
| | NO. | 01 | 02 | ... |
| ◎ | FACTORY NAME | GOTENBA | ATSUGI | ... |
| | ABBREVIATION | GTB | ATG | ... |

FIG.51

PRODUCT FIELD TYPE MASTER TABLE 3708c

| KEY | ITEMS | DATA | |
|---|---|---|---|
| ◎ | PRODUCT FIELD TYPE | PPC | ... |

FIG.52

PRODUCTION STEP MASTER TABLE 3708d

| KEY | ITEMS | DATA | | |
|---|---|---|---|---|
| | NO. | 01 | 02 | ... |
| ◎ | PRODUCTION STEP | MASS-PRODUCTION | MASS TEST | ... |

FIG.53

Line NO MASTER TABLE 3708e

| KEY | ITEMS | DATA | | |
|---|---|---|---|---|
| ◎ | LINE NO. | A8031 | A8511 | ... |

FIG.54

Rank MASTER TABLE 3708f

| KEY | ITEMS | DATA | | |
| --- | --- | --- | --- | --- |
| ◎ | RANK | CHECK DEPENDENCE | INFORMATION TREATING | ... |

FIG.55

INPUT SUPERVISOR MASTER TABLE 3708g

| KEY | ITEMS | DATA | | | |
| --- | --- | --- | --- | --- | --- |
| ◎ | EMPLOYEE NO. | 091 | 111111 | 123456 | ... |
| | NAME | SAKAI | YAMADA | SUGIYAMA | ... |
| | PASSWORD | 091 | 111111 | 123456 | ... |

FIG.56

RESPONSIBLE SECTOR MASTER TABLE 3708h

| KEY | ITEMS | DATA | | | |
|---|---|---|---|---|---|
| ◎ | NO. | 01 | 06 | 99 | ... |
| | RESPONSIBLE SECTOR 1 | TECHNOLOGY | ASSEMBLY | OTHER | ... |
| | RESPONSIBLE SECTOR 2 | – | N-4:WRITE | – | ... |
| | RESPONSIBLE SECTOR 3 | – | – | – | ... |

FIG.57

REPAIR CONTENTS MASTER TABLE 3708i

| KEY | ITEMS | DATA | | | |
|---|---|---|---|---|---|
| ◎ | NO. | 005 | 018 | 041 | ... |
| | REPAIR CONTENTS 1 | OK | SET | SET | ... |
| | REPAIR CONTENTS 2 | REMEASUREMENT OK | COVER TEETH AFTER DF | POWER CODE DISCONNECTED CLAMP | ... |
| | REPAIR CONTENTS 3 | – | RH | No4 | ... |

FIG.58

UNIT CHECK ITEM MASTER TABLE 3708j

| KEY | ITEMS | DATA | | | |
|---|---|---|---|---|---|
| ◎ | NO. | 01 | 02 | 03 | ... |
| | SUPERVISOR NAME | USHIGOME | TSUCHIMOCHI | KATO | ... |

FIG.59

REPAIR SUPERVISOR MASTER TABLE 3708k

| KEY | ITEMS | DATA | | | |
|---|---|---|---|---|---|
| | NO. | 01 | 02 | 03 | ... |
| ◎ | SUPERVISOR NAME | USHIGOME | HASEGAWA | KATO | ... |

FIG.60

IN-PROCESSING CHECK ITEM
MASTER TABLE 3708l

| KEY | ITEMS | DATA | | | |
|---|---|---|---|---|---|
| | NO. | 01 | 02 | 03 | ... |
| ◎ | SUPERVISOR NAME | SHIRASAKA | TSUCHIMOCHI | KATO | ... |

FIG.61

COUNTERMEASURE SUPERVISOR
MASTER TABLE 3708m

| KEY | ITEMS | DATA | | |
|---|---|---|---|---|
| | NO. | 01 | 02 | ... |
| ◎ | SUPERVISOR NAME | USHIGOME | ASANO | ... |

FIG.62

PROCESSING OPERATION SETTINGS
MASTER TABLE 3708n

| KEY | ITEMS | DATA | | | |
|---|---|---|---|---|---|
| ◎ | NO. | 01 | 43 | 45 | ... |
| | PROCESSING NAME | MAIN ASSEMBLY 01 | MACHINE CHECK 02 | ELECTRICAL CHECK 01 | ... |
| | DISPLAY PROCESSING | MAIN ASSEMBLY 01 | MACHINE CHECK 02 | ELECTRICAL CHECK 01 | ... |
| | CHECKER | OTA | MATSUMOTO | IWATA | ... |
| | TAB CONTROL | START | CHECK TABLE | CHECK TABLE+Unit | ... |

FIG.63

ALARM RECEIVER MASTER TABLE 3708o

| KEY | ITEMS | DATA | | | |
|---|---|---|---|---|---|
| | NO. | 001 | 029 | 041 | ... |
| | RESPONSIBLE SECTOR 1 | ASSEMBLY | ASSEMBLY | ASSEMBLY | ... |
| | RESPONSIBLE SECTOR 2 | A-4:AIO | P-5:3 SETS | T-4 FIXING | ... |
| | RESPONSIBLE SECTOR 3 | – | – | 3G | ... |
| | NOTES_ID | Misako Katsumata/R/RICOH | Tsutom Ushigome/R/RICOH | Eijiroh Katuski/RICOH | ... |
| | TRANSMISSION CLASSIFICATION | TO | CC | CC | ... |

FIG.64

CHECK TABLE ITEM MASTER TABLE 3708p

| KEY | ITEMS | DATA | | | |
|---|---|---|---|---|---|
| ◎ | MACHINE TYPE CODE | A25000 | A25000 | A25000 | ... |
| ◎ | NO. | 02 | 03 | 04 | ... |
| ◎ | PROCESSING NAME | MACHINE CHECK 02 | MACHINE CHECK 02 | MACHINE CHECK 02 | ... |
| | CHECK ITEM | DROPPED OBJECT | FIT SCREW | VERIFY WIRING | ... |
| | STIPULATIONS | ELIMINATE | ELIMINATE PROTRUSION | NO INCORRECT WIRING | ... |
| | INPUT TYPE | 2 | 2 | 2 | ... |

FIG.65

UNIT NAME MASTER TABLE 3708q

| KEY | ITEMS | DATA | | | |
|---|---|---|---|---|---|
| ◎ | UNIT_NO | 1 | 2 | 3 | ... |
| ◎ | UNIT CODE | A | A | A | ... |
| ◎ | UNIT NAME | CONTROLLER | CONTROLLER | CONTROLLER | ... |
| ◎ | UNIT DIVISION | 01 | 02 | 03 | ... |
| ◎ | MACHINE TYPE CODE | A25000 | A28000 | A28100 | ... |
| | UNIT MACHINE TYPE CODE | A250.11 | A250.11 | A250.11 | ... |
| | UNIT CHECK TABLE | YES | NO | YES | ... |

FIG.66

MACHINE NAME MASTER TABLE 3708r

| KEY | ITEMS | DATA | | |
|---|---|---|---|---|
| ◎ | MACHINE NAME | Iris/Lilac2 | StingerC1 | ... |
| | PRODUCT FIELD | PPC | PPC | ... |
| | PRODUCTION POINT | GTB | GTB | ... |
| | DATE WHEN MASS PRODUCTION STARTED | 2000.01.01 | 2000.01.01 | ... |
| | SERVER NAME | PRQ_GTB1 | PRQ_GTB1 | ... |
| | IP_ADDRESS | 133.139.104.147 | 133.139.104.147 | ... |
| | DB NAME | Q_Lilac2 | Q_StingerC1 | ... |
| | HEAD_NO_FLG | * | – | ... |
| | MAIL TRANSMISSION | * | – | ... |

FIG.67

ALARM CONTROL MASTER TABLE 3708s

| KEY | ITEMS | DATA | |
|---|---|---|---|
| ◎ | CONTROL DIVISION | A003 | ... |
| ◎ | ORGANIZATION | A003G | ... |
| | OBJECT VALUE | 0 | ... |
| | ALARM VALUE | 2 | ... |

FIG.68

ALARM VALUE MASTER TABLE 3708t

| KEY | ITEMS | DATA | | | |
|---|---|---|---|---|---|
| ◎ | NO. | 02 | 03 | 04 | ··· |
| ◎ | CONTROL DIVISION | IMPORTANT | — | REOCCURRENCE | ··· |
| | DEFECTIVE SECTOR | SAFETY STIPULATIONS DEFECTIVE | — | — | ··· |
| | PROCESSING NAME | ELECTRICAL CHECK 01 | — | — | ··· |
| | DEFECTIVE ITEM | SAFETY STIPULATIONS DEFECTIVE | DEFECTIVE CRIMPING | CIRCULAR S DEFECT | ··· |
| | NATURE OF DEFECT 1 | HEAT LOSS | — | — | ··· |
| | NATURE OF DEFECT 2 | IC2 | — | — | ··· |
| | NATURE OF DEFECT 3 | NONPERFORMING | — | — | ··· |
| | LINE OUT | — | RESECT | — | ··· |
| | CHANGES | — | * | — | ··· |
| | RANK | — | CHECK DEPENDENCE | — | ··· |
| | RESPONSIBLE SECTOR 1 | TECHNOLOGY | PARTS | PARTS | ··· |
| | RESPONSIBLE SECTOR 2 | — | — | — | ··· |
| | RESPONSIBLE SECTOR 3 | — | — | — | ··· |
| | REOCCURRENCE | * | — | — | ··· |
| | CAUSE OF DEFECT | — | — | — | ··· |
| | REPAIR CONTENTS 1 | EXCHANGE | — | — | ··· |
| | REPAIR CONTENTS 2 | BICU | — | — | ··· |
| | REPAIR CONTENTS 3 | SERIAL NO 001205 | — | — | ··· |
| | REPAIR SUPERVISOR | TANAKA | — | — | ··· |
| | REPAIR PREVETION CONTENTS | INTENSIFY PRODUCT CHECKS | — | — | ··· |
| | COUNTERMEASURE SUPERVISOR | YAMAGUCHI | — | — | ··· |
| | ALARM VALUE | 1 * | 1 * | 1 * | ··· |
| | ALARM RESULT | 000707 7 | 000707 7 | 000707 7 | ··· |
| | TIME OF ALARM | 10:15 | 12:30 | 09:28 | ··· |
| | DATE OF MAIL TRANSMISSION | 000707 10:15 | 000707 12:30 | 000707 09:28 | ··· |

FIG.69

NATURE OF DEFECTS MASTER TABLE 3708u

| KEY | ITEMS | DATA | | | |
|---|---|---|---|---|---|
| ◎ | MACHINE TYPE NAME | StingerC1 | StingerC1 | StingerC1 | ... |
| ◎ | PROCESS NAME | MACHINE CHECK 01 | IMAGE CHECK 01 | IMAGE CHECK 02 | ... |
| ◎ | NO. | 0043 | 0054 | 0055 | ... |
| ◎ | DEFECTIVE ITEM | SC DEFECT | IMAGE DEFECT | IMAGE DEFECT | ... |
| | NATURE OF DEFECT 1 | SC2001 | TONER DOWN | SPOT | ... |
| | NATURE OF DEFECT 2 | PRINTER ERROR | A3 | WHITE SPOT | ... |
| | NATURE OF DEFECT 3 | – | 200% | RIGHT 100% | ... |

FIG.70

UNIT CHECK TABLE ITEM MASTER TABLE 3708v

| KEY | ITEMS | DATA | | | |
|---|---|---|---|---|---|
| ◎ | UNIT CODE | K | S | S | ... |
| ◎ | UNIT DIVISION | 24 | 01 | 02 | ... |
| | NO. | 01 | 01 | 01 | ... |
| | CLASSIFICATION | WRITE UNIT | SCANNER | SCANNER | ... |
| | CHECK ITEM | VERIFY LENS AND MIRROR | VERIFY FRAME DRIVE AND ASSEMBLY | PAINT ACURIDE GREASE | ... |
| | STIPULATIONS | NO SCRATCHES OR DIRT | 1.NO PROTRUDING SCREWS OR MISSING PARTS | 1.NO FORGOTTEN PAINTING OR PROTRUSIONS | ... |
| | CHECK METHOD | VISUAL | MANUAL | VISUAL | ... |

FIG.71

CHECK TABLE DATA TABLE 3709a

| KEY | ITEMS | DATA | | | |
|---|---|---|---|---|---|
| ◎ | ASSEMBLY SERIAL NO. | 200004-00003 | 200004-00003 | 200004-00003 | ··· |
| ◎ | MACHINE TYPE Code | A25019 | A25019 | A25019 | ··· |
| ◎ | CHECK TABLE CONNECTION | 1 | 1 | 1 | ··· |
| ◎ | NO. | 01 | 02 | 03 | ··· |
| ◎ | PRODUCT STEP | MASS-PRODUCTION | MASS-PRODUCTION | MASS-PRODUCTION | ··· |
| | PROCESSING NAME | MACHINE CHECK 02 | MACHINE CHECK 02 | MACHINE CHECK 02 | ··· |
| | CHECK ITEMS | MISSING PART | DROPPED OBJECT | FIT SCREW | ··· |
| | STIPULATIONS | ELIMINAT | ELIMINAT | ELIMINATE PROTRUSION | ··· |
| | DETERMINATION_COMPLETION | MATCH | MATCH | MATCH | ··· |
| | REPRINTING | YAMAGUCHI | YAMAGUCHI | — | ··· |
| | INPUT TYPE | 2 | 2 | 2 | ··· |

FIG.72

CHECK TABLE REVISION HISTORY DATA TABLE 3709b

| KEY | ITEMS | DATA | |
|---|---|---|---|
| ◎ | MACHINE TYPE Code | A25700 | ... |
| ◎ | NO. | 01 | ... |
| | ITEM | MACHINE CHECK | ... |
| | CONTENT | MISSING PART | ... |
| | CREATION DATE | 20000416 | ... |
| | EDITING DATE | 20000417 | ... |
| | CONFIRMATION | KOTO | ... |

FIG.73

UNIT CONTROL NO DATA TABLE 3709c

| KEY | ITEMS | DATA | | | |
|---|---|---|---|---|---|
| ◎ | ASSEMBLY SERIAL NO. | 200001-00034 | 200001-00034 | 200001-00034 | ... |
| ◎ | MACHINE TYPE Code | A25022 | A25022 | A25022 | ... |
| ◎ | UNIT _NO | 52 | 61 | 91 | ... |
| ◎ | UNIT CODE | A | K | T | ... |
| ◎ | UNIT DIVISION | 12 | 24 | 12 | ... |
| ◎ | PRODUCT STEP | MASS-PRODUCTION | MASS-PRODUCTION | MASS-PRODUCTION | ... |
| | UNIT NAME | CONTROLLER | WRITE UNIT | FIXING UNIT | ... |
| | UNIT CONTROL NO | A25022000A | A25022000S | A250220001T00034 | ... |

FIG.74

Main DATA TABLE 3709d

| KEY | ITEMS | DATA | | | |
|---|---|---|---|---|---|
| | FACTORY NAME | GOTENBA | GOTENBA | GOTENBA | ... |
| | PRODUCT FIELD | PPC | PPC | PPC | ... |
| | MACHINE TYPE NAME | StringerC1 | StringerC1 | StringerC1 | ... |
| ◎ | PRODUCTION STEP | MASS-PRODUCTION | MASS-PRODUCTION | MASS-PRODUCTION | ... |
| | LINE NO. | A8031 | A8031 | A8031 | ... |
| ◎ | MACHINE TYPE CODE | A29100 | A29100 | B00115 | ... |
| ◎ | ASSEMBLY SERIAL NO. | 200001-00099 | 200001-00829 | 200002-00041 | ... |
| | MACHINE NO. | 3124-126011 | 3124-126931 | H4300200102 | ... |
| | ASSEMBLY START DAY | 20000417 | 20000420 | 20000324 | ... |
| | ASSEMBLY STARTING TIME | 08:45 | 08:56 | 15:14 | ... |
| | COMPLETE DAY | 20000417 | 20000424 | 20000324 | ... |
| | COMPLETE TIME | 09:33 | 15:00 | 16:27 | ... |
| | LineOutFlg | 1 | 2 | 2 | ... |
| | PROCESS INPUT HOLD Flg | – | * | * | ... |
| | MANUFACTURING INPUT HOLD Flg | * | – | – | ... |
| | MANUFACTURING CHECK SampleFlg | – | * | – | ... |
| | MARKET GENERATION Flg | – | – | – | ... |
| | DATE OF INPUT | 20000417 | 20000420 | 20000324 | ... |
| | NO. OF DEFECTS | – | 01 | 01 | ... |
| | NO. OF CHANGES | 01 | 02 | 01 | ... |
| | NO. OF REOCCURRENCES | – | – | 01 | ... |
| | NO. OF RECHECKS | 01 | 02 | 03 | ... |
| | NO. OF INFORMATION TREATING | 01 | 02 | 01 | ... |
| | SPECIAL SPECIFICATIONS | MEMO | SUFFIX A CHANGED TO B | CHANGED TO △△ REGULATION | ... |
| | DATE AND TIME OF LATEST UPDATE | 000417/9:33:50 | 000420/8:57:43 | 7 | ... |

FIG.75

IN-PROCESSING DEFECT DATA TABLE 3709f

| KEY | ITEMS | DATA | | | |
|---|---|---|---|---|---|
| | FACTORY NAME | GOTENBA | GOTENBA | GOTENBA | ... |
| | PRODUCT FIELD | PPC | PPC | PPC | ... |
| | MACHINE TYPE NAME | StingerC1 | StingerC1 | StingerC1 | ... |
| ◎ | PRODUCTION STEP | MASS-PRODUCTION | MASS-PRODUCTION | MASS-PRODUCTION | ... |
| | LINE NO. | A8031 | A8031 | A8031 | ... |
| ◎ | MACHINE TYPE Code | A29100 | B00115 | B00115 | ... |
| ◎ | ASSEMBLY SERIAL NO. | 200001-00829 | 200002-00041 | 200002-00041 | ... |
| ◎ | DEFECT SERIAL NO. | 01 | 01 | 02 | ... |
| | MACHINE NO. | H4300200111 | H4300200102 | H4300200102 | ... |
| | DEFECTIVE SECTOR | – | SAFETY STIPULATIONS DEFECTIVE | – | ... |
| | NO. OF RECHECKS | – | 01 | – | ... |
| | OCCURRENCE DATE | 20000420 | 20000324 | 20000324 | ... |
| | OCCURRENCE TIME | 08:57 | 15:14 | 16:15 | ... |
| | PROCESS NAME | MACHINE CHECK 02 | IMAGE CHECK 02 | IMAGE CHECK 01 | ... |
| | DEFECTIVE ITEM | DISPLAY DEFECT | SOUND DEFECT | IMAGE DEFECT | ... |
| | NATURE OF DEFECT1 | CANNOT DISPLAY A3 | SOUND DURING NORMAL PASSAGE OF PAPER IS TOO LOUD | VERTICAL WHITE LINE | ... |
| | NATURE OF DEFECT2 | – | – | J | ... |
| | NATURE OF DEFECT3 | – | – | – | ... |
| | LINE OUT | – | 1 | 1 | ... |
| | CHANGES | – | * | * | ... |
| | RANK | – | – | – | ... |
| | RESPONSIBLE SECTOR 1 | OTHER | PARTS | OTHER | ... |
| | RESPONSIBLE SECTOR 2 | – | – | – | ... |
| | RESPONSIBLE SECTOR 3 | – | – | – | ... |
| | REOCCURRENCE | – | – | * | ... |
| | CAUSE OF DEFECT | – | – | – | ... |
| | REPAIR CONTENTS 1 | REPLACE | REPLACE | REPLACE | ... |
| | REPAIR CONTENTS 2 | PRINT BOARD | HOUSING DRIVE | HOUSING DRIVE | ... |
| | REPAIR CONTENTS 3 | – | – | – | ... |
| | REPAIR DATE | 20000420 | 20000324 | 20000324 | ... |
| | REPAIR TIME | – | – | – | ... |
| | REPAIR SUPERVISOR | KATO | MOCHIDA | SUGIMOTO | ... |
| | REPAIR PREVETION CONTENTS | REVISE SEQUENCE MANUAL | – | – | ... |
| | DATE OF COUNTERMEASURE | 20000705 | – | – | ... |
| | TIME OF COUNTERMEASURE | 15:30 | – | – | ... |
| | COUNTERMEASURE SUPERVISOR | TANAKA | – | – | ... |
| | DATE OF LATEST UPDATE | 000420/8:57:44 | 000324/16:27:37 | 000324/16:27:37 | ... |
| | MAIL TRANSMISSION FLAG | 1 | – | – | ... |

MAIL TRANSMISSION「1」FLAG: TARGET OF TRANSMISSION
MAIL TRANSMISSION「2」FLAG: TRANSMITTED

FIG.76

NON-PROCESSING DEFECT DATA TABLE 3709g

| KEY | ITEMS | DATA | |
|---|---|---|---|
| | FACTORY NAME | GOTENBA | ··· |
| | PRODUCT FIELD | PPC | ··· |
| | MACHINE TYPE NAME | StingerC1 | ··· |
| ◎ | PRODUCTION STEP | MASS-PRODUCTION | ··· |
| ◎ | CONTROL NO | – | ··· |
| ◎ | DEFECT SERIAL NO. | 01 | ··· |
| | NO. OF DEFECTS | – | ··· |
| | OCCURRENCE DATE | 20000630 | ··· |
| | OCCURRENCE TIME | 01:30 | ··· |
| | UNIT NAME | – | ··· |
| | DEFECTIVE ITEM | DISPLAY DEFECT | ··· |
| | NATURE OF DEFECT 1 | CANNOT DISPLAY A3 | ··· |
| | NATURE OF DEFECT 2 | – | ··· |
| | NATURE OF DEFECT 3 | – | ··· |
| | LINE OUT | – | ··· |
| | CHANGES | – | ··· |
| | RANK | – | ··· |
| | RESPONSIBLE SECTOR 1 | OTHER | ··· |
| | RESPONSIBLE SECTOR 2 | – | ··· |
| | REOCCURRENCE | – | ··· |
| | CAUSE OF DEFECT | – | ··· |
| | REPAIR CONTENTS 1 | EXCHANGE | ··· |
| | REPAIR CONTENTS 2 | PRINTER BOARD | ··· |
| | REPAIR DATE | 20000703 | ··· |
| | REPAIR TIME | – | ··· |
| | REPAIR SUPERVISOR | KATO | ··· |
| | REPAIR PREVETION CONTENTS | REVISE SEQUENCE MANUAL | ··· |
| | DATE OF COUNTERMEASURE | 20000710 | ··· |
| | TIME OF COUNTERMEASURE | 15:30 | ··· |
| | COUNTERMEASURE SUPERVISOR | TANAKA | ··· |
| | DATE OF LATEST UPDATE | – | ··· |

FIG.77

UNIT MAIN DATA TABLE 3709e

| KEY | ITEMS | DATA | | | |
|---|---|---|---|---|---|
| | FACTORY NAME | GOTENBA | GOTENBA | GOTENBA | ··· |
| | PRODUCT FIELD | PPC | PPC | PPC | ··· |
| | MACHINE TYPE NAME | StingerC1 | StingerC1 | StingerC1 | ··· |
| ◎ | PRODUCTION STEP | MASS-PRODUCTION | MASS-PRODUCTION | MASS-PRODUCTION | ··· |
| ◎ | UNIT CODE | T | T | T | ··· |
| ◎ | UNIT DIVISION | 01 | 01 | 01 | ··· |
| ◎ | UNIT CONTROL NO. | A250000001T00001 | A250000001T00002 | A250000001T00003 | ··· |
| ◎ | UNIT NAME | FIXING UNIT | FIXING UNIT | FIXING UNIT | ··· |
| | ASSEMBLY START DAY | 20000124 | 20000124 | 20000124 | ··· |
| | ASSEMBLY STARTING TIME | 11:06 | 11:07 | 11:08 | ··· |
| | COMPLETE DAY | 20000124 | 20000124 | 20000124 | ··· |
| | COMPLETE TIME | 11:06 | 11:07 | 11:08 | ··· |
| | DATE OF INPUT | 20000124 | 20000124 | 20000124 | ··· |
| | NO. OF DEFECTS | 01 | 02 | 03 | ··· |
| | NO. OF CHANGES | 01 | 02 | 03 | ··· |
| | NO. OF REOCCURRENCE | 01 | 02 | 03 | ··· |
| | NO. OF RECHECKS | 01 | 02 | 03 | ··· |
| | DATE OF LATEST UPDATE | 000124/11:06:03 | 000124/11:07:38 | 000124/11:08:37 | ··· |

FIG.78

UNIT CHECK TABLE DATA TABLE 3709i

| KEY | ITEMS | DATA | | | |
|---|---|---|---|---|---|
| ◎ | UNIT CONTROL NO. | A250000001T00001 | A250000001T00001 | A250000001T00001 | ... |
| ◎ | UNIT CODE | T | T | T | ... |
| ◎ | UNIT DIVISION | 01 | 01 | 01 | ... |
| ◎ | PRODUCTION STEP | MASS-PRODUCTION | MASS-PRODUCTION | MASS-PRODUCTION | ... |
| ◎ | NO. | 01 | 02 | 03 | ... |
| | CLASSIFICATION | FIXING UNIT | FIXING UNIT | FIXING UNIT | ... |
| | CHECK ITEM | VERIFY DIVERGENCE OF FIXING ROLLER MACHINE TYPE | VERIFY DIVERGENCE OF INFRARED HEATER MACHINE TYPE | VERIFY DIVERGENCE OF DEFUNCT ROLLER MACHINE TYPE | ... |
| | STIPULATIONS | INSCRIPTION ON FIXING ROLLERS | RED INSCRIPTION (DOMESTIC 120V) BLACK INSCRIPTION (230V) | DIAMETER OF ROLLERS IS NARROWER AT TWO POINTS ON THE INNER SIDE | ... |
| | CHECK METHOD | VISUAL | VISUAL | VISUAL | ... |
| | RESULT | 1 | 1 | 1 | ... |
| | RECHECK STAMP | TANAKA | WATANABE | YAMAGUCHI | ... |

FIG.79

UNIT DATA TABLE 3709j

| KEY | ITEMS | DATA | | | |
|---|---|---|---|---|---|
| ◎ | UNIT CONTROL NO. | A250000001T00001 | A250000001T00001 | A250000001T00001 | ... |
| ◎ | UNIT CODE | T | T | T | ... |
| ◎ | UNIT DIVISION | 01 | 01 | 01 | ... |
| ◎ | PRODUCTION STEP | MASS-PRODUCTION | MASS-PRODUCTION | MASS-PRODUCTION | ... |
| | UNIT NAME | FIXING UNIT | FIXING UNIT | FIXING UNIT | ... |
| | CHECK DATE | 20000124 | 20000124 | 20000124 | ... |
| | CHECK TIME | 11:06 | 11:07 | 11:08 | ... |
| | RECHECK STAMP | TANAKA | TANAKA | WATANABE | ... |
| | PASS STAMP | KASAI | KASAI | KASAI | ... |

Figure 93:
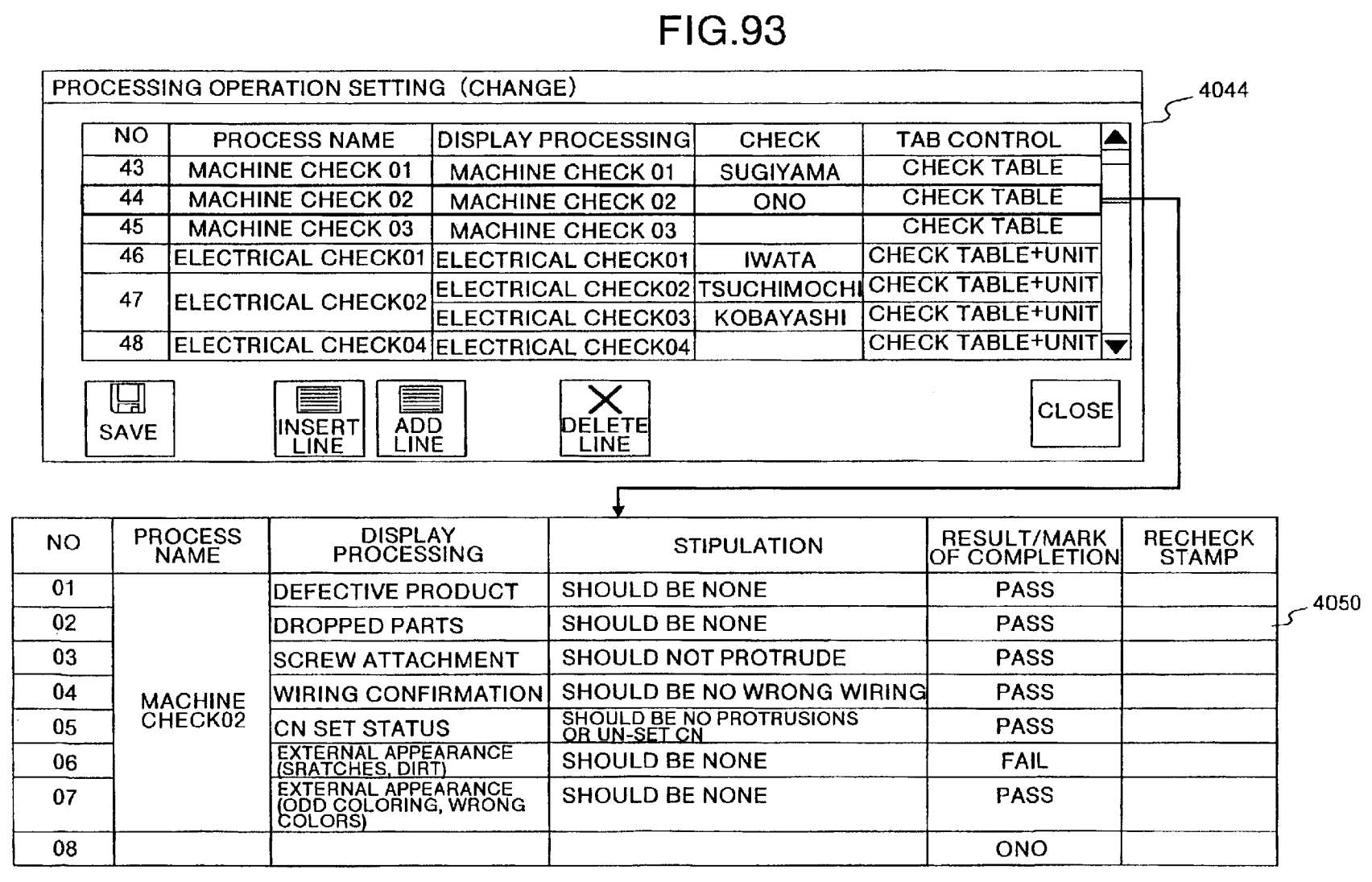

PROCESSING OPERATION SETTING (CHANGE)

| NO | PROCESS NAME | DISPLAY PROCESSING | CHECK | TAB CONTROL |
|---|---|---|---|---|
| 43 | MACHINE CHECK 01 | MACHINE CHECK 01 | SUGIYAMA | CHECK TABLE |
| 44 | MACHINE CHECK 02 | MACHINE CHECK 02 | ONO | CHECK TABLE |
| 45 | MACHINE CHECK 03 | MACHINE CHECK 03 | | CHECK TABLE |
| 46 | ELECTRICAL CHECK01 | ELECTRICAL CHECK01 | IWATA | CHECK TABLE+UNIT |
| 47 | ELECTRICAL CHECK02 | ELECTRICAL CHECK02 | TSUCHIMOCHI | CHECK TABLE+UNIT |
| | | ELECTRICAL CHECK03 | KOBAYASHI | CHECK TABLE+UNIT |
| 48 | ELECTRICAL CHECK04 | ELECTRICAL CHECK04 | | CHECK TABLE+UNIT |

SAVE | INSERT LINE | ADD LINE | DELETE LINE | CLOSE

4050

| NO | PROCESS NAME | DISPLAY PROCESSING | STIPULATION | RESULT/MARK OF COMPLETION | RECHECK STAMP |
|---|---|---|---|---|---|
| 01 | MACHINE CHECK02 | DEFECTIVE PRODUCT | SHOULD BE NONE | PASS | |
| 02 | | DROPPED PARTS | SHOULD BE NONE | PASS | |
| 03 | | SCREW ATTACHMENT | SHOULD NOT PROTRUDE | PASS | |
| 04 | | WIRING CONFIRMATION | SHOULD BE NO WRONG WIRING | PASS | |
| 05 | | CN SET STATUS | SHOULD BE NO PROTRUSIONS OR UN-SET CN | PASS | |
| 06 | | EXTERNAL APPEARANCE (SRATCHES, DIRT) | SHOULD BE NONE | FAIL | |
| 07 | | EXTERNAL APPEARANCE (ODD COLORING, WRONG COLORS) | SHOULD BE NONE | PASS | |
| 08 | | | | ONO | |

FIG.94

PROCESSING OPERATION SETTING (CHANGE)

4044

| NO | PROCESS NAME | DISPLAY PROCESSING | CHECK | TAB CONTROL |
|---|---|---|---|---|
| 43 | MACHINE CHECK 01 | MACHINE CHECK 01 | SUGIYAMA | CHECK TABLE |
| 44 | MACHINE CHECK 02 | MACHINE CHECK 02 | ONO | CHECK TABLE |
| 45 | MACHINE CHECK 03 | MACHINE CHECK 03 | | CHECK TABLE |
| 46 | ELECTRICAL CHECK01 | ELECTRICAL CHECK01 | IWATA | CHECK TABLE+UNIT |
| 47 | ELECTRICAL CHECK02 | ELECTRICAL CHECK02 | TSUCHIMOCHI | CHECK TABLE+UNIT |
| | | ELECTRICAL CHECK03 | KOBAYASHI | CHECK TABLE+UNIT |
| 48 | ELECTRICAL CHECK04 | ELECTRICAL CHECK04 | | CHECK TABLE+UNIT |

SAVE INSERT LINE ADD LINE DELETE LINE CLOSE

4050

| NO | PROCESS NAME | DISPLAY PROCESSING | STIPULATION | RESULT/MARK OF COMPLETION | RECHECK STAMP |
|---|---|---|---|---|---|
| 01 | ELECTRICAL CHECK02 | DETECT TONER END | SHOULD FLASH | PASS | |
| 02 | | REGULATION AIO SET | DO NOT DISPLAY "PLEASE SET" | PASS | |
| 03 | | 1-PIN LED LAMP | 2 LAMPS TOGETHER | PASS | |
| 04 | | LEAKED CURRENT | LESS THAN 1.0 mA | PASS | |
| 05 | | | | TSUCHIMOCHI | |
| 06 | ELECTRICAL CHECK03 | LOOP BACK 1-PIN | SHOULD BE OK | PASS | |
| 07 | | LOOP BACK 1-DF | SHOULD BE OK | PASS | |
| 08 | | LOOP BACK PUNCTURE | SHOULD BE OK | PASS | |
| 09 | | | | KOBAYASHI | |

UNIT CHECK TABLE AND NATURE OF UNIT DEFECTS

A19302 | 0001-00000 | WRITE UNIT | 24000100000 | CLOSE

UNIT CHECK TABLE | NATURE OF UNIT DEFECTS

| | | | | | | |
|---|---|---|---|---|---|---|
| | | | | | | |
| CHECK DATE | 000606 | | | | | |
| CHECK TIME | 17 : 49 | | | | | |
| | | | | | | |
| NO | CLASSIFICATION | CHECK ITEMS | STIPULATIONS | RETRIEVE METHOD | RESULT | RECHECK |
| 01 | WRITE UNIT | CONFIRM LENS MIRROR | NO SCRATCHES / DIRT / RUBBISH | | PASS | |
| 02 | | CONFIRM LENS MIRROR PRESS | NO PROTRUSIONS, WARPING, MISSING PART, INCORRECT SPECIFICATIONS | | PASS | |
| 03 | | CONFIRM POLYCON AND LD SUBSTRATE CONNECTOR SET ABILITY | NO PROTRUDING OR UNSET CONNECTORS | | PASS | |
| 04 | | CONFIRM CHARACTERISTIC VALUE OF CHARACTERISTIC VALUE CHECKER | SHOULD BE WITHIN CHARACTERISTIC VALUE STIPULATIONS | | PASS | |
| 05 | | CONFIRM EXTERNAL APPERANCE OF UNIT | NO PROTRUSIONS OR MISSING PARTS | | PASS | |

ALARM CONDITIONS SETTING BOX

PLEASE SELECT FROM "DEFECT DIVISION" ~ "CORRESPONDING SUPERVISOR" THE ITEM FOR WHICH YOU WISH TO RING THE ALARM, AND DIRECTLY INPUT THE NUMBER OF OCCURENCES OF THAT ITEM IN THE "ALARM VALUE" COLUMN. WHEN THE TARGET FOR THE ALARM IS NOT THE NUMBER OF OCCURENCES, AND YOU WISH THE ALARM TO RING WHENEVER THAT ITEM OCCURS, PLEASE INSERT "*" IN THE "ALARM VALUE" COLUMN.

THE ALARM WILL RING WHEN THE RETRIEVAL RESULT REACHES THE ALARM TARGET. (NB. AN EMPTY "ALARM VALUE" WILL BE IGNORED)

INDIVIDUAL ALARM SETTINGS | JOINT ALARM SETTINGS | SETTING OK | CANCEL (NB. FOR "JURISDICTION" SELECT EITHER "REOCCURRENCE" OR "IMPORTANT".

| NO | JURIS-DICTION | DEFECTIVE DIVISION | PROCESS NAME | DEFECTIVE ITEM | NATURE OF DEFECT 1 | NATURE OF DEFECT 2 | NATURE OF DEFECT 3 | REJECT | CAHNGES | RANK | RESPON-SIBLE SECTOR 1 | RESPON-SIBLE SECTOR 2 | RESPON-SIBLE SECTOR | ALARM VALUE |
|---|---|---|---|---|---|---|---|---|---|---|---|---|---|---|
| 1 | | | | IDENTICAL DEFECT | | | | | | | | | | |
| 2 | | | | SC DEFECT | | | | | | | TECHNOLOGY | | | 1* |
| 3 | | | | DEFECTIVE CRIMPING | | | | | | | TECHNOLOGY | | | 1* |
| 4 | | | | UNSAFETY STANDARD | | | | | | | TECHNOLOGY | | | 1* |
| 5 | | | | ASSEMBLY DEFECT | | | | | | | ASSEMBLY | | | 1* |
| 6 | | | | COMPONENT CRIMPING | | | | | | | COMPONENTS | | | 3* |
| 7 | | | | | | | | | | | | | | |
| 8 | | | | | | | | | | | | | | |
| 9 | | | | | | | | | | | | | | |
| 10 | | | | | | | | | | | | | | |
| 11 | | | | | | | | | | | | | | |
| 12 | | | | | | | | | | | | | | |
| 13 | | | | | | | | | | | | | | |
| 14 | | | | | | | | | | | | | | |
| 15 | | | | | | | | | | | | | | |
| 16 | | | | | | | | | | | | | | |
| 17 | | | | | | | | | | | | | | |
| 18 | | | | | | | | | | | | | | |

EVEN WHEN ITEM CONTENTS OF ALARM TARGET ARE INPUT, EMPTY "ALARM VALUE" COLUMNS WILL BE IGNORED AS ALARM TARGETS.

FIG.123

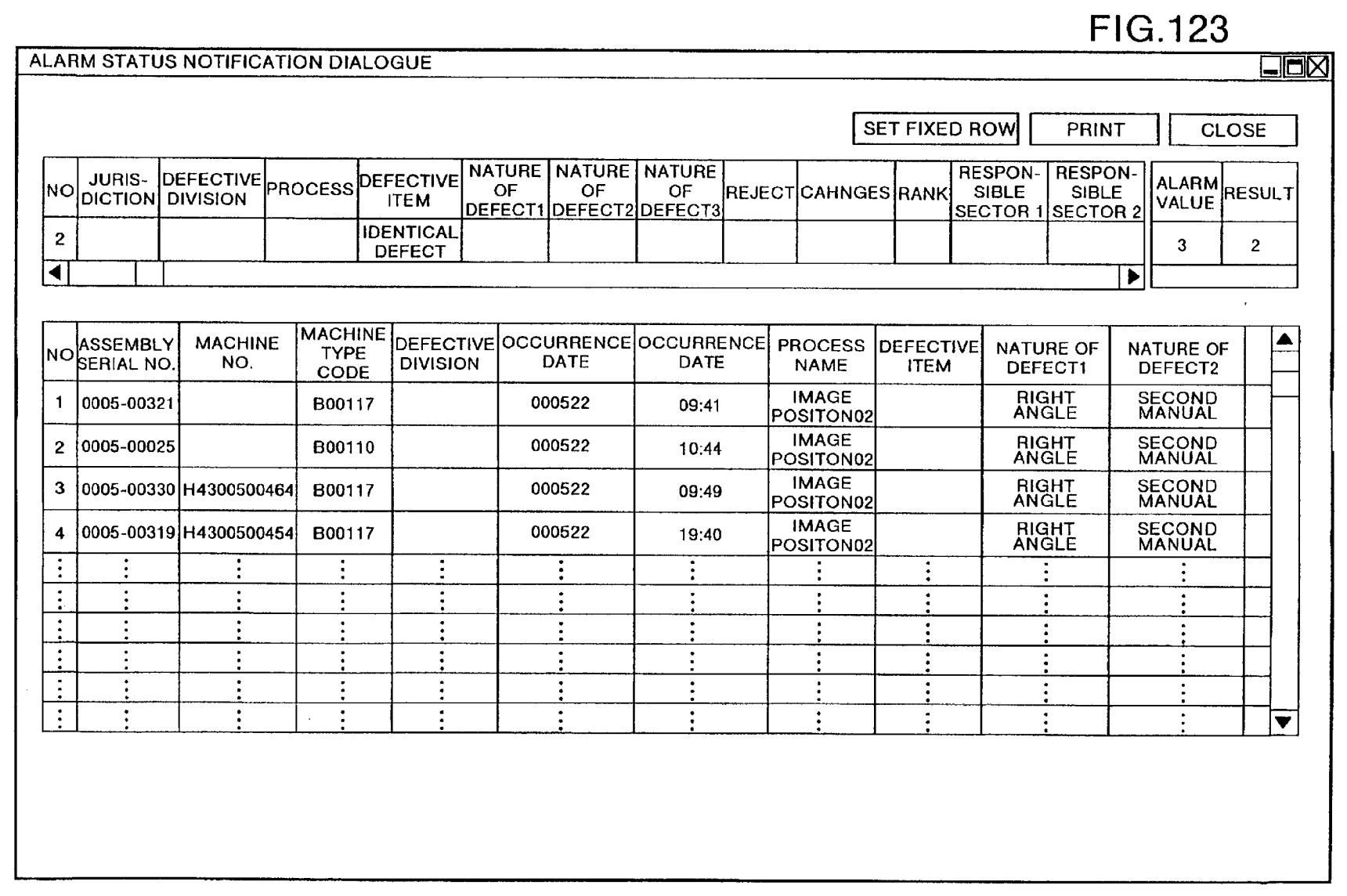

ALARM STATUS NOTIFICATION DIALOGUE

SET FIXED ROW | PRINT | CLOSE

| NO | JURIS-DICTION | DEFECTIVE DIVISION | PROCESS | DEFECTIVE ITEM | NATURE OF DEFECT1 | NATURE OF DEFECT2 | NATURE OF DEFECT3 | REJECT | CAHNGES | RANK | RESPON-SIBLE SECTOR 1 | RESPON-SIBLE SECTOR 2 |
|---|---|---|---|---|---|---|---|---|---|---|---|---|
| 2 | | | | IDENTICAL DEFECT | | | | | | | | |

| ALARM VALUE | RESULT |
|---|---|
| 3 | 2 |

| NO | ASSEMBLY SERIAL NO. | MACHINE NO. | MACHINE TYPE CODE | DEFECTIVE DIVISION | OCCURRENCE DATE | OCCURRENCE DATE | PROCESS NAME | DEFECTIVE ITEM | NATURE OF DEFECT1 | NATURE OF DEFECT2 |
|---|---|---|---|---|---|---|---|---|---|---|
| 1 | 0005-00321 | | B00117 | | 000522 | 09:41 | IMAGE POSITON02 | | RIGHT ANGLE | SECOND MANUAL |
| 2 | 0005-00025 | | B00110 | | 000522 | 10:44 | IMAGE POSITON02 | | RIGHT ANGLE | SECOND MANUAL |
| 3 | 0005-00330 | H4300500464 | B00117 | | 000522 | 09:49 | IMAGE POSITON02 | | RIGHT ANGLE | SECOND MANUAL |
| 4 | 0005-00319 | H4300500454 | B00117 | | 000522 | 19:40 | IMAGE POSITON02 | | RIGHT ANGLE | SECOND MANUAL |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

FIG.124

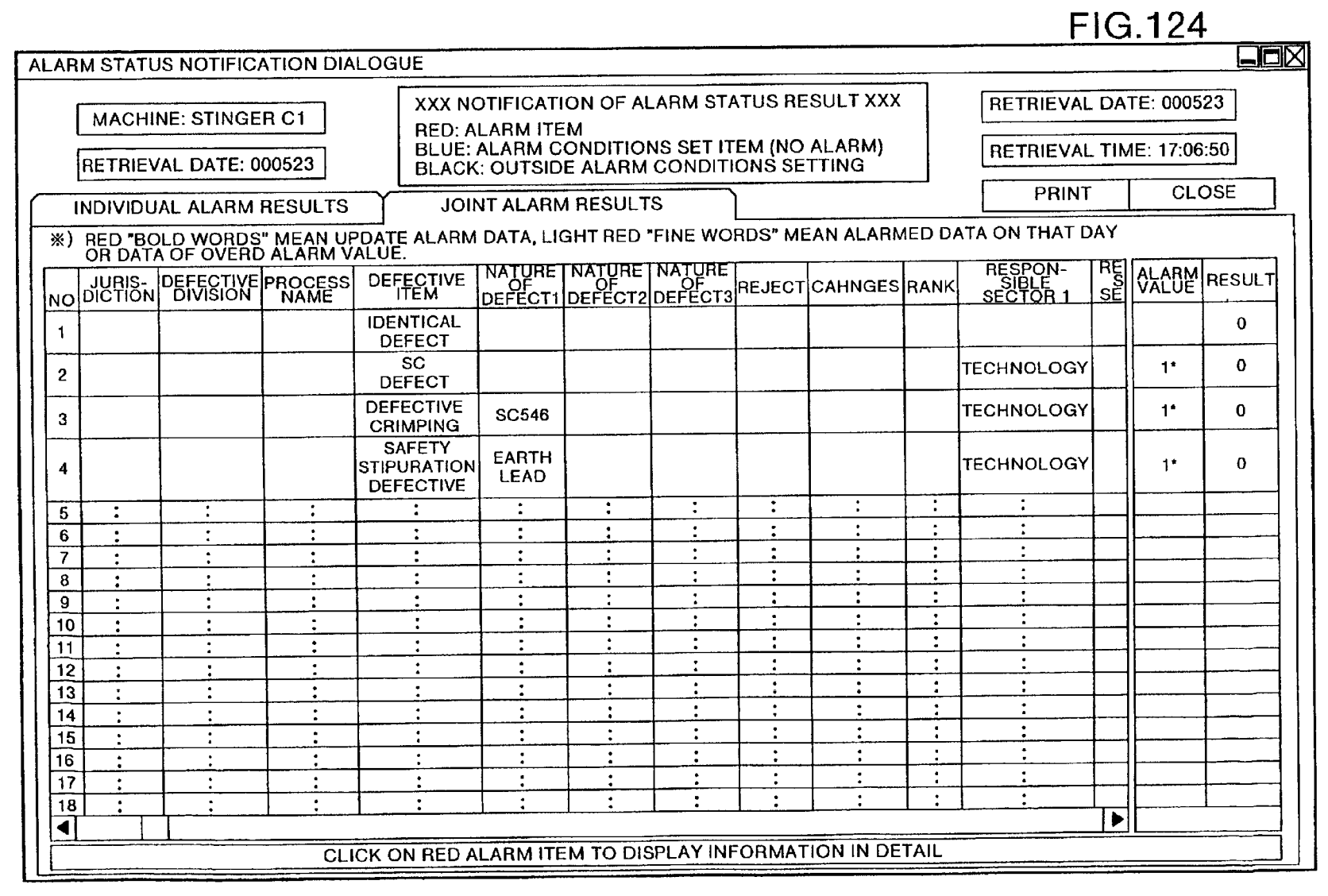

ALARM STATUS NOTIFICATION DIALOGUE

MACHINE: STINGER C1

RETRIEVAL DATE: 000523

XXX NOTIFICATION OF ALARM STATUS RESULT XXX
RED: ALARM ITEM
BLUE: ALARM CONDITIONS SET ITEM (NO ALARM)
BLACK: OUTSIDE ALARM CONDITIONS SETTING

RETRIEVAL DATE: 000523

RETRIEVAL TIME: 17:06:50

PRINT | CLOSE

INDIVIDUAL ALARM RESULTS | JOINT ALARM RESULTS

※) RED "BOLD WORDS" MEAN UPDATE ALARM DATA, LIGHT RED "FINE WORDS" MEAN ALARMED DATA ON THAT DAY OR DATA OF OVERD ALARM VALUE.

| NO | JURIS-DICTION | DEFECTIVE DIVISION | PROCESS NAME | DEFECTIVE ITEM | NATURE OF DEFECT1 | NATURE OF DEFECT2 | NATURE OF DEFECT3 | REJECT | CAHNGES | RANK | RESPON-SIBLE SECTOR 1 | RES SE | ALARM VALUE | RESULT |
|---|---|---|---|---|---|---|---|---|---|---|---|---|---|---|
| 1 | | | | IDENTICAL DEFECT | | | | | | | | | | 0 |
| 2 | | | | SC DEFECT | | | | | | | TECHNOLOGY | | 1* | 0 |
| 3 | | | | DEFECTIVE CRIMPING | SC546 | | | | | | TECHNOLOGY | | 1* | 0 |
| 4 | | | | SAFETY STIPURATION DEFECTIVE | EARTH LEAD | | | | | | TECHNOLOGY | | 1* | 0 |
| 5 | : | : | : | : | : | : | : | : | : | : | : | | | |
| 6 | : | : | : | : | : | : | : | : | : | : | : | | | |
| 7 | : | : | : | : | : | : | : | : | : | : | : | | | |
| 8 | : | : | : | : | : | : | : | : | : | : | : | | | |
| 9 | : | : | : | : | : | : | : | : | : | : | : | | | |
| 10 | : | : | : | : | : | : | : | : | : | : | : | | | |
| 11 | : | : | : | : | : | : | : | : | : | : | : | | | |
| 12 | : | : | : | : | : | : | : | : | : | : | : | | | |
| 13 | : | : | : | : | : | : | : | : | : | : | : | | | |
| 14 | : | : | : | : | : | : | : | : | : | : | : | | | |
| 15 | : | : | : | : | : | : | : | : | : | : | : | | | |
| 16 | : | : | : | : | : | : | : | : | : | : | : | | | |
| 17 | : | : | : | : | : | : | : | : | : | : | : | | | |
| 18 | : | : | : | : | : | : | : | : | : | : | : | | | |

CLICK ON RED ALARM ITEM TO DISPLAY INFORMATION IN DETAIL

PRODUCTION MANAGEMENT SYSTEM, CLIENT IN THE PRODUCTION MANAGEMENT SYSTEM, PRODUCTION MANAGEMENT METHOD IN THE PRODUCTION MANAGEMENT SYSTEM, DATA RETRIEVAL METHOD IN THE PRODUCTION MANAGEMENT SYSTEM, AND COMPUTER PRODUCT

FIELD OF THE INVENTION

The present invention relates to a production management system, a client in the production management system, production management method in the production management system, a data retrieval method in the production management system, and a computer-readable recording medium which programs for executing the methods are stored in.

BACKGROUND OF THE INVENTION

Conventionally, the manufacturing history of a production line product is managed by using documents. Therefore, the documents must be retrieved when considering irregularities in the product. Specifically, the documents mainly comprise production flowcharts and operation charts written by the operators of each step. The flowcharts are circulated for each lot and record the names of the steps described therein. When the steps end, the name of the operator who supervised the step, the materials used, the numbers of satisfactory and defective products and the like are recorded manually.

The operation charts contain manually recorded data such as which lot was supervised in that step, the materials used and the number of satisfactory products, as in the flowchart. Various types of totals are calculated from these documents. The operators create daily, weekly and monthly records and the like, and obtain the results and quality data from these documents. In other words, data recorded by the operators is transcribed and totalled.

When there are a great number of irregularities, the cause is searched for in these documents. When a step which appears to be causing a problem is discovered in the quality data total, the operation charts are checked. For example, when a problem is found in the material after studying the operation charts, the material chart is checked. When considering in a group, copies of the documents are distributed.

However, in a method for managing manufacturing history by using on documents such as that described above, time is required to create and consider the documents. Consequently, the method has disadvantages of poor efficiency and lack of speediness.

SUMMARY OF THE INVENTION

It is the object of the present invention to provide a production management system which is capable of efficiently and speedily managing products manufactured on a production and assembly line, a client in the production management system, production management method in the production management system, a data retrieval method in the production management system, and a computer-readable recording medium which programs for executing the methods are stored in.

In the production management system according to one aspect of the present invention, a plurality of clients in a first client group input data related production and assembly in each of a plurality of steps of producing and assembling components, units and main bodies. A plurality of clients in a second client group input data related to electrical check, image check, completion check, repair step, and product check. A server stores the input data from the clients in the first client group in a database. A plurality of clients in a third client group specify retrieval conditions and send retrieval requests to the server. In response, the server retrieves the data from the database and transmits it to the clients in the third client group. The clients in the third client group chronologically process and output (display or print) the received retrieved data based on a predetermined output target. Therefore, products which are manufactured on an assembly line can be managed effectively and rapidly. Furthermore, since the retrieved data are processed chronologically in accordance with a predetermined output target, the data can be managed in each time band.

Further, the clients in the third client group output the chronologically processed data in a display and graph format by using monitoring and the like. Therefore, the manufacturing assembly line can be managed chronologically.

Furthermore, the clients in the third client group create quality information for individual quality results, processes, defective items and responsible sectors by using monitoring and the like. This makes it possible to determine quality information for individual quality results, processes, defective items and responsible sectors.

Furthermore, when a created quality information has exceeded an action reference, the clients in the third client group send a warning to the responsible sector of the quality information, or to the assembly step relating to the quality in information. Therefore, the relevant division can learn of problems and implement countermeasures speedily.

In the production management system according to another aspect of the present invention, a plurality of clients in a first client group transmit machine type codes and installation serial numbers appended to the pieces to be assembled, and data such as quality data and check table data, to a step-monitoring server. The step-monitoring server stores the data input from the clients in the first client group in the corresponding tables (for example, in-processing defect content data table, check table data table, main data table). The clients in the first client group specify machine type code and dates, and retrieve data which matches the specified conditions from the corresponding tables stored in the step-monitoring server, and chronologically process and display the retrieved data on the screen in accordance with the output items stipulated in the selected output categories. Therefore, products which are manufactured on a production and assembly line can be efficiently and speedily managed. Further, since the retrieved data is chronologically processed for output items stipulated by set output targets, the products can be managed in each time band.

Other objects and features of this invention will become apparent from the following description with reference to the accompanying drawings.

BRIEF DESCRIPTION OF THE DRAWINGS

FIG. 14 is a diagram showing a display screen in the check step;

FIG. 26A to FIG. 26F are diagrams showing a display screen of the monitoring process;

FIG. 31A to FIG. 31F are diagrams showing a display screen of the quality information process;

FIG. 47 is a diagram showing a master table stored in a first database of FIG. 46;

FIG. 49 is a diagram showing an example of the format of a machine type code name master table of FIG. 47;

FIG. 50 is a diagram showing an example of the format of the factory name master table of FIG. 47;

FIG. 51 is a diagram showing an example of the format of the product field master table of FIG. 47;

FIG. 52 is a diagram showing an example of the format of the production step master table of FIG. 47;

FIG. 53 is a diagram showing an example of the format of the line No. master table of FIG. 47;

FIG. 54 is a diagram showing an example of the format of a Lank master table of FIG. 47;

FIG. 55 is a diagram showing an example of the format of the input supervisor master table of FIG. 47;

FIG. 56 is a diagram showing an example of the format of the responsible sector master table of FIG. 47;

FIG. 57 is a diagram showing an example of the format of the repair contents master table of FIG. 47;

FIG. 58 is a diagram showing an example of the format of the unit check table supervisor master table of FIG. 47;

FIG. 59 is a diagram showing an example of the format of the repair supervisor master table of FIG. 47;

FIG. 60 is a diagram showing an example of the format of the in-processing check supervisor master table of FIG. 47;

FIG. 61 is a diagram showing an example of the format of the countermeasure supervisor master table of FIG. 47;

FIG. 62 is a diagram showing an example of the format of the individual step operation settings master table of FIG. 47;

FIG. 63 is a diagram showing an example of the format of the alarm receiver master table of FIG. 47;

FIG. 64 is a diagram showing an example of the format of the check table item master table of FIG. 47;

FIG. 65 is a diagram showing an example of the format of the unit name master table of FIG. 47;

FIG. 66 is a diagram showing an example of the format of the name of machine type master table of FIG. 47;

FIG. 67 is a diagram showing an example of the format of the alarm management master table of FIG. 47;

FIG. 68 is a diagram showing an example of the format of the alarm value master table of FIG. 47;

FIG. 69 is a diagram showing an example of the format of the defect content master table of FIG. 47;

FIG. 70 is a diagram showing an example of the format of the unit check table item master table of FIG. 47;

FIG. 71 is a diagram showing an example of the format of the check table data table of FIG. 48;

FIG. 72 is a diagram showing an example of the format of the check table revision history data table of FIG. 48;

FIG. 73 is a diagram showing an example of the format of the unit management No. data table of FIG. 48;

FIG. 74 is a diagram showing an example of the format of the main data table of FIG. 48;

FIG. 75 is a diagram showing an example of the format of the in-processing defect table of FIG. 48;

FIG. 76 is a diagram showing an example of the format of the out-of-processing table of FIG. 48;

FIG. 77 is a diagram showing an example of the format of the unit main data table of FIG. 48;

FIG. 78 is a diagram showing an example of the format of the unit check table data table of FIG. 48;

FIG. 79 is a diagram showing an example of the format of the unit data table of FIG. 48;

FIG. 93 is a diagram showing an example of a screen display in an in-processing data input process;

FIG. 94 is a diagram showing an example of a screen display in an in-processing data input process;

FIG. 97 is a diagram showing an example of a screen display in an in-processing data input process;

FIG. 109 is a flowchart showing a step-monitoring/alarm process of an output system client;

FIG. 120 is a flowchart showing a step-monitoring/alarm process of an output system client;

FIG. 121 is a flowchart showing a step-monitoring/alarm process of an output system client;

FIG. 122 is a flowchart showing a step-monitoring/alarm process of an output system client;

FIG. 123 is a flowchart showing an alarm mail transmission process of the management system client;

FIG. 124 is a flowchart showing an alarm mail transmission process of the management system client;

FIG. 125 is a flowchart showing an alarm mail transmission process of the management system client;

FIG. 126 is a flowchart showing an alarm mail transmission process of the management system client;

FIG. 127 is a flowchart showing an alarm mail transmission process of the management system client;

FIG. 128 is a diagram showing an example of a display screen in the alarm mail transmission process;

FIG. 129 is a diagram showing an example of a display screen in the alarm mail transmission process;

FIG. 130 is a diagram showing an example of a display screen in the alarm mail transmission process;

FIG. 131 is a diagram showing an example of a display screen in the alarm mail transmission process;

Figure 132:
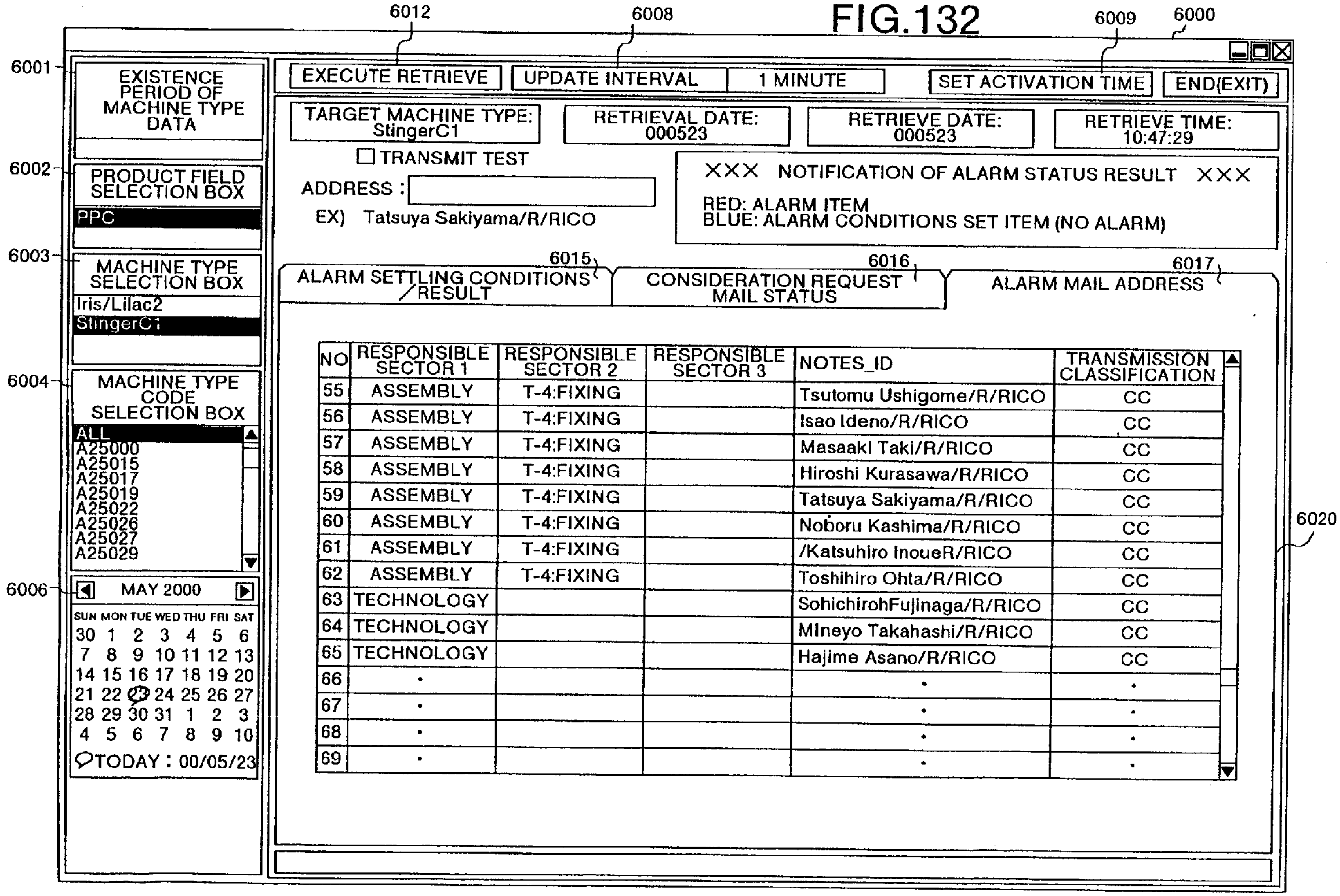
Figure 133:
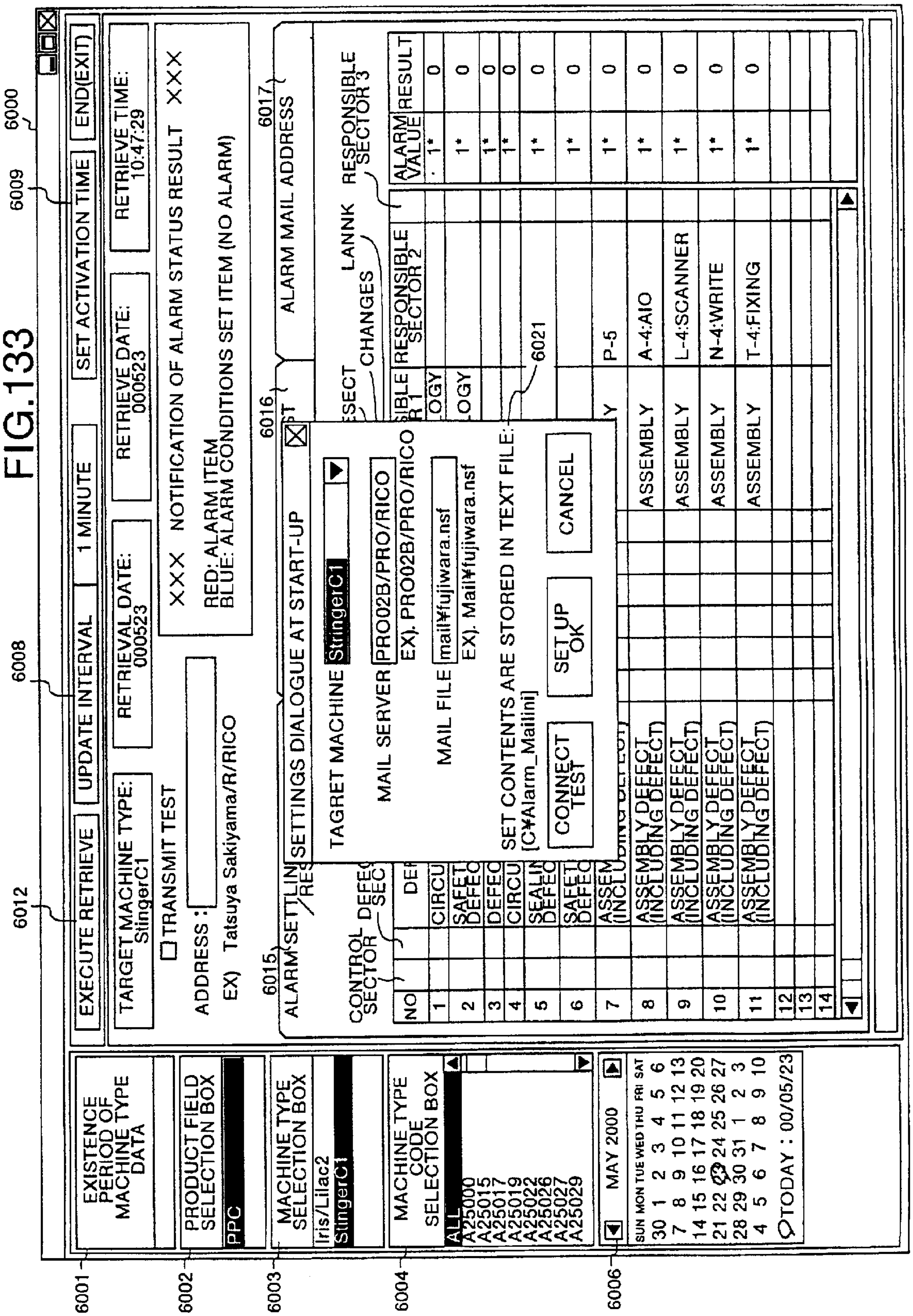
Figure 134:
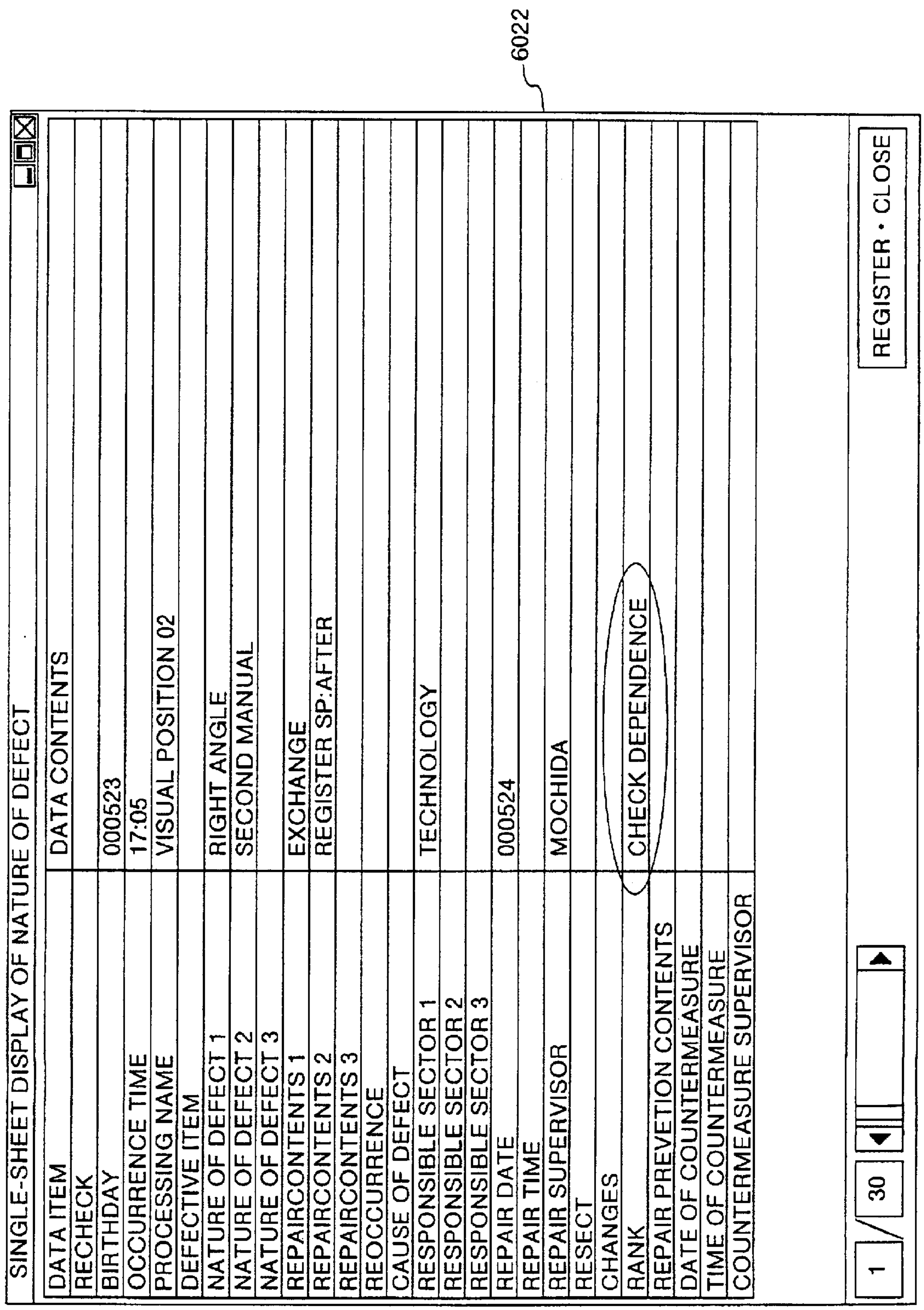
Figure 135:
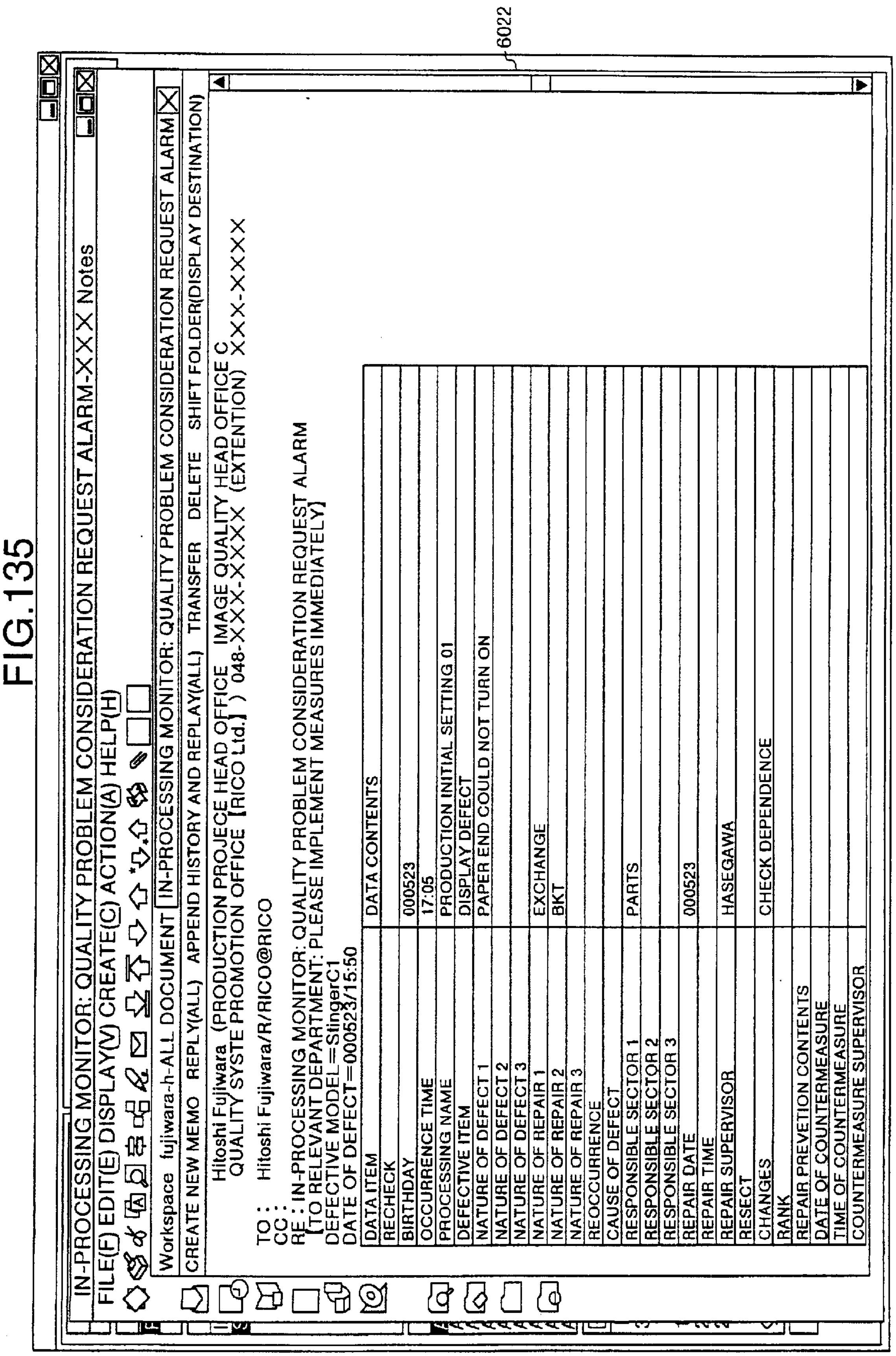

FIG. 132 is a diagram showing an example of a display screen in the alarm mail transmission process;

FIG. 133 is a diagram showing an example of a display screen in the alarm mail transmission process;

FIG. 134 is a diagram showing an example of a display screen in the alarm mail transmission process; and FIG. 135 is a diagram showing an example of a display screen in the alarm mail transmission process.

DESCRIPTION OF THE PREFERRED EMBODIMENTS

The terminology of this application and first and second preferred embodiments of the production management system, the client in the production management system, the production management method in the production management system, the data retrieval method in the production management system, and the computer-readable recording medium which programs for executing the methods are stored in, will be explained below with reference the accompanying drawings.

Explanation of the Terminology Used in this Application

The terminology used in this application will be explained.

Machine type: product specification sector (domestic and export to all countries)

Serial number: management number of the production side

Type number; production serial number

Irregularity: an irregular state discovered in an item other than the test item

Matter: fact or facts to be transmitted as information

Non-reoccurrence: irregular state wherein an irregular state has arisen but has been confirmed during repair that it will not reoccur Number of completed products: the number of completely assembled products Number of straight-throughs: the number of completely assembled products which have absolutely no irregularities Number of defects: the number of irregular states (defects) which are discovered during testing (checking) after assembly Straight-through rate: number of straight-throughs/number of completed products=value Defective rating: number of defects/number of completed products=value PQ value=number of irregular states other than in irregularity information, non-reoccurrence defects, in-processing tests, and tests/number of products tested=value Number of line rejects=number of products removed from the assembly line due to the discovery of an irregular state Responsible sector: the division (component sector, assembly sector, technical sector, design sector) which the cause/origin of an irregular state is located in. E.g. when an irregular state occurs due to purchased components, the "component sector" is responsible. When an irregular state occurs due to the assembly operation, the "assembly sector" is responsible. When an irregular state occurs in the product despite no problems in the assembly operation and having passed the specification test, the "technical sector" is responsible. When an investigative analysis in the technical sector discovers that an irregular state has occurred in a product due to an irregularity in the design, the "design sector" is responsible.

A first embodiment of the present invention will be explained here with reference to FIG. 1 to FIG. 39 in the sequence "entire constitution of the production management system", "application constitution of the production management system", "constitution of input system client", "server constitution", "constitution of output system client", "summary of entire operations of the production management system", "data input processes", and "retrieval requests/output processing". In the following explanation, a production management system of an assembly line which manufactures color copying machines is described by way of example.

Figure 1:
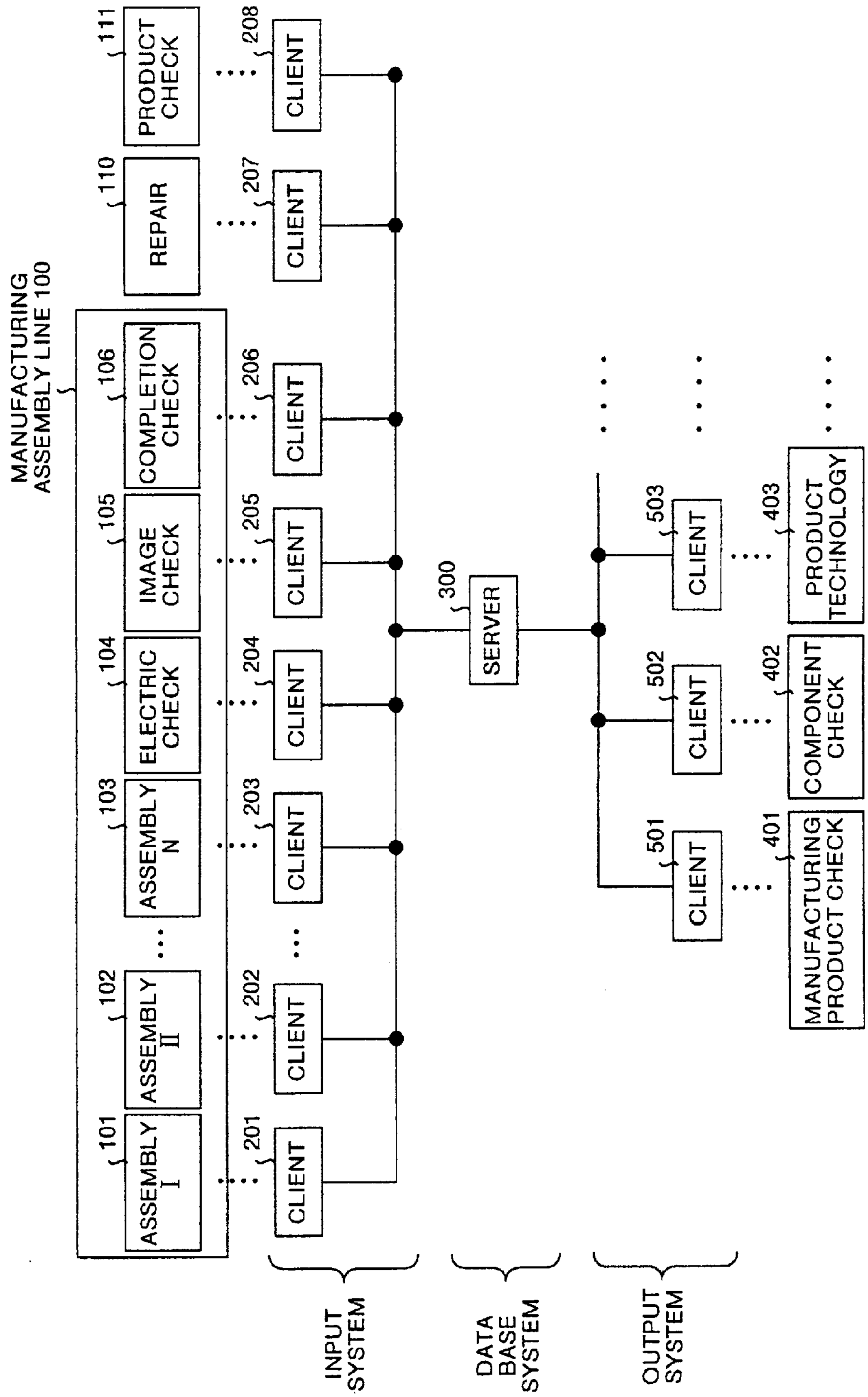
FIG. 1 is a diagram showing an example of a schematic constitution of a production management system according to a first embodiment.

FIG. 1 is a diagram showing a schematic constitution of the production management system according to the first embodiment. In FIG. 1, reference numeral 100 represents a color copying machine manufacturing assembly line. The manufacturing assembly line 100 comprises an assembly I step 101, an assembly II step 102, . . . , an assembly N step 103, an electrical check step 104, an image check step 105, and a completion check step 106. Reference numeral 110 represents a repair process and reference numeral 111 represents a product check step. These processes are performed outside the line.

Reference numerals 201 to 203 represent clients which input data of the assembly I step 101, the assembly II step 102, . . . , and the assembly N step 103. An operator inputs data representing production and assembly contents for each component and unit to the clients 201 to 203. The clients 201 to 203 transfer the data to a server 300 which is explained later.

Reference numerals 204 to 206 represent clients for inputting data of the electrical check step 104, the image check step 105, and the completion check step 106. An operator inputs data representing checks, confirmed contents and results for products assembled in the assembly steps 101 to 103 to the clients 204 to 206. The clients 204 to 206 transfer the data to a server 300 which is explained later.

Reference numeral 207 represents a client for inputting data of the repair step 110. The operator inputs data of the repair step 110 to the client 207. The client 207 transfers the data to the server 300 explained later.

Reference numeral 208 represents a client which checks the data input in the steps from the assembly I step 101 to the repair step 110. The clients 201 to 208 form the input system. The manufacturing assembly line 100 here comprises a manufacturing assembly line for manufacturing color copying machines, but the present invention is not limited to this and can be applied in a manufacturing assembly line for components and units.

Reference numeral 300 represents a server 300 which manages the entire production management system. The server 300 holds the data which is transferred from the clients 201 to 208 in a database. In response to retrieval requests from clients 501 to 503 explained later, the server 300 retrieves the data from the database and transmits it to the clients 501 to 503. The server 300 forms a database system.

Reference numeral 401 represents a manufacturing and production check section, reference numeral 402 represents a component check section, and reference numeral 403 represents a manufacturing technical section. Reference numerals 501 to 503 represent clients of the manufacturing and production check section 401, the component check section 402, and the manufacturing technical section 403. The clients 501 to 503 output retrieval requests to the server 300 based on predetermined retrieval conditions, and process the retrieved data which the server 300 sends in response to the requests.

Application Constitution of the Production Management System

Figure 2:
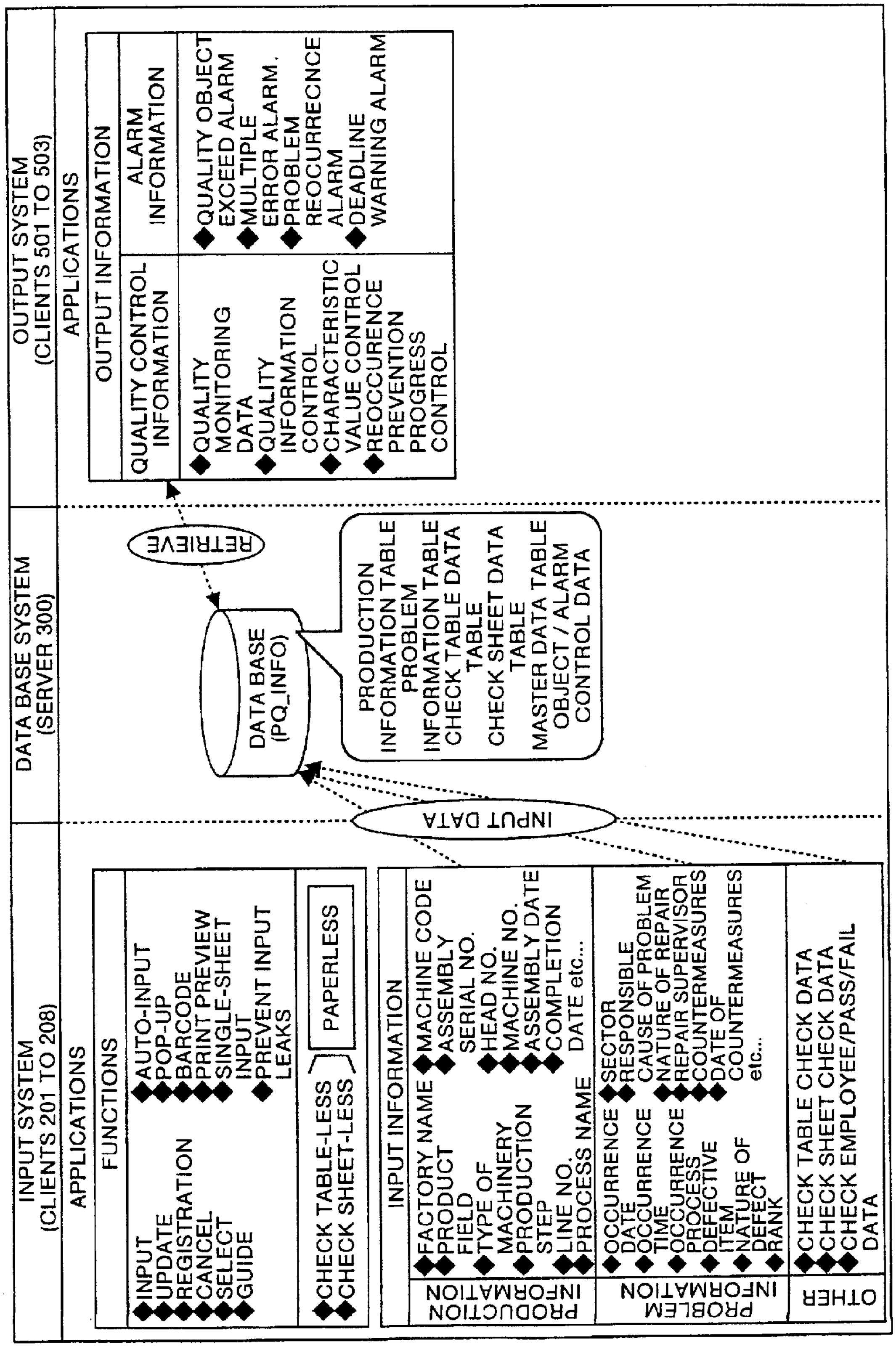
FIG. 2 is a diagram showing a schematic constitution of an application system of the production management system of FIG. 1.

FIG. 2 is a diagram showing a schematic constitution of an application system of the production management system of FIG. 1. The applications of the input system (the clients 201 to 208) provide the functions of input, update, store, delete, select, guide, automatic input, pop-up, barcode processing, print preview, single-sheet input, and input leak prevention.

Production information (factory name, production field, machine type, production step, line no., process name, machine type code, installation serial number, head no., machine number, installation date, completion date, etc.) and irregular state information (occurrence date, occurrence time, occurrence step, defective item, defect content, lank, responsible sector, cause of defect, repair contents, repair supervisor, countermeasure contents, countermeasure date, etc.) are input as input information of the input system (the clients 201 to 208). Other data comprising check table check data, check sheet check data, name of check employee, and pass/fail data, are also input. This input information is transferred to the database system (the server 300).

The database system (the server 300) comprises tables for managing the input information which is input from the input system. Specifically, for example, the database system comprises a production information table, an irregular state information table, a check table data table, a check sheet data table, a master data table, and an object/alarm management data table. The database system (the server 300) retrieves data from the database in accordance with retrieval requests from the output system (the clients 501 to 503) and outputs the data to the output system (the clients 501 to 503).

Output information of the output system (the clients 501 to 503) comprises quality management information (quality monitoring monitor, quality information management, characteristic value management, reoccurrence prevention progress management, etc.) and alarm information (quality object exceed alarm, multiple defect alarm, reoccurring defect alarm, deadline warning alarm, etc.). The output system (the clients 501 to 503) output retrieval requests to the server 300 based on predetermined retrieval conditions, chronologically processes the retrieved data sent from the server 300 in accordance with the retrieval requests, and outputs the above output information.

Constitution of Input System Client

Figure 3:
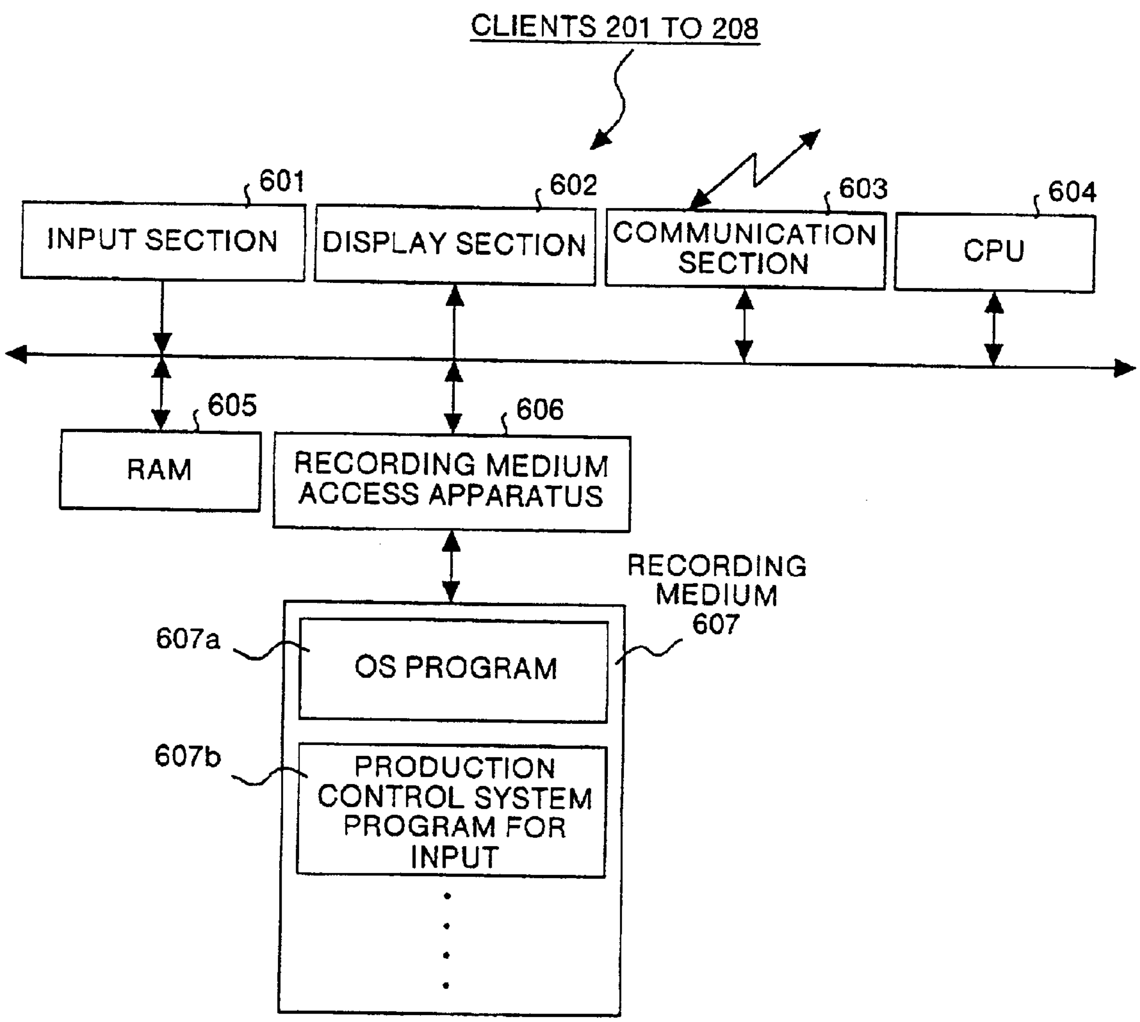
FIG. 3 is a block diagram showing the constitution of a schematic constitution of a client of the input system of FIG. 1.

FIG. 3 is a block diagram showing the schematic constitution of the clients 201 to 208 of the input system shown in FIG. 1. The clients 201 to 208 of the input system each have the same constitution. As shown in FIG. 3, the clients 201 to 208 comprise an input section 601, a display section 602, a communications section 603 which performs data communications, a CPU 604 which controls the entire apparatus, a RAM 605 used as the work area of the CPU 604, a recording medium access apparatus 606 which reads and writes data to/from a recording medium 607, and a recording medium 607 which stores programs and the like for operating the CPU 604.

The input section 601 comprises a keyboard having a cursor key, a number input key, various types of function keys and the like, a mouse, a barcode reader, and the like. The operator supplies a control command to the CPU 604 and inputs data by using the input section 601 as a user interface.

The display section 602 comprises a CRT, an LCD or the like, and displays data in accordance with display data input from the CPU 604. The communications section 603 connects to a network and exchanges data communications with the server 300 and other clients via this network.

The CPU 604 is a central processing unit which controls the entire apparatus in compliance with the programs stored in the recording medium 607. The CPU 604 is connected to the input section 601, the display section 602, the communications section 603, the RAM 605, and the recording medium access apparatus 606. The CPU 604 controls data communications, reading of application programs by accessing the memory, reading and writing various types of data, inputting data and commands, displaying, and the like.

The RAM 605 comprises a work memory which stored specified programs, input commands, input data, processing results and the like, and a display memory which temporarily stores display data displayed on a display screen of the display section 602.

The recording medium 607 stores various types of programs and data such as an OS program 607*a* which can be executed by the CPU 604 (e.g. WINDOWS 95 and WINDOWS NT) and application programs. Application programs include, for example, a program for production management system input 607.

The recording medium comprises, for example, an optical, magnetic or electrical recording medium such as a floppy disk, a hard disk, a CD-ROM, a DVD-ROM, an MO, and a PC card. The various types of programs are stored in the recording medium 607 in a data format which the CPU 604 can read. The various types of programs may be stored beforehand in the recording medium or downloaded via a communications line and stored in the recording medium.

Constitution of Server

Figure 4:
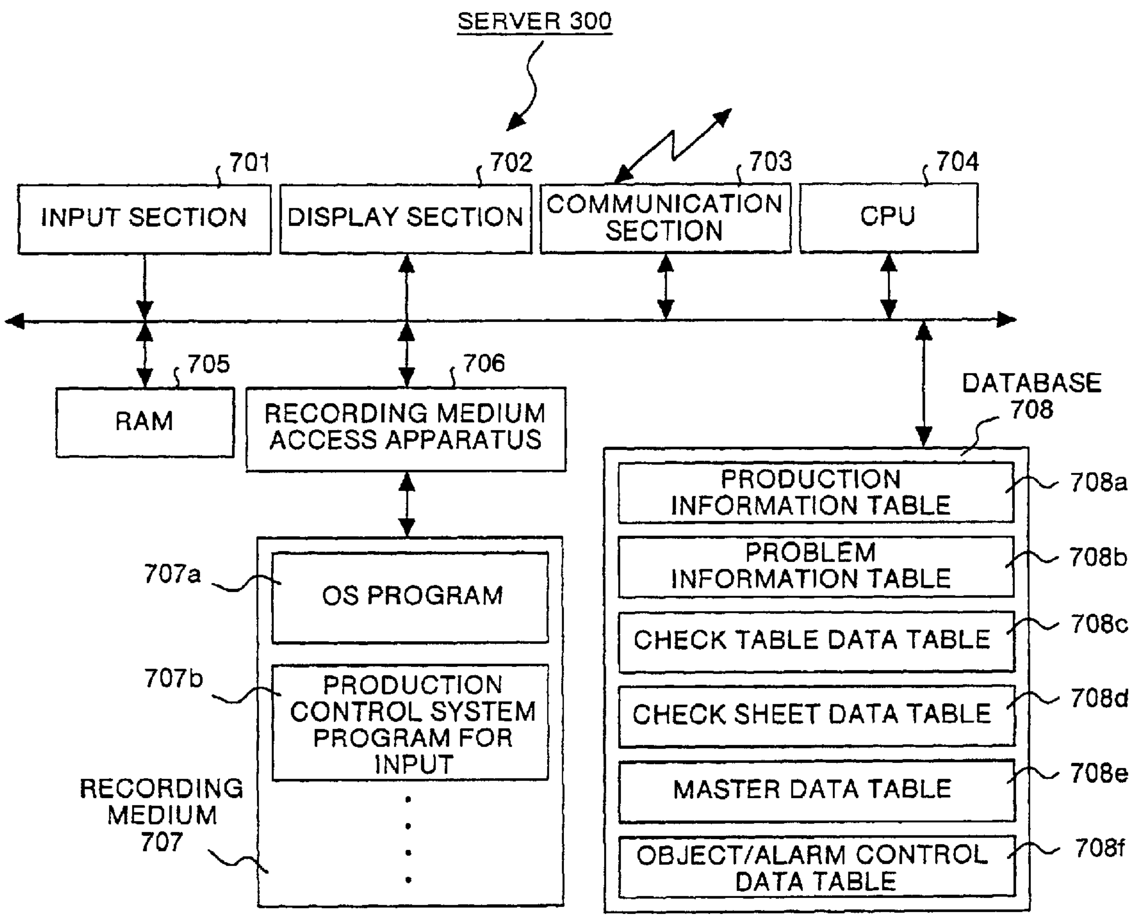
FIG. 4 is a block diagram showing the schematic constitution of the server of FIG. 1.

FIG. 4 is a block diagram showing a schematic constitution of the server 300 shown in FIG. 1. As shown in FIG. 4, the server 300 comprises an input section 701 for inputting data, a display section 702, a communications section 703 which performs data communications, a CPU 704 which manages the entire production management system and controls the entire apparatus, a RAM 705 which is used as the work area of the CPU 704, a recording medium access apparatus 706 which reads and writes data to/from a recording medium 707, a recording medium 707 which stores programs and the like for operating the CPU 704, and a database for holding data sent from the clients.

The input section 701 comprises a keyboard having a cursor key, a number input key, various types of function keys and the like, a mouse, a barcode reader, and the like. The operator supplies a control command to the CPU 704 and inputs data by using the input section 701 as a user interface.

The display section 702 comprises a CRT, an LCD or the like, and displays data in accordance with display data input from the CPU 704. The communications section 703 connects to a network and exchanges data communications via the network with the input system clients 201 to 208 and the output system clients 501 to 503.

The CPU 704 is a central processing unit which controls the entire apparatus in compliance with the programs stored in the recording medium 707. The CPU 704 is connected to the input section 701, the display section 702, the communications section 703, the RAM 705, the recording medium access apparatus 706, and the database 708. The CPU 704 controls data communications, reading of application programs by accessing the memory, reading and writing various types of data, inputting data and commands, displaying, and the like.

The RAM 705 comprises a work memory which stored specified programs, input commands, input data, processing results and the like, and a display memory which temporarily stores display data displayed on a display screen of the display section 702.

The recording medium 707 stores various types of programs and data such as an OS program 707*a* which can be executed by the CPU 704 (e.g. WINDOWS NT Server V4.0) and application programs. Application programs include, for example, a program for production management system input 707*b*. The recording medium comprises, for example, an optical, magnetic or electrical recording medium such as a floppy disk, a hard disk, a CD-ROM, a DVD-ROM, an MO, and a PC card. The various types of programs are stored in the recording medium 707 in a data format which the CPU 704 can read. The various types of programs may be stored beforehand in the recording medium or downloaded via a communications line and stored in the recording medium.

The database 708 comprises a production information table 708*a*, an irregular state information table 708*b*, a check table data table 708*c*, a check sheet data table 708*d*, a master data table 708*e*, and an object/alarm management data table 708*f*.

Constitution of Output System Client

Figure 5:
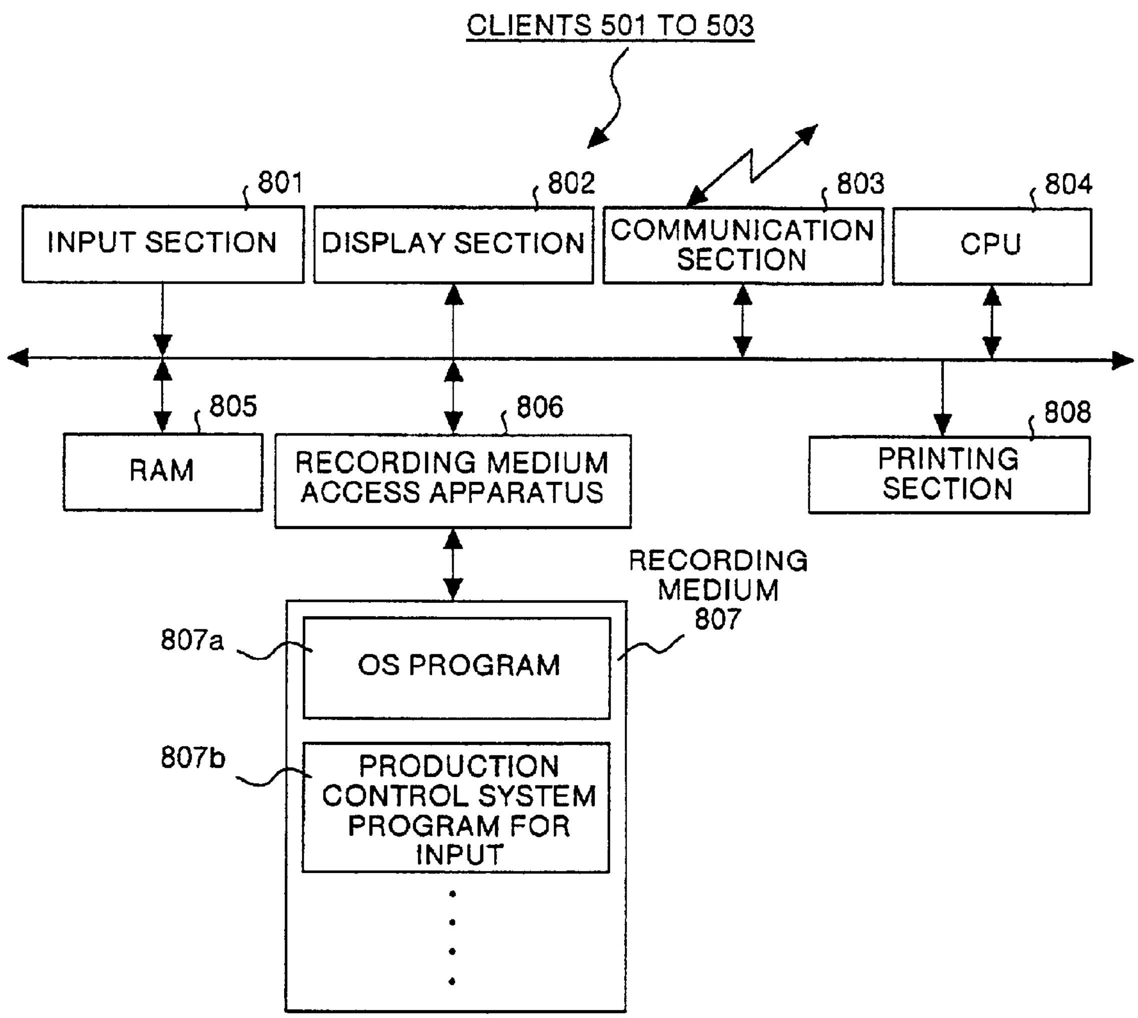
FIG. 5 is a block diagram showing the schematic constitution of a client of the output system of FIG. 1.

FIG. 5 is a block diagram showing a schematic constitution of the clients 501 to 503 of the output system shown in FIG. 1. The clients 501 to 503 of the output system each have the same constitution. As shown in FIG. 5, the clients 501 to 503 comprise an input section 801, a display section 802, a communications section 803 which performs data communications, a CPU 804 which controls the entire apparatus, a RAM 805 used as the work area of the CPU 804, a recording medium access apparatus 806 which reads and writes data to/from a recording medium 807, and a recording medium 807 which stores programs and the like for operating the CPU 804.

The input section 801 comprises a keyboard having a cursor key, a number input key, various types of function keys and the like, a mouse, a barcode reader, and the like. The operator supplies a control command to the CPU 804 and inputs data by using the input section 801 as a user interface.

The display section 802 comprises a CRT, an LCD or the like, and displays data in accordance with display data input from the CPU 804. The communications section 803 connects to a network and exchanges data communications with the server 300 and other clients via this network.

The CPU 804 is a central processing unit which controls the entire apparatus in compliance with the programs stored in the recording medium 807. The CPU 804 is connected to the input section 801, the display section 802, the communications section 803, the RAM 805, the recording medium access apparatus 806, and a printing section 808. The CPU 804 controls data communications, reading of application programs by accessing the memory, reading and writing various types of data, inputting data and commands, displaying, and the like.

The RAM 805 comprises a work memory which stored specified programs, input commands, input data, processing results and the like, and a display memory which temporarily stores display data displayed on a display screen of the display section 802.

The recording medium 807 stores various types of programs and data such as an OS program 807*a* which can be executed by the CPU 804 (e.g. WINDOWS 95 and WINDOWS NT) and application programs. Application programs include, for example, a program for production management system input 807*b*. The recording medium comprises, for example, an optical, magnetic or electrical recording medium such as a floppy disk, a hard disk, a CD-ROM, a DVD-ROM, an MO, and a PC card. The various types of programs are stored in the recording medium 807 in a data format which the CPU 804 can read. The various types of programs may be stored beforehand in the recording medium or downloaded via a communications line and stored in the recording medium.

The printing section 808 for example comprises a laser printer which prints data displayed on the display section 802 onto paper in compliance with the CPU 804.

Subsequently, the operation of the production management system will be explained in detail according to the sequence "Summary of Entire Operation of the Production management system", "Data input Step", and "Retrieval request and output Step".

Summary of Entire Operation of the Production Management System

Figure 6:
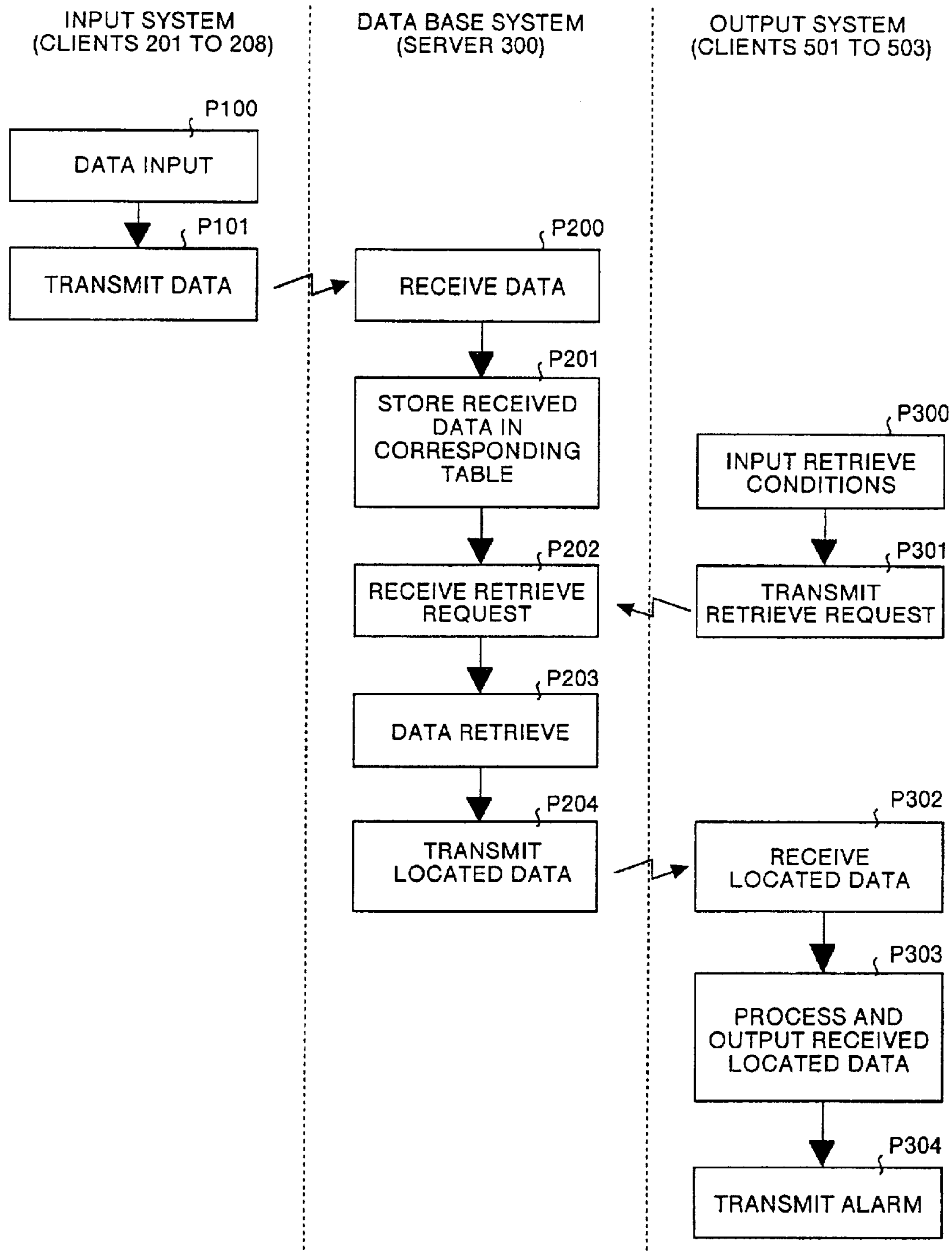
FIG. 6 is a flowchart schematically showing the entire operation of the production management system of FIG. 1.

FIG. 6 is a flowchart showing a summary of the entire operations of the production management system shown in FIG. 1. In FIG. 6, data of an assembly I step 101, an assembly II step 102, . . . , an assembly N step 103, an electrical check step 104, an image check step 105, a completion check step 106, a repair step 110, and a product check step 111 are input to the input system (clients 201 to 208) (step P100). The input data are transferred to the database system (the server 300) (step P101).

The database system (the server 300) receives the data from the input system (clients 201 to 208) (step P200) and stores the data in the corresponding tables of the database 708 (step P201).

On the other hand, the retrieval conditions are input to the output system (clients 501 to 503) (step P300) and a retrieval request is transmitted to the database system (server 300) based on the input retrieval conditions (step P301). The server 300 receives the retrieval request from the output system (clients 501 to 503) (step P202), retrieves the data from the corresponding table of the database 708 in accordance with the retrieval request (step P203), and transmits the retrieved data to the output system (the clients 501 to 503) (step P204).

The output system (the clients 501 to 503) receives the retrieved data from the server 300 (step P302), chronologically processes the retrieved data in compliance with a predetermined output target and output it thereto (step P303). In this step, when the processed retrieved data exceeds a predetermined action reference value, a warning is transmitted to the relevant division (step P304). The action reference value relates to a PQ value, an IQ value, an identical defect item, a scattered defect occurrence, product check defects, and the like.

Data Input Step

The steps of data input executed by the clients 201 to 206 of the input system will be explained in the sequence of (1) installation serial number storage (inputting data to the clients 201 to 203 in the steps of assembly 1101 to assembly N 103), (2) checking (inputting data to the clients 204 to 206 in the steps of the electrical check 104, the image check 105, and the completion check 106).

(1) Installation Serial Number Storage

The step of installation serial number storage comprises inputting data to the clients 201 to 203 in the steps of assembly 1101 to assembly N 103. The step of installation serial number storage will be explained based on the flowchart of FIG. 7 and with reference to FIG. 8 to FIG. 10.

Figure 7:
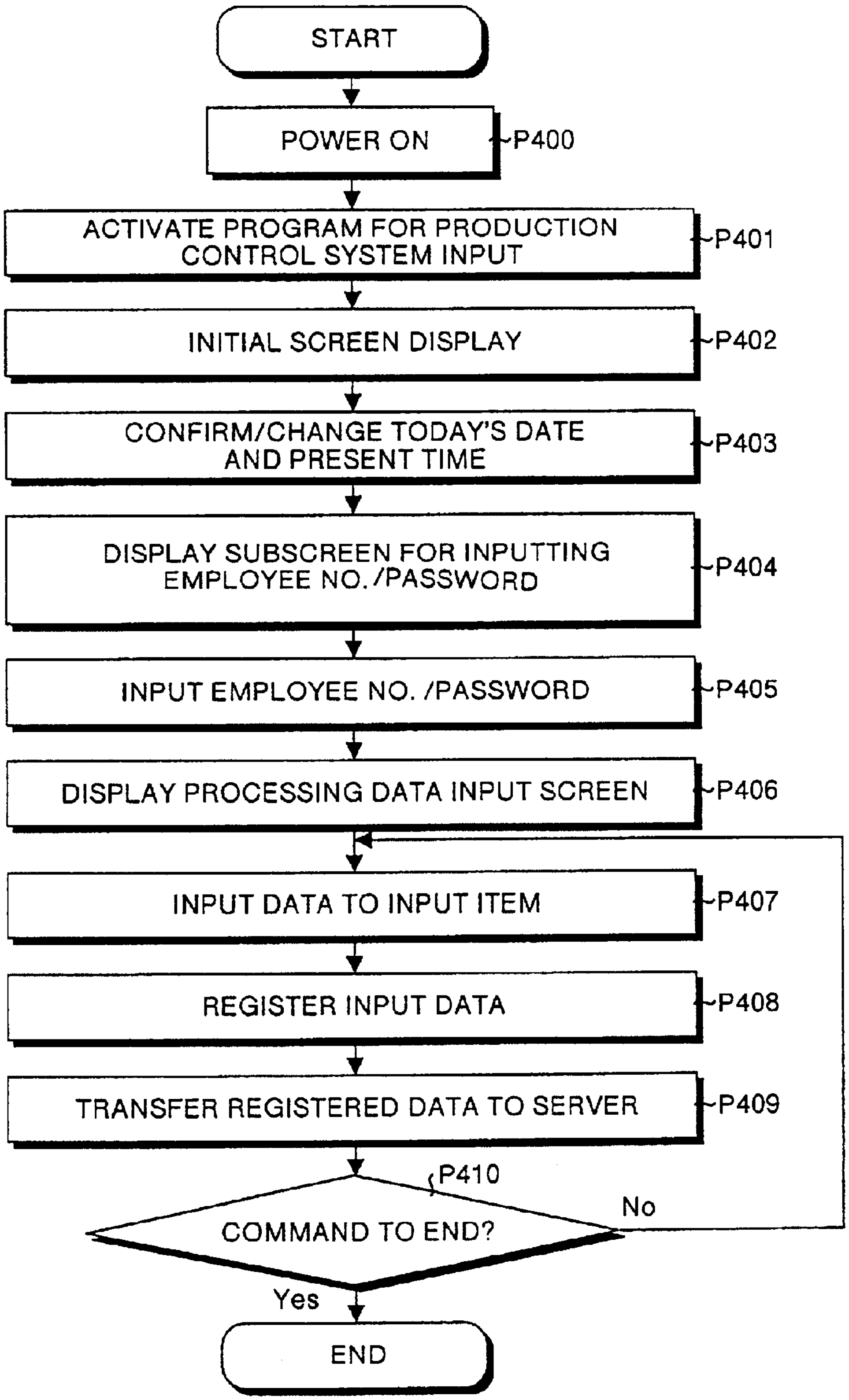
FIG. 7 is a flowchart showing data input in an installation serial number storage step.
Figure 8:
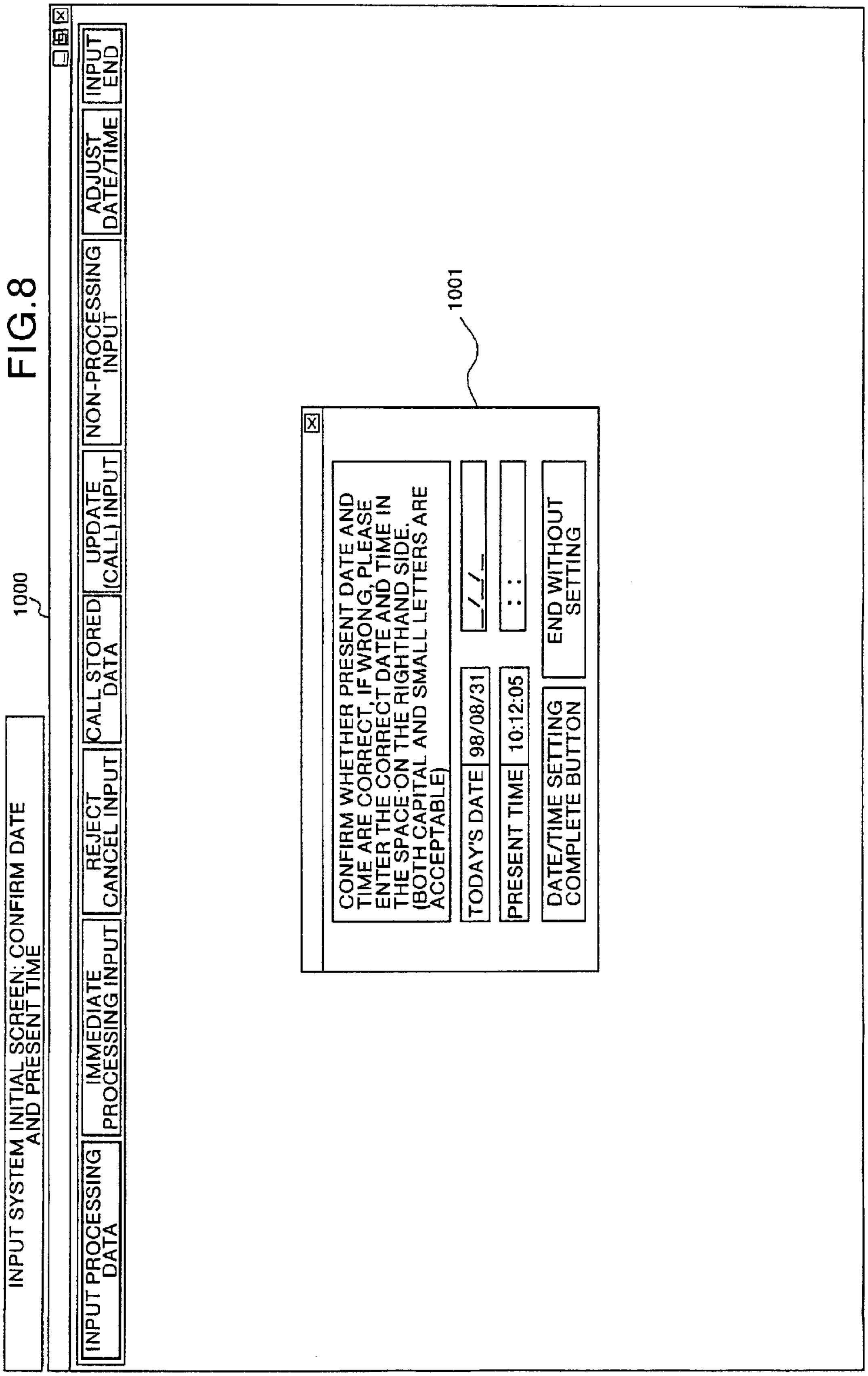
FIG. 8 is a diagram showing a display screen in an installation serial number storage step.
Figure 9:
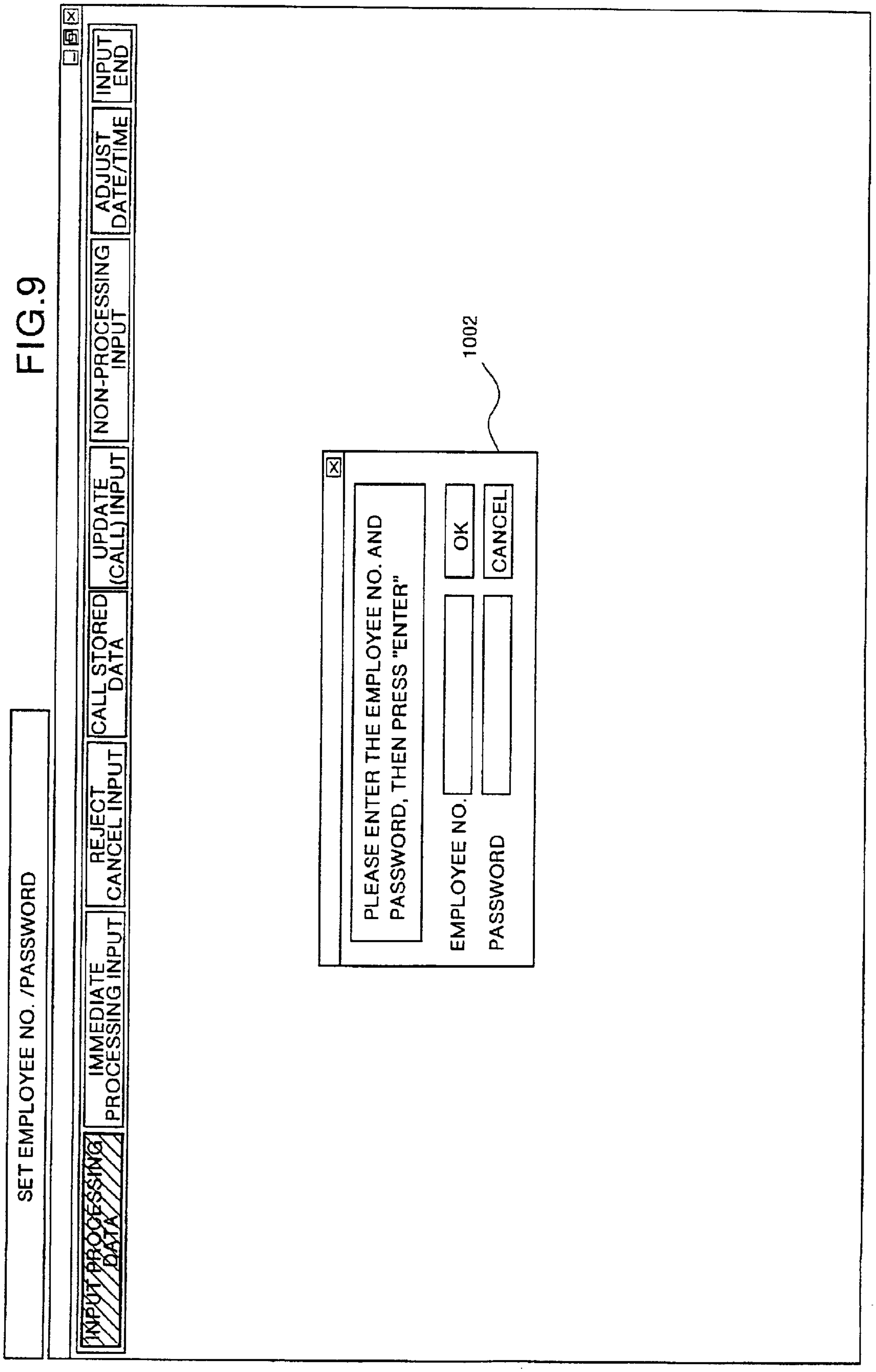
FIG. 9 is a diagram showing a display screen in an installation serial number storage step.
Figure 10:
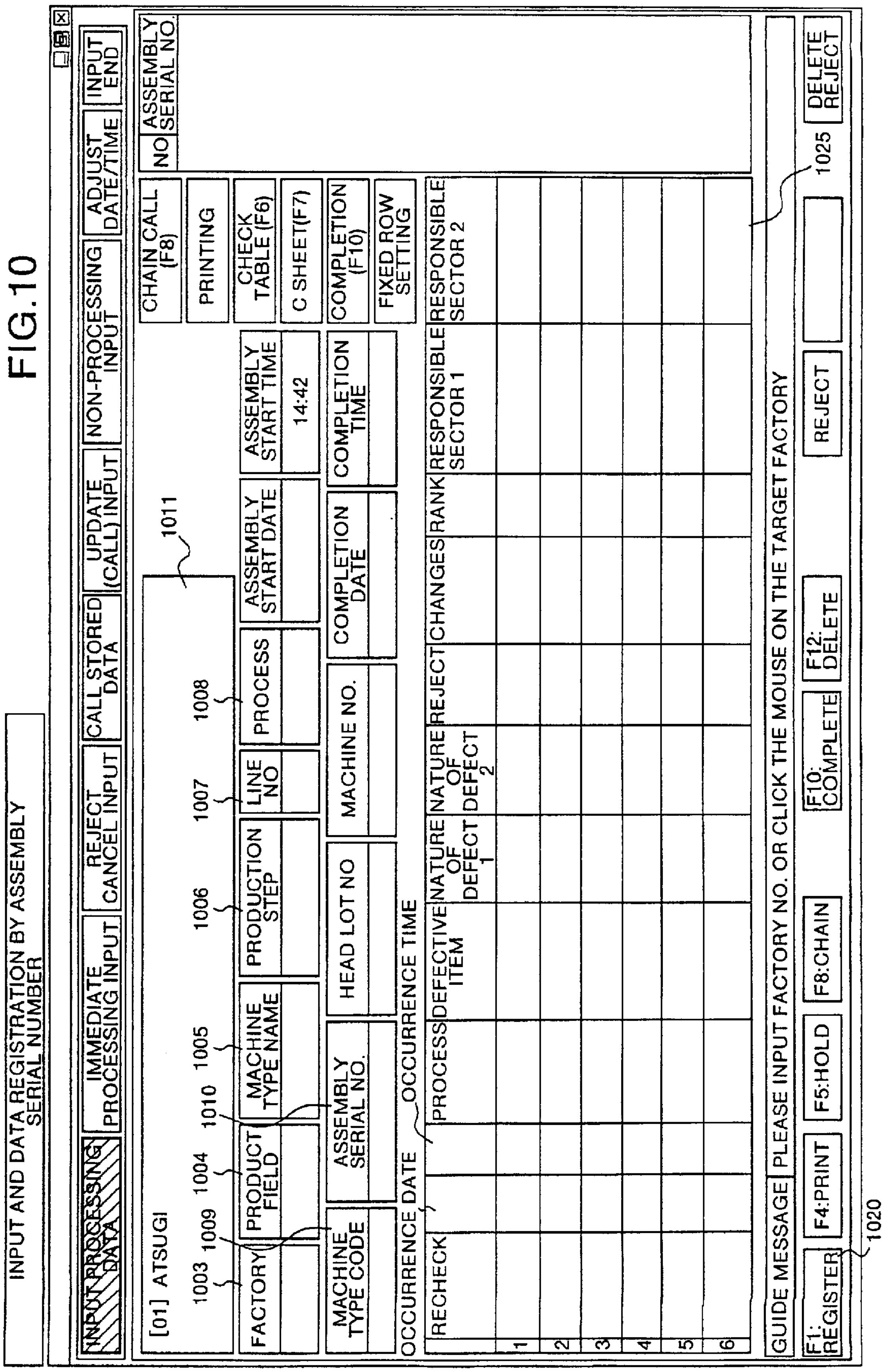
FIG. 10 is a diagram showing a display screen in an installation serial number storage step.

FIG. 7 is a flowchart showing data input in the step of installation serial number storage, and FIG. 8 to FIG. 10 are diagrams showing screens displayed during installation serial number storage.

In FIG. 7, the operators of the steps of assembly I 101 to assembly N 103 firstly switch the power of the clients 201 to 203 to ON (step P400), then select and activate the program for production management system input 607*b* (step P401), whereby an initial screen such as that shown in FIG. 8 is displayed (step P402). A subscreen 1001 for confirming and changing today's date and the present time is displayed in a portion of the initial screen shown in FIG. 8.

The operators confirm today's date and the present time. When no change is needed, the operators press the "Enter" key; when the date and time need to be changed, the operator inputs the correct date and time and then press the "Enter" key (step P403). When today's date and the present time have been confirmed/changed, a subscreen 1002 for inputting the employee number and password is displayed (step P404). The operator inputs his employee number and password (step P405). Thereafter, a subscreen for in-processing data input is displayed as shown in FIG. 10 (step P406).

In the subscreen for in-processing data input shown in.

FIG. 10, reference numeral 1003 represents the factory, reference numeral 1004 represents the product field, reference numeral 1005 represents the machine type, reference numeral 1006 represents the production step, reference numeral 1007 represents the line No., reference numeral 1008 represents the step name, reference numeral 1009 represents the machine code, and reference numeral 1010 represents the input item of the installation serial number. Reference numeral 1011 represents an input guide box. Data items matching each of input items 1003 to 1009 are automatically displayed in the input guide box 1011.

As the installation which the operator is supervising progresses, he inputs data to the input items 1003 to 1010 (step P407). Specifically, the operator selects a data item from among those displayed in the input guide box 1011 and clicks on it by using the mouse, whereby the selected data is automatically displayed in the boxes of the input items 1003 to 1009. The installation serial number 1010 is input by using the barcode reader to read the barcode showing the installation serial number which is pasted to the component or the unit which is to be installed.

The operator presses the store key 1020 to store the input data (step P408). The stored data is transferred to the server 300 (step P409) together with the date and present time data. The processes of steps P407 to P409 are performed until the operator issues a command to stop. The data of the installation serial number 1010 of each machine which is supplied to the line thereafter is stored with the serial number of that machine.

(2) Check Step Data Input

Figure 11:
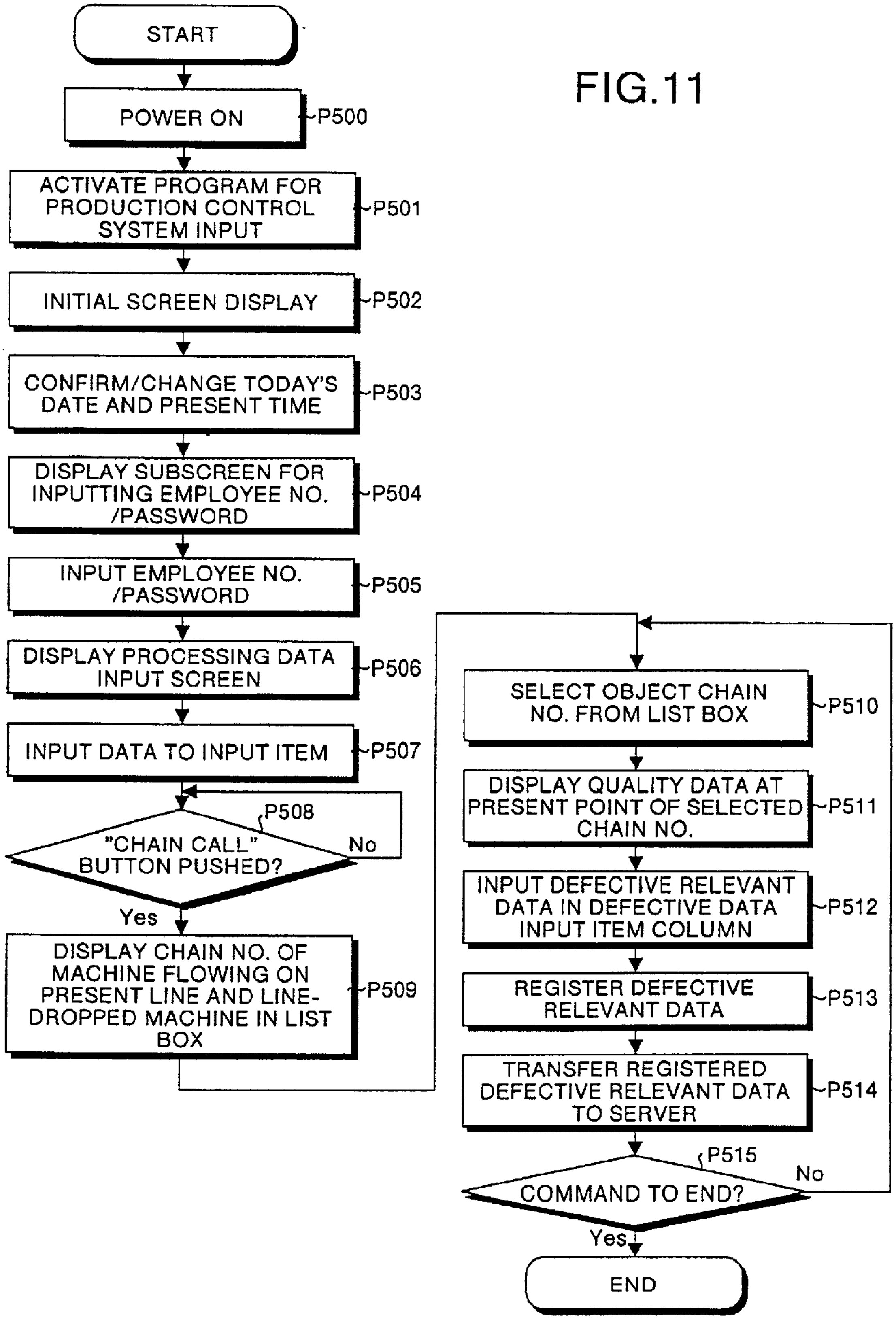
FIG. 11 is a flowchart showing data input in a check step.

The check step comprises inputting data to the clients 204 to 206 in the steps of the electrical check 104, the image check 105, and the completion check 106. The check step will be explained based on the flowchart of FIG. 11 with reference to FIG. 8, FIG. 9, and FIG. 12 to FIG. 14. FIG. 11 is a flowchart showing data input in the check step, FIG. 8, FIG. 9 and FIG. 12 to FIG. 14 are diagrams showing screens which are displayed during the check step.

In FIG. 11, the operators of the electrical check 104, the image check 105, and the completion check 106 firstly switch the power of the clients 204 to 206 to ON (step P500), then select and activate the program for production management system input 607*b* (step P501), whereby an initial screen 1000 such as that shown in FIG. 8 is displayed (step P502). A subscreen 1001 for confirming and changing today's date and the present time is displayed in a portion of the initial screen shown in FIG. 8.

The operators confirm today's date and the present time. When no change is needed, the operators press the "Enter" key; when the date and time need to be changed, the operator inputs the correct date and time and then press the "Enter" key (step P503). When today's date and the present time have been confirmed/changed, a subscreen 1002 for inputting the employee number and password is displayed (step P504). The operator inputs his employee number and password (step P505). Thereafter, a subscreen for in-processing data input is displayed as shown in FIG. 12 (step P506).

Figure 12:
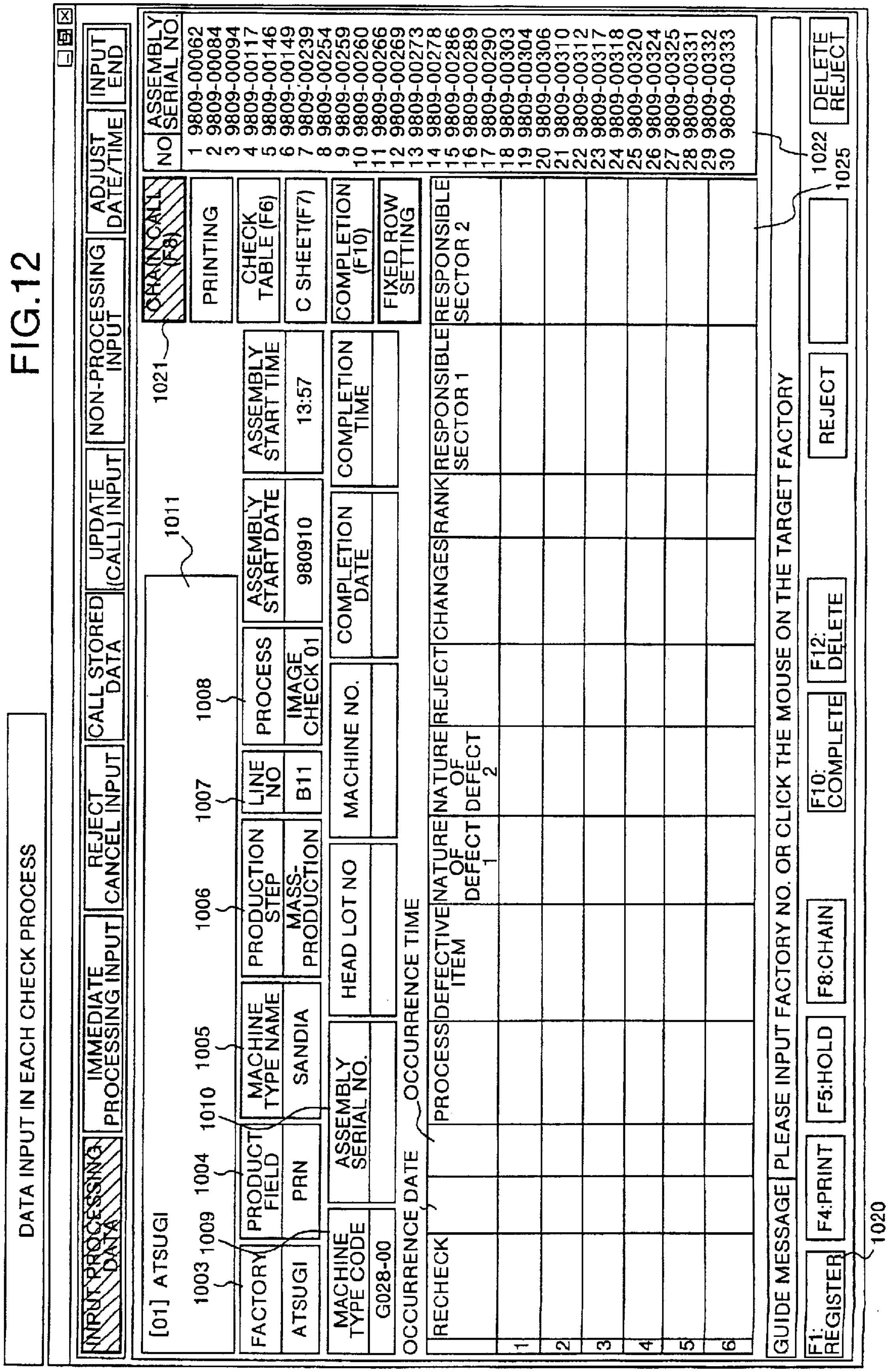
FIG. 12 is a diagram showing a display screen in the check step.

In FIG. 12, reference numeral 1003 represents the factory, reference numeral 1004 represents the product field, reference numeral 1005 represents the machine type, reference numeral 1006 represents the production step, reference numeral 1007 represents the line No., reference numeral 1008 represents the step name, reference numeral 1009 represents the machine code, and reference numeral 1010 represents the input item of the installation serial number. Reference numeral 1011 represents an input guide box which data items matching each of input items 1003 to 1009 are automatically displayed in.

As the installation which the operator is supervising progresses, he inputs data to the input items of 1003 to 1009 (step P507). Specifically, the operator selects a data item from among those displayed in the input guide box 1011 and clicks on it by using the mouse, whereby the selected data is automatically displayed in the boxes of the input items 1003 to 1009.

To read the data of the installation serial number of the machine to be checked, the operator presses a "chain call" button 1021 (step P508), whereby the installation serial numbers of the machine which is presently passing along the line and the machines which have been rejected from the line are displayed in the list box 1022 (step P509).

Figure 13:
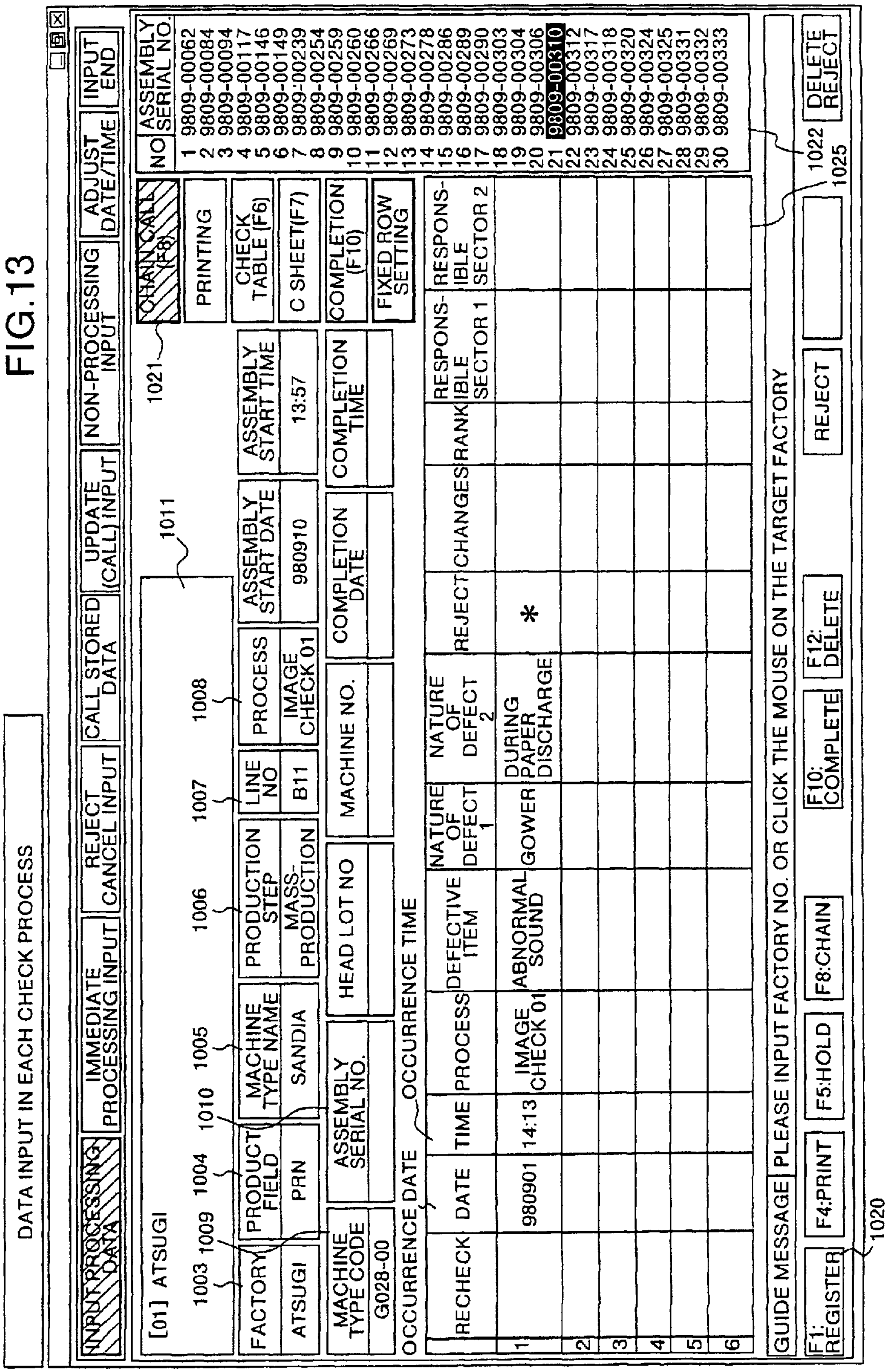
FIG. 13 is a diagram showing a display screen in the check step.

When the operator selects a target installation serial number from those in the list box 1022 and clicks on it (step P510), the present quality data of that installation serial number is displayed on the screen as shown in FIG. 13 (step P511). The installation serial number and present quality data of the installation serial number which is displayed in the list box 1022 is read from the server 300 and displayed. More specifically, as shown in FIG. 13, the data which have been input so far are displayed in the input items. In addition, the defective data (quality data) is displayed in the defective data input item box 1025. When there is no defective data, no defective data is displayed.

When there is a defective target installation serial number in the target step, the operator inputs the data relating to the defect to the defective data input item box 1025 (step P512). When there is a defective target installation serial number in the target step, the operator inputs the data relating to the defect to this box. When the operator inputs "defective item", the data is automatically input to "date of occurrence", "time of occurrence", and "factory name". It is also possible to input the data relating to the defect in a single-sheet format. When the operator clicks on the number box in the defective data input item box 1025 of FIG. 13, the single-sheet input screen is displayed as shown in FIG. 14.

The operator presses the store key 1020 to store the input data relating to the defect (step P513). The stored data relating to the defect is sent to the server 300. The server 300 receives the data relating to the defect (step P514) and stores the data in the corresponding tables of the database 708 (step P515). The processes of the steps P510 to P514 are carried out until the operator issues a command to end (step P515).

Retrieval Request/Output Step

The steps of retrieval request and output performed by the clients 501 to 503 will be explained with reference to FIG. 15 to FIG. 39. In these steps of retrieval request and output, in the manufacturing and production check section 401, the component check section 402, and the manufacturing technical section 403, the clients 501 to 503 output retrieval requests to the server 300 and perform processes such as chronologically processing and displaying the retrieved data sent from the server 300.

Figure 15:
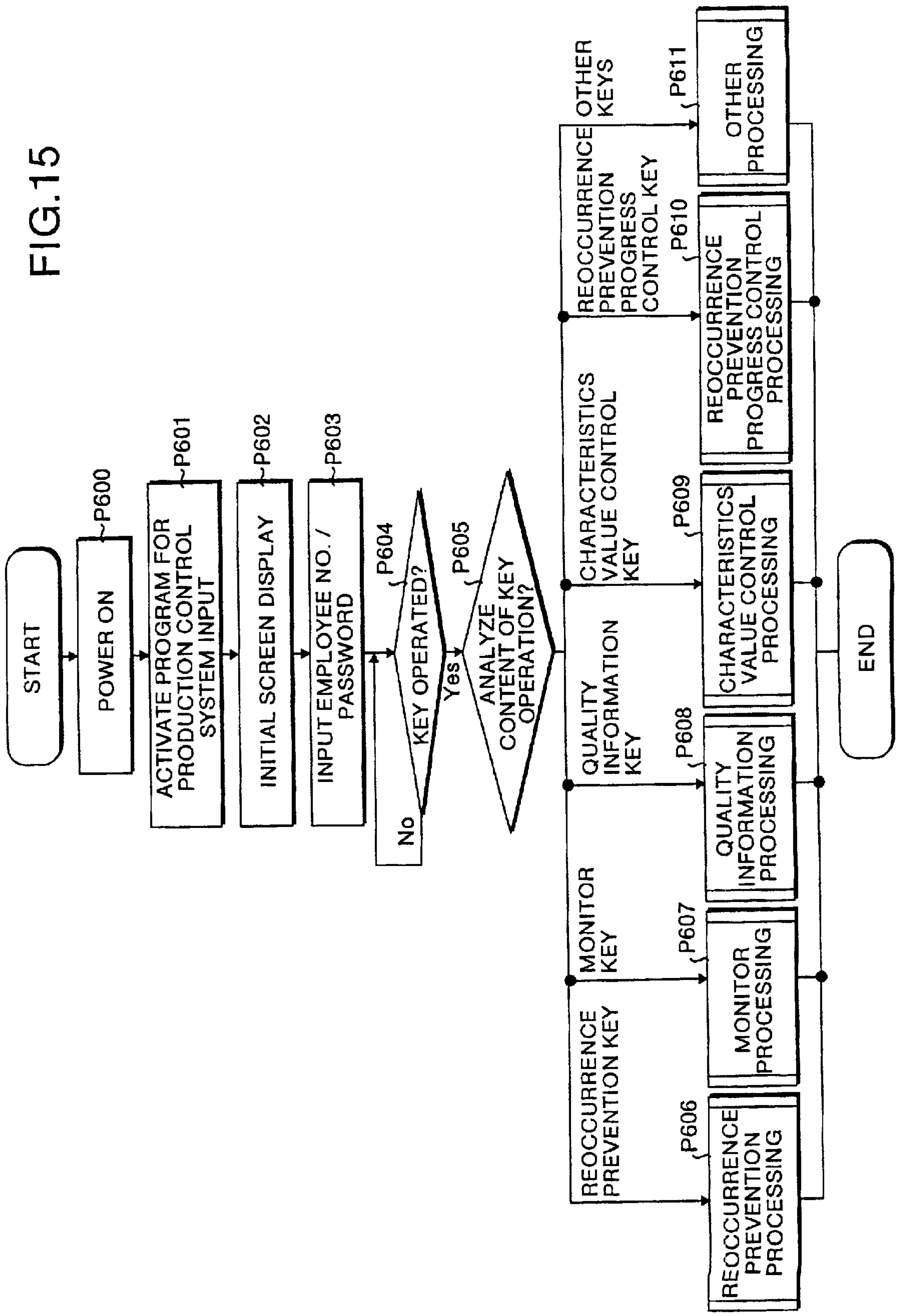
FIG. 15 is a flowchart schematically showing the entire operation of the output system client of FIG. 1.
Figure 16:
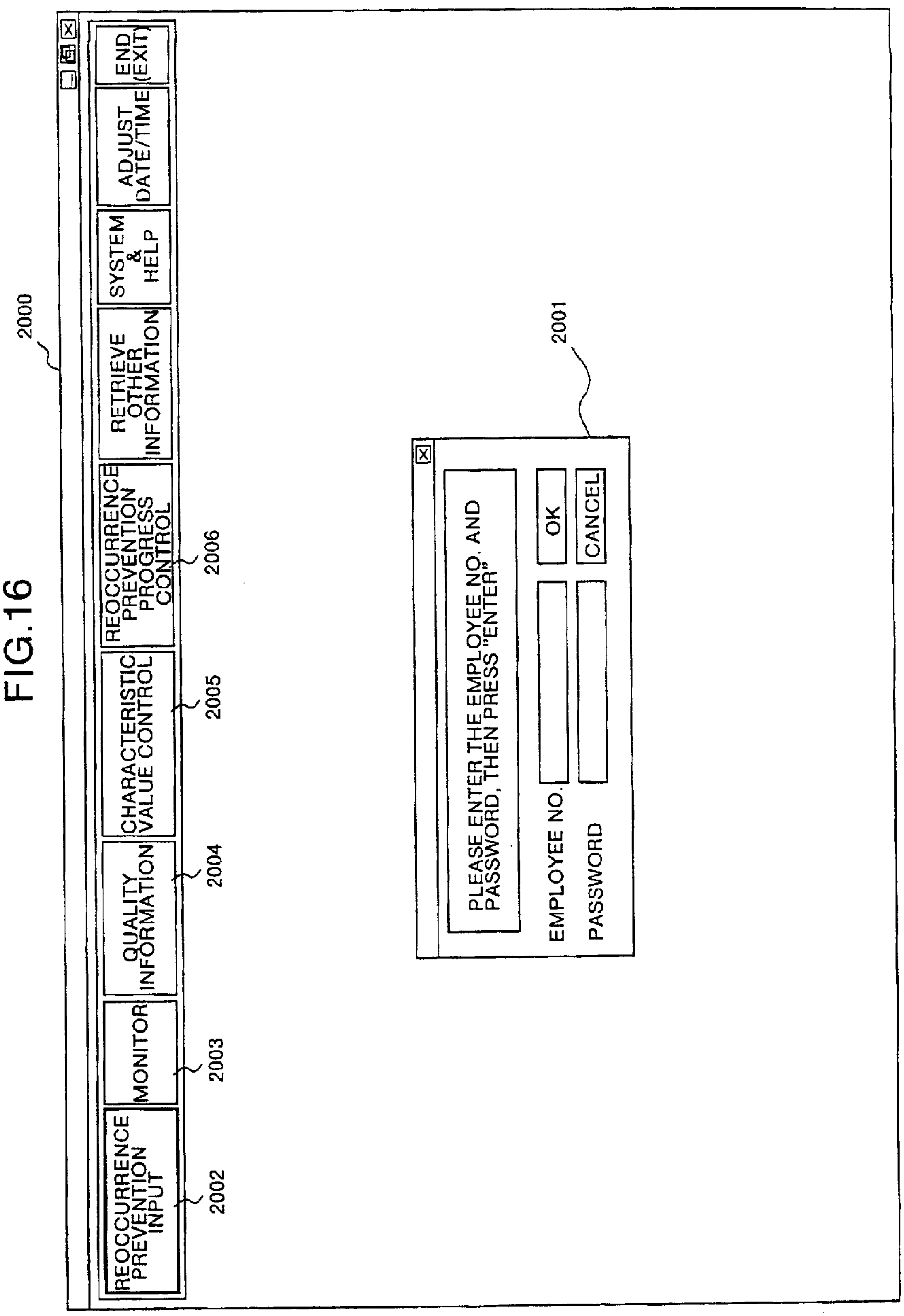
FIG. 16 is a diagram showing an initial screen of the output system client.

FIG. 15 is a flowchart showing a summary of the entire processes performed by the clients 501 to 503 of the output system. In FIG. 15, the controllers of the manufacturing and production check section 401, the component check section 402, and the manufacturing technical section 403 switch the power of the clients 501 to 503 to ON (step P600), then select and activate the program for production management system input 807*b* (step P601), whereby an initial screen 2000 such as that shown in FIG. 16 is displayed (step P602). A subscreen 2001 for inputting the employee number and password (step P603) is displayed in a portion of the initial screen shown in FIG. 16, and the controller inputs his employee number and password (step P603) thereto. When the above processes end, it becomes possible to input data to the screen by using the keys.

When the controller manipulates the keys (step P604), the content of the key manipulation is analyzed (step P605). When the reoccurrence prevention input key 2002 has been selected, (1) reoccurrence prevention input processing (step P606) is executed; when the monitor key 2003 has been selected, (2) monitoring processing (step P607) is executed; when the quality information key 2004 has been selected, (3) quality information processing (step P608) is executed; when the characteristic value management key 2005 has been selected, (4) characteristic value management processing is executed (step P609); (5) when the reoccurrence progress monitor key 2006 has been selected, reoccurrence progress monitor processing is executed (step P610); and when other keys have been selected, other processes are executed (step P611).

Subsequently, (1) the reoccurrence prevention input processing (step P606), (2) the monitoring processing (step P607), (3) the quality information processing (step P608). (4) the characteristic value management processing (step P609), and (5) the reoccurrence progress monitor processing (step P610) will be explained in detail.

(1) Reoccurrence Prevention Input Processing

Figure 17:
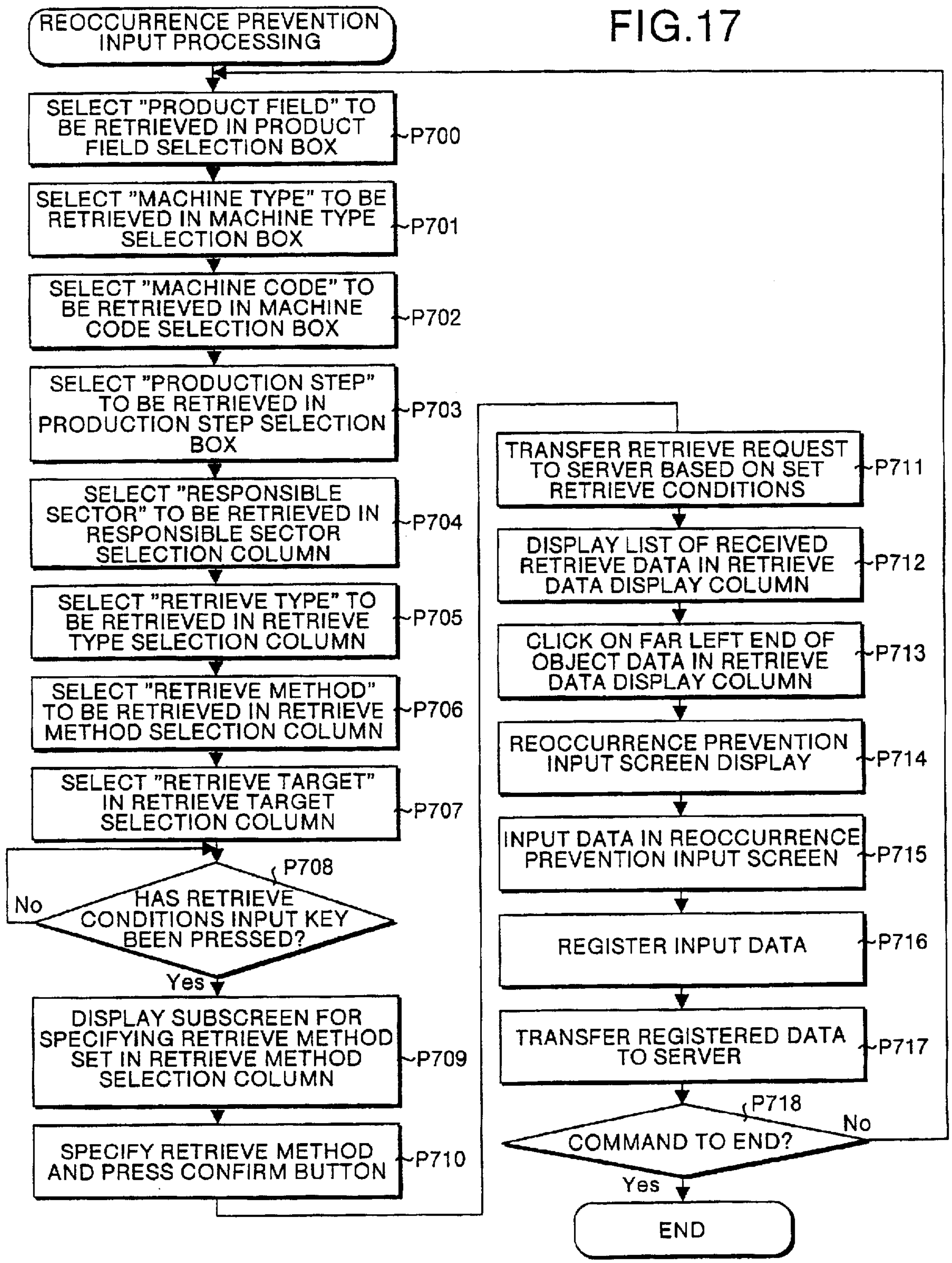
FIG. 17 is a flowchart showing in detail a reoccurrence prevention input process of FIG. 15.

The reoccurrence prevention input processing will be explained based on the flowchart of FIG. 17 and with reference to FIG. 18 to FIG. 21. FIG. 17 is a flowchart showing reoccurrence prevention input processing, and FIG. 18 to FIG. 21 are diagrams showing screens which are displayed during the reoccurrence prevention input processing.

Figure 18:
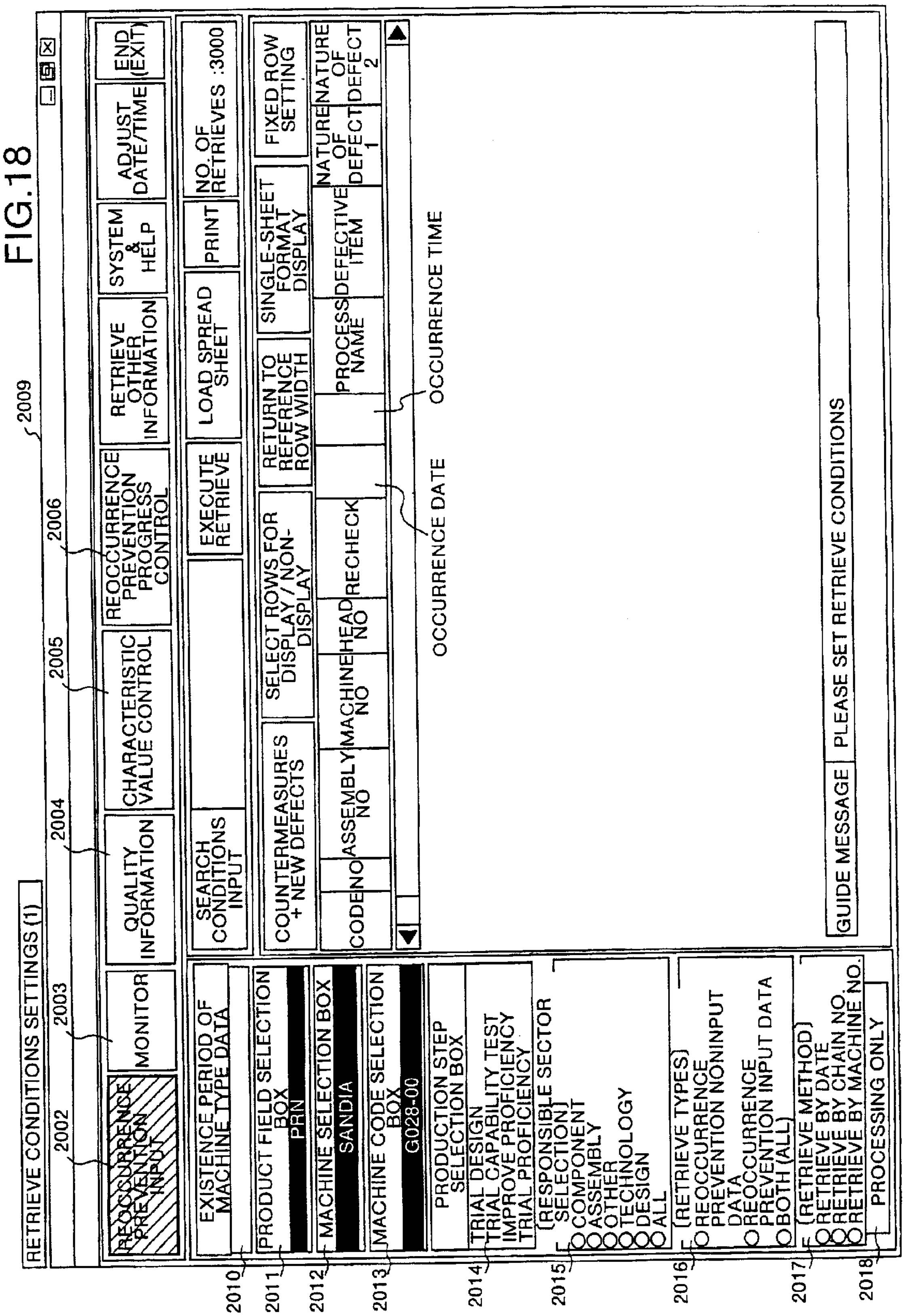
FIG. 18 is a diagram showing a display screen of the reoccurrence prevention input process.

FIG. 18 shows an initial screen 2009 of the reoccurrence prevention input processing, displayed when the reoccurrence prevention input processing key 2002 has been selected. In FIG. 18, reference numeral 2010 represents a key for displaying the data duration of the selected machine. When the key 2010 is pressed, the data duration of the selected machine is displayed. Reference numeral 2011 represents a product field selection box for selecting a product field to be retrieved, reference numeral 2012 represents a machine type selection box for selecting the type of machine to be retrieved, reference numeral 2013 represents a machine code selection box for selecting the machine code to be retrieved, and reference numeral 2014 represents a production step selection box for selecting the production step to be retrieved.

Furthermore, reference numeral 2015 represents a responsible sector selection box for selecting the responsible sector to be retrieved. "Component", "technology", "assembly", "design", "other" and "all" can be selected from the responsible sector selection box. Reference numeral 2016 represents a retrieval type selection box for selecting the "retrieval type" to be retrieved. One of "reoccurrence not-input data", "reoccurrence prevention input data", and "all" can be selected from the retrieval type selection box 2016. Reference numeral 2017 represents a retrieval method selection box for selecting the "retrieval method" to be used for retrieval. One of "retrieve by date", "retrieve by installation serial number", and "retrieve by machine number" can be selected from the retrieval method selection box 2017. Reference numeral 2018 represents a retrieval target selection box for selecting the "retrieval target". Either "in-processing only" or "out-of-processing only" can be selected from the retrieval target selection box 2018.

In the flowchart of FIG. 17, the controller selects the "product field" to be retrieved in the product field selection box 2011 of the initial screen 2009 of FIG. 18 (step P700). Then, the controller selects the "machine type" to be retrieved in the machine type selection box 2012 (step P701), the "machine code"to be retrieved in the machine code selection box 2013 (step P702), and the "production step" to be retrieved in the production step selection box 2014 (step P703).

The controller selects the "responsible sector" for retrieval in the responsible sector selection box 2015 (step P704), and the "retrieval type" for retrieval in the retrieval type selection box 2016 (step P705). Moreover, the controller selects the "retrieval method" to be used for retrieval in the retrieval method selection box 2017 (step P706), and the "retrieval target" in the retrieval target selection box 2018 (step P707).

Figure 19:
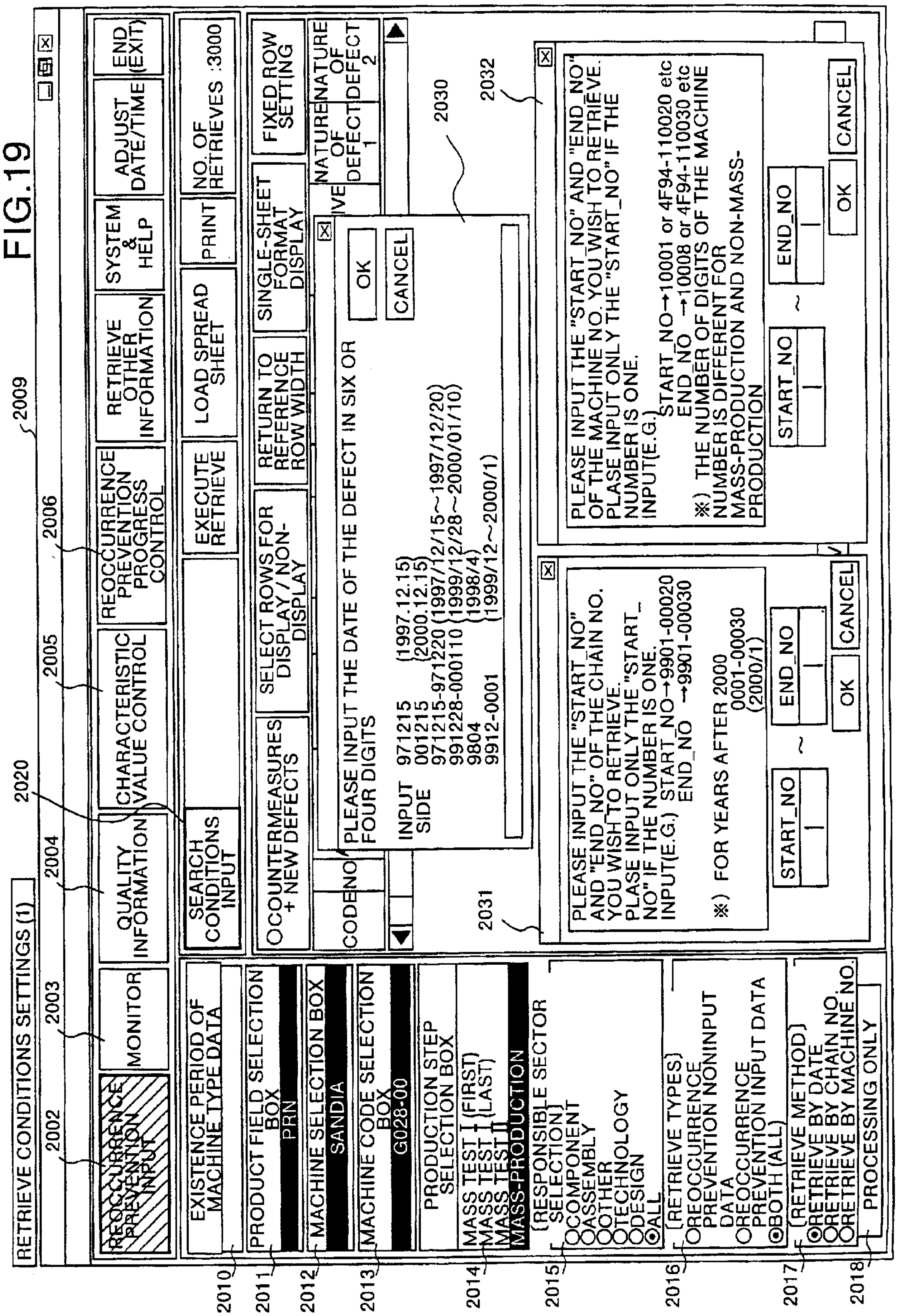
FIG. 19 is a diagram showing a display screen of the reoccurrence prevention input process.

When the controller presses the retrieval conditions input key 2020 (step P708), a subscreen for specifying the retrieval method set in the retrieval method selection box 2017 in greater detail is displayed (step P709). More specifically, as shown in FIG. 19, when "retrieve by date" is selected in the retrieval method selection box 2017, a subscreen 2030 is displayed and the controller inputs the retrieval period. When "retrieve by installation serial number" is selected, a subscreen 2031 is displayed and the controller inputs the "start_no" and "end_no". When "retrieve by machine number" is selected, a subscreen 2032 is displayed and the controller inputs the "start_no" and "end_no".

Figure 20:
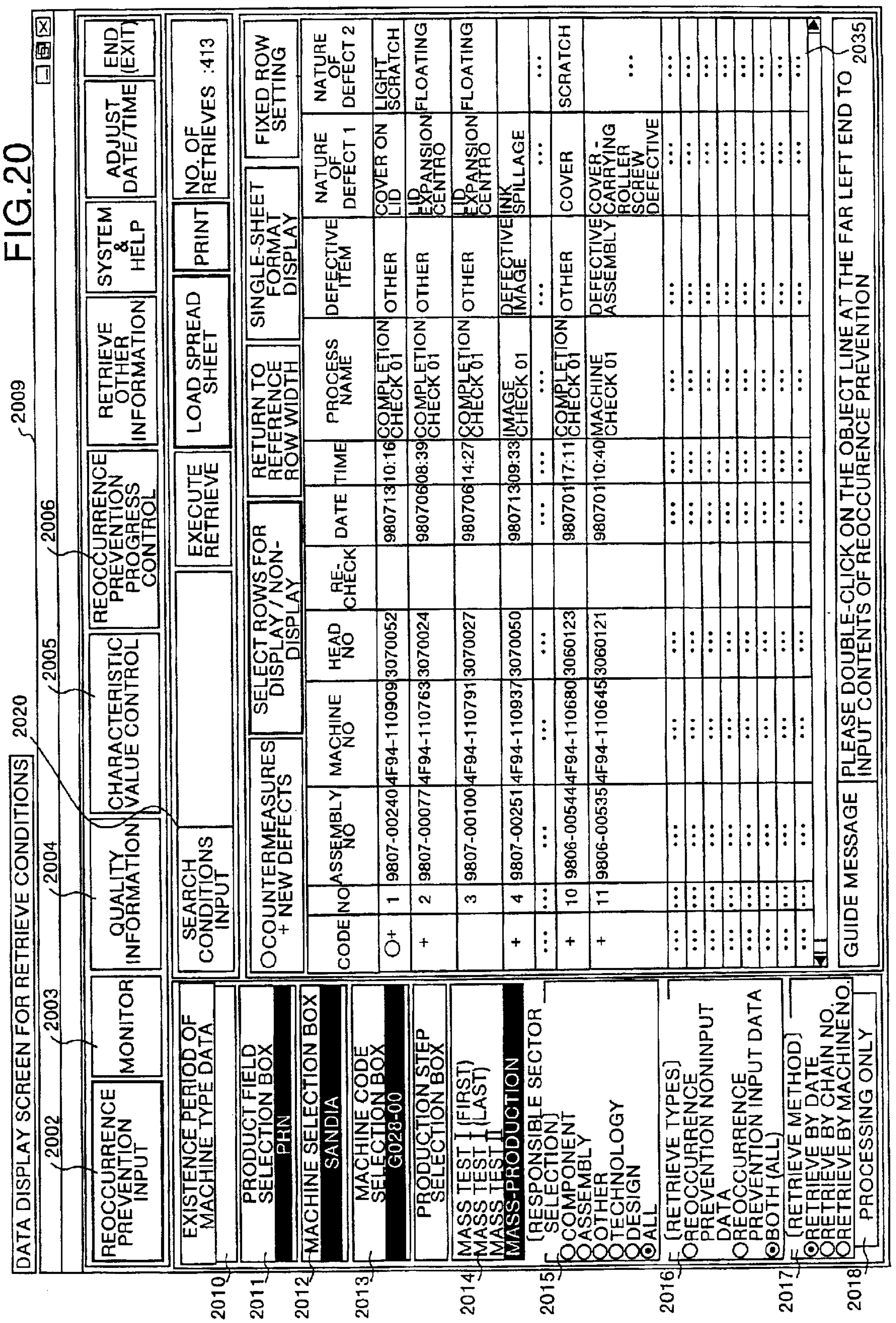
FIG. 20 is a diagram showing a display screen of the reoccurrence prevention input process.

When the controller has precisely specified the retrieval method and pressed the confirm button (step P710), a retrieval request based on the retrieval conditions which were set in the above-mentioned steps P700 to P710 is transmitted to the server 300 (step P711). The server 300 retrieves the data based on the retrieval conditions and transmits the data. A list of the retrieved data (raw data) is displayed in the retrieved data display box 2035 (step P712) as shown in FIG. 20.

The retrieved data display box 2035 comprises items such as "No.", "installation serial number", "machine no.", "head no.", "redetection", "occurrence date", "process name", "defective item", "defect content", "line reject", "lank", "responsible sector", "cause of defect", "repair contents", "repair date", "reoccurrence prevention contents", "date of countermeasure", "time of countermeasure", and "supervisor". The operator can freely set which of these items to display in the retrieved data display box 2035.

Figure 21:
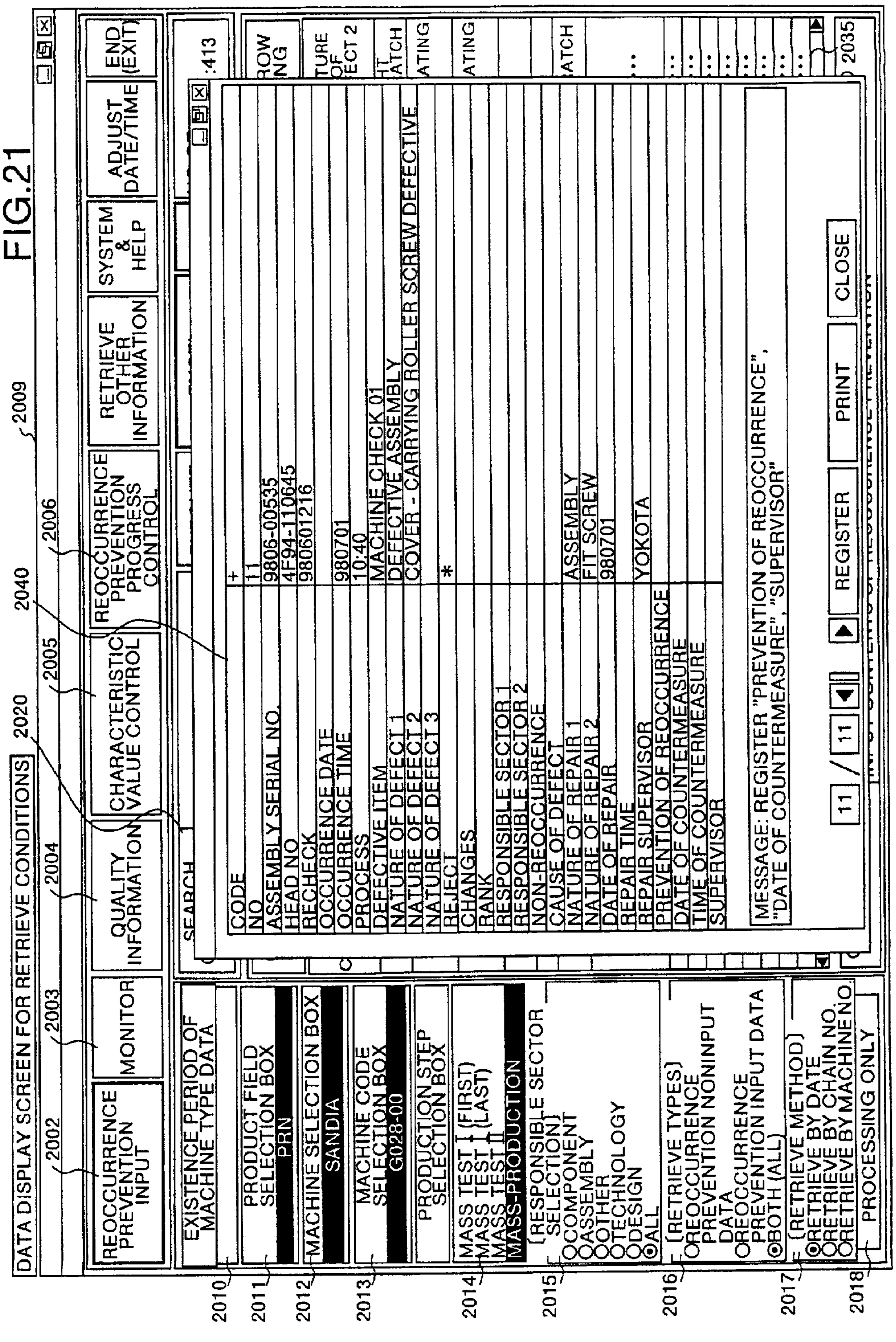
FIG. 21 is a diagram showing a display screen of the reoccurrence prevention input process.

In the retrieved data display box 2035, when the controller clicks on the far right cell of the object data (step P713), a reoccurrence prevention input screen 2040 is displayed as shown in FIG. 21 (step P714). The controller inputs the reoccurrence prevention contents, "date of countermeasure", "time of countermeasure", and "supervisor" to the reoccurrence prevention input screen 2040 (step P715), and stores it by pressing the store key (step P716). The stored reoccurrence prevention data is transmitted to the server 300 (step P717). The transmitted reoccurrence prevention data is stored in a corresponding table of the database 708 of the server 300. The processes of steps P700 to P717 are executed until there is a command to end (step P718).

(2) Monitoring Processing

Figure 22:
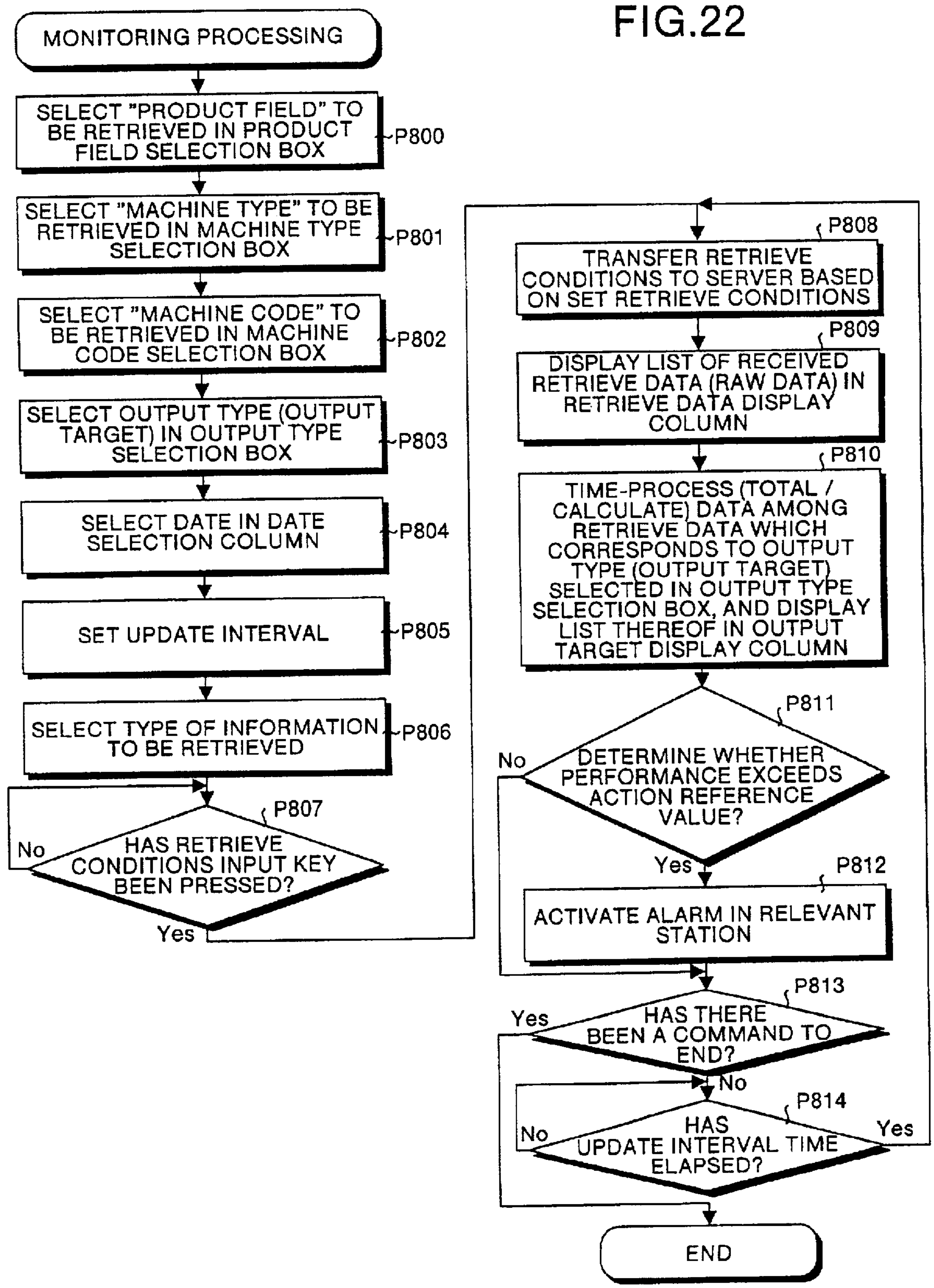
FIG. 22 is a flowchart showing in detail a monitoring process of FIG. 15.

Monitoring will be explained in compliance with the flowchart of FIG. 22 and with reference to FIG. 23 to FIG. 26. FIG. 22 is a flowchart showing monitoring processes, and FIG. 23 to FIG. 26 show screens displayed during monitoring. Monitoring is carried out by at least one of the output system clients 501 to 503 while the manufacturing assembly line is moving.

Figure 23:
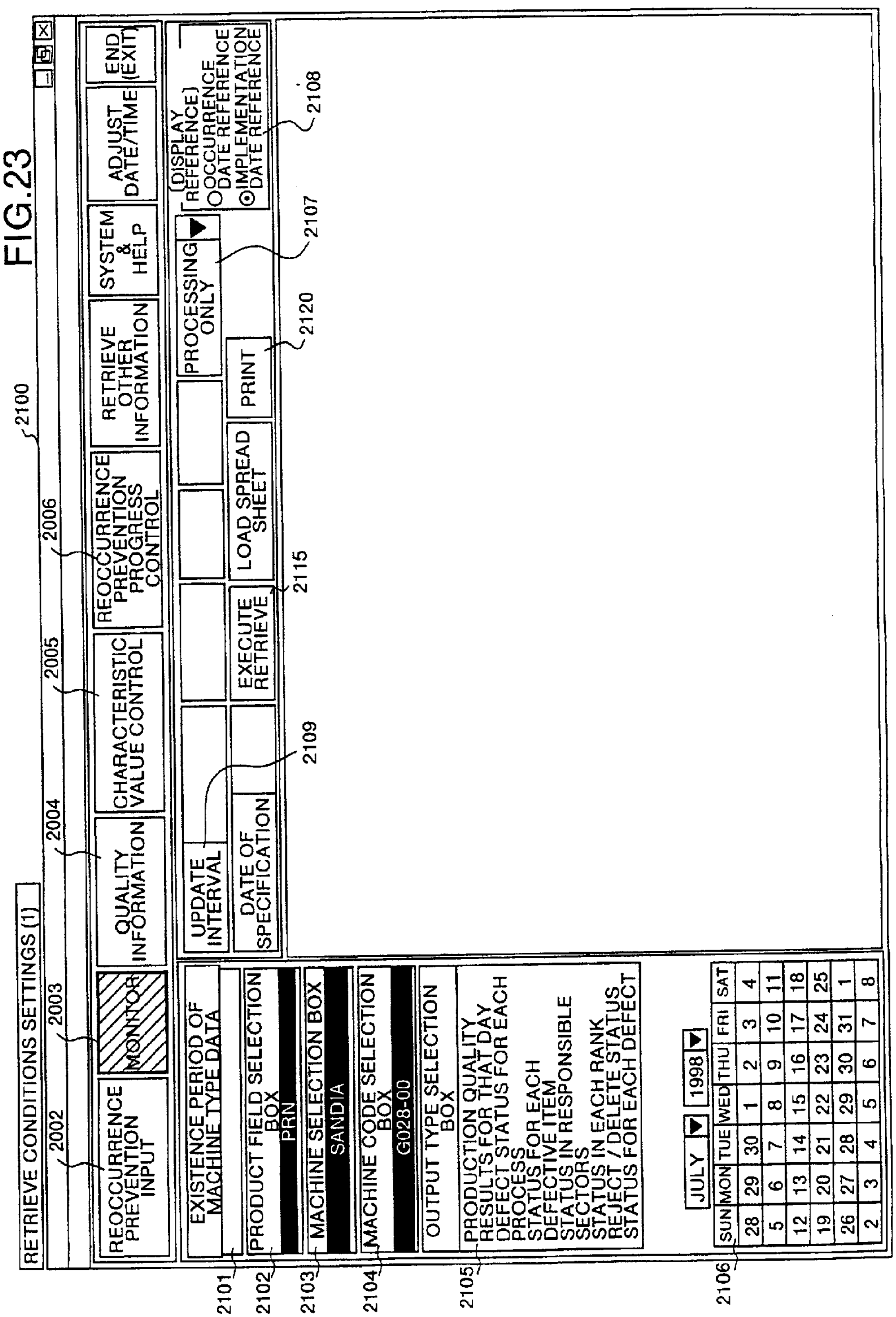
FIG. 23 is a diagram showing a display screen of the monitoring process.

FIG. 23 shows an initial screen of the monitoring processing which is displayed when the monitor key 2003 has been selected. In FIG. 23, reference numeral 2101 represents a key for displaying the data duration of the selected machine type. When the key 2101 is pressed, the data duration of the selected machine type is displayed. Reference numeral 2102 represents a product field selection box for selecting a product field to be retrieved, reference numeral 2103 represents a machine type selection box for selecting the type of machine to be retrieved, reference numeral 2104 represents a machine code selection box for selecting the machine code to be retrieved, and reference numeral 2105 represents an output category selection box for selecting the output target. The output target is selected from "that day's production and quality results information", "defect state in each process", "occurrence state for each defective item", "occurrence state for each responsible sector", "occurrence state for each lank", "line reject/cancel state" and "occurrence state for each type of defect" which are displayed in the output category selection box 2105.

Here, "that day's production and quality results information" comprises information for determining the disparity and variation between quality results and objects. "Defect state in each process" comprises information for determining shifts and tendencies of the occurrence state of defects in each process. "Occurrence state for each defective item" is for determining shifts and tendencies of the occurrence state of defects in each item. "Occurrence state for each lank" is for determining shifts and tendencies of the occurrence state of defects of each lank. "Line reject/cancel state" is for determining shifts and tendencies in the line rejects and cancellation state. "Occurrence state for each type of defect" is for determining shifts and tendencies of the occurrence state for each type of defect. This output category (output target) can be selected before and after data is retrieved.

Reference numeral 2106 represents a box for selecting the target "date" of the retrieval. Reference numeral 2107 represents a box for selecting the type of information to be retrieved, one of the following items being selected therefrom: "in-processing only", "out-of-processing only", and "in-processing+out-of-processing". Reference numeral 2108 represents a display reference box for selecting whether to display the information with "date of defect occurrence" as the reference or with "date of completion of machine" as the reference. The display reference box 2108 can be set before or after data is retrieved.

Figure 24:
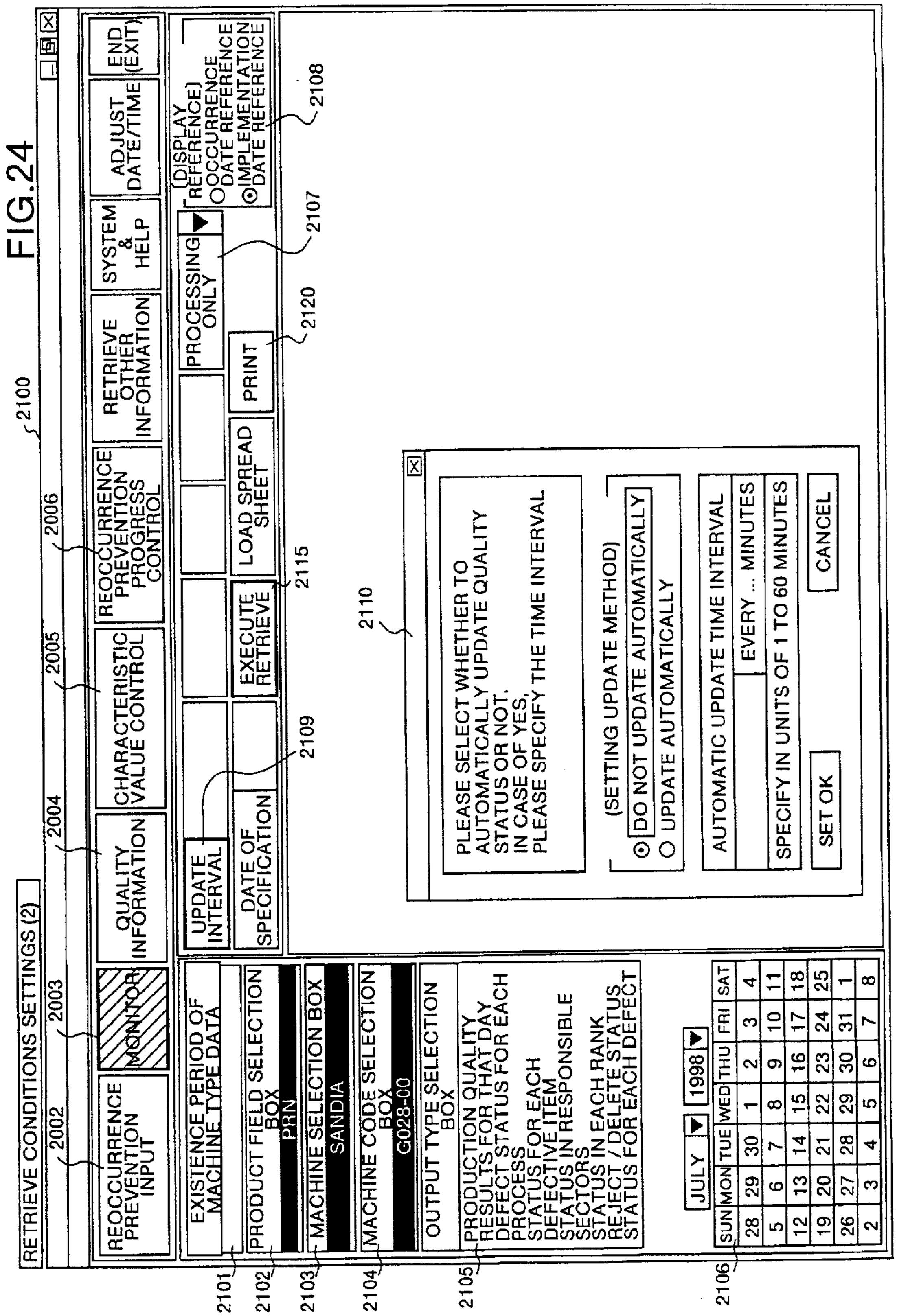
FIG. 24 is a diagram showing a display screen of the monitoring process.

Reference numeral 2109 represents an "update interval" setting key. When the "update interval" setting key 2109 has been selected, the subscreen 2110 of FIG. 24 is displayed. This subscreen 2110 is for selecting whether to automatically update retrieval of information, and for setting the intervals (in minutes) which the automatic updates are carried out at. "Automatic update" is a term signifying the function of automatically retrieving information at predetermined intervals of time and displaying the latest information on the screen. Reference numeral 2115 represents an execute retrieval key. When the execute retrieval key is pressed, information matching the retrieval conditions is retrieved, and the retrieved information is displayed on the screen.

In the flowchart of FIG. 22, the controller selects the "product field" for the retrieval in the product field selection box 2101 of the initial screen of FIG. 23 (step P800). The controller selects the "machine type" to be retrieved in the machine type selection box 2103 (step P801). Then, the "machine code" is selected from the machine code selection box 2104 (step P802) and the output category (output target) selected from the output category selection box 2105 (step P803). The update interval is set (step P805) and the type of information to be retrieved is selected (step P806).

Figure 25:
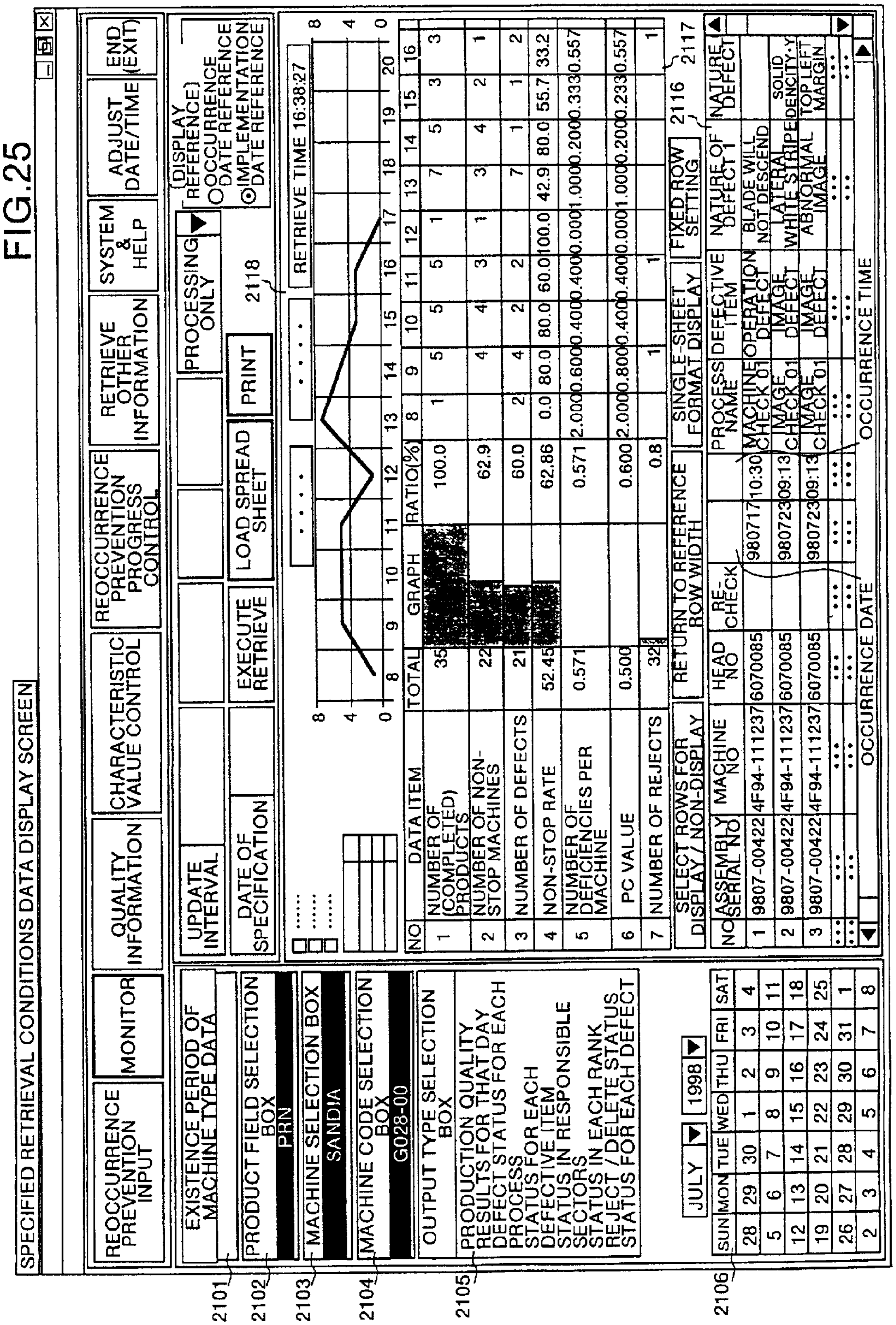
FIG. 25 is a diagram showing a display screen of the monitoring process.

When the controller presses the execute retrieval key 2115 (step P807), a retrieval request based on the retrieval conditions set in the above-described steps P800 to P807 is sent to the server 300 (step P808). The server 300 retrieves the data based on the retrieval conditions and transmits the retrieved data. As shown in FIG. 25, a list of the retrieved data (raw data) is displayed in the retrieved data display box 2116 (step P809). The items displayed in the retrieved data display box 2116 include items such as "No.", "installation serial number", "machine no.", "head no.", "redetection", "occurrence date", "process name", "defective item", "defect content", "line reject", "lank", "responsible sector", "cause of defect", "repair contents", "repair date", "reoccurrence prevention contents", "date of countermeasure", "time of countermeasure", and "supervisor". The operator can freely set which of these items to display in the retrieved data display box 2116.

The output category (output target) data which was selected from the retrieved data in the output category selection box 2105 is chronologically processed (calculated and totalled) and displayed in the output target display box 2117 (step P810). The items selected from the data displayed in the output target display box are displayed in a graph in a graph display box 2118. The operator can select which items to display in the graph.

FIG. 25 shows the data displayed in the output target display box 2117 in the case where "that day's production and quality result information" has been selected in the output category selection box 2105. The output target display box 2117 of FIG. 25 displays "Total number", "graph total number", "ratio" and number of occurrences within the time period (8 a.m. to 8 p.m.)" in correspondence with the data items (number of products (completions), number of straight-throughs, number of defects, straight-through rate, defective rating, PQ value, number of rejects). The graph display box 2118 shown in FIG. 25 shows an example of a graph display when the number of products (completions) has been selected in the output target display box 2117.

FIG. 26A to FIG. 26F show examples of the output target display box 2117 when "defect occurrence state in each process", "occurrence state for each defective item", "occurrence state for each lank", "line reject/cancel state" and "occurrence state for each type of defect" are selected in the output category selection box 2105.

The operator can print the data displayed in the display screen via the printing section 808 by pressing the print key 2120. The actual result displayed in the output target display box 2117 is compared with the predetermined action reference (step P811). When the actual result has exceeded the reference, an alarm is generated at the relevant district (the relevant assembly step or responsible sector stored beforehand etc.) (step P812). It is determined whether there has been an end command (step P813), and if so, processing ends. When there is no end command, it is determined whether the update interval has elapsed (step P814). When the update interval has elapsed, processing returns to step S807 and data retrieval and the like are carried out (steps P808 to P812). In this way, it is always determined whether the actual result has exceeded the action reference.

(3) Product Quality Information Processing

Figure 27:
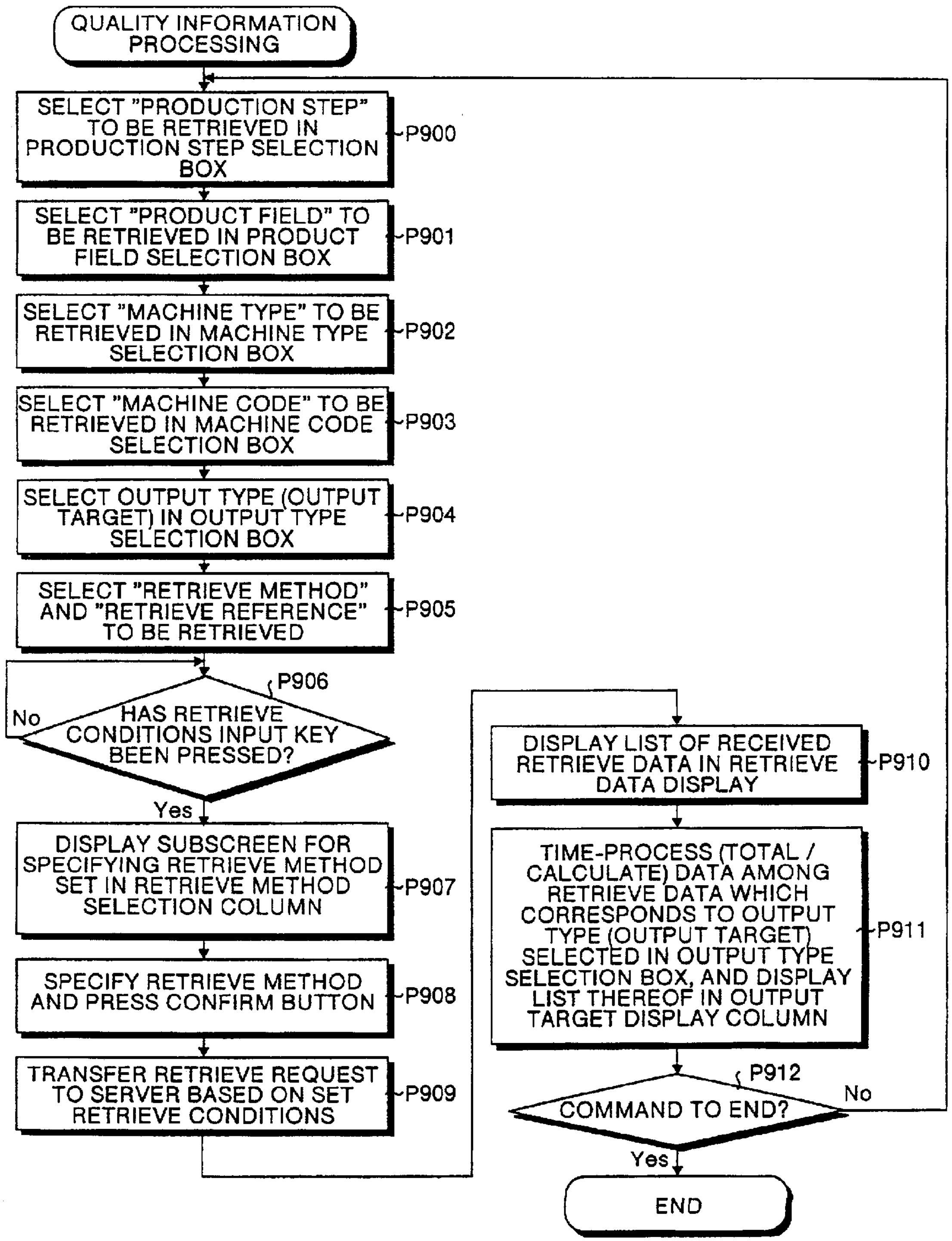
FIG. 27 is a flowchart showing a quality information process.

Product quality information processing will be explained based on the flowchart of FIG. 27 and with reference to FIG. 28 to FIG. 31F. FIG. 27 is a flowchart showing quality information processes, and FIG. 28 to FIG. 31F are diagrams showing screens displayed during the quality information processes.

Figure 28:
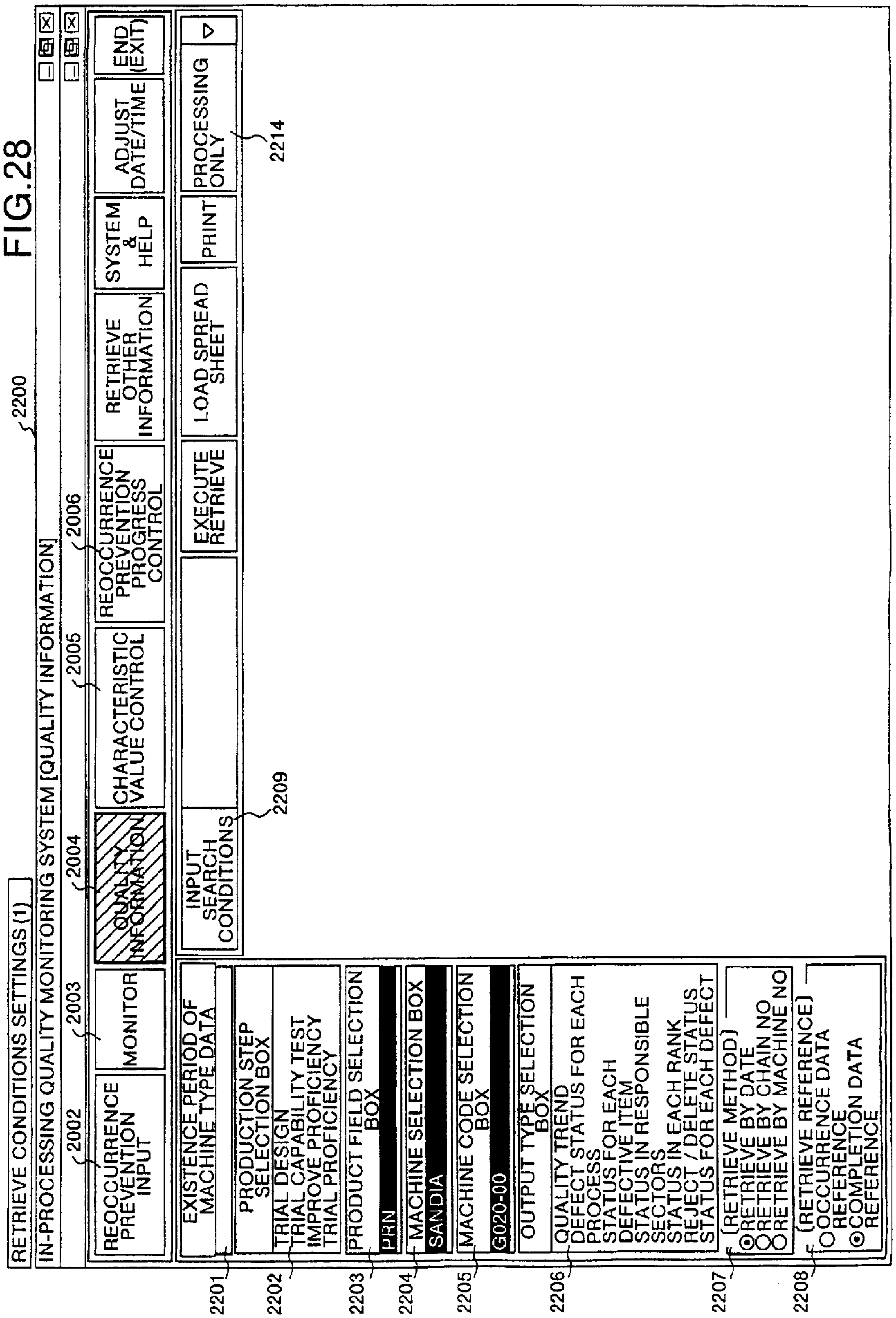
FIG. 28 is a diagram showing a display screen of the quality information process.

FIG. 28 shows an initial screen 2200 of the quality information processing which is displayed when the quality information key 2004 has been selected. Reference numeral 2201 represents a key for displaying the data duration of the selected machine type. When the key 2201 is pressed, the data duration of the selected machine type is displayed. Reference numeral 2202 represents a production step selection box for selecting "production step" for retrieval, reference numeral 2203 represents a product field selection box for selecting a "product field" for retrieval, reference numeral 2204 represents a machine type selection box for selecting the type of machine to be retrieved, reference numeral 2205 represents a machine code selection box for selecting the machine code to be retrieved, and reference numeral 2206 represents a production step selection box for selecting the production step to be retrieved. The output target is selected from the following items which are displayed in the output category selection box 2206: "quality trend", "defect occurrence state in each step", "occurrence state for each defective item", "occurrence state for each lank", "line reject/cancel state" and "occurrence state for each type of defect".

"Quality trend" comprises information for determining the disparity and variation between essential results and objects. "Defect state in each process" comprises information for determining shifts and tendencies of the occurrence state of defects in each process. "Occurrence state for each defective item" is for determining shifts and tendencies of the occurrence state of defects in each item. "Occurrence state for each lank" Is for determining shifts and tendencies of the occurrence state of defects of each lank. "Line reject/cancel state"is for determining shifts and tendencies in the line rejects and cancellation state. "Occurrence state for each type of defect" is for determining shifts and tendencies of the occurrence state for each type of defect. The output category (output target) can be selected before and after the information is retrieved.

Reference numeral 2207 represents a retrieval method selection box for selecting the "retrieval method" to be used for retrieval. One of "retrieve by date", "retrieve by installation serial number", and "retrieve by machine number" is selected from the retrieval method selection box 2207. Reference numeral 2208 represents a retrieval reference selection display box for selecting a "retrieval reference" for retrieval. Either one of "occurrence date reference" and "completion date reference" is selected in the retrieval reference selection display box 2208. Reference numeral 2214 represents a box for selecting the type of information to be retrieved, one of the following being selected; "in-processing only", "out-of-processing only", and "in-processing+out-of-processing".

In the flowchart of FIG. 27, the controller selects the "production step" for retrieval in the production step selection box 2202 in the initial screen of FIG. 28 (step P900), and selects the "product field" to be retrieved in the product field selection box 2203 (step P901). Then, the controller selects the "machine type" to be retrieved in the machine type selection box 2204 (step P902), the "machine code" to be retrieved in the machine code selection box 2205 (step P903). Moreover, the controller selects the output category (output target) in the output category selection box 2206 (step P904) and selects the type of information to be retrieved (step P905).

Figure 29:
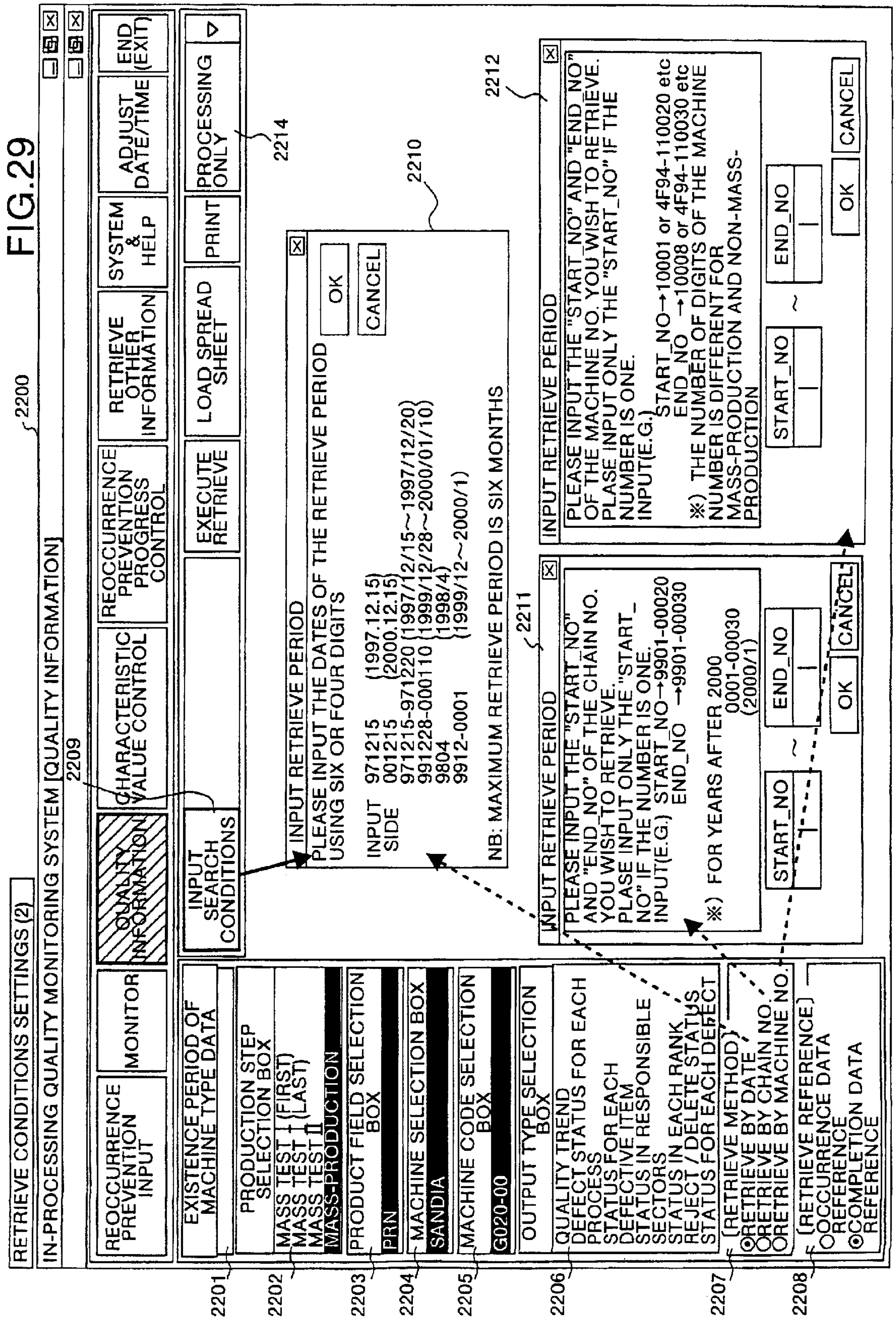
FIG. 29 is a diagram showing a display screen of the quality information process.

When the controller presses the retrieval conditions input key 2029 (step P906), a subscreen for specifying the retrieval method set in the retrieval method selection box 2207 in greater detail is displayed (step P907). More specifically, as shown in FIG. 29, when "retrieve by date" is selected in the retrieval method selection box 2207, a subscreen 2210 is displayed and the controller inputs the retrieval period. When "retrieve by installation serial number" is selected, a subscreen 2211 is displayed and the controller inputs the "start_no" and "end_no". When "retrieve by machine number" is selected, a subscreen 2212 is displayed and the controller inputs the "start_no" and "end_no".

Figure 30:
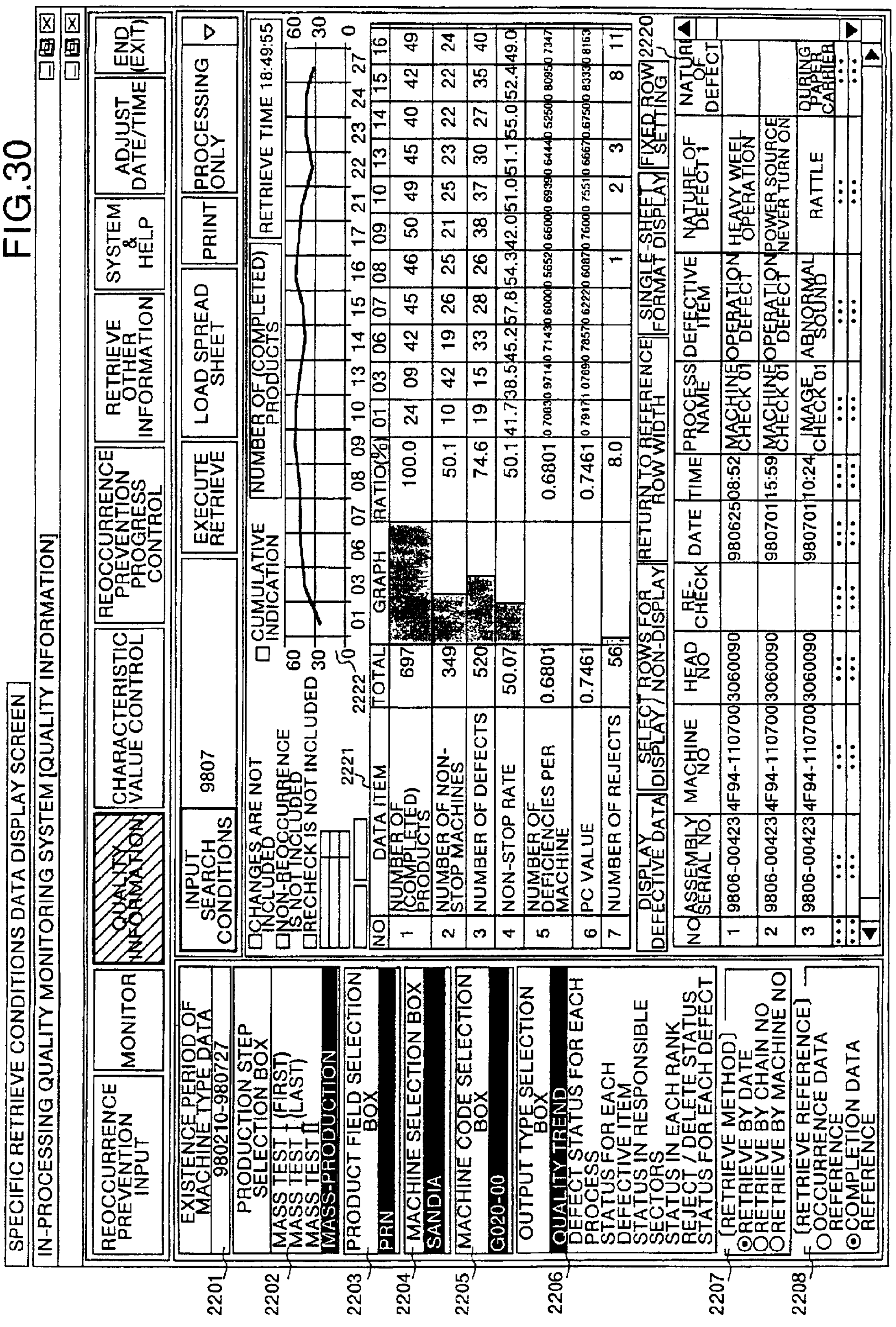
FIG. 30 is a diagram showing a display screen of the quality information process.

When the controller has precisely specified the retrieval method and pressed the confirm button (step P908), a retrieval request based on the retrieval conditions which were set in the above-mentioned steps P900 to P907 is transmitted to the server 300 (step P909). The server 300 retrieves the data based on the retrieval conditions and transmits the data. A list of the retrieved data (raw data) is displayed in the retrieved data display box 2220 (step P910) as shown in FIG. 30. The retrieved data display box 2220 comprises items such as "No.", "installation serial number", "machine no.", "head no.", "redetection", "occurrence date", "process name", "defective items, "defect content", "line reject", "lank", "responsible sector", "cause of defect", "repair contents", "repair date", "reoccurrence prevention contents", "date of countermeasure", "time of countermeasure", and "supervisor". The operator can freely set which of these items to display in the retrieved data display box 2220.

The output category (output target) data which was selected from the retrieved data in the output category selection box 2206 is chronologically processed (calculated and totalled) and displayed in the output target display box 2221 (step P911). The items selected from the data displayed in the output target display box are displayed in a graph in a graph display box 2222. The operator can select which items to display in the graph.

FIG. 30 shows the data displayed in the output target display box 2206 in the case where "quality trend" was selected in the output category selection box 2206. The output target display box 2221 of FIG. 30 displays "total number", "graph total number", "ration" and "number of occurrences within each time period" in correspondence with the data items (number of products (completions), number of straight-throughs, number of defects, straight-through rate, defective rating, PQ value, number of rejects). The graph display box 2222 shown in FIG. 30 shows an example of a graph display when the number of products (completions) has been selected in the output target display box 2221.

FIG. 31A to FIG. 31F show examples of the output target display box 2117 when "defect occurrence state in each process", "occurrence state for each defective item", "occurrence state for each lank", "line reject/cancel state" and "occurrence state for each type of defect" are selected in the output category selection box 2221.

The processes of steps P900 to P911 are carried out until an end command is received (step P912).

(4) Characteristic Value Management Processing

Figure 32:
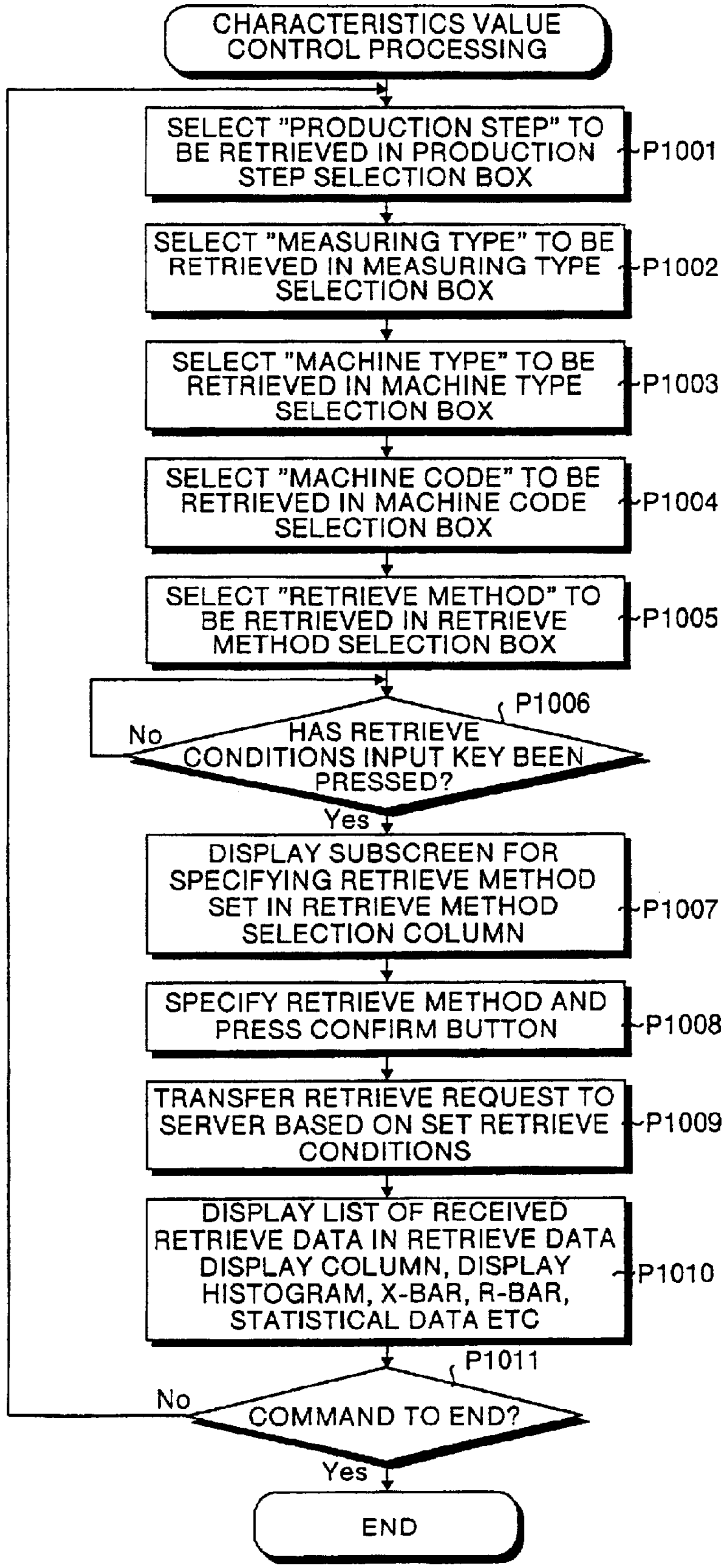
FIG. 32 is a flowchart showing a characteristic value monitoring process.
Figure 34:
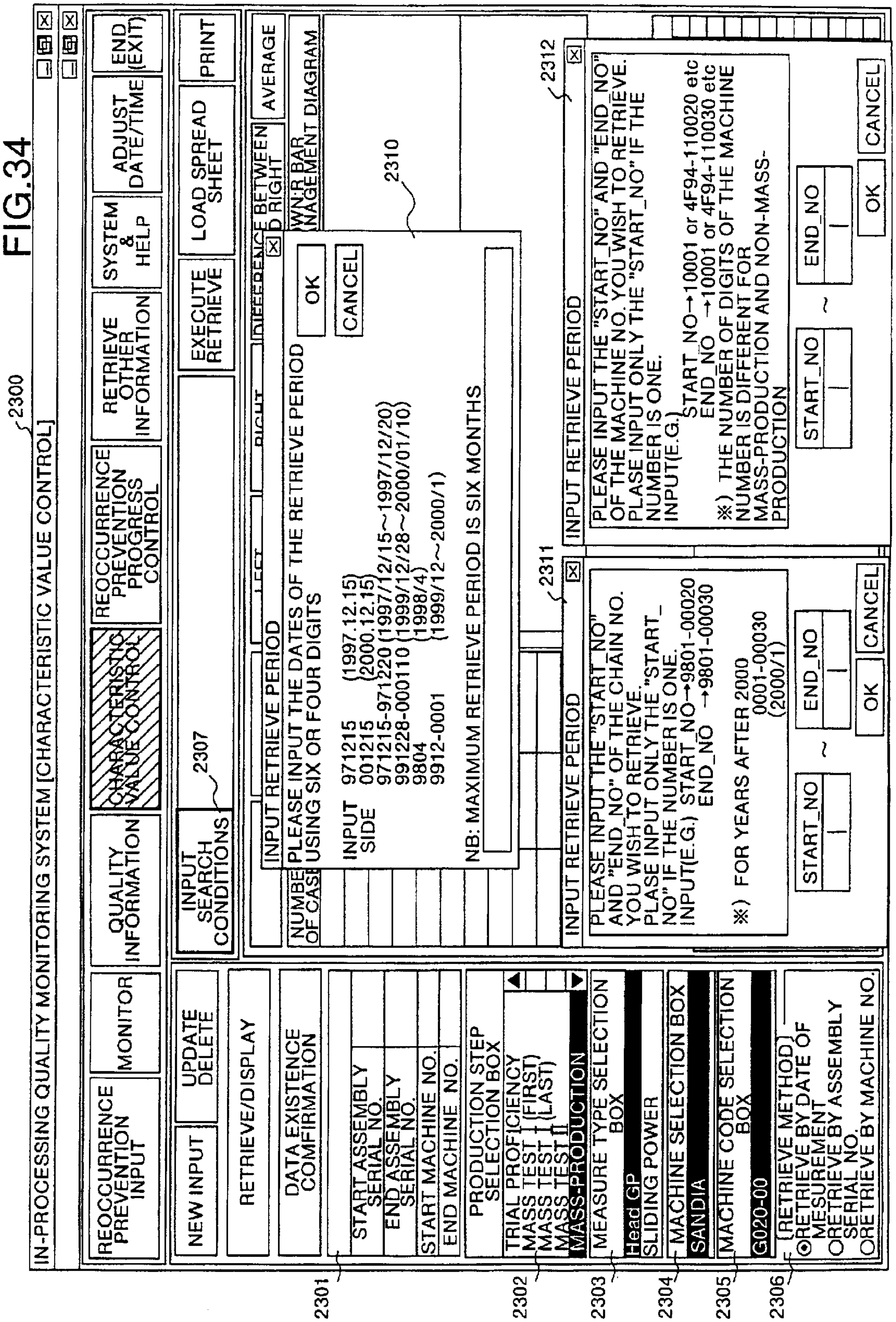
FIG. 34 is a diagram showing a display screen of the characteristic value management process.
Figure 35:
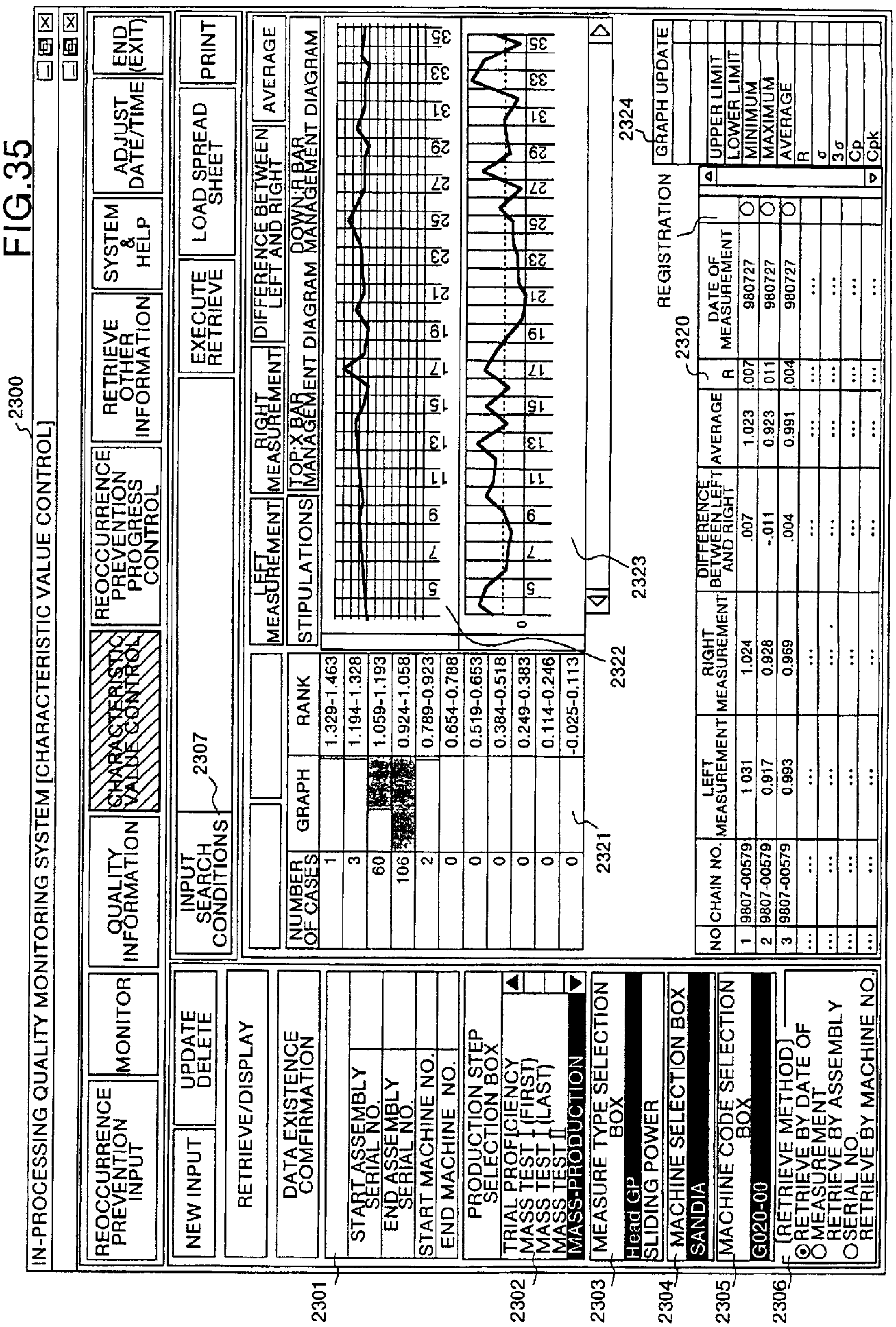
FIG. 35 is a diagram showing a display screen of the characteristic value management process.

Characteristic value management processing will be explained based on the flowchart of FIG. 32 and with reference to FIG. 33 to FIG. 35. FIG. 32 is a flowchart showing characteristic value management processes, and FIG. 32 to FIG. 35 are diagrams showing screens displayed during the characteristic value management processes.

Figure 33:
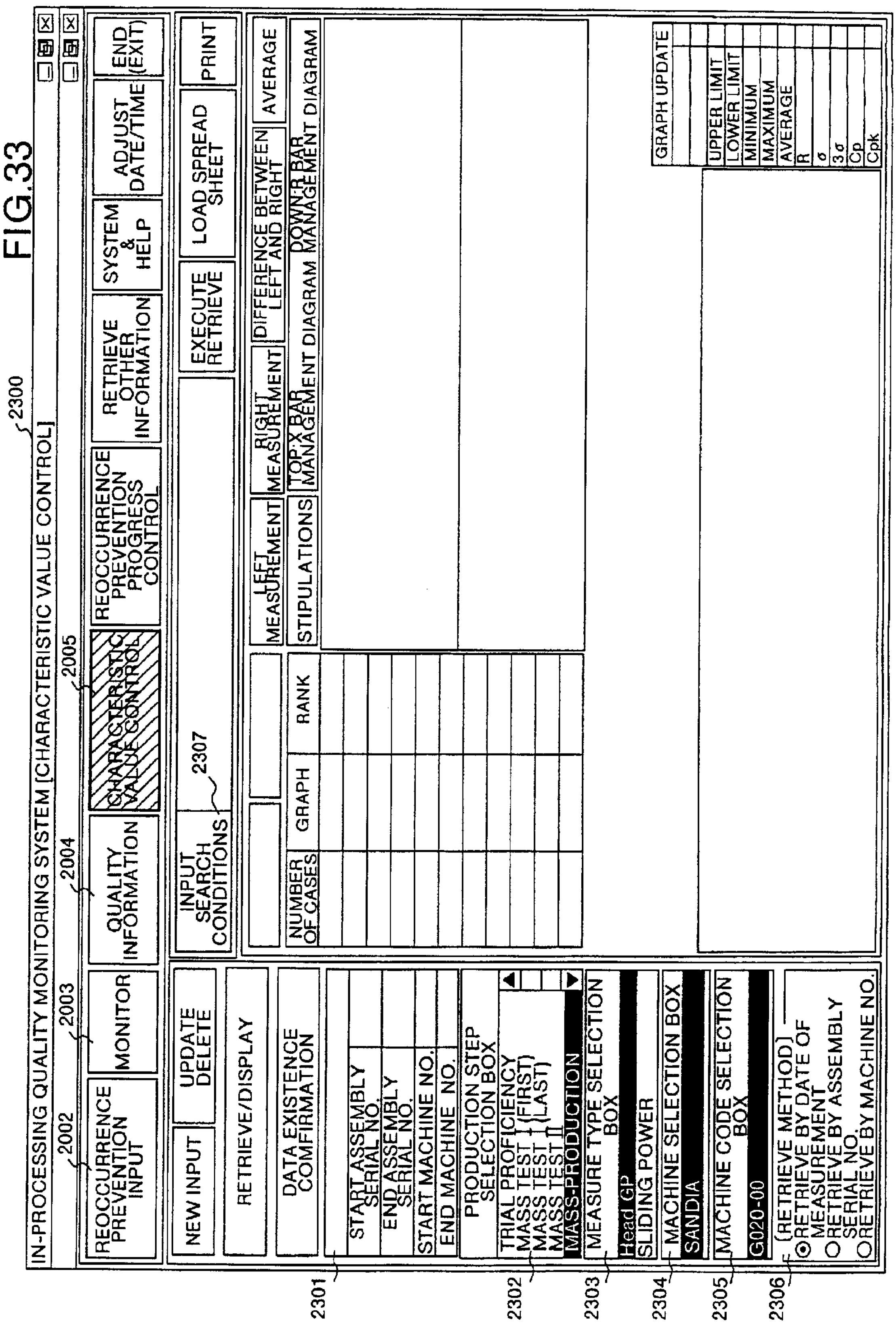
FIG. 33 is a diagram showing a display screen of the characteristic value management process.

FIG. 33 shows an initial screen 2300 of the characteristic value management processing when the characteristic value management key 2005 has been selected. Reference numeral 2301 represents a key for displaying the data duration of a selected measurement category. When the key 2301 is pressed, the data duration of the selected measurement category is displayed. Reference numeral 2302 represents a production step selection box for selecting the "production step" to be retrieved, reference numeral 2303 represents a measurement category selection box for selecting the "measurement category" for retrieval, reference numeral 2304 represents a machine type selection box for selecting the type of machine to be retrieved, reference numeral 2305 represents a machine code selection box for selecting the "machine code" to be retrieved, and reference numeral 2306 represents a retrieval method selection box for selecting the "retrieval method" to be used for retrieval. One of "retrieve by date", "retrieve by installation serial number", and "retrieve by machine number" is selected from the retrieval method selection box 2306.

In the flowchart of FIG. 32, the controller selects the "production step" for retrieval in the production step selection box 2302 in the initial screen of FIG. 33 (step P1001), and selects the "measurement category" to be retrieved in the measurement category selection box 2303 (step P1002). The controller selects the "machine type" to be retrieved in the machine type selection box 2304 (step P1003), selects the "machine code" to be retrieved in the machine code selection box 2305 (step P1004), and selects the "retrieval method" to be used in the retrieval method selection box 2303 (step P1005).

When the controller presses the retrieval conditions input key 2307 (step P1006), a subscreen for precisely specifying the retrieval method set in the retrieval method selection box 2306 is displayed (step P1007). More specifically, as shown in FIG. 34, when "retrieve by date" is selected in the retrieval method selection box 2306, a subscreen 230 is displayed and the controller inputs the retrieval period. When "retrieve by installation serial number" is selected, a subscreen 2311 is displayed and the controller inputs the "start_no" and "end_no". When retrieve by machine numbers is selected, a subscreen 2312 is displayed and the controller inputs the "start_no" and "end no".

When the controller has precisely specified the retrieval method and pressed the confirm button (step P1008), a retrieval request based on the retrieval conditions which were set in the above-mentioned steps P1001 to P1007 is transmitted to the server 300 (step P1009). The server 300 retrieves the data based on the retrieval conditions and transmits the data. As shown in FIG. 35, for example, a list of the retrieved data (raw data) is displayed in the retrieved data display box 2320, a histogram is displayed in a histogram display box 2321, an X bar is displayed in an X bar display box 2322, an R bar is displayed in an R bar display box 2323, and statistical data is displayed in a statistical data display box 2324 (step P1010).

The processes of steps P1011 to P1010 are carried out until an end command is received (step P1011).

(5) Reoccurrence Prevention Progress Management

Figure 36:
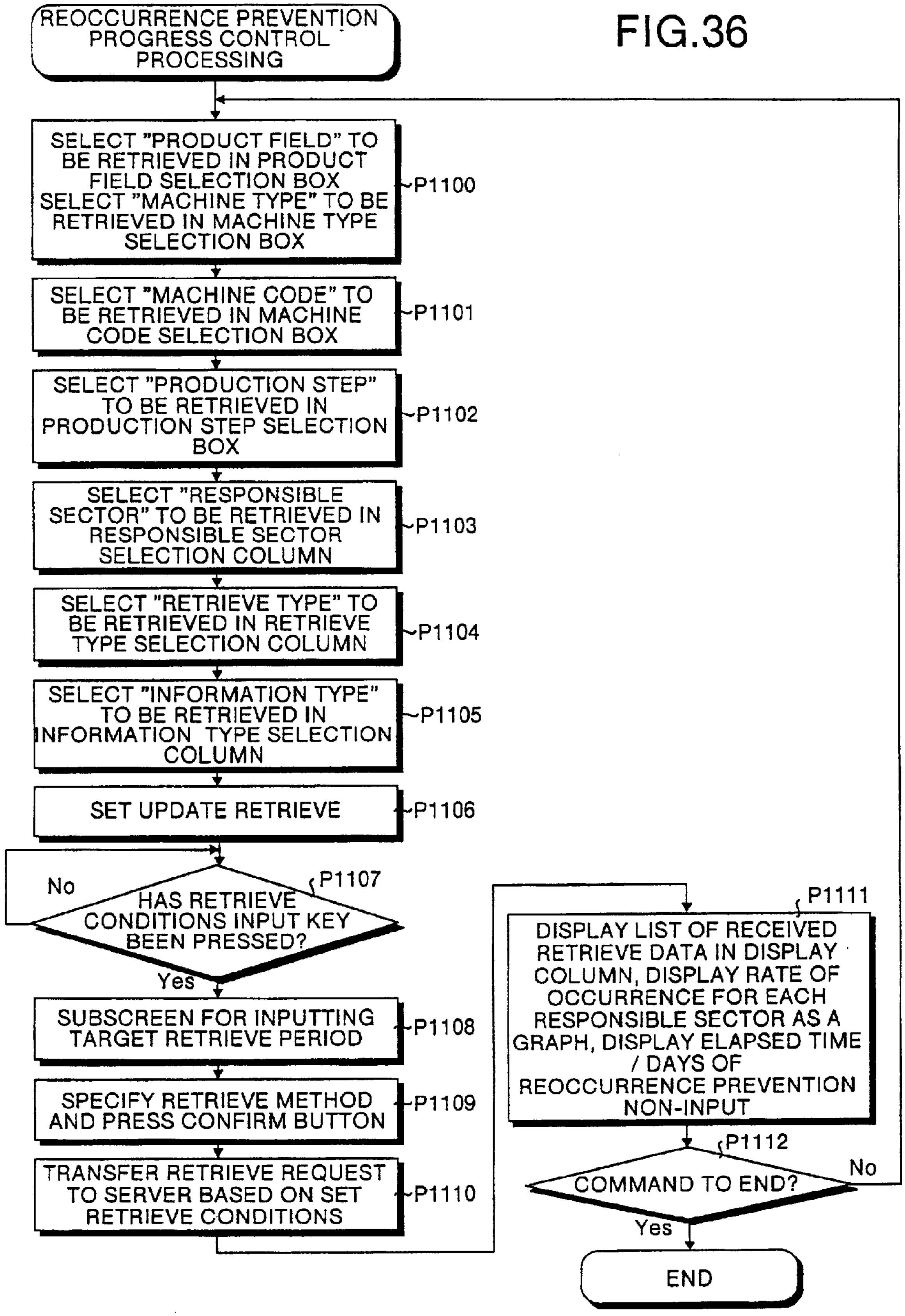
FIG. 36 is a flowchart showing a reoccurrence progress management process.
Figure 38:
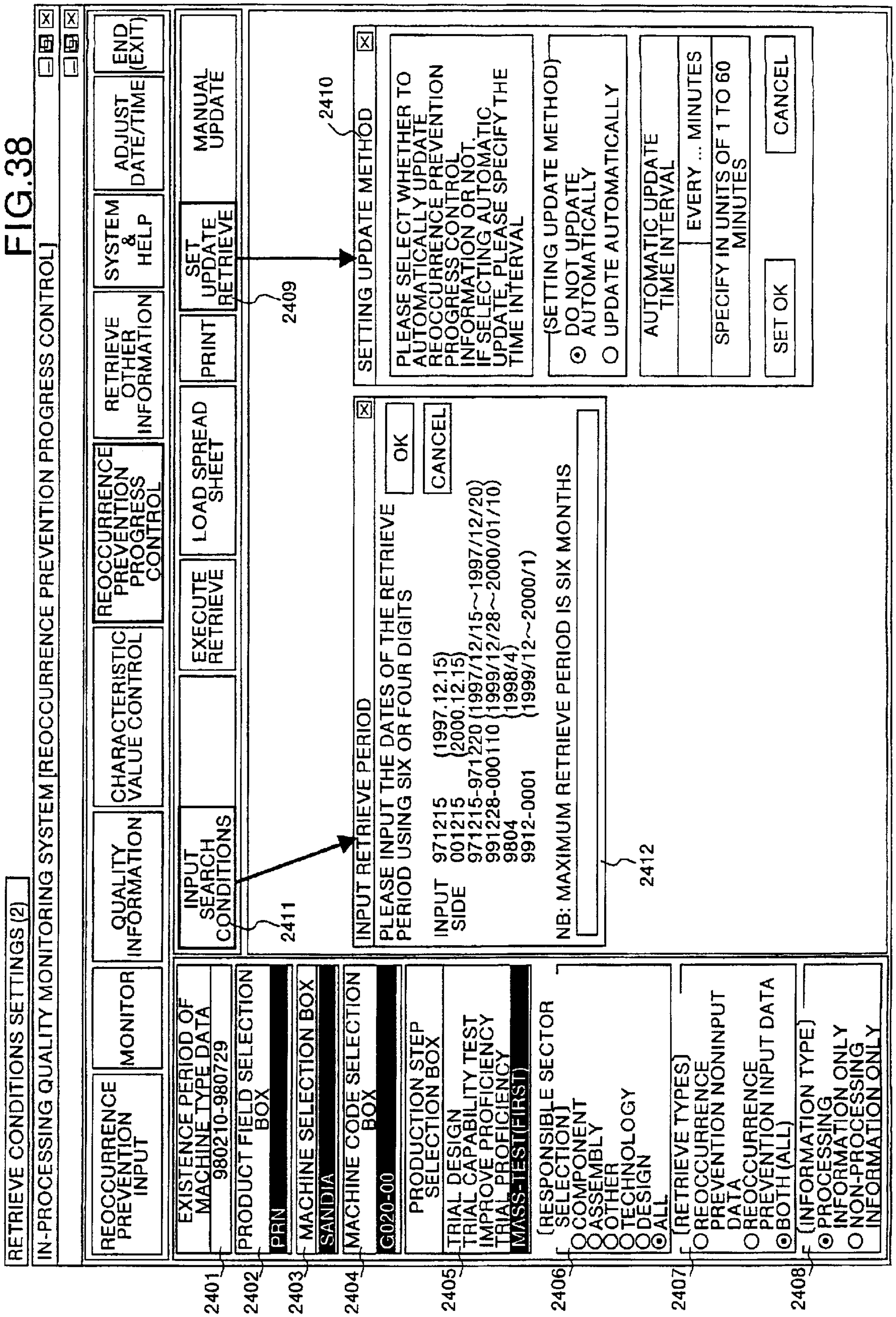
FIG. 38 is a diagram showing a display screen of the reoccurrence progress management process.
Figure 39:
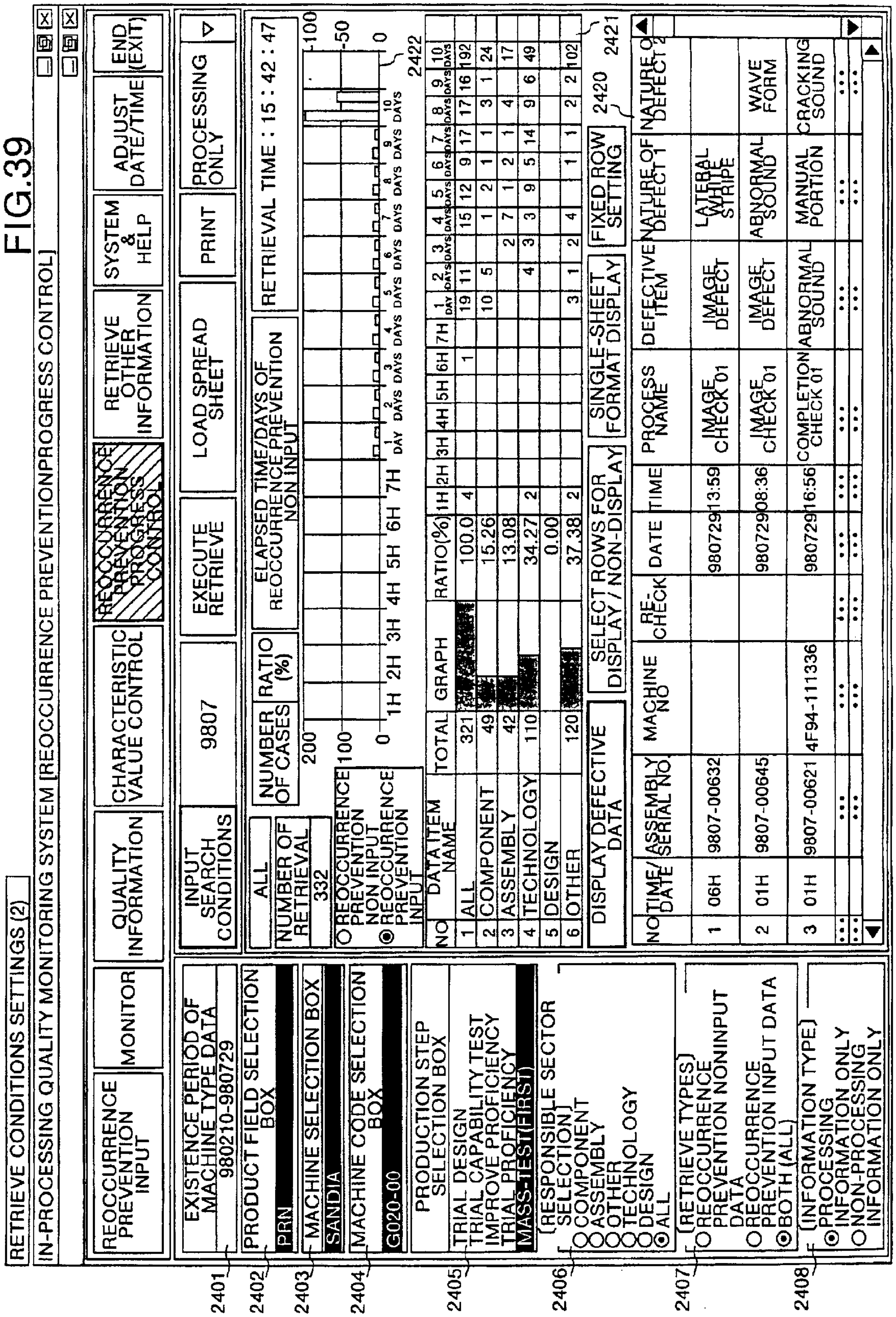
FIG. 39 is a diagram showing a display screen of the reoccurrence progress management process.

Reoccurrence prevention progress management will be explained based on the flowchart of FIG. 36 and with reference to FIG. 37 to FIG. 39. FIG. 36 is a flowchart showing reoccurrence prevention progress management processes, and FIG. 37 to FIG. 39 are diagrams showing screens displayed during the reoccurrence prevention progress management processes.

Figure 37:
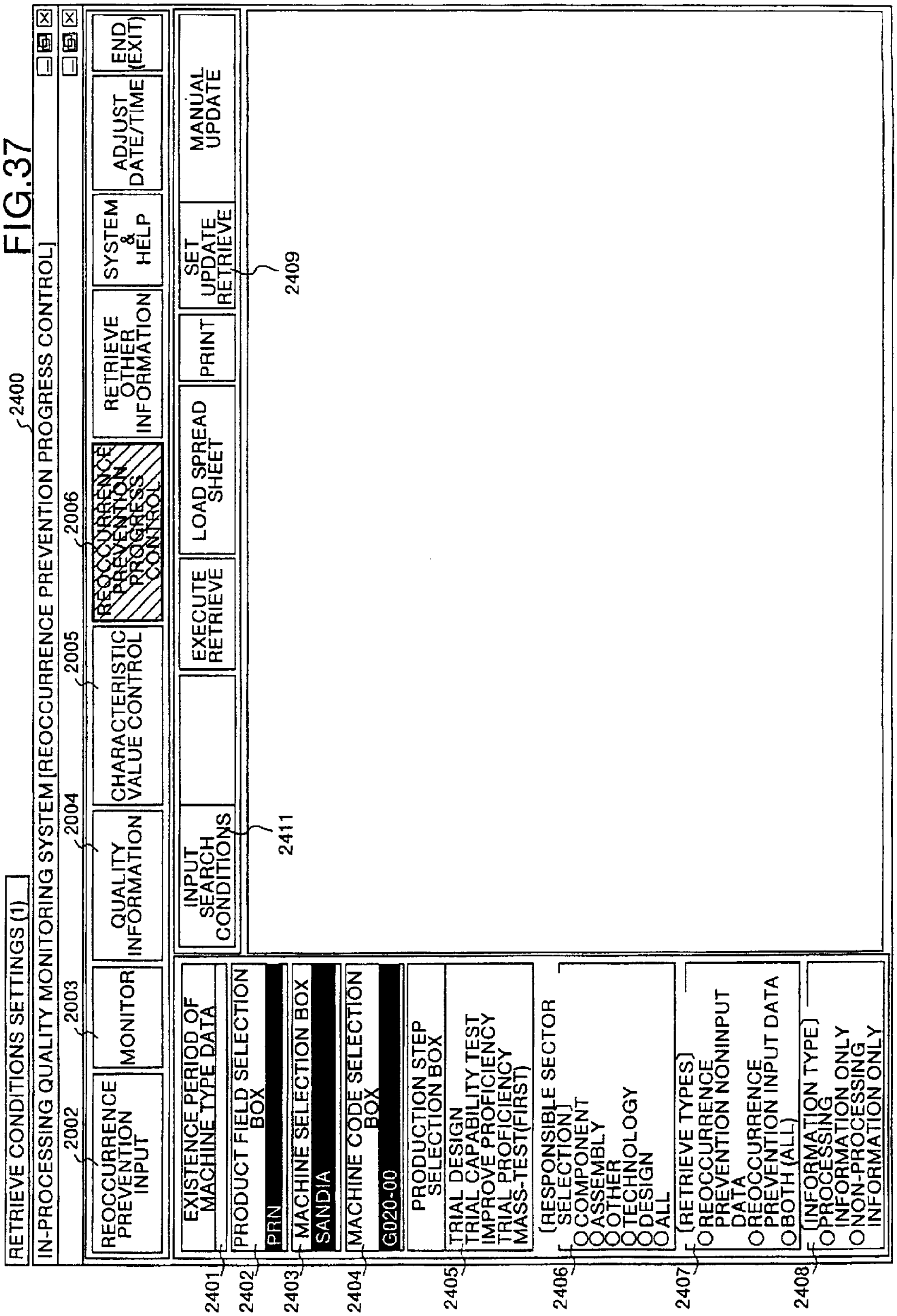
FIG. 37 is a diagram showing a display screen of the reoccurrence progress management process.

FIG. 37 shows an initial screen 2400 of the characteristic value management processing when the characteristic value management key 2006 has been selected. Reference numeral 2401 represents a key for displaying the data duration of a selected machine type. When the key 2401 is pressed, the data duration of the selected machine type is displayed. Reference numeral 2402 represents a product field selection box for selecting a "product field" for retrieval, reference numeral 2403 represents a machine type selection box for selecting the type of machine to be retrieved, reference numeral 2404 represents a machine code selection box for selecting the "machine code" to be retrieved, and reference numeral 2405 represents a production step selection box for selecting the "production step" to be retrieved.

Furthermore, reference numeral 2406 represents a responsible sector selection box for selecting the responsible sector to be retrieved. "Component", "technology", "assembly", "design", "other" and "all" can be selected from the responsible sector selection box 2406. Reference numeral 2407 represents a retrieval category selection box for selecting the "retrieval category" to be retrieved. One of "reoccurrence not-input data", "reoccurrence prevention input data", and "all" can be selected from the retrieval type selection box 2407. Reference numeral 2408 represents an information category selection box for selecting the "information category". Either of "in-processing information only" and "out-of-processing information only" can be selected from the information category selection box 2408.

Reference numeral 2409 represents an "update interval" setting key for setting the update retrieval time. When the "update interval" setting key 2409 has been selected, the subscreen 2410 of FIG. 38 is displayed. This subscreen 2410 is for selecting whether to automatically update retrieval of information, and for setting the intervals (in minutes) which the automatic updates are carried out at.

In the flowchart of FIG. 36, the controller selects the "product field" for retrieval in the product field selection box 2402 of the initial screen 2400 of FIG. 37 (step P1100). The controller selects the "machine type" to be retrieved in the machine type selection box 2403 (step P1100). The "machine code" is selected from the machine code selection box 2404 (step P1101) and the "production step" for retrieval is selected from the production step selection box 2405 (step P1102).

The "responsible sector" for the retrieval is selected in the responsible sector selection box 2406 (step P1103), the "retrieval category" is selected in the retrieval category selection box 2407 (step P1104), and the "information category" is selected in the information category selection box 2408 (step P1105). In addition, the update retrieval time is set (step P1106).

When the controller presses the retrieval conditions input key 2411 (step P1107), a subscreen 2412 for inputting the retrieval period is displayed as shown in FIG. 38 (step P1108). Then, when the controller specifies the retrieval method precisely and presses the confirm button (step P1109), a retrieval request based on the retrieval conditions set in the above-described steps P1100 to P1109 is sent to the server 300 (step P1110). The server 300 retrieves the data based on the retrieval conditions and transmits the retrieved data. As shown in FIG. 39, a list of the retrieved data is displayed in the retrieved data display box 2420, the occurrence ratio in each responsible sector is displayed in the responsible sector display box 2421, and the reoccurrence prevention non-input elapsed time/days is displayed (step P1111). The selected items of the data displayed in the responsible sector display box 2421 are displayed in a graph 2422. The operator can select which items to display in graph format.

FIG. 39 shows an example of data displayed in the responsible sector display box 2421 when "All" has been selected in the responsible sector selection box 2406. In the responsible sector display box 2421 shown in FIG. 39, "number of occurrences". "graphs", "ratio", relapsed time (before reoccurrence prevention: the time/days elapsed since the defect occurred; after reoccurrence prevention: the time/days elapsed from the occurrence of the defect to the reoccurrence prevention input) are displayed in correspondence with the responsible sectors (All, component, assembly, technology, design, other).

The processes of steps P1100 to P1111 are carried out until there is an end command (step P1112).

As described above, in the first embodiment, the clients 201 to 203 input data relating to assembly in each of the assembly steps 101 to 103. The clients 204 to 208 input data of the electrical check step 104, the image check step 105, the completion check step 106, the repair step 110, and the product check step 111. The server 300 stores the input data from the clients 201 to 208 in the database 708. The output system clients 501 to 503 specify retrieval conditions and send retrieval requests to the server 300. In response, the server 300 retrieves the data from the database 708 and transmits it to the clients 501 to 503. The clients 501 to 503 chronologically process and output (display or print) the received retrieved data based on a predetermined output target. Therefore, products which are manufactured on an assembly line can be managed effectively and rapidly. Furthermore, since the retrieved data are processed chronologically in accordance with a predetermined output target, the data can be managed in each time band.

In the first embodiment, the clients 501 to 503 output the chronologically processed data in a display and graph format by using monitoring and the like. Therefore, the manufacturing assembly line can be managed chronologically.

In the first embodiment, the clients 501 to 503 create quality information for individual quality results, processes, defective items and responsible sectors by using monitoring and the like. This makes it possible to determine quality information for individual quality results, processes, defective items and responsible sectors.

Moreover, in the first embodiment, when a created quality information has exceeded an action reference, the clients 501 to 503 send a warning to the responsible sector of the quality information, or to the assembly step relating to the quality information. Therefore, the relevant division can learn of problems and implement countermeasures speedily.

Figure 40:
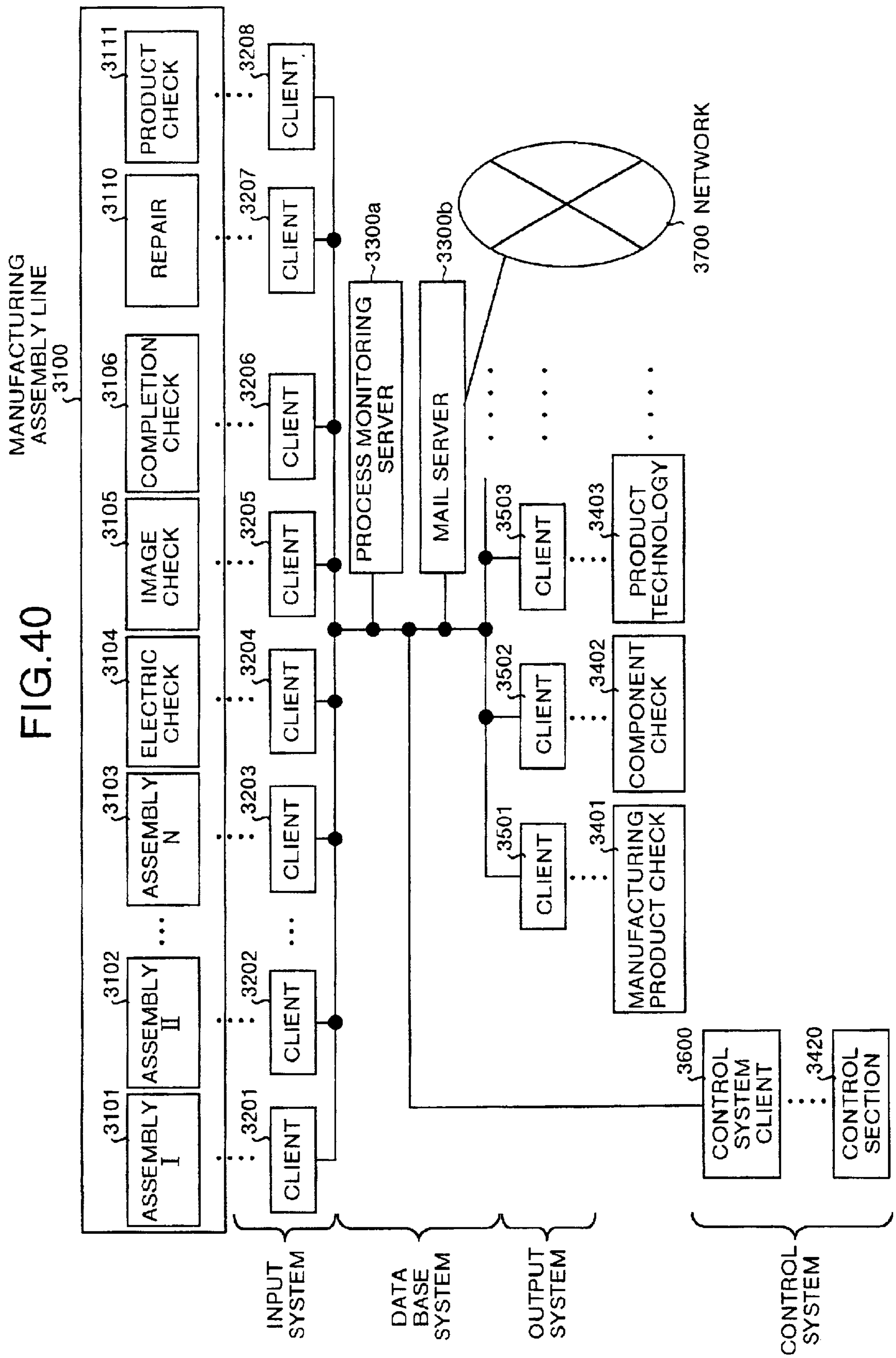
FIG. 40 is a diagram showing a schematic constitution of a production management system according to a second embodiment.

A second embodiment of the present invention will be explained with reference to FIG. 40 to FIG. 135 in the sequence "entire constitution of the production management system", "application constitution of the production management system", "constitution of input and output system clients", "step-monitoring server constitution", "constitution of management system client", "in-processing data input by input system client", "step-monitoring and alarm processing by output system client", and "transmission of alarm mail by management system client". The following explanation describes as an example a production management system of an assembly line which manufactures color copying machines. Entire Constitution of Production Management System FIG. 40 is a diagram showing a schematic constitution of the production management system according to the first embodiment. In FIG. 40, reference numeral 3100 represents a color copying machine manufacturing assembly line. The manufacturing assembly line 3100 comprises an assembly I step 3101, an assembly II step 3102, . . . , an assembly N step 3103, an electrical check step 3104, an image check step 3105, a completion check step 3106, a repair step 3110 and a product check step 3111.

Reference numerals 3201 to 3203 represent clients which input data of the assembly I step 3101, the assembly II step 3102, . . . . and the assembly N step 3103. An operator inputs data representing production and assembly contents for each component and unit to the clients 3201 to 3203. The clients 3201 to 3203 transfer the data to a server 3300 which is explained later.

Reference numerals 3204 to 3206 represent clients for inputting data of the electrical check step 3104, the image check step 3105, and the completion check step 3106. An operator inputs data representing checks, confirmed contents and results for products assembled in the assembly steps 3101 to 3103 to the clients 3204 to 3206. The clients 3204 to 3206 transfer the data to a server 3300 which is explained later.

Reference numeral 3207 represents a client for inputting data of the repair step 3110. The operator inputs data of the repair step 3110 to the client 3207. The client 3207 transfers the data to the server 3300 explained later.

Reference numeral 3208 represents a client of product check step 3111 which checks the data input in the steps from the assembly I step 3101 to the repair step 3110. The clients 3201 to 3208 constitute the input system. In the example described here, the manufacturing assembly line 3100 comprises a manufacturing assembly line for manufacturing color copying machines, but the present invention is not limited to this and can be applied in a manufacturing assembly line for components and units.

Reference numeral 3300*a* represents a step-monitoring server 3300*a* which manages the entire production management system. The step-monitoring server 3300*a* holds the data transmitted from the clients 3201 to 3208 in a database. In response to retrieval requests from clients 3501 to 3503 explained later, the server 3300*a* retrieves the data from the database and transmits it to the clients 3501 to 3503.

Reference numeral 3300*b* represents a mail server which transmits alarm mail. The mail server 3300*b* is connected to the production management system and to an outside network 3700. The mail server 3300*b* transmits an alarm mail sent from a management system client 3600 to a specified destination (a terminal within the production management system or a terminal connected to the outside network 3700). The step-monitoring server 3300*a* and the mail server 3300*b* constitute a database system.

Reference numeral 3401 represents a manufacturing and production check section, reference numeral 3402 represents a component check section, and reference numeral 3403 represents a manufacturing technical section. Reference numerals 3501 to 3503 represent clients of the manufacturing and production check section 3401, the component check section 3402, and the manufacturing technical section 3403. The clients 3501 to 3503 output retrieval requests to the server 3300 based on predetermined retrieval conditions, and process the retrieved data which the server 3300 sends in response to the requests. The clients 3501 to 3503 constitute an output system.

Reference numeral 3420 represents a monitoring section, and reference numeral 3600 represents a management system client which is provided in the monitoring section. The management system client 3600 transmits an alarm mail to a predetermined destination when defective data of an assembled product and the like, which is stored in the database of the step-monitoring server 3300*a*, has exceeded a reference value. The management system client 3600 constitutes a management system.

Figure 41:
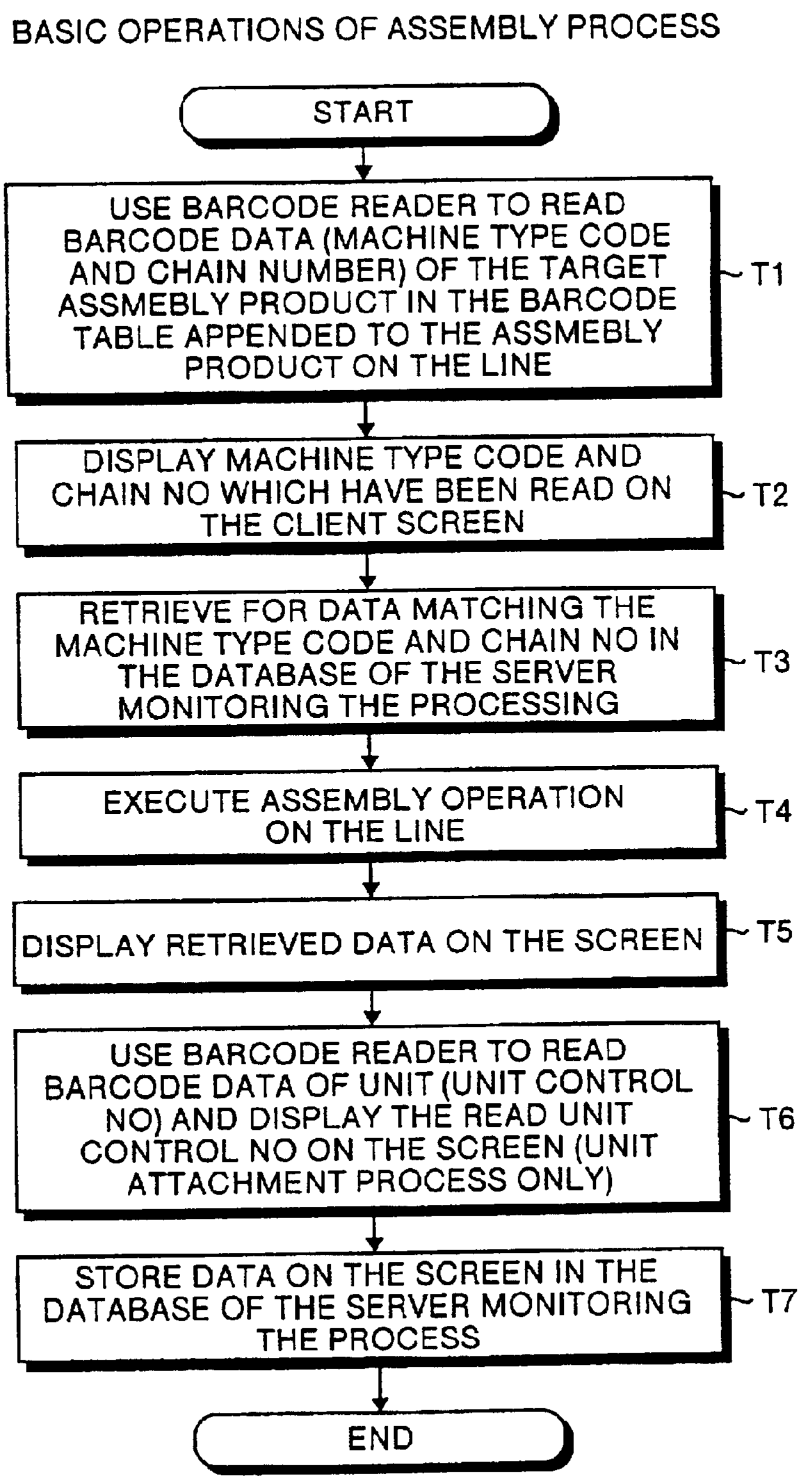
FIG. 41 is a flowchart showing the basic operation of an input system (assembly step)

Subsequently, the basic operation of the assembly steps 3101 to 3103 will be explained with reference to the flowchart of FIG. 41. FIG. 41 is a flowchart showing the basic operation of the assembly steps 3101 to 3103. In FIG. 41, the operators of the assembly steps 3101 to 3103 extract the barcode data (machine type code and installation serial number) of the assembly product in the barcode table which is appended to the assembly product on the line via the input system clients 3201 to 3203 (step T1). The extracted machine type code and installation serial number are displayed on the screens of the input system clients 3201 to 3203 (step T2). Then, data (unit data, check table data, defect data, etc.) which matches the data of the machine type code and installation serial number is retrieved from the database of the step-monitoring server 3300*a* (step T3). The operators of the assembly steps 3101 to 3103 execute assembly on the line while the data of the step-monitoring server 3300*a* is being retrieved (step T4). After the data has been retrieved from the database of the step-monitoring server 3300*a*, the retrieved data is displayed on the screens of the input system clients 3201 to 3203 (step T5). The operator inputs the necessary data on the screen. When there is a unit attachment step, the barcode data (unit management no.) is read by using a barcode reader and displayed on the screen (step T6). The operator inputs the necessary data on the screen. In accordance with a storage command from the operator, the data on the screen is stored in the database of the step-monitoring server 3300*a* (step T7).

Figure 42:
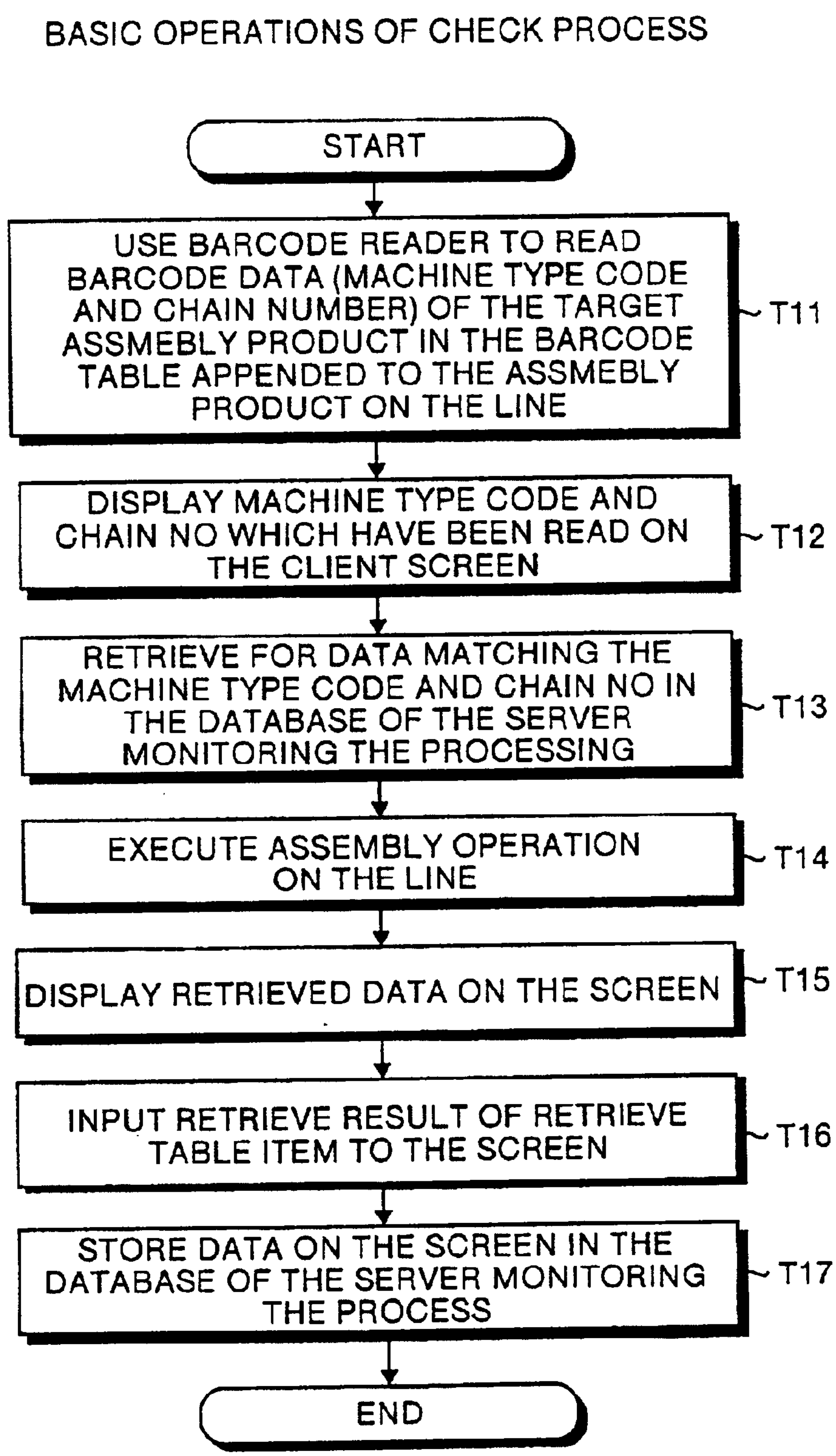
FIG. 42 is a flowchart showing the basic operation of an input system (assembly step)

Subsequently, the basic operation of the check steps 3104 to 3106 will be explained with reference to the flowchart of FIG. 42. FIG. 42 is a flowchart showing the basic operation of the check steps 3104 to 3106. In FIG. 42, the operators (checkers) of the check steps 3104 to 3106 extract the barcode data (machine type code and installation serial number) of the assembly product in the barcode table which is appended to the assembly product on the line via the input system clients 3204 to 3206 (step T11). The extracted machine type code and installation serial number are displayed on the screens of the input system clients 3204 to 3206 (step T12). Then, data (unit data, check table data, defect data, etc.) which matches the data of the machine type code and installation serial number is retrieved from the database of the step-monitoring server 3300*a* (step T13). The operators of the assembly steps 3101 to 3103 execute the check on the line while the data of the step-monitoring server 3300*a* is being retrieved (step T14). After the data has been retrieved from the database of the step-monitoring server 3300*a*, the retrieved data is displayed on the screens of the input system clients 3204 to 3206 (step T15). The operators input the retrieval results of the check table items onto the screen (step T16). In accordance with a storage command from the checker, the data on the screen is stored in the database of the step-monitoring server 3300*a* (step T17).

In this example, barcode data (machine type code and installation serial number) is read from a barcode table, but the barcode may be read from a barcode which is pasted onto the assembly product.

Figure 43:
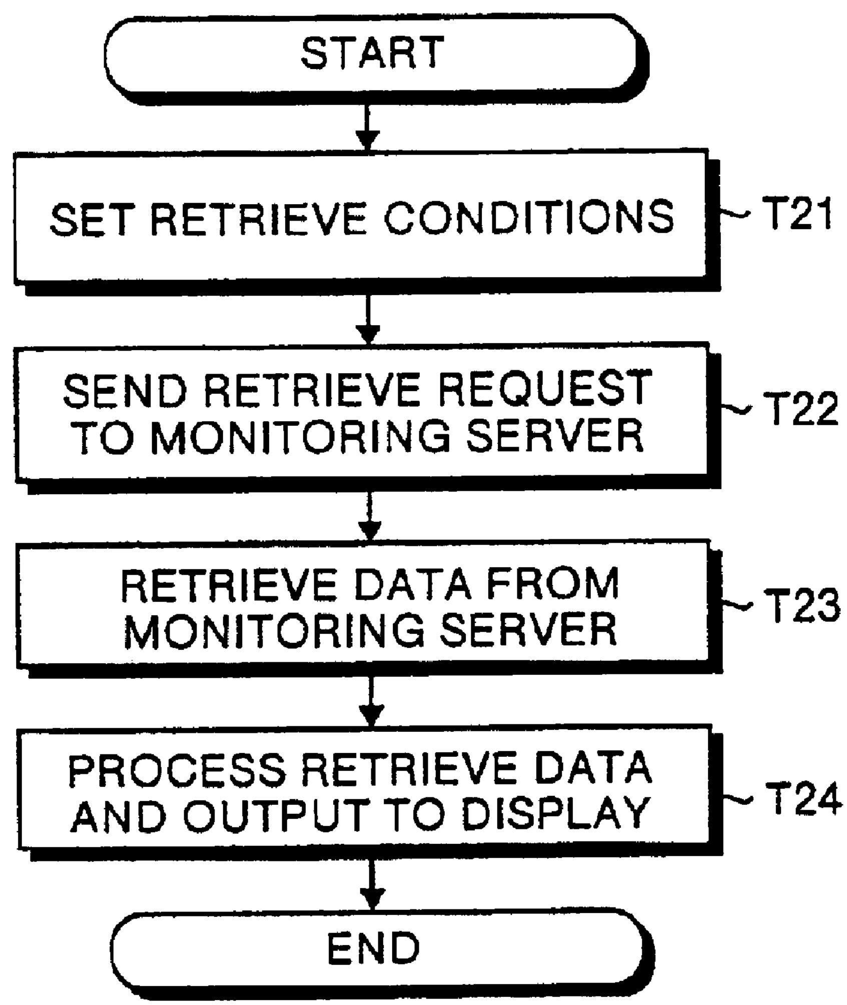
FIG. 43 is a flowchart showing the basic operation of an output system.

Subsequently, the basic operations of the manufacturing and production check section 3401, the component check section 3402, and the manufacturing technical section 3403 will be explained with reference to the flowchart of FIG. 43. FIG. 43 is a flowchart showing basic operations of the manufacturing and production check section 3401, the component check section 3402, and the manufacturing technical section 3403.

In FIG. 43, the supervisors of the manufacturing and production check section 3401, the component check section 3402, and the manufacturing technical section 3403 set retrieval conditions for retrieving data stored in the database of the step-monitoring server 3300*a* in order to learn the state of the product of the production management system on that particular day, and in daily and monthly units (step T21). The retrieval requests are transmitted to the step-monitoring server 3300*a* (step T22), and the step-monitoring server 3300*a* retrieves and transmits data which matches the retrieval conditions (step T23). The retrieved data is process chronologically and displayed on the screens of the output system clients 3501 to 3503 (step T24).

Figure 44:
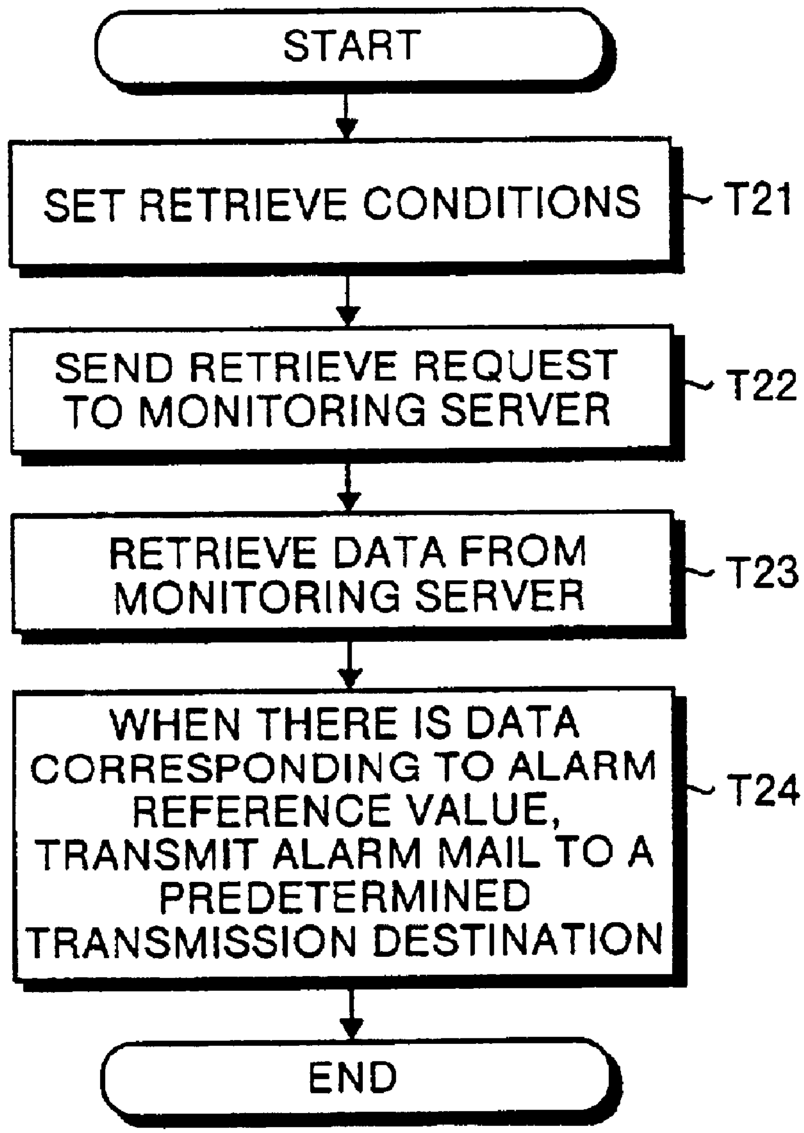
FIG. 44 is a flowchart showing the basic operation of a management system.

Subsequently, the basic operation of the monitoring section 3420 will be explained with reference to the flowchart of FIG. 44. FIG. 44 is a flowchart showing basic operation of the monitoring section 3420. In FIG. 44, the controller of the monitoring section 3420 sets retrieval conditions by using the management system client 3600 for retrieving data stored in the database of the step-monitoring server 3300*a* in order to learn whether there are any problems with the manufacture of the product and the like (step T31). The retrieval requests are transmitted to the step-monitoring server 3300*a* (step T32), and the step-monitoring server 3300*a* retrieves and transmits data which matches the retrieval conditions (step T33). When the retrieved data contains data which is disqualified by the alarm reference, an alarm mail is transmitted as notification that a problem has arisen at the stored destination (step T34).

Constitution of Input System and Output System Clients

Figure 45:
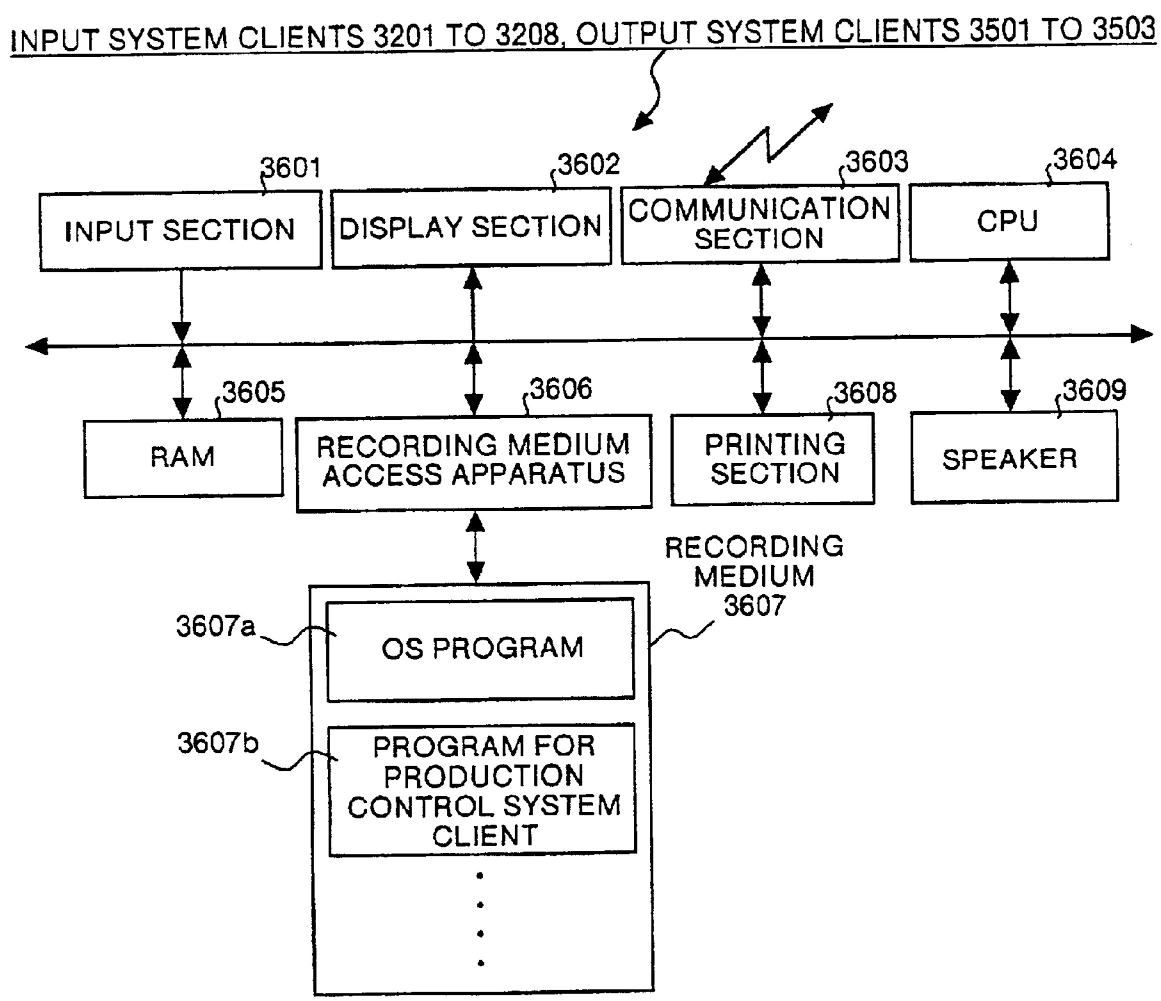
FIG. 45 is a block diagram showing the schematic constitution of the input system and output system clients of FIG. 40.

FIG. 45 is a block diagram showing the schematic constitution of the input system clients 3201 to 3208 and the output system clients 3501 to 3503 shown in FIG. 40. The input system clients 3201 to 3208 and the output system clients 3501 to 3503 have identical constitutions. As shown in FIG. 45, the input system clients 3201 to 3208 and the output system clients 3501 to 3503 comprise an input section 3601 for inputting data, a display section 3602, a communications section 3603 which performs data communications, a CPU 3604 which controls the entire apparatus, a RAM 3605 which is used as the work area of the CPU 3604, a recording medium access apparatus 3606 which reads and writes data to and from a recording medium 3607, the recording medium 3607 which stores programs and the like for operating the CPU 3604, a printing section 3608, and a speaker 3609.

The input section 3601 comprises a keyboard having a cursor key, a number input key, various types of function keys and the like, a mouse, a barcode reader, and the like. The operator supplies a control command to the CPU 3604 and inputs data by using the input section 3601 as a user interface.

The display section 3602 comprises a CRT, an LCD or the like, and displays data in accordance with display data input from the CPU 3604. The communications section 3603 connects to a network and exchanges data communications with the server 3300 and other clients via this network.

The CPU 3604 is a central processing unit which controls the entire apparatus in compliance with the programs stored in the recording medium 3607. The CPU 3604 is connected to the input section 3601, the display section 3602, the communications section 3603, the RAM 3605, the recording medium access apparatus 3606, the printing section 3608, and the speaker 3609. The CPU 3604 controls data communications, reading of application programs by accessing the memory, reading and writing various types of data, inputting data and commands, displaying, and the like.

The RAM 3605 comprises a work memory which stored specified programs, input commands, input data, processing results and the like, and a display memory which temporarily stores display data displayed on a display screen of the display section 3602.

The recording medium 3607 stores various types of programs and data such as an OS program 3607*a* which can be executed by the CPU 3604 (e.g. WINDOWS 95 and WINDOWS NT) and application programs. Application programs include, for example, a program for production management system input 3607*b*. The recording medium comprises, for example, an optical, magnetic or electrical recording medium such as a floppy disk, a hard disk, a CD-ROM, a DVD-ROM, an MO, and a PC card. The various types of programs are stored in the recording medium 3607 in a data format which the CPU 3604 can read. The various types of programs is sometimes stored beforehand in the recording medium or downloaded via a communications line and then stored in the recording medium. The various programs can be transmitted by communications lines.

The printing section 3608 for example comprises a laser printer which prints data displayed on the display section 3602 onto paper in compliance with the CPU 3604. The speaker 3609 emits the sound of the alarm and the like in compliance with the CPU 3604.

The input system clients 3201 to 3208 download the in-processing input program 3707*c* (see FIG. 46) from the step-monitoring server 3300*a*, and the CPU 3604 inputs in-processing data described later in compliance with the in-processing input program 3707*c*.

The output system clients 3501 to 3503 download the step-monitoring/alarm program 3707*d* (see FIG. 46) from the step-monitoring server 3300*a*, and the CPU 3604 executes step-monitoring/alarm processing in compliance with the step-monitoring/alarm program 3707*d*.

The output system clients 3501 to 3503 download the step-monitoring quality program 3707*e* from the step-monitoring server 3300*a*, and the CPU 3604 executes step-monitoring quality processing in compliance with the step-monitoring quality program 3707*f*.

The output system clients 3501 to 3503 download the daily/monthly program 3707*f* (see FIG. 46) from the step-monitoring server 3300*a*, and the CPU 3604 executes daily/monthly processing in compliance with the daily/monthly program 3707*g*.

The output system clients 3501 to 3503 download a free retrieval program 3707*g* (see FIG. 46) from the step-monitoring server 3300*a*, and the CPU 3604 executes free retrieval in compliance with the free retrieval program 3707*g*. In this way, since programs are downloaded from the step-monitoring server, 3300*a* they need not be installed to the clients each time the programs are altered. Consequently, altered programs can be rapidly used in the production management system.

Constitution of Step-Monitoring Server

Figure 46:
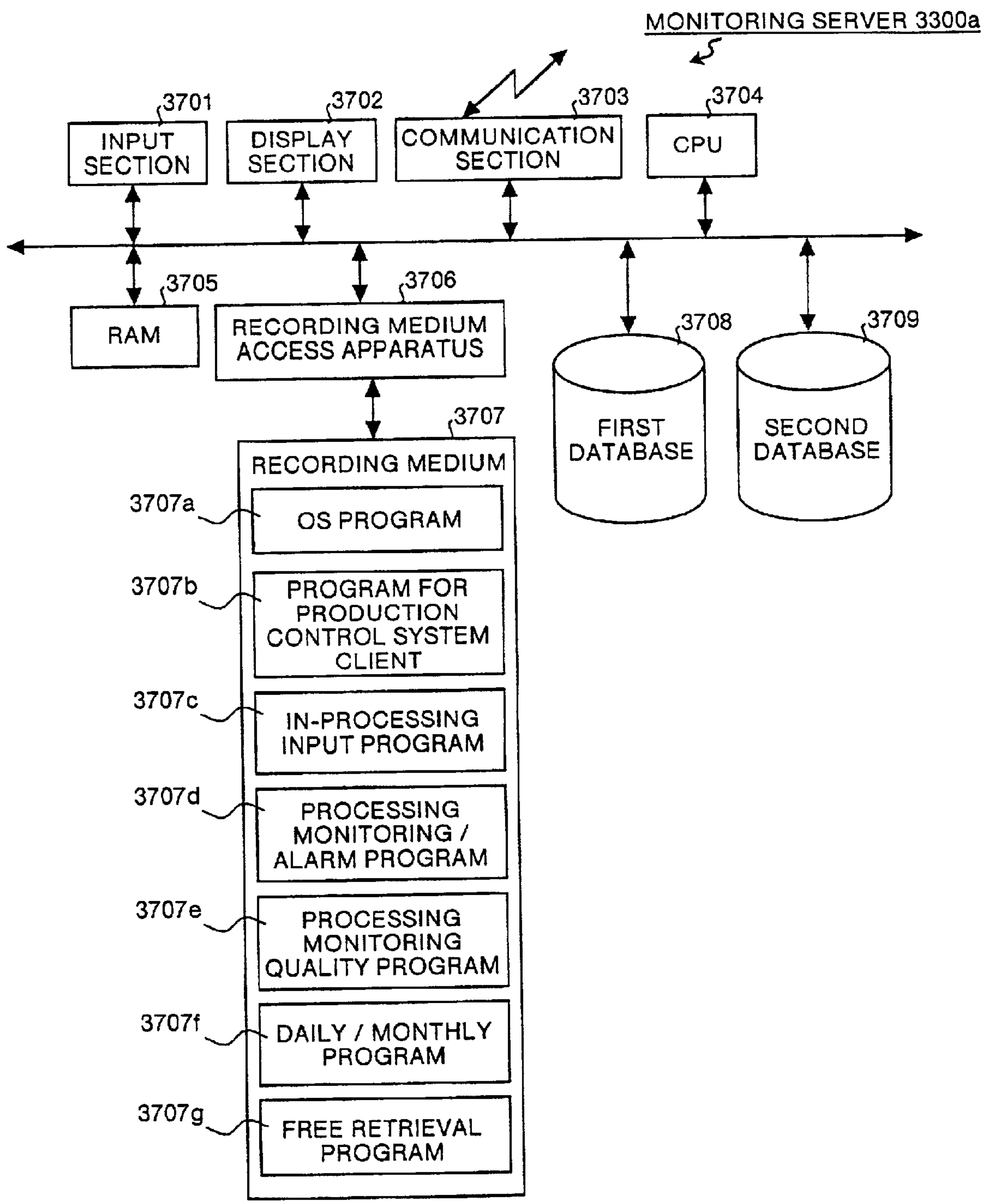
FIG. 46 is a block diagram showing the schematic constitution of the step-monitoring server of FIG. 40.

FIG. 46 is a block diagram showing the schematic constitution of the step-monitoring server 3300*a* shown in FIG. 40. As shown in FIG. 46, the step-monitoring server 3300*a* comprises an input section 3701 for inputting data, a display section 3702, a communications section 3703 which performs data communications, a CPU 3704 which manages the entire production management system and controls the entire apparatus, a RAM 3705 which is used as the work area of the CPU 3704, a recording medium access apparatus 3706 which reads and writes data to/from a recording medium 3707, a recording medium 3707 which stores programs and the like for operating the CPU 3704, a first database 3708 for storing various types of master tables, and a second database 3709 for storing various types of master tables.

The input section 3701 comprises a keyboard having a cursor key, a number input key, various types of function keys and the like, a mouse, a barcode reader, and the like. The operator supplies a control command to the CPU 3704 and inputs data by using the input section 3701 as a user interface.

The display section 3702 comprises a CRT, an LCD or the like, and displays data in accordance with display data input from the CPU 3704. The communications section 3703 connects to a network and exchanges data communications via the network with the input system clients 3201 to 3208 and the output system clients 3501 to 3503.

The CPU 3704 is a central processing unit which controls the entire apparatus in compliance with the programs stored in the recording medium 3707. The CPU 3704 is connected to the input section 3701, the display section 3702, the communications section 3703, the RAM 3705, the recording medium access apparatus 3706, and the database 3708. The CPU 3704 controls data communications, reading of application programs by accessing the memory, reading and writing various types of data, inputting data and commands, displaying, and the like.

The RAM 3705 comprises a work memory which stored specified programs, input commands, input data, processing results and the like, and a display memory which temporarily stores display data displayed on a display screen of the display section 3702.

The above-mentioned recording medium 3707 stores various types of programs and data such as an OS program 3707*a* which can be executed by the CPU 3704 (e.g. WINDOWS NT Server V4.0) and application programs. Application programs include, for example, the program for production management system server 3707*b*, the program for in-processing input 3707*c*, the, step-monitoring/alarm program 3707*d*, the step-monitoring quality program 3707*e*, the daily/monthly program 3707*f*, the free retrieval program 3707*g*, and the like. The recording medium comprises, for example, an optical, magnetic or electrical recording medium such as a floppy disk, a hard disk, a CD-ROM, a DVD-ROM, an MO, and a PC card. The various types of programs are stored in the recording medium 3707 in a data format which the CPU 3704 can read. The various types of programs may be stored beforehand in the recording medium 3707 or downloaded via a communications line and stored in the recording medium 3707. The programs stored in the recording medium 3707 can be transmitted via a communications line.

FIG. 47 shows one example of a format of the first database 3708 of FIG. 46. As shown in FIG. 47, a variety of master tables are stored in the first database 3708. As shown in FIG. 47, the master tables comprise machine type code name master table 3708*a*, factory name master table 3708*b*, product field master table 3708*s*, production step master table 3708*d*, Line No. master table 3708*e*, Lank master table 3708*f*, input supervisor master table 3708*g*, responsible sector master table 3708*h*, repair contents master table 3708*i*, unit check item master table 3708*j*, repair supervisor master table 3708*k*, in-processing check item master table 37081, supervisor countermeasure master table 3708*m*, individual step settings master table 3708*n*, alarm receiver master table 3708*o*, check table item master table 3708*p*, unit name master table 3708*q*, name of machine type master table 3708*r*, alarm management master table 3708*s*, alarm value master table 3708*t*, defect content master table 3708*u*, and unit check table item master table 3708*v*.

Figure 48:
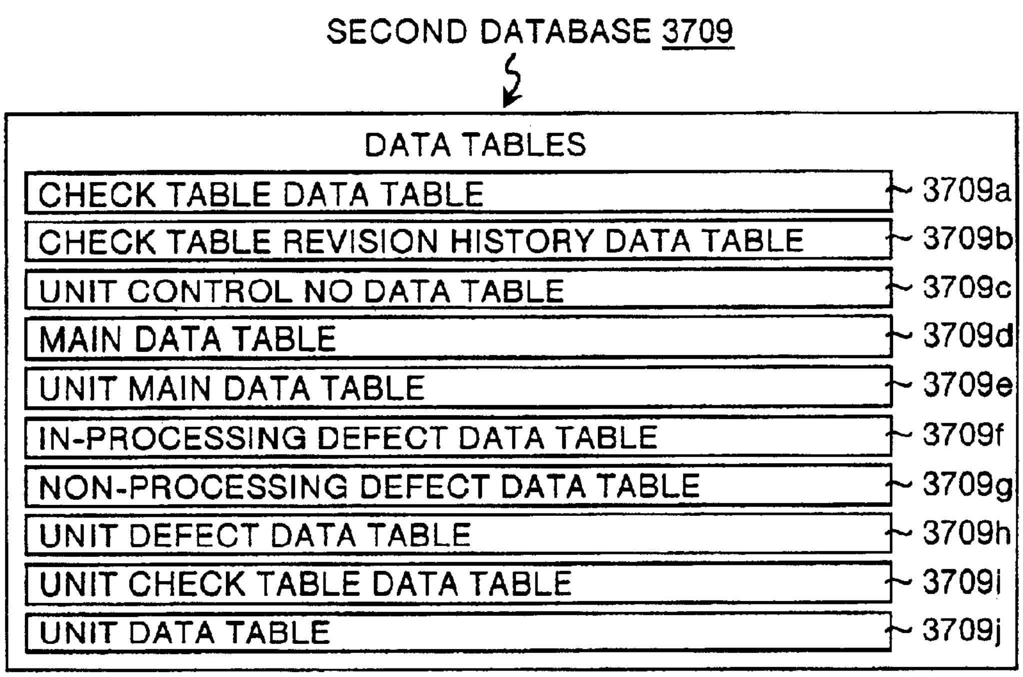
FIG. 48 is a diagram showing a master table stored in a second database of FIG. 46.

FIG. 48 shows one example of a format of the second database 3709 of FIG. 46. As shown in FIG. 48, a variety of data tables are stored in the second database 3709. As shown in FIG. 48, the data tables comprise check table data table 3709*a*, check table revision history data table 3709*b*, unit management No. data table 3709*c*, main data table 3709*d*, unit main data table 3709*e*, in-processing defect data table 3709*f*, out-of-processing defect data table 3709*g*, unit defect data table 3709*h*, unit check table data table 3709*i*, and unit data table 3709*k*.

FIG. 49 to FIG. 70 show examples of data formats of the master tables 3708*a* to 3708*v*. In these diagrams, the symbol "*" is appended to items which are used as retrieval keys.

FIG. 49 is a diagram showing an example of the format of the machine type code name master table 3708*a*. As shown in FIG. 49, the machine type code name master table 3708*a* stores data comprising "No.", "Machine type code", "Machine type abbreviated name", "Product name", "Voltage display", and "Machine type Code". A machine type code name master table 3708*a* is provided for each type of machine.

FIG. 50 is a diagram showing an example of the format of the factory name master table 3708*b*. As shown in FIG. 50, the factory name master table 3708*b* stores data comprising "No., "factory name", and "abbreviation".

FIG. 51 is a diagram showing an example of the format of the product field master table 3708*c*. As shown in FIG. 51, the product field master table 3708*c* stores "product field" data.

FIG. 52 is a diagram showing an example of the format of the production step master table 3708*d*. As shown in FIG. 52, the production step master table 3708*d* stores "No." and "production step" data.

FIG. 53 is a diagram showing an example of the format of the line No. master table 3708*e*. As shown in FIG. 53, the line No. master table 3708*e* stores "Line No." data.

FIG. 54 is a diagram showing an example of the format of a Lank master table 3708*f*. As shown in FIG. 54, the Lank master table 3708*f* stores "Lank" data (review request and handling of information).

FIG. 55 is a diagram showing an example of the format of the input supervisor master table 3708*g*. As shown in FIG. 55, the input supervisor master table 3708*g* stores data comprising "employee No.", "Name" and "Password".

FIG. 56 is a diagram showing an example of the format of the responsible sector master table 3708*h*. As shown in FIG. 56, the responsible sector master table 3708*h* stores data comprising "No.", "Responsible sector 1", "Responsible sector 2" and " Responsible sector 3".

FIG. 57 is a diagram showing an example of the format of the repair contents master table 3708*i*. As shown in FIG. 57, the repair contents master table 3708*i* stores data comprising "No.", "Repair contents 1", "Repair contents", and "Repair 3".

FIG. 58 is a diagram showing an example of the format of the unit check table supervisor master table 3708*j*. As shown in FIG. 58, the unit check table supervisor master table 3708J stores data comprising "No." and "name of supervisor".

FIG. 59 is a diagram showing an example of the format of the repair supervisor master table 3708*k*. As shown in FIG. 59, the repair supervisor master table 3708*k* stores the "name of supervisor" of the repair supervisor.

FIG. 60 is a diagram showing an example of the format of the in-processing check supervisor master table 37081. As shown in FIG. 60, the in-processing check supervisor master table 37081 stores the "name of supervisor" of the in-processing check supervisor.

FIG. 61 is a diagram showing an example of the format of the countermeasure supervisor master table 3708*m*. As shown in FIG. 61, the countermeasure supervisor master table 3708*m* stores "No." and "name of supervisor".

FIG. 62 is a diagram showing an example of the format of the individual step operation settings master table 3708*n*. As shown in FIG. 62, the individual step operation settings master table 3708*n* stores data comprising "No.", "Name of step", "Display Process", "Checker", and "Tab Control".

FIG. 63 is a diagram showing an example of the format of the alarm receiver master table 3708*o*. As shown in FIG. 63, the alarm receiver master table 3708*o* stores data comprising "No.", "Responsible sector 1", "Responsible sector 2", "Responsible sector 3", "Notes_ID", and "Transmission category".

FIG. 64 is a diagram showing an example of the format of the check table item master table 3708*p*. As shown in FIG. 64, the check table item master table 3708*p* stores data comprising "Machine type code", "No.", "Name of step", "Check item", "Stipulation", and "Input type". A check table item master table 3703*p* is prepared for each machine type. Here, the an entry of "1" in the "Input type" represents "direct input", and "2" represents "pass/fail" input.

FIG. 65 is a diagram showing an example of the format of the unit name master table 3708*q*. As shown in FIG. 65, the unit name master table 3708*q* stores data comprising "No.", "Unit No.", "Unit symbol", "Unit name", "Unit sector", "Machine type code", "Unit machine type code", and "Existence of Unit check table". The unit name master table 3708*q* is prepared for each name of machine type.

FIG. 66 is a diagram showing an example of the format of the name of machine type master table 3708*r*. As shown in FIG. 66, the name of machine type master table 3708*r* stores data comprising "name of machine type", "Product field", "Production point", "Date when production started", "Server Name", "IP_Address", "DBName", "Head_NO_Flg" and "Mail Transmission".

FIG. 67 is a diagram showing an example of the format of the alarm management master table 3708*s*. As shown in FIG. 67, the alarm management master table 3708*s* stores data comprising "Management sector", "Organization", "Target Value", and "Alarm value".

FIG. 68 is a diagram showing an example of the format of the alarm value master table 3708*t*. As shown in FIG. 68, the alarm value master table 3708*t* stores data comprising "No.", "Management sector", "Defective sector". "Name of step", "Defective Item", "Defect content 1", "Defect content 2", "Defect content 3", "LineOut", "Something strange", "Lank", "Responsible sector 1", "Responsible sector 2", "Responsible sector 3", "Repair supervisor", "Reoccurrence Prevention Contents", "Countermeasure supervisor", "Alarm value", "Alarm result", "Alarm time", and "Date of Mail transmission".

FIG. 69 is a diagram showing an example of the format of the defect content master table 3708*u*. As shown in FIG. 69, the defect content master table 3708*u* stores data comprising "Name of machine type", "Name of step", "No.", "Defective item", "Defect content 1", "Defect content 2", and "Defect content 3".

FIG. 70 is a diagram showing an example of the format of the unit check table item master table 3708*v*. As shown in FIG. 70, the unit check table item master table 3708*v* stores data comprising "Unit symbol", "Unit sector", "No.", "Classification", "Check item", "Stipulation", and "Check method". The unit check table item master table 3708*v* is prepared for each name of machine type.

Subsequently, FIG. 71 to FIG. 79 show examples of data formats of the data tables 3709*a* to 3709*j*. In these diagrams, the symbol "*" is appended to items which are used as retrieval keys.

FIG. 71 is a diagram showing an example of the format of the check table data table 3709*a*. As shown in FIG. 71, the check table data table 3709*a* stores data (check table data) comprising "Installation serial number", "Machine Type Code", "Check Table Link", "No.", "Production step", "Name of step", "Check item", "Stipulation", "Determination_complete", "Redetection Mark" and "Input Type". Here, an entry of "1" in the "Input type" represents "direct input", and "2" represents "pass/fail" input. The data (raw data) from the input system clients 3201 to 3208 is sequentially added to the check table data table 3709*a*. The check table data table 3709*a* is prepared for each name of machine type.

FIG. 72 is a diagram showing an example of the format of the check table revision history data table 3709*b*. As shown in FIG. 72, the check table revision history data table 3709*b* stores data comprising "Machine type code", "No.", "Item", "Contents", "Date of creation", "Date of editing", and "Approved".

FIG. 73 is a diagram showing an example of the format of the unit management No. data table 3709*c*. As shown in FIG. 73, the unit management No. data table 3709*c* stores data comprising "Installation serial number", Machine type code", "Unit No.", "Unit symbol", "Unit sector", "Production step", "Unit Name", and "Unit management No.". The unit management No. data table 3709*c* is prepared for each name of machine type.

FIG. 74 is a diagram showing an example of the format of the main data table 3709*d*. As shown in FIG. 74, the main data table 3709*d* stores data (quality data) comprising "Factory name", "Product field", "Name of machine type", "Production step", "Line No.", "Machine type code", "Installation serial number", "Machine number", "Installation start date", "Installation start time", "Completion date", "Completion time", LineoutFlg", "Process input hold Flg", "Manufacturing check input hold Flg", "Manufacturing check Sample Flg", "Market generation flg", "Input date", "Number of defects", "Number of something stranges", "Number of non-reoccurrences", "Number of redetections", "Number of information handlings", "Special stipulations", and "Date of Latest update". The main data table 3709*d* is prepared for each machine type. In the main data table 3709*d*, the data totalled by the input system clients 3201 to 3208 is written as a key over the machine type code and Installation serial number.

FIG. 75 is a diagram showing an example of the format of the in-processing defect table 3709*f*. As shown in FIG. 75, the in-processing defect table 3709*f* stores data (quality data) comprising "Factory name", "Product field", "Name of machine type", Production step", "Line No.", "Machine type code", "Installation serial number", "Machine number", "defect serial number", "Machine number", "Defective sector", "Number of reoccurrences", "Date of Occurrence", "Time of Occurrence", "Name of step", "Defective Item", "Defect content 1", "Defect content 2", "Defect content 3", "Lineout", "Lank", "Something strange", "Responsible sector 1", "Responsible sector 2", "Responsible sector 3", "Non-reoccurrence", "Cause of defect", "Repair contents 1", "Repair contents 2", "Repair contents 3", "Repair Date", "Repair time", "Repair supervisor", "Reoccurrence prevention Contents", "Date of Countermeasure", "Time of Countermeasure", Countermeasure supervisor", "Date of Latest update", and "Mail transmission flag". Here, an entry of "1" in the "Input type" represents "direct input", and "2" represents "pass/fail" input. The data (raw data) from the input system clients 3201 to 3208 is sequentially added to the in-processing defect table 3709*f*. The in-processing defect table 3709*f* is prepared for each name of machine type.

FIG. 76 is a diagram showing an example of the format of the out-of-processing table 3709*g*. As shown in FIG. 76, the out-of-processing table 3709*g* stores data comprising "factory name", "Product field", "Name of machine type", "Production step", "Management No.", "Defect serial number", "Number of reoccurrences", "Date of Occurrence", "Time of Occurrence", "Unit name", "Defective Item", "Defect content 1", "Defect content 2", "Defect content 3", "Lineout", "Something strange", "Lank", "Responsible sector 1", "Responsible sector 2", "Responsible sector 3", "Non-reoccurrence", "Cause of defect", "Repair contents 1", "Repair contents 2", "Repair Date", "Repair time", "Repair supervisor", "Reoccurrence prevention Contents", "Date of Countermeasure", "Time of Countermeasure", "Countermeasure supervisor", and "Date of Latest update."The out-of-processing defect data table 3709*g* is prepared for each name of machine type.

FIG. 77 is a diagram showing an example of the format of the unit main data table 3709*h*. As shown in FIG. 77, the unit main data table 3709*h* stores data comprising "Factory name", "Product field", "Name of machine type", "Production step", "Unit symbol", "Unit sector", "Unit management number", "Unit name", "Installation start date", "Installation start time", "Completion date", "Completion time", "Input date", "Number of defects", "Number of something stranges", "Number of reoccurrences", "Number of redetections", and "Date of latest update". The unit main data table 3709*h* is prepared for each name of machine type.

FIG. 78 is a diagram showing an example of the format of the unit check table data table 3709*i*. As shown in FIG. 78, the unit check table data table 3709*i* stores data comprising "Unit management number", "Unit symbol", "Unit sector", "Production step", "No.", "Classification", "Check item", "Stipulation", "Check method", "Determination", and "Redetection mark". The unit check table data table 3709*i* is prepared for each name of machine type.

FIG. 79 is a diagram showing an example of the format of the unit data table 3709J. As shown in FIG. 79, the unit data table 3709*j* stores data comprising "Unit management number", "Unit symbol", "Unit sector", "Production step", "Unit name", "Check date", "Check time", "Redetection mark", and "Pass mark. The unit data table 3709 is prepared for each name of machine type.

Constitution of Management System Client

Figure 80:
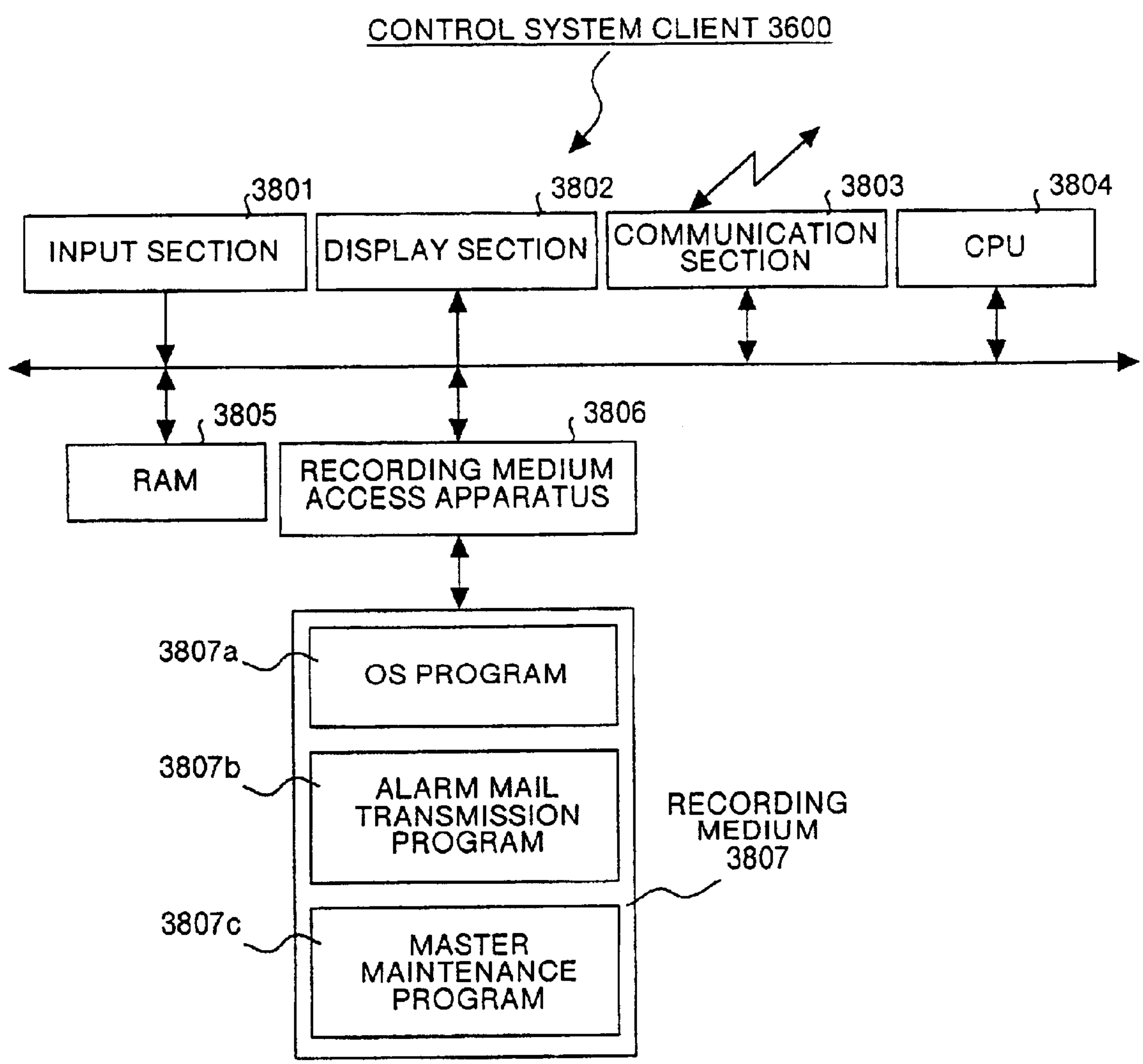
FIG. 80 is a diagram showing a schematic constitution of the management system client of FIG. 40.

FIG. 80 is a block diagram showing the schematic constitution of the management system client 3600 of FIG. 40. As shown in FIG. 80, the management system client 3600 comprises an input section 3801, a display section 3802, a communications section 3803 which performs data communications, a CPU 3804 which controls the entire apparatus, a RAM 3805 used as the work area of the CPU 3804, a recording medium access apparatus 3806 which reads and writes data to/from a recording medium 3807, and a recording medium 3807 which stores programs and the like for operating the CPU 3804.

The input section 3801 comprises a keyboard having a cursor key, a number input key, various types of function keys and the like, a mouse, a barcode reader, and the like. The operator supplies a control command to the CPU 3804 and inputs data by using the input section 3801 as a user interface.

The display section 3802 comprises a CRT, an LCD or the like, and displays data in accordance with display data input from the CPU 3804. The communications section 3803 connects to a network and exchanges data communications with the step-monitoring server 3300*a* and other clients via this network.

The CPU 3804 is a central processing unit which controls the entire apparatus in compliance with the programs stored in the recording medium 3807. The CPU 3804 is connected to the input section 3801, the display section 3802, the communications section 3803, the RAM 3805, the recording medium access apparatus 3806, and a printing section 3808. The CPU 3804 controls data communications, reading of application programs by accessing the memory, reading and writing various types of data, inputting data and commands, displaying, and the like.

The RAM 3805 comprises a work memory which stored specified programs, input commands, input data, processing results and the like, and a display memory which temporarily stores display data displayed on a display screen of the display section 3802.

The above-described recording medium 3807 stores various types of programs and data such as an OS program 3807*a* which can be executed by the CPU 3804 (e.g. WINDOWS 95 and WINDOWS NT) and application programs. Application programs include, for example, an alarm mail transmission program 3807*b*, a master maintenance program 3807*c*, and the like. The recording medium comprises, for example, an optical, magnetic or electrical recording medium such as a floppy disk, a hard disk, a CD-ROM, a DVD-ROM, an MO, and a PC card. The various types of programs are stored in the recording medium 3807 in a data format which the CPU 3804 can read. The various types of programs may be stored beforehand in the recording medium or downloaded via a communications line and stored in the recording medium. The programs can be transmitted via the communications line.

In the management system client 3600, the CPU 3804 transmits the alarm mail by executing a process explained later in compliance with the alarm mail transmission program 3807*b*. In the management system client 3600, the CPU 3804 inputs, adds, changes, deletes, and the like, data of the master tables of the step-monitoring server 3300*a* in compliance with the master maintenance program 3807*c*. More specifically, the management system client 3600 inputs, adds, changes, deletes, and the like, data of the machine type code name master table 3708*a*, the individual step settings master table 3708*n*, the repair supervisor master table 3708*k*, the defect content master table 3708*u*, the supervisor countermeasure master table 3708*m*, the check table item master table 3708*p*, the in-processing check item master table 37081, the unit name master table 3708*q*, unit check item master table 3708*j*, the unit check table item master table 3708*v*, the alarm receiver master table 3708*o*, and the alarm value master table 3708*t*.

In-Processing Data Input Process Executed by the Input System Clients

An in-processing data input process executed by the input system clients 3201 to 3203 will be explained based on the flowcharts of FIG. 81 to FIG. 84 and with reference to the examples of display screens in the in-processing data input process shown in FIG. 85 to FIG. 99. FIG. 81 to FIG. 84 are flowcharts showing in-processing data input processes executed by the input system clients 3201 to 3203, and FIG. 85 to FIG. 99 are diagram showing examples of display screens in the in-processing data input processes.

Figure 87:
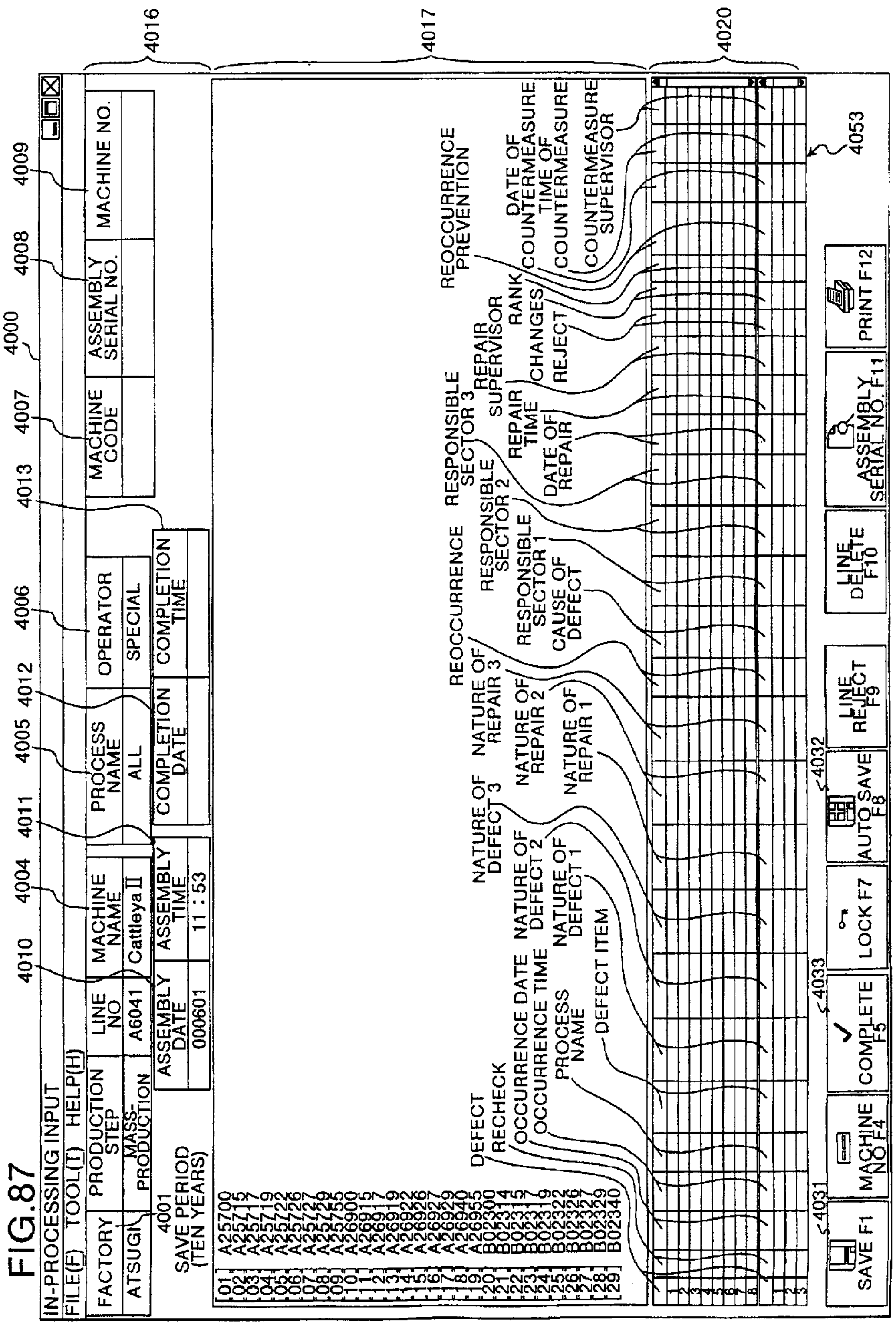
FIG. 87 is a diagram showing an example of a screen display in an in-processing data input process.

FIG. 87 shows an example of an in-processing data input screen 1000 which is displayed when the in-processing input program 3707*c* is activated. In the in-processing data input screen 1000 of FIG. 87, reference numeral 4001 represents an input box for "factory", reference numeral 4002 represents "production step", reference numeral 4003 represents "line no.", reference numeral 4004 represents "machine type", reference numeral 4005 represents "name of step", reference numeral 4006 represents "operator", reference numeral 4007 represents "machine type code", reference numeral 4008 represents "installation serial number", reference numeral 4009 represents "machine number", reference numeral 4010 represents "assembly date", reference numeral 4011 represents "assembly time", reference numeral 4012 represents "completion date", and reference numeral 4013 represents "completion time". These input boxes "factory 4001", "production step 4002", "line no. 4003", "machine type 4004", "name of step 4005", "operator 4006", "machine type code 4007", "installation serial number 4008", "machine number 4009", "assembly date 4010", "assembly time 4011", "completion date 4012", and "completion time 4013" form a main data input block 4016.

Reference numeral 4020 represents a defect content data input block for inputting data representing the content of each defect. The defect content data input block 4020 displays items such as "Number of reoccurrences", "Date of Occurrence", "Time of Occurrence", "Name of step", "Defective Item", "Defect content 1", "Defect content 2", "Defect content 3", "Repair contents 1", "Repair contents 2", "Repair contents 3", "Non-reoccurrence", "Cause of defect", "Responsible sector 1", "Responsible sector 2", "Responsible sector 3", "Repair Date", "Repair time". "Repair supervisor", "Line reject", "Something strange", "Lank", "Reoccurrence prevention Contents", "Date of Countermeasure", "Time of Countermeasure", and "Countermeasure supervisor". The operator inputs the data when the content of the defect is known.

Reference numeral 4017 represents a selection list block which items (data) to be input to the defect content data input block 4020 are displayed in. Reference numeral 4031 represents a "store F1" key for storing the input data in the step-monitoring server 3300*a*, and reference numeral 4032 represents an "automatic store F8" key for automatically storing the input data in the step-monitoring server 3300*a*. Reference numeral 4033 represents a "completion F5" key.

Figure 96:
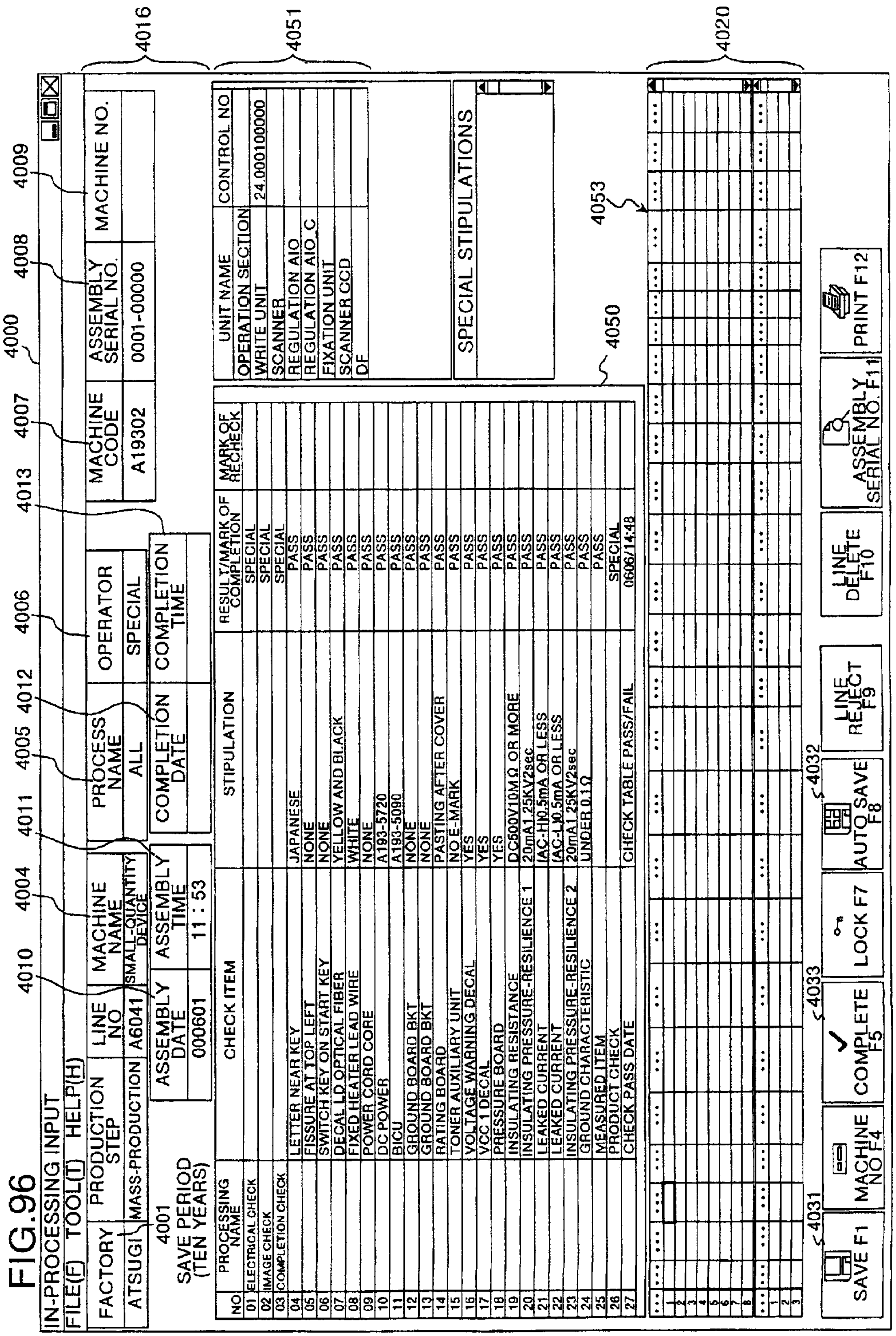
FIG. 96 is a diagram showing an example of a screen display in an in-processing data input process.

FIG. 96 shows the case where the check table data input block 4051 and the unit data input block 4051 are display simultaneously in the selection list input block 4017. It is determined whether or not to display the check table data input block 4051 and the unit data input block 4051 based on "tab control" data in the individual step operation settings master table 3708*n* as explained later. The unit check table and unit defect content can be displayed by double-clicking on the unit data of the unit item in the unit data input block 4051. FIG. 97 shows an example of a display screen 4052 of the unit check table and unit defect content.

Figure 88:
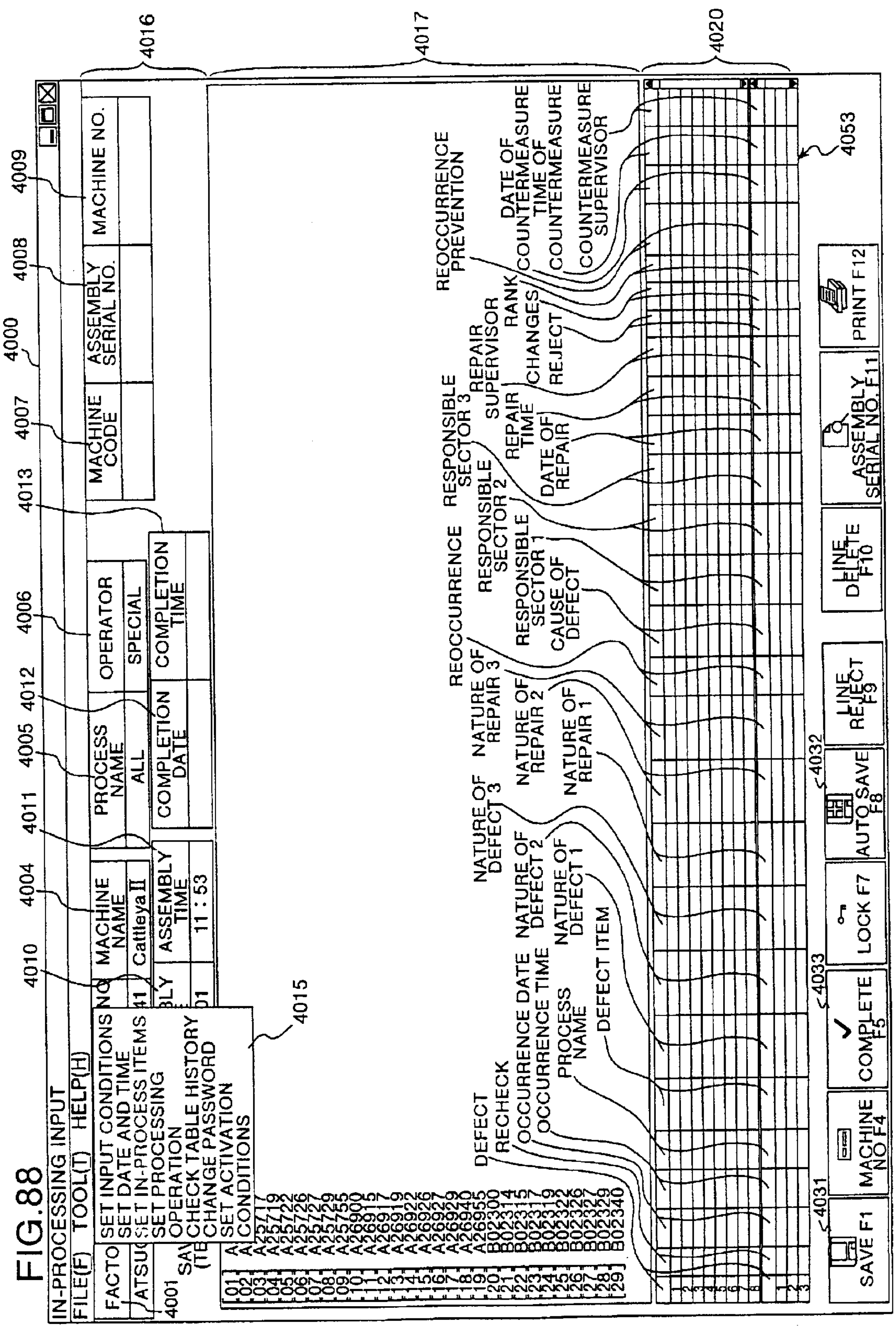
FIG. 88 is a diagram showing an example of a screen display in an in-processing data input process.

Activation conditions are set in the input system clients 3201 to 3208. When "Tools" (T) is selected in the in-processing data input screen of FIG. 87, a pull-down menu 4015 for setting the activation conditions is displayed as shown in FIG. 88. The activation conditions are set separately for each of the input system clients 3201 to 3208. The pull-down menu 4015 displays "set input conditions, "set date and time", "set individual step operations", "check table history", "change password", and "set activation conditions".

The activation conditions are set here because there are likely to be many input mistakes when the first initial values (factory, production step, line No., name of machine type, name of step) are set when activating the input system clients, and moreover it is time-consuming to input the same contents each time. For these reasons, the initial values are input automatically to prevent input mistakes and improve input efficiency.

Figure 89:
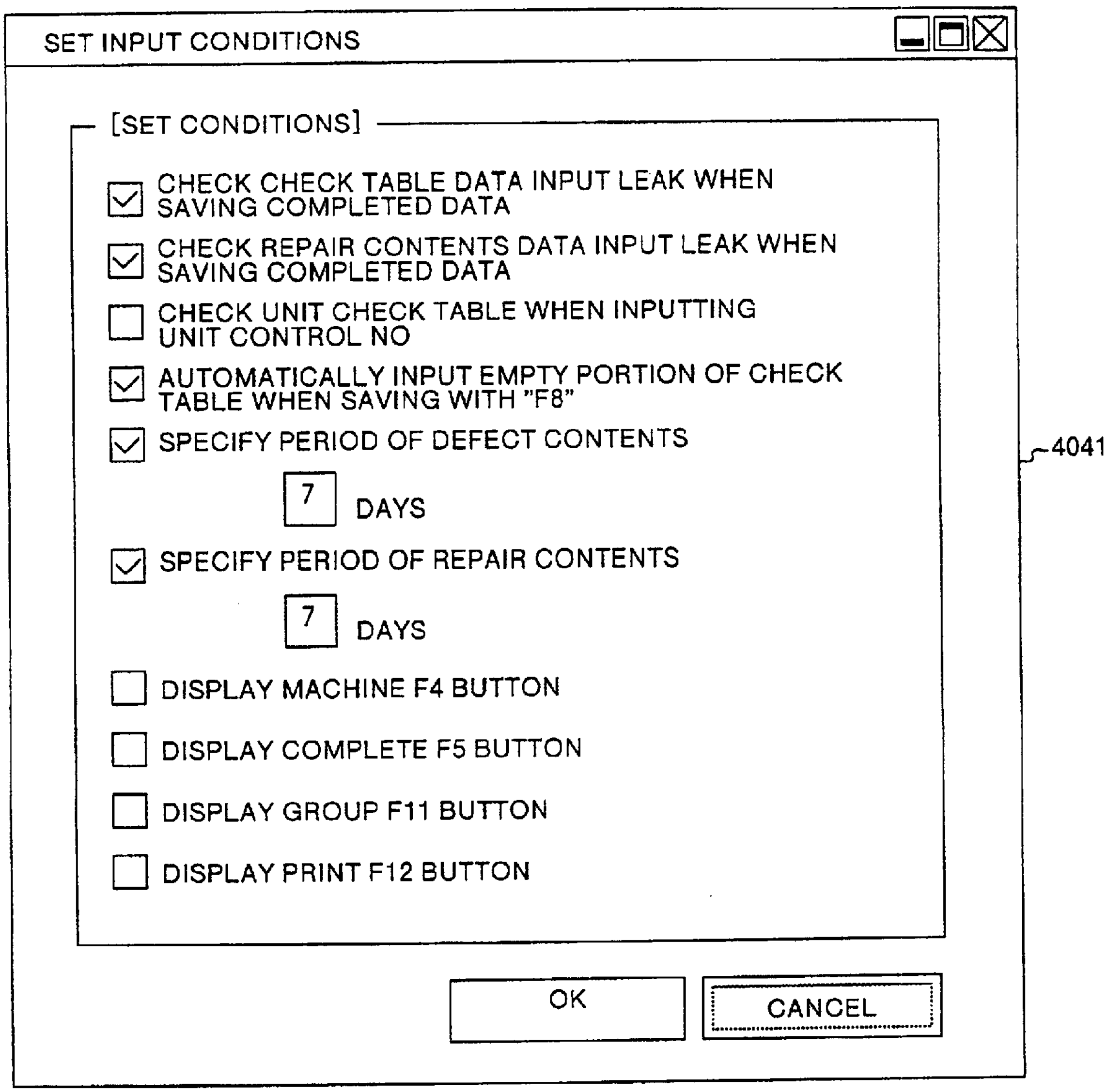
FIG. 89 is a diagram showing an example of a screen display in an in-processing data input process.

When "set input conditions" is selected in the pull-down menu 4015, a dialogue box 4041 for setting the input conditions is simultaneously displayed as shown in FIG. 89. The input conditions are set in the dialogue box 4041. The dialogue box 4041 displays settings such as "Check for input leakage of check table data when storing completed data?", "Check for input leakage of repair contents data when storing completed data?", "Check unit check table data when inputting unit management no.?", "Automatically input empty portion of check table when storing with F8?", "Defect content period", and "Repair contents period". The set contents (data) are stored as input conditions settings files in the recording media 3607 of each of the input system clients 3201 to 3208. The "Defect content period", and "Repair contents period" are set in units of days.

Figure 90:
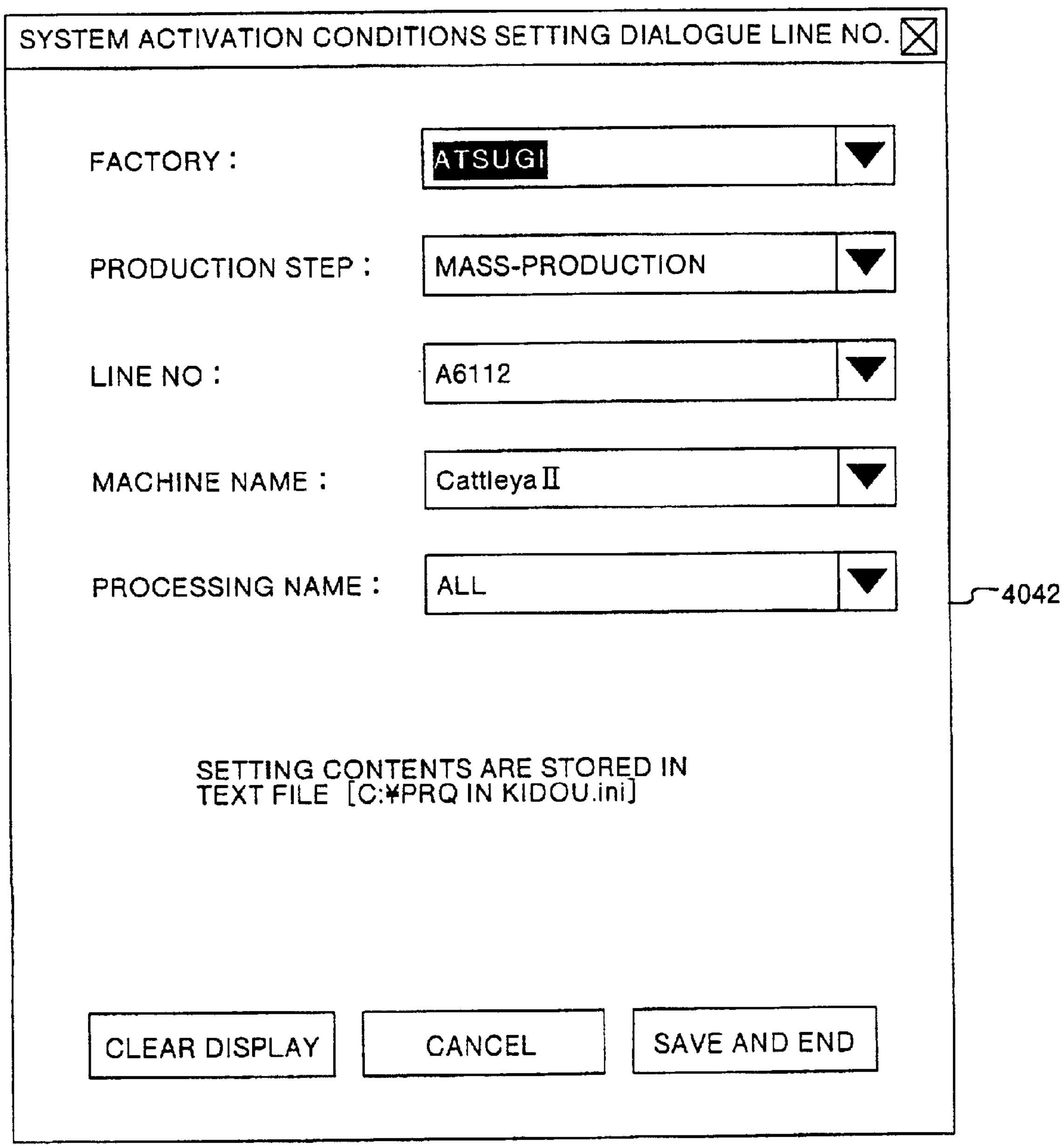
FIG. 90 is a diagram showing an example of a screen display in an in-processing data input process.

When "set activation conditions" is selected in the pull-down menu 4015 of FIG. 88, a dialogue box 4042 for setting the activation conditions is displayed on the screen of FIG. 88 as shown in FIG. 90. The activation conditions are set for each of the input system clients 3201 to 3208 in the dialogue box 4042. The dialogue box 4042 contains settings for "factory", "production step", "line No.", "name of machine type", and "name of step". The set contents (data) are stored as activation conditions setting files in the recording media 3607 of the input system clients 3201 to 3208. Since the initial values of the input system clients 3201 to 3208 are different, the activation conditions settings data are held for each of the input system clients 3201 to 3208 and are read out separately when each client is activated. The activation conditions settings data are set in the display boxes "factory 4001", "production step 4002", "line no. 4003", "machine type 4004", and "name of step 4005".

As the activation conditions settings data of the example shown in FIG. 90, "Atsugi" is set as the "factory", "mass-production" is set as the "production step", "A6112" is set as the "line No.", "CattleyaII" is set as the "name of machine type", and "All" is set as the "name of step".

Figure 91:
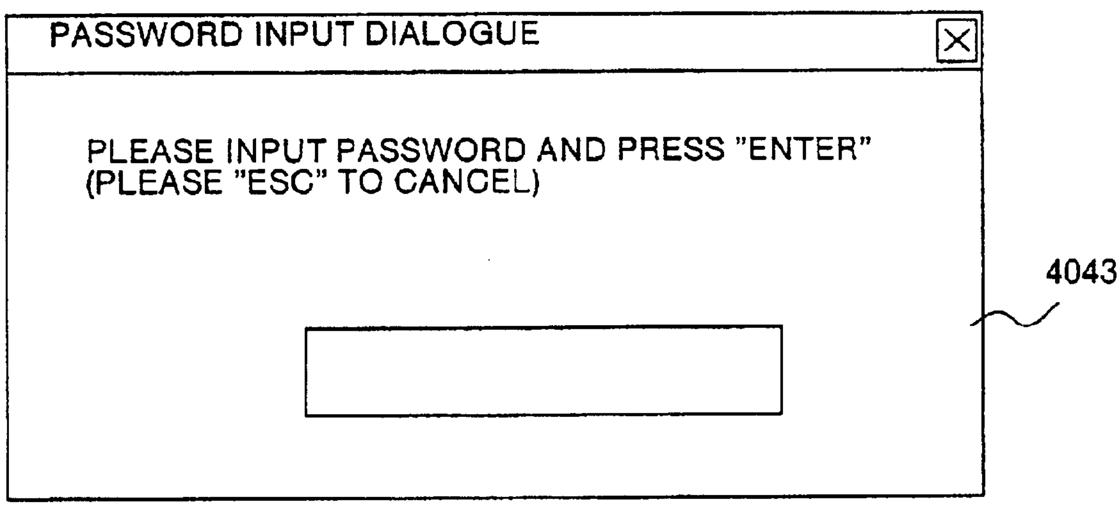
FIG. 91 is a diagram showing an example of a screen display in an in-processing data input process.
Figure 92:
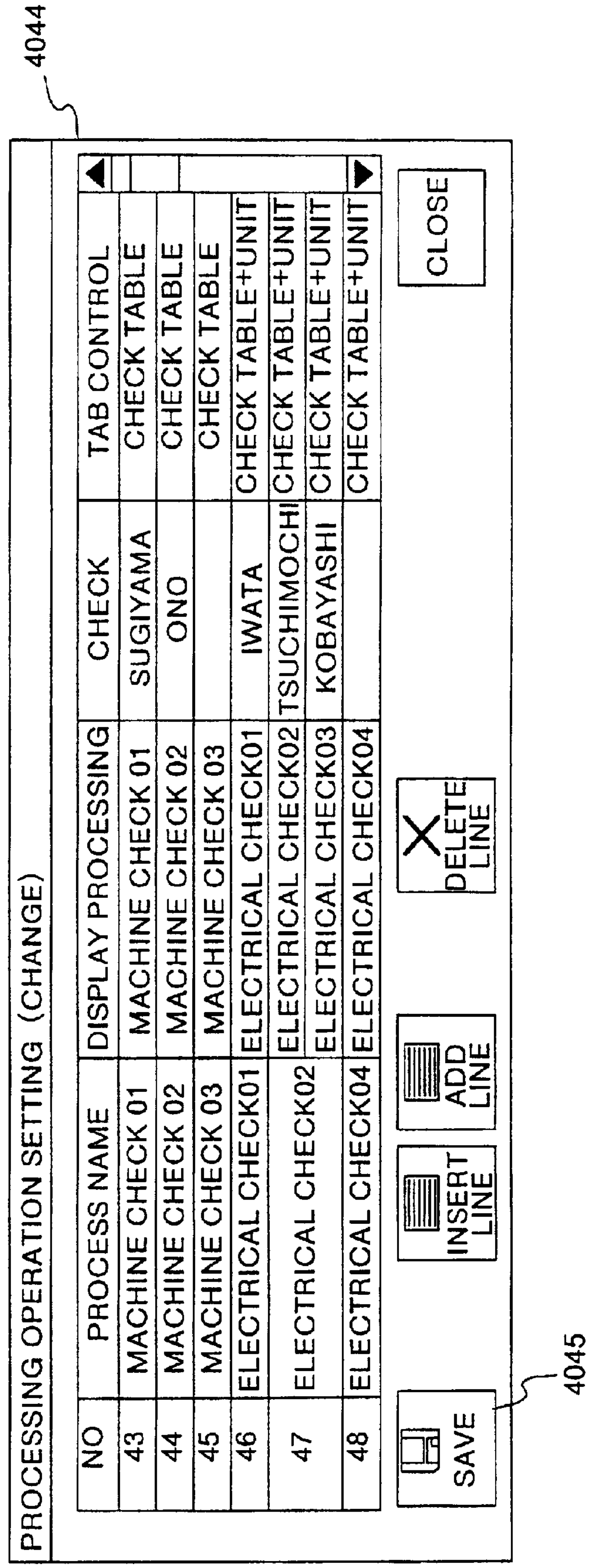
FIG. 92 is a diagram showing an example of a screen display in an in-processing data input process.
Figure 95:
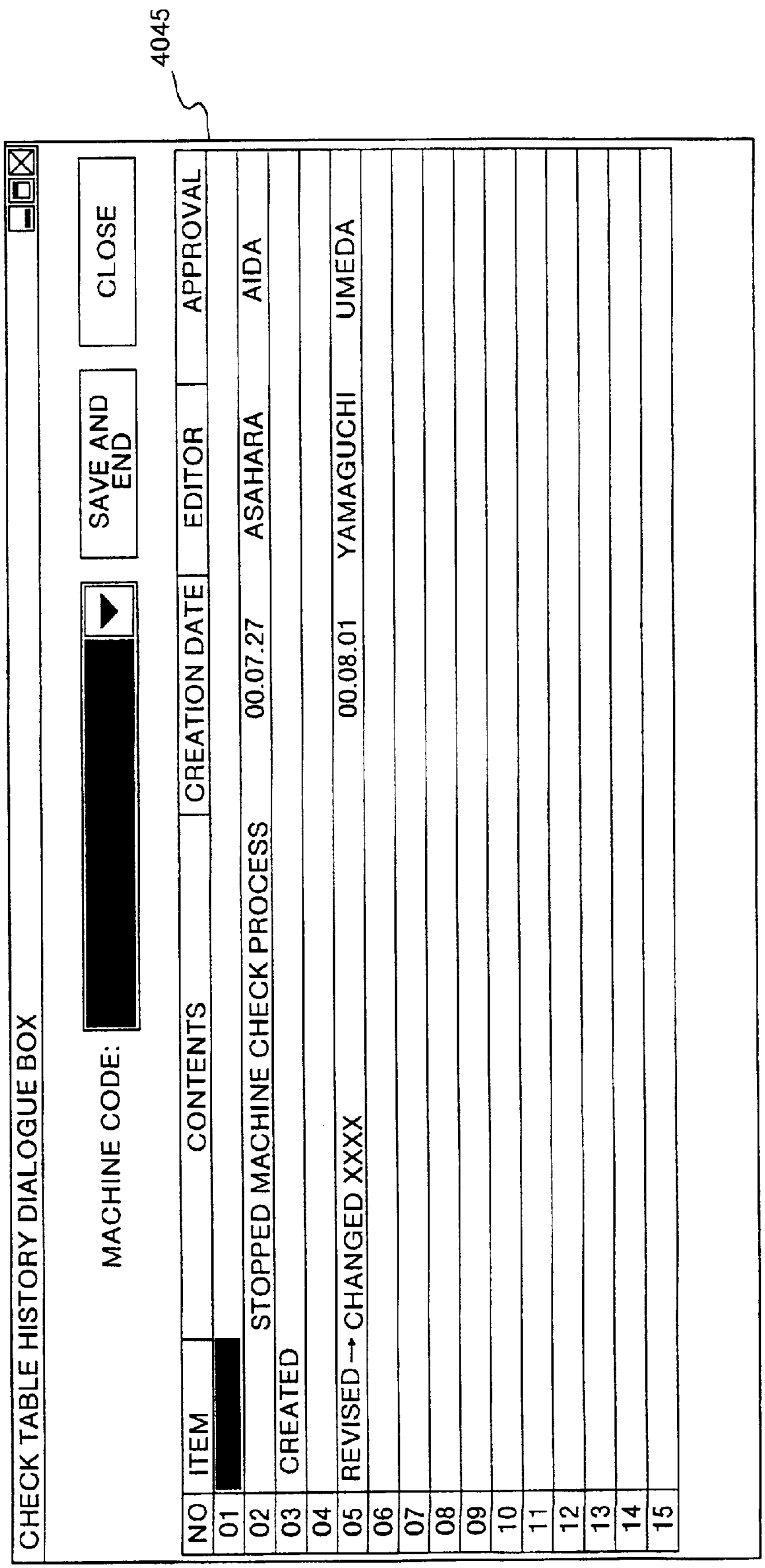
FIG. 95 is a diagram showing an example of a screen display in an in-processing data input process.

When "set individual step operations" is selected in the pull-down menu 4015 of FIG. 88, a password input screen is displayed as shown in FIG. 91. When the correct password is input to the password input screen, a dialogue box 4044 for setting the individual step operations is displayed on the screen of FIG. 89, as shown in FIG. 92. A password is required in order to prevent any operator from setting the individual step operations. Only someone who is authorized to know the password can set the individual step operations.

The individual step operations are set in the dialogue box 4044, and the set data is stored in the individual step operations settings master table 3708*n* of the step-monitoring server 3300*a*. "No.", "name of step", "name of display process", "checker", and "tab control" are set in the dialogue box 4044.

"Display process" is the function of displaying a process which has been set in a check table during a display process. It is possible to show the display in each process or as a group display of multiple processes. Due to production fluctuations, processes must frequently be divided. Since such divisions cannot be handled by a management method using conventional processing units, the processes are arranged in blocks by using this operations setting function. "Checker" comprises management data for automatically displaying and storing a "checker" for the "display process" when the "automatic store F8" key 4032 is pressed to store the data.

"Tab control" is for setting which data (check table or unit name etc.) to display in each step. For example, when "check table" is set in the "tab control" box of a particular step, the "check table" data is displayed on the screens of the input system clients 3201 to 3208 which execute that step. As a consequence, it is possible to display or not display "check table" and "unit name" in each step.

When the "save" key 4044 is pressed, the data which has been set in the dialogue box 4044 is stored in the individual step operations setting master table 3708*n* of the step-monitoring server 3300*a*.

As shown in FIG. 93, for example, the "name of step" is "mechanical check 02", the "display step" of the individual step operation setting which corresponds to the mechanical check 02 is "mechanical check 01", the "checkers is Ono, and the "tab control" is the check table. In this case, the check table (checker: Ono) of the mechanical check 01 is displayed in the check table data input block 4050. In FIG. 94, the "name of step" is "electrical check 02", the "display step" of the individual step operation setting which corresponds to the electrical check 02 is "electrical check 02", electrical check 03", the "checkers" are Domochi and Kobayashi, and the "tab control" is the check table+Unit. In this case, check tables of the electrical check 02 and the electrical check 03 (checkers: Domochi and Kobayashi) are displayed in the check table data input block 4050. In addition, the unit data input block is also displayed. When "All" is entered as the "name of step", the check tables of all the check steps are displayed.

When "Start" is entered into the "tab control" box, the step which "start" is allocated to is recognized as the first step and the data of its "check table" is automatically displayed on all screens. That is, "Start" is allocated to the first step of the assembly process.

When "check table history" is selected in the pull-down menu 4015 of FIG. 88, the check table history data of the check table revision history data table 3709*b* of the step-monitoring server 3300*a* is downloaded. The read check table history data is displayed in a check table history dialogue box 4045 for confirming the check table history, such as that shown in FIG. 95.

Figure 81:
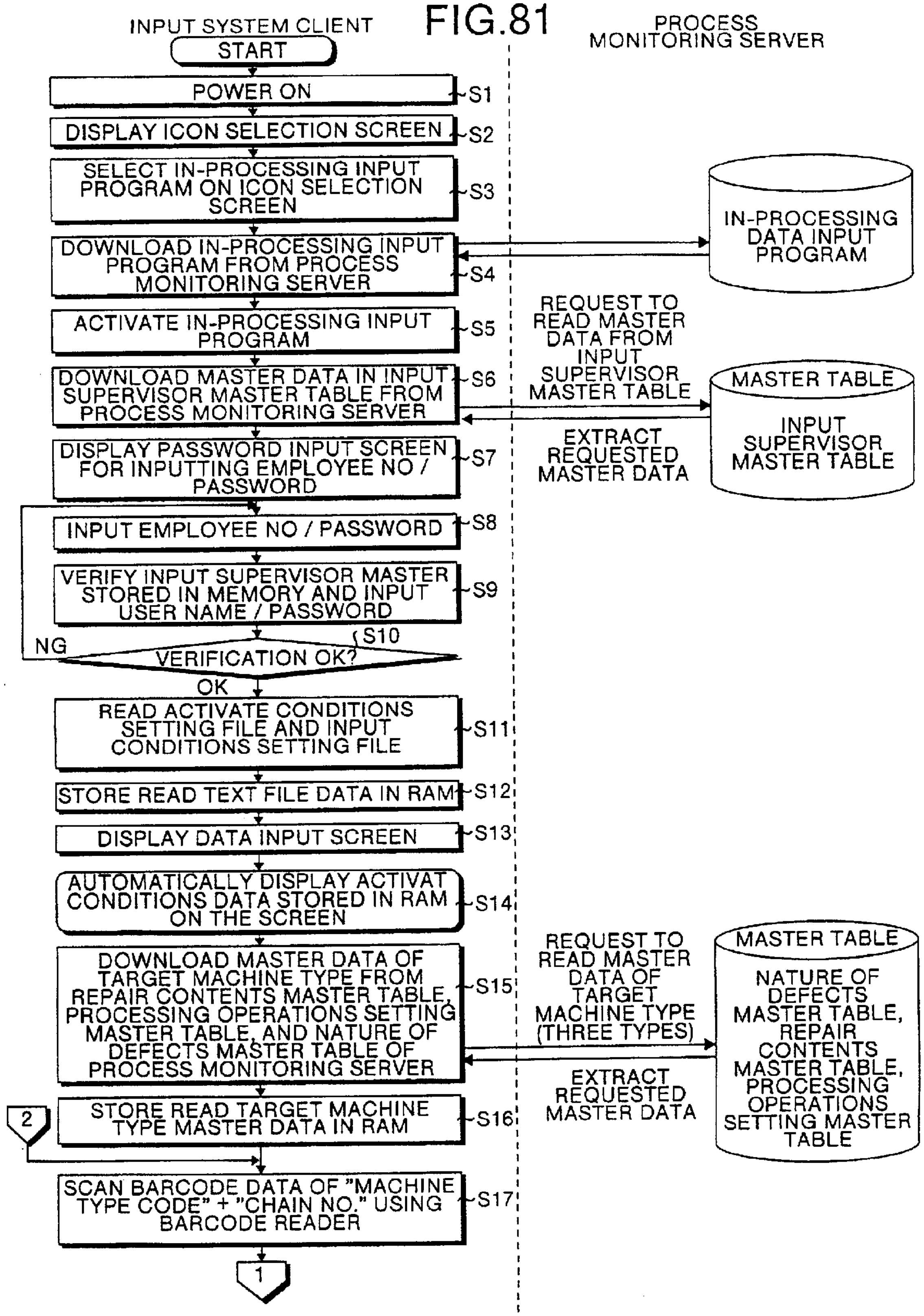
FIG. 81 is a flowchart showing an in-processing data input process of an input system client.
Figure 84:
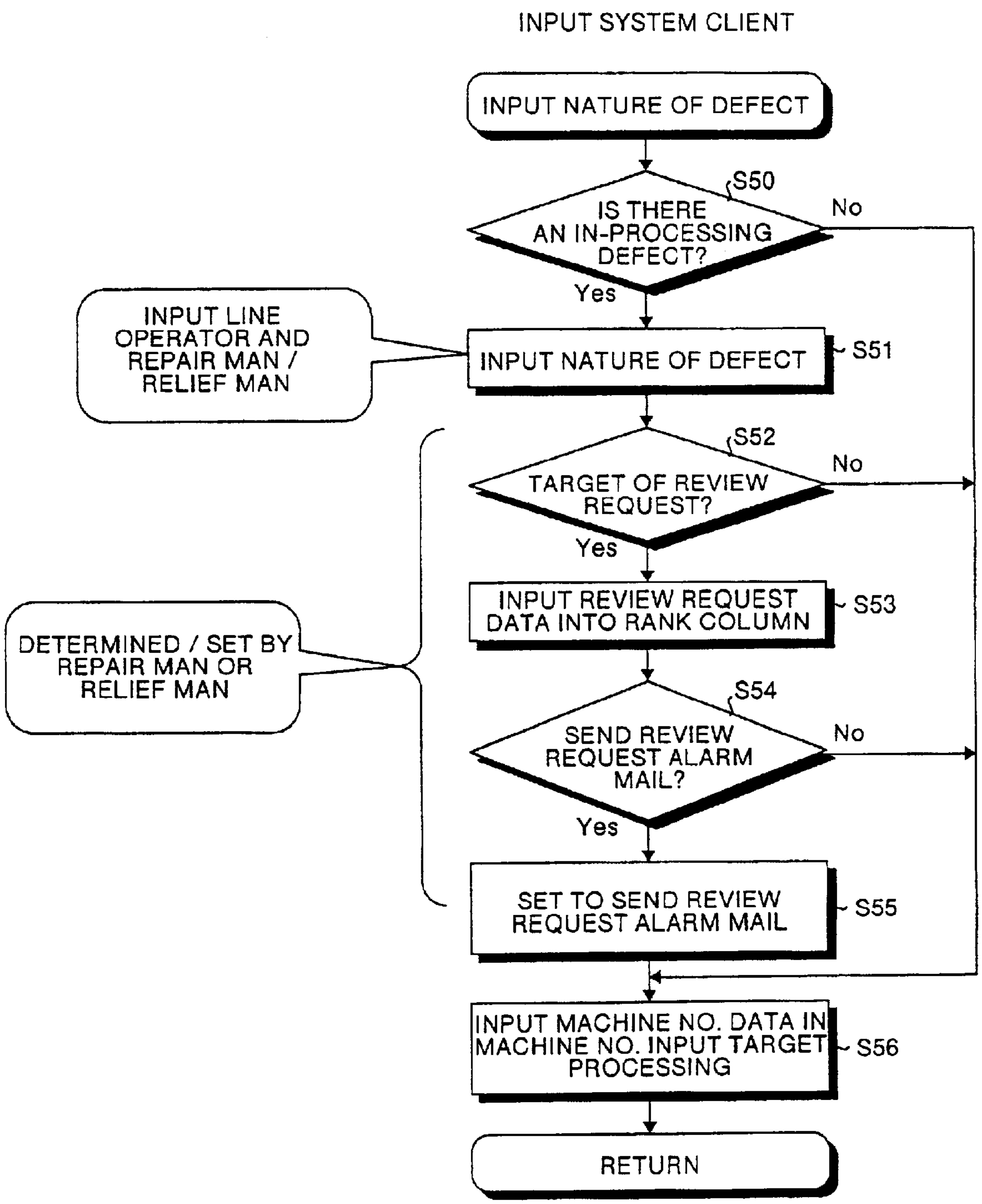
FIG. 84 is a flowchart showing an in-processing data input process of an input system client.
Figure 85:
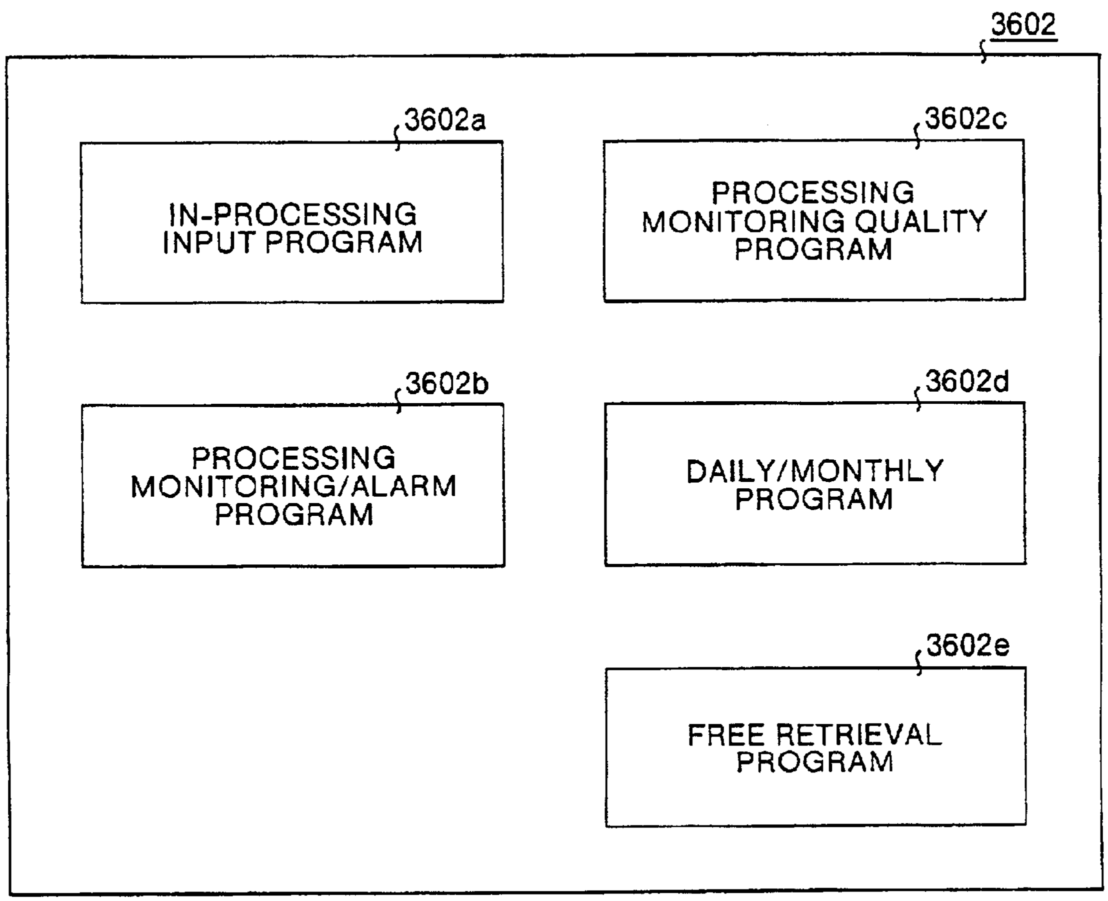
FIG. 85 is a diagram showing an example of a screen display in an in-processing data input process.

Subsequently, an in-processing data input process executed by the input system clients 3201 to 3208 will be explained with reference to the flowcharts of FIG. 81 to FIG. 84. In FIG. 81, when the operators of the input system (assembly steps 3101 to 3103, check steps 3104 to 3106, repair step 3110, product check step 3111) switch the power of the input system clients 3201 to 32080N (step S1), the program for production management system 3607*b* stored in the recording medium 3607 is opened into the RAM 3605 and activated, whereby the icon selection screen shown in FIG. 85 is displayed in the display section 3602 (step S2). When the in-processing input program 3602*a* is selected in this icon selection screen (step S3), the in-processing input program 3707*c* is downloaded from the step-monitoring server 3300*a* and stored in the RAM 3605 (step S4).

Figure 86:
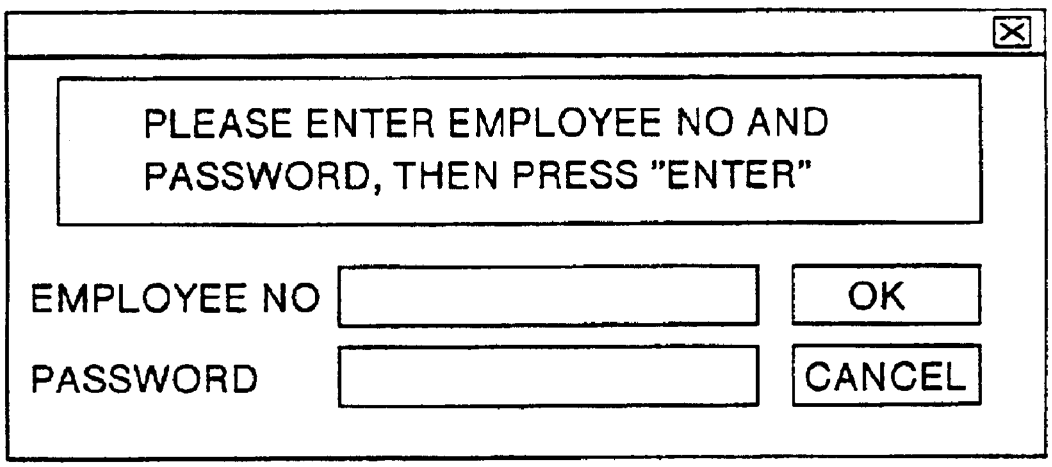
FIG. 86 is a diagram showing an example of a screen display in an in-processing data input process.

When the in-processing input program 3707*c* stored in the RAM 3605 is activated (step S5), the master data of the input supervisor master table 3708*g* (employee No., name, password) is downloaded from the step-monitoring server 3300*a* and stored in the RAM 3605 (step S6). A password input screen such as that shown in FIG. 86 is displayed in the display section 3602 (step S7). Boxes for entering the "employee No." and the "password" are also displayed in the password input screen of FIG. 86. The operators enter their passwords and employee numbers (step S8).

The input password and employee number are compared with the master data (password and employee no.) of the input supervisor master table 3708*g* stored in the RAM 3605 (step S9) to determine whether they are correct (step S10). When the input password and employee number are correct, processing proceeds to step S11. On the other hand, when the input password and employee number are incorrect, the processing returns to step S8 and the password and employee number are entered a second time.

In step S11, text file data (activation conditions data and input conditions data) of the activation conditions setting files and input conditions setting files which are stored in the recording medium 3607 are read out, and are stored in the RAM 3605 (step S12). A data input screen such as that shown above in FIG. 87 is displayed (step S13), and the activation conditions data of the activation conditions file stored in the RAM 3605 is displayed in the "factory name 4001", "production step 4002", "line No. 4003", "name of machine type 4004" and "name of step 4005" boxes of the input screen (step S14).

The master data of the target machine type in the defect master table 3708*u* ("Name of machine type", "Name of step", "No.", "Defective item", "Defect content 1", "Defect content 2", and "Defect content 3"), the repair contents master table 3708*i* ("No.", "Repair contents 1", "Repair contents 2", and "Repair 3") and the individual step operation settings master table 3708*n* ("No.", "Name of step", "Display Process", "Checker", and "Tab Control") are downloaded from the step-monitoring server 3300*a* (step S15) and stored in the RAM 3605 (step S16). Thereafter, the barcode table (machine type code and installation serial number) which is appended to the assembly product is read by using a barcode reader, and machine type code 4007" and "Installation serial number 4008" are entered in the display box (step S17).

Figure 82:
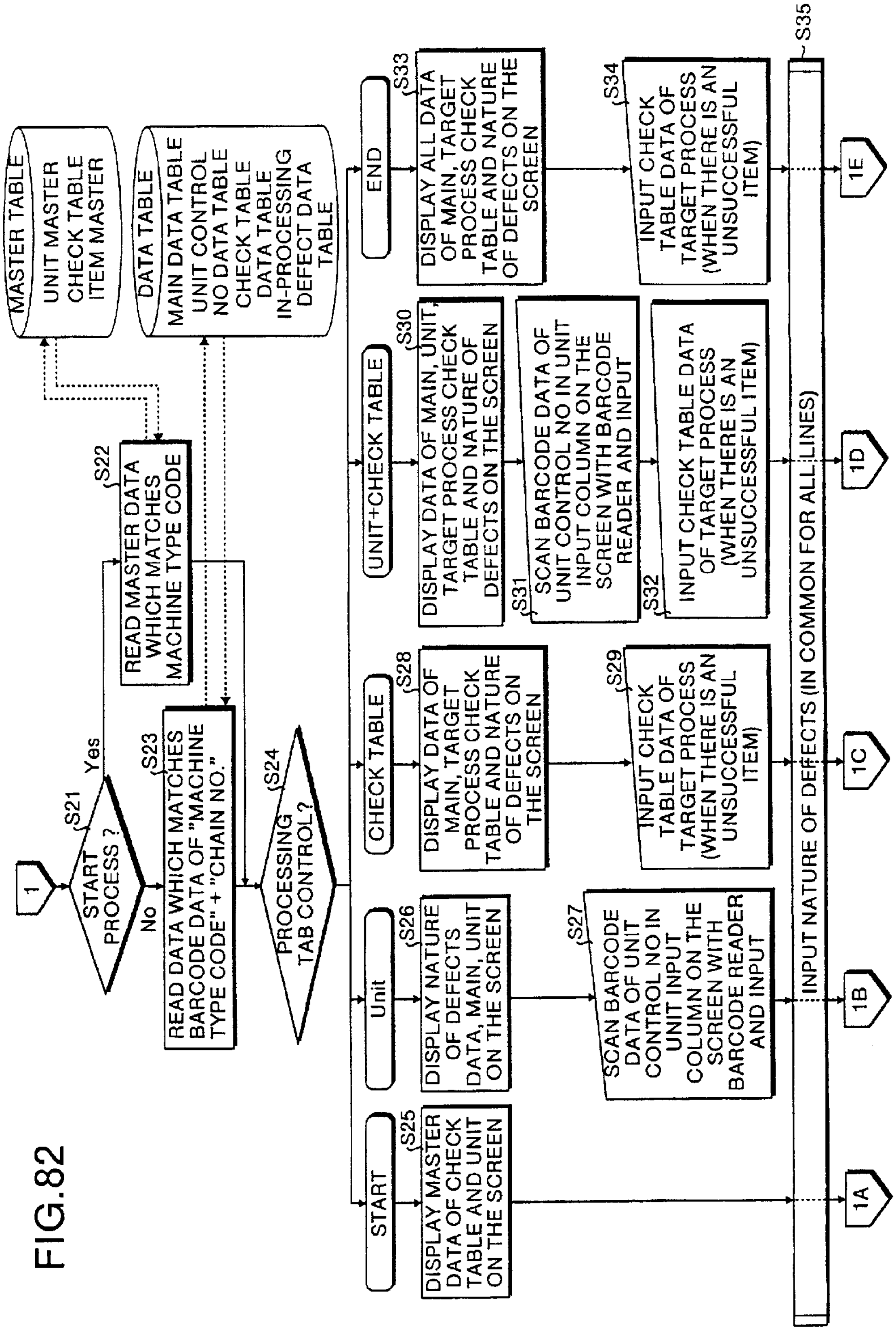
FIG. 82 is a flowchart showing an in-processing data input process of an input system client.
Figure 83:
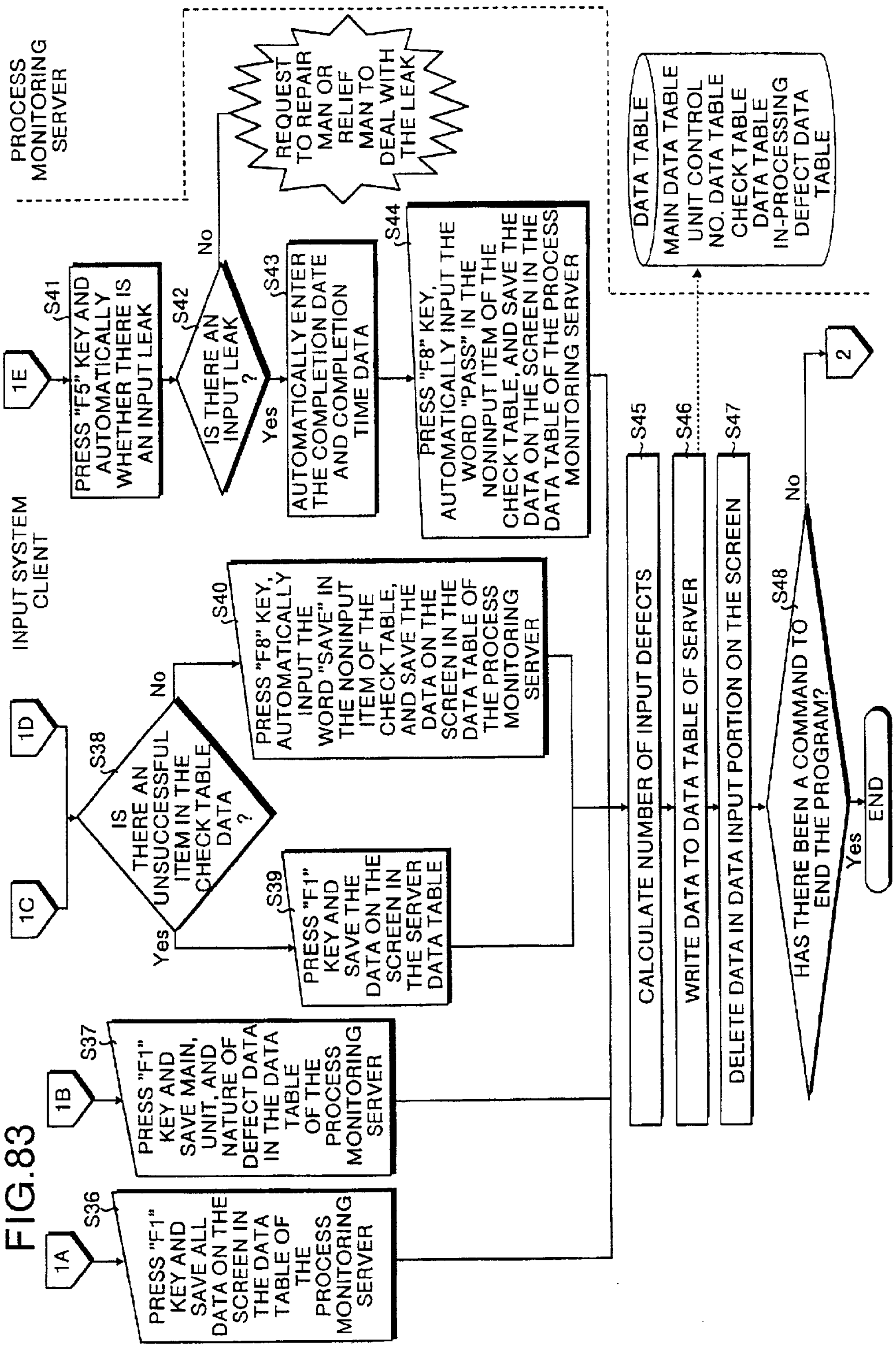
FIG. 83 is a flowchart showing an in-processing data input process of an input system client.

Subsequently, in FIG. 82, the data is compared with the "tab control" data which corresponds the automated steps (stored as activation conditions data of the activation conditions file) of the master data of the individual step operation settings master table 3708*n* stored in the RAM 3605, and it is determined whether to Start (step S21). When it is determined to Start, the master data from the unit name master table 3708*q* ("No.", "Unit No.", "Unit symbol", "Unit name", "Unit sector", "Machine type code", "Unit machine type code", and "Existence of Unit check table") and the check table item master table 3708*p* ("Machine type code", "No.", "Name of step", "Check item". "Stipulation", and "Input type") which matches the read machine type code is stored in the RAM 3605 (step S22) and the processing shifts to step S24.

On the other hand, when it is determined in step S21 that the tab control corresponding to the automated step is not Start, the master data which matches the main data table 3709*d* ("Factory name", "Product field", "Name of machine type", "Production step", "Line No.", "Machine type code", "Installation serial number", "Machine number", "Installation start date", "Installation start time", "Completion date", "Completion time", LineoutFlg", "Process input hold Flg", "Manufacturing check input hold Flg", "Manufacturing check Sample Flg", "Market generation flg", "Input date", "Number of defects", "Number of something stranges", "Number of non-reoccurrences", "Number of redetections", "Number of information handlings", "Special stipulations", and "Date of Latest update"), the unit management No. data table 3709*c* ("Installation serial number", "Machine type code", "Unit No.", "Unit symbol", "Unit sector", "Production step", "Unit Name", and "Unit management No."), the unit check table data table 3709*i* ("Unit management number", "Unit symbol", "Unit sector", "Production step", "No.", "Classification", "Check item", "Stipulation", "Check method", "Determination", and "Redetection mark"), and the in-processing defect table 3709*f* ("Factory name", "Product field", "Name of machine type", Production step", "Line No.", "Machine type code", "Installation serial number", "Machine number", "defect serial number", "Machine number", "Defective sector", "Number of reoccurrences", "Date of Occurrence", "Time of Occurrence", "Name of step", "Defective Item", "Defect content 1", "Defect content 2", "Defect content 3", "Lineout", "Lank", "Something strange", "Responsible sector 1", "Responsible sector 2", "Responsible sector 3", "Non-reoccurrence", "Cause of defect", "Repair contents 1", "Repair contents 2", "Repair contents 3", "Repair Date", "Repair time", "Repair supervisor", "Reoccurrence prevention Contents", "Date of Countermeasure", "Time of Countermeasure", "Countermeasure supervisor" and "Date of Latest update") is downloaded and stored in the RAM 3605 (step S23). The processing then shifts to step S24.

In step S24, the "tab control" data of the individual step settings master table 3708*n* stored in the RAM 3605 which corresponds with the automatically set step is determined. When the "tab control" is "start step", the processing shifts to step S25 and the master data of the check table item master table 3708*p* stored in the RAM 3605 is displayed in the check table data input block 4050. In addition, the master data of the unit name master table 3708*q* stored in the RAM 3605 is displayed in the unit data input block 4051 (step S25). Then, the defect content is entered in the defect data input block 4020 (step S35), the "Store F1" key is pressed, and all the data entered into the screen is stored in the corresponding data table of the step-monitoring server 3300*a* (step S36). Thereafter, processing shifts to step S45. More specifically, the data input to the main data input block 4016 and the defect content data input block 4020 are stored in the defect content master table 3708*u*.

Figure 98:
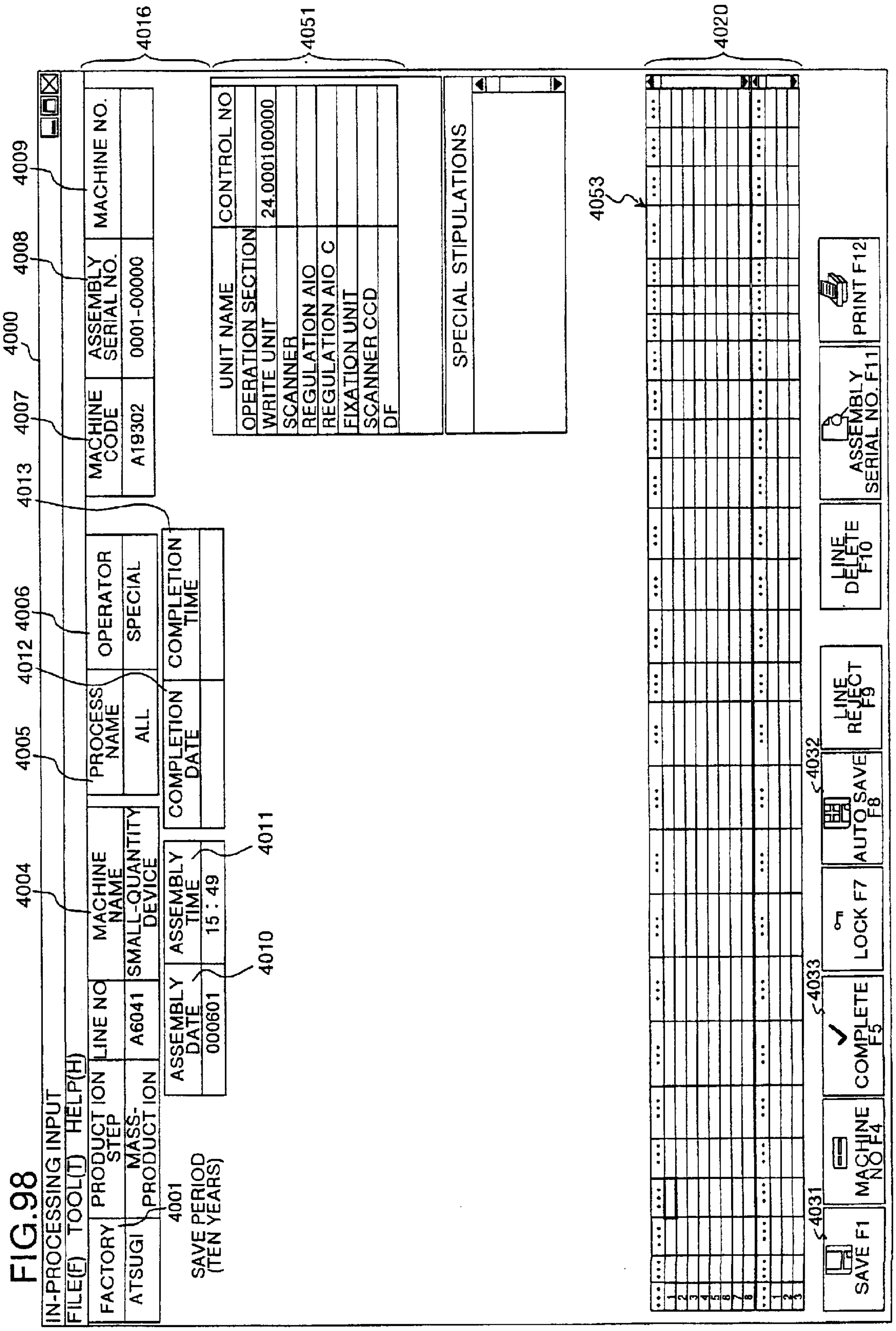
FIG. 98 is a diagram showing an example of a screen display in an in-processing data input process.

In step S24, when the "tab control" is "Unit", the master data of the main data table 3709*d* stored in the RAM 3605 is displayed in the main data input block 4016, the master data of the unit data table 3709*k* stored in the RAM 3605 is displayed in the unit data input block 4051, and the master data of the in-processing defect data table 3709*f* stored in the RAM 3605 is displayed in the defect data input block 4020. FIG. 98 shows an example of the screen display in this case, in which the unit data input block 4051 is displayed.

The barcode data on the "unit management No." which is pasted to the unit is read by using a barcode reader in the machine type code input box of the unit data input block 4051 on the screen (step S27).

Subsequently, the defect content is entered in the defect content input block 1020 (step S35). The "F1" key is pressed, and data of the main data input block 4016, the unit data input block 4051 and the defect data input block 4020 are stored in the corresponding data tables of the step-monitoring server 3300*a* (step S37). Thereafter, the processing shifts to step S44. More specifically, the data entered in the main data input block 4016 and the unit data input block 4051 are stored in the unit data table 3709*k*, and the data entered in the main data input block 4016 and the defect content data input block 4120 are stored in the defect content master table 3708*u*.

Figure 99:
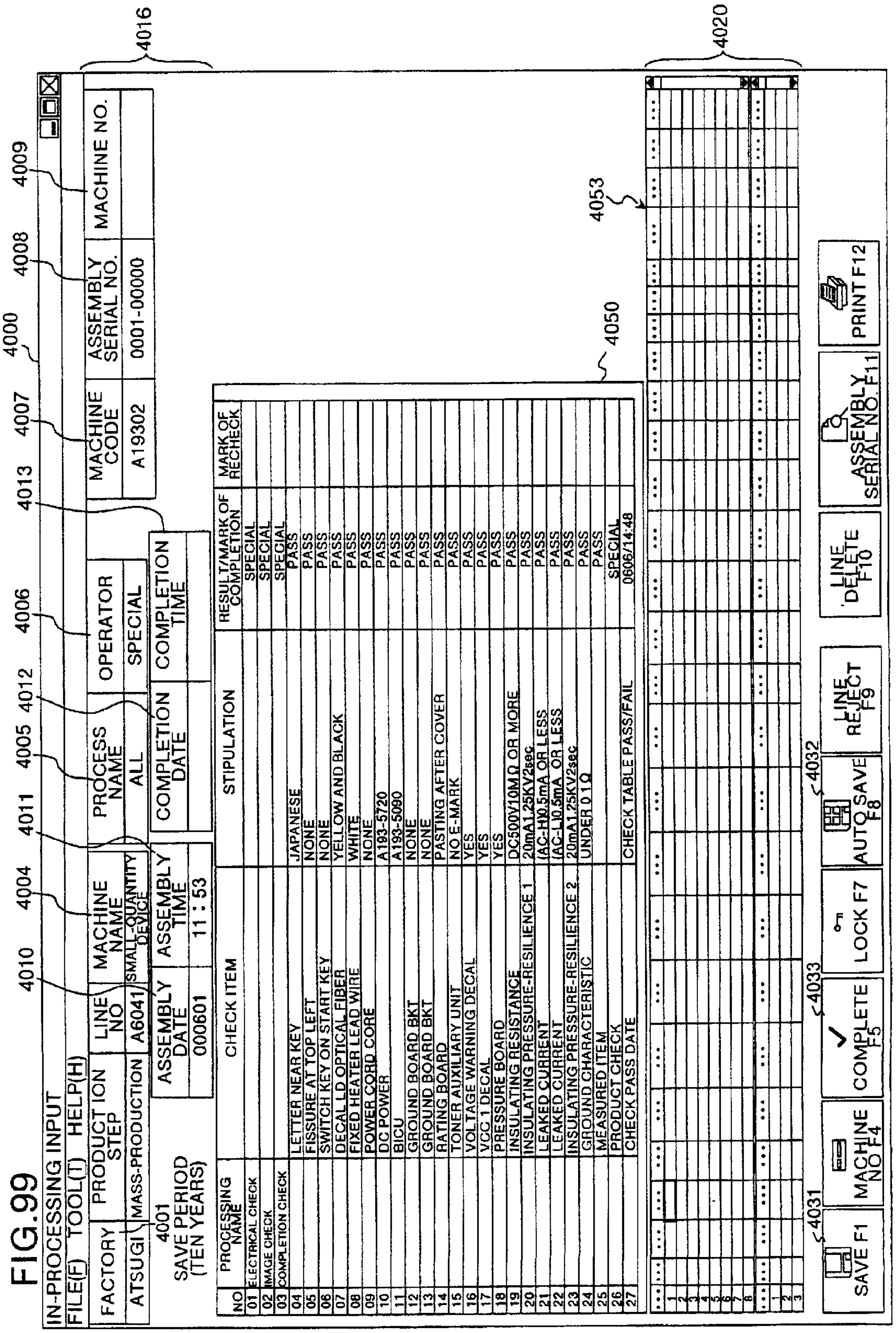
FIG. 99 is a diagram showing an example of a screen display in an in-processing data input process.

When the "tab control" in step S24 is "check table", the master data of the main data table 3709*d* is displayed in the main data input block 4016, the data of the check table of the target step of the check table data table 3709*i* stored in the RAM 3605 is displayed in the check table data input block 4050, and the data of the 10 defect data table 3709*f* stored in the RAM 3605 is displayed in the defect content data input block 4051 (step S28). FIG. 99 shows an example of the screen display in this case, in which the check table data input block 1050 is displayed. When an item is unsuccessful, the check table data of the target step is entered in the defect data input block 4051. Data is only entered in the check table when there is an unsuccessful item; successful items are not entered. As explained later, "pass" is automatically entered 110 in the empty boxes.

Subsequently, the defect content data is entered in the defect data input block 4020 (step S35). It is determined whether there is an unsuccessful item in the check table data of the check table data input block 4050 (step S38). When there is an unsuccessful item in this check table data, the "store F1" key is pressed and the data on the screen is stored in the corresponding data table of the step-monitoring server 00*a* (step S39). The processing then proceeds to step S44. On the other hand, when there is no unsuccessful item in the check table data in step S44, the "automatic store F8" key is pressed, the word "pass" is entered in the empty items in the check table of the check table data input block, and the data on the screen is stored in the corresponding data table of the step-monitoring server 3300*a* (step S40). The processing then shifts to step S45. More specifically, the data input in the main data input block 4016 and the retrieval table data input block 4050 are stored in the check table data table 3709*i*.

When the "tab control" in step S24 is "Unit+Check table", the data of the main data table 3709*d* stored in the RAM 3605 is displayed in the main data input block 4016, the data of the target step of the check table data table 3709*i* stored in the RAM 3605 is displayed in the check table data input block 4050, and the data of the in-processing defect content table 3709*f* is displayed in the defect content data input block 4051 (step S30). FIG. 96 shows an example of the screen display in this case, in which the unit data input block 4051 and the check table data input block 4050 are displayed.

The barcode data on the "unit management No." which is pasted to the unit is read by using a barcode reader in the machine type code input box of the unit input box 4051 (step S31). When there is an unsuccessful item, the check table data of the target step of the check table data input block 4050 is input (step S32). Thereafter, the defect content is input in the defect data input block 4020 (step S35).

It is determined whether there is an unsuccessful item in the check table data of the check table data input block 4050 (step S38). When there is an unsuccessful item in the check table data, the "store F1" key is pressed and the data on the screen is stored in the corresponding data table of the step-monitoring server 3300*a* (step S39). Then, the processing shifts to step S44. Specifically, the data input in the main data input block 4016 and the defect data input block 4020 is stored in the defect content master table 3708*u*, the data input in the main data input block 4016 and the retrieval table data input block 4050 is stored in the check table data table 3709*i*, and the data input in the main data input block 4016 and the unit data input block 4051 is stored in the unit data table 3709*k*.

On the other hand, when there is no unsuccessful item in the check table data in step S44, the "automatic store F8" key 4032 is pressed, the word "pass" is entered in the empty items in the check table of the check table data input block, and the data on the screen is stored in the corresponding data table of the step-monitoring server 3300*a* (step S40). The processing then shifts to step S45.

When the "tab control" in step S24 is "End", the main data of the main data table 3709*d* stored in the RAM 3605 is displayed in the main data input block 4016, the check table data of the target process of the check table data table 3709*i* stored in the RAM 3605 is displayed in the check table data input block 4050, and the master data of the in-processing defect content data table 3709*f* stored in the RAM 3605 is displayed in the defect data input block 4051 (step S33).

The check table data of the target process is input in the check table data input block 4050 (step S34). Thereafter, the defect content is input in the defect data input block 4020. The "complete F5" key is pressed (step S41) and it is determined whether there is any input leak (step S42). When there is an input leak, a request to deal with the input leak is sent to a repair-man or a relief-man (a person who implements countermeasures when trouble has occurred). On the other hand, when there is no input leak, the completion date data is automatically entered in the "completion date 4012" input box on the screen, and the completion time data is automatically entered in the "completion time 4013" input box (step S43). The "automatic store F8" key 4032 is pressed and the word "pass" is entered in the empty items in the check table of the check table data input block, and the data on the screen is stored in the corresponding data table of the step-monitoring server 3300*a* (step S44). The processing then shifts to step S45.

In step S45, defect data relating to the defect content data being input in the defect content data input block 4051 such as the number of something stranges, the number of reoccurrences, the number of information handlings, and the total number of defects, is totalled and stored (written) in the appropriate place in the main data table 3709*d* of the step-monitoring server 3300*a* with the production step, the machine type code and the installation serial number as the keys (step S45).

The data in the data input portion on the screen is deleted and the processing shifts to step S48. When there is no command to end the program, the replacement returns to step S17 of FIG. 81 and the machine type code and installation serial number of the next assembly product on the line are input.

The input of the defect content in the step S35 described above will be explained in detail based on the flowchart of FIG. 84. In FIG. 84, it is firstly determined whether there are any defect contents (step S50). When there is no defect content, the processing shifts to step S56. On the other hand, when there is a defect content, the processing shifts to step S51 in which the line operator, the repair man and the relief man input the defect content in the defect data input block 4020 (step S51). Then, the repair man and the relief man determine whether there is a target for the review request (step S52). When there is no review request target, the processing shifts to step S56. On the other hand, when there is a review request target, the processing shifts to step S53, in which the review request data is entered in the lank box 4053 of the defect content data input block 4020. It is determined whether to send a review request alarm mail (step S54). When a review request alarm mail is not sent, the processing shifts to step S56. On the other hand, when a review request alarm mail is sent, the setting is changed to "send review request alarm mail" and the processing shifts to step S56. Here, when the setting is changed to "send review request alarm mail", the mail transmission flag in the in-processing defect content data table 3709*f* is set to "1" (transmission target). In step S56, after the machine number data has been input in the machine number input target step, the processing returns to the start.

The management system client 3600 can add, delete and change the check items, stipulations and input types of the check table item master table 3708*p* at any time. The revision history of the check table item master table 3708*p* is saved in the check table revision history data table 3709*d*. The contents of data stored in the check table revision history data table 3709*d* can be confirmed by the clients.

As described above, when the "tab control" in the individual step operation setting master table 3708*m* is "Start (first step)", the check items and the like of the check table item master table 3708*p* are displayed (see step S22 and step S25). The displayed check items and the like of the check table are stored in the check table item data table 3709*i* (see step S36) and the check items and data and the like of the check table item data table 3709*i* are displayed in the check table (see step S23 and step S28) in the subsequent steps. The check table which the data is input to in each step is stored in the check table item data table 37091 (see step S39 and step S40) and the same process is repeated until the final step. Therefore, the same check items as those of the check table item master table 3708*p* can be used for the body to be assembled from the first step until the final step (i.e. until the product is completely assembled). That is, the result of adding, deleting and changing the check items, stipulations, and input types of the check table item master table 3708*p* can be reflected in the next body to be assembled. Consequently, no irregular state occurs in the next step after the check table item data table 3709*i* has been revised.

Step Monitoring and Alarm Processes Executed by Output System Client

Step monitoring and alarm processes executed by the output system clients will be explained based on the flowcharts of FIG. 100 to FIG. 105 and with reference to the examples of screen displays in the in-processing data input process of FIG. 106 to FIG. 124. FIG. 100 to FIG. 105 are flowcharts showing step monitoring and alarm processes executed by the output system clients, and FIG. 106 to FIG. 124 are diagrams showing examples of screen displays in the in-processing data input processes.

In the step-monitoring/alarm processing, the clients 3501 to 3503 of the manufacturing and production check section 3401, the component check section 3402, and the manufacturing technical section 3403 send retrieval requests to the step-monitoring server 3300*a*, and the chronologically process and display and the like the retrieved data sent from the step-monitoring server 3300*a*.

Figure 106:
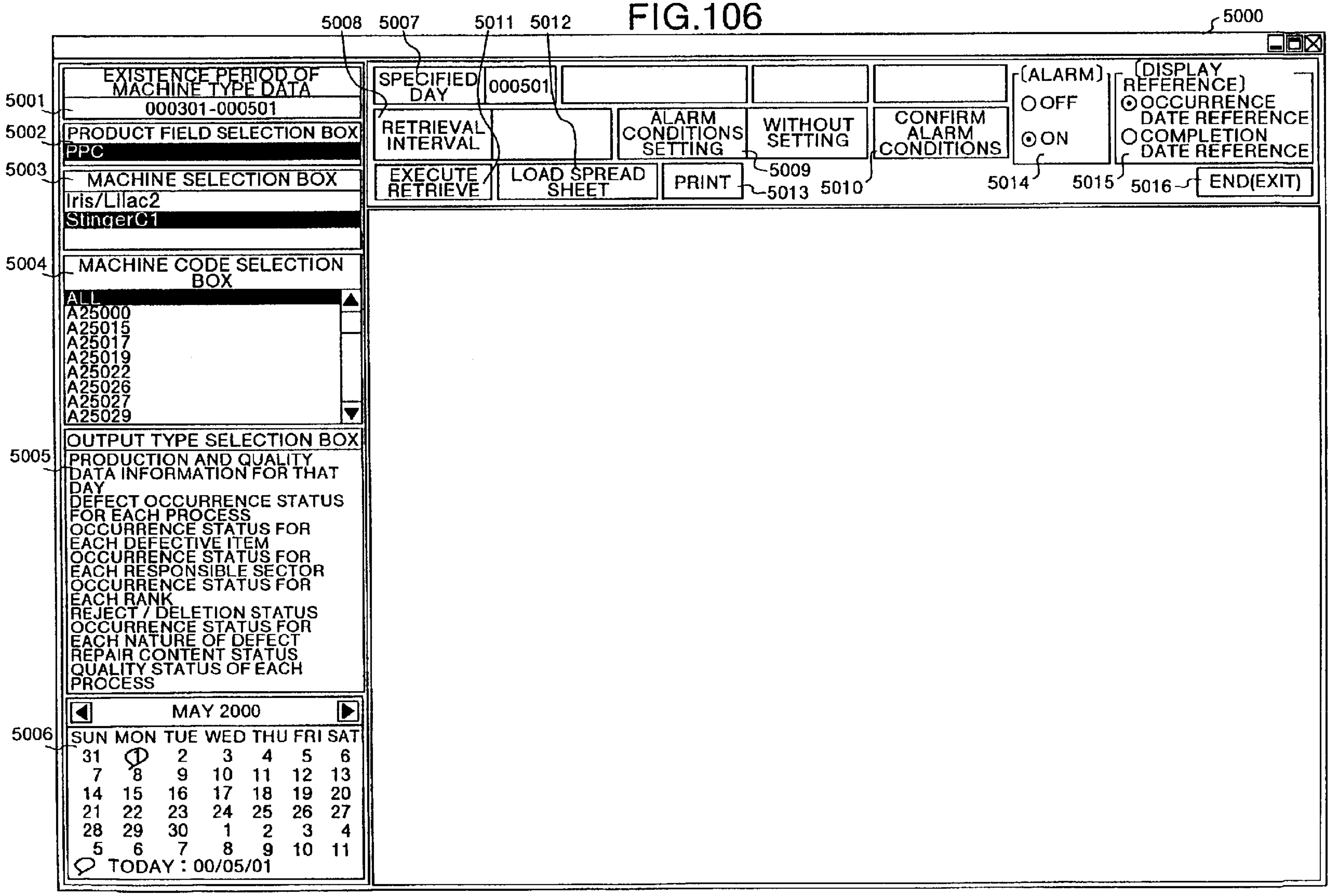
FIG. 106 is a flowchart showing a step-monitoring/alarm process of an output system client.

FIG. 106 is an example of a display screen 5000 displayed when the step-monitoring/alarm program 3707*d* has been activated. In FIG. 106, reference numeral 5001 represents a key for displaying the data duration of the selected machine type. When the key 5001 is pressed, the data duration of the selected machine type is displayed. Reference numeral 5002 represents a product field selection box for selecting the "product field" for retrieval, reference numeral 5003 represents a machine type selection box for selecting the "machine type" to be retrieved, reference numeral 5004 represents a machine code selection box for selecting the "machine code" to be retrieved, and reference numeral 5005 represents an output category selection box for selecting an output target. The output target is selected from "that day's production and quality results information", "defect state in each process", "occurrence state for each defective item", "occurrence state for each responsible sector", "occurrence state for each lank", "line reject/cancel state" and "occurrence state for each type of defect" which are displayed in the output category selection box 5105.

"That day's production and quality results information" comprises information for determining the disparity and variation between quality results and objects. "Defect state in each process" comprises information for determining shifts and tendencies of the occurrence state of defects in each process. "Occurrence state for each defective item" is for determining shifts and tendencies of the occurrence state of defects in each item. "Occurrence state for each lank" is for determining shifts and tendencies of the occurrence state of defects of each lank. "Line reject/cancel state" is for determining shifts and tendencies in the line rejects and cancellation state. "Occurrence state for each type of defect" is for determining shifts and tendencies of the occurrence state for each type of defect. This output category (output target) can be selected before and after data is retrieved.

Reference numeral 5006 represents a calendar for selecting the "date" of the retrieval target. Reference numeral 5007 represents a date specification box for selecting the "date" of the retrieval target. Either of the calendar 5006 and the date specification box 5007 can be used to specify the "date" of the retrieval target. Reference numeral 5008 represents a "retrieval interval" key for specifying the data retrieval interval, reference numeral 5009 represents an "alarm conditions setting" key for setting alarm conditions, reference numeral 5010 represents an "alarm status confirmation" key for confirming the alarm status, reference numeral 5011 represents a "retrieval conditions" key for executing retrieval, reference numeral 5012 represents a "table soft open" key for opening data to a table calculation software, reference numeral 5013 represents a "print" key for printing the data displayed on the screen, and reference numeral 5104 represents an alarm setting box for selecting alarm generate/non-generate. Reference numeral 5015 represents a display reference box for selecting whether to display the information with "date of defect occurrence" as the reference or with "completion date of machine" as the reference. The display reference box 5015 may be set before or after retrieval.

Figure 107:
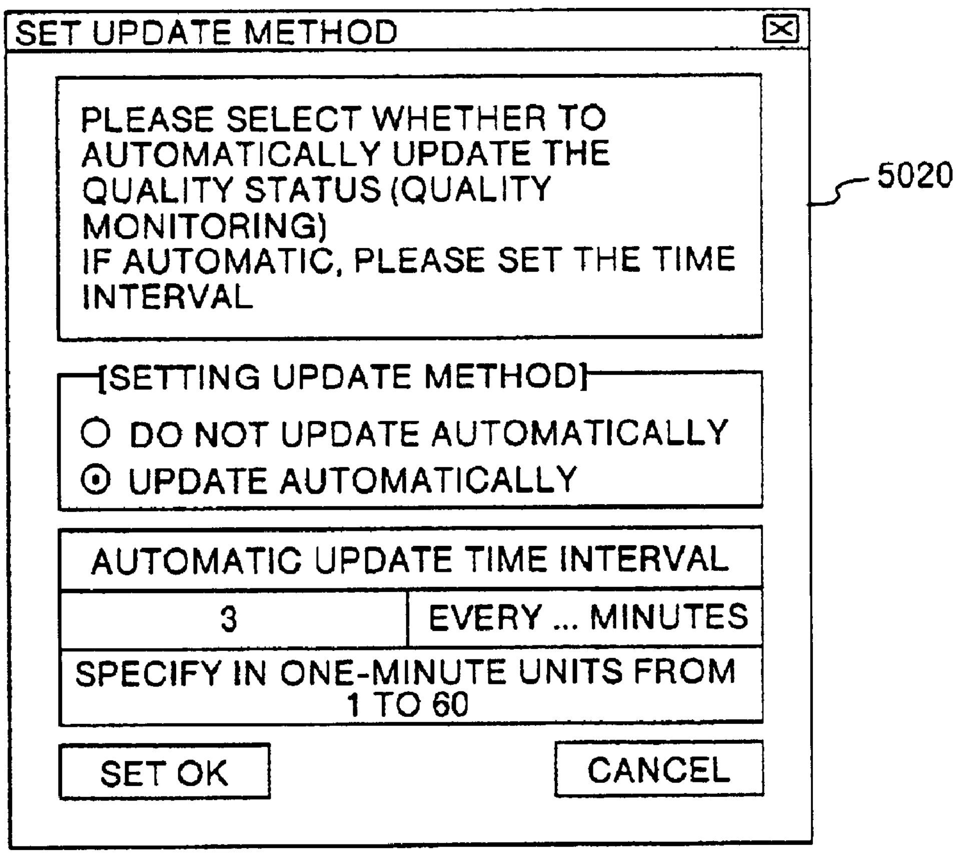
FIG. 107 is a flowchart showing a step-monitoring/alarm process of an output system client.

When the "retrieval interval" key 5109 has been selected, a subscreen 5020 for setting the update method shown in FIG. 107 is displayed over the screen of FIG. 106. In the subscreen 5020, the operator selects whether to automatically update the retrieval of information and sets the intervals (in minutes) at which the retrieval is to be automatically updated. Automatic retrieval is a function whereby information is automatically retrieved at set time intervals and the latest information is displayed on the screen. In the example shown in FIG. 106, the update method is set to "update automatically" and the automatic update interval is set to one minute. When the information is automatically updated every one minute in this way, the output system clients 3501 to 3503 transmits requests to read the quality data to the step-monitoring server 3300*a* every one minute, extract the quality data from the step-monitoring server 3300*a* every one minute, and update the quality data.

Subsequently, a method for setting the alarm will be explained. There is an individual alarm and a common alarm (serious problem). The common alarm is used to speed up the quality improvement by linking with the relevant division, and the individual alarm is used in confirming states such as quality improvement, quality confirmation, correction confirmation, quality improvement result confirmation, and the like.

Figure 108:
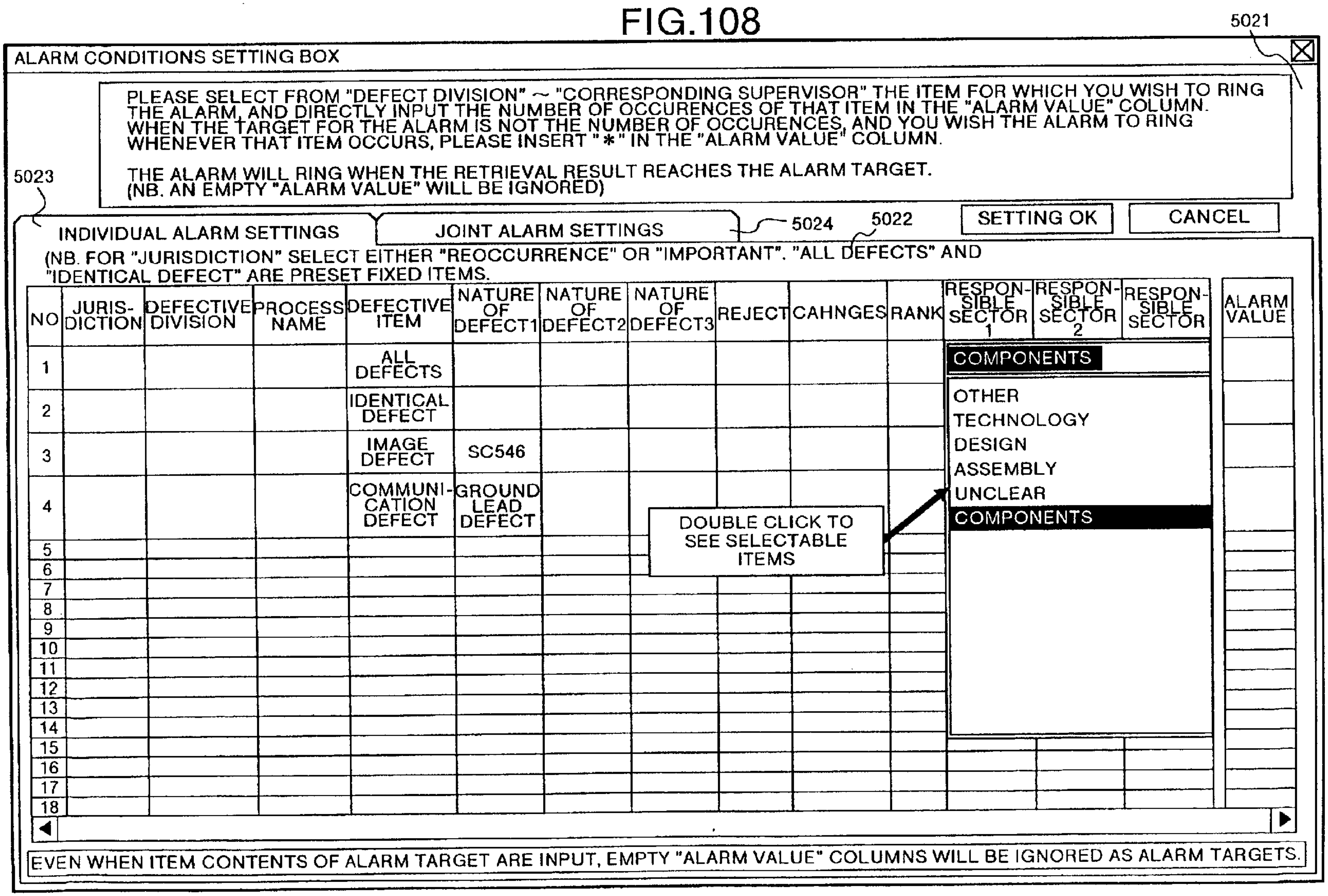
FIG. 108 is a flowchart showing a step-monitoring/alarm process of an output system client.

In the screen of FIG. 106, when the alarm conditions Ad, setting key 5009 is selected, for example, the alarm conditions setting guide screen 5021 shown in FIG. 108 is displayed. In FIG. 108, reference numeral 5023 represents an "individual alarm setting" key for setting the individual alarm, and reference numeral 5024 represents a "common alarm setting key" for setting the common alarm. FIG. 108 shows a case where the individual alarm setting key 5023 has been selected, whereby an individual alarm setting box 5022 is displayed. The supervisor inputs the alarm conditions (alarm item, alarm reference) and the alarm value into the alarm setting box 5022 for the individual alarm and presses the "Set OK" button, whereby the individual alarm is set. The set data of the set individual alarm is stored in the recording medium 3607.

When the "common alarm setting" key 5022 is selected in the alarm conditions setting guide screen 5021, the password input screen shown in FIG. 91 is displayed. When the correct password is entered into the password input screen, the common alarm setting box 5025 of FIG. 109 is for example displayed. When the supervisor inputs the alarm conditions (alarm item, alarm reference) and the alarm value into the common alarm setting box 5025 and presses the "Set OK" button, the common alarm is set and the set common alarm data is transferred to the step-monitoring server 3300*a*. The step-monitoring server 3300*a* receives the common alarm data and stores it in the alarm value master table 3708*t*. A password is required in order to prevent any operator from setting the individual step operations. Only someone who is authorized to know the password can set the individual step operations.

The method for setting the alarm will be explained more specifically. In the alarm setting boxes 5022 and 5025, the supervisor specifies the items (alarm conditions {reference}) for which he wishes to sound the alarm from among "defective sector" to "supervisor", and inputs the number of occurrences of the specified items which will trigger the alarm in the "alarm value" box. The alarm will sound when the number of occurrences reaches the number specified in the alarm conditions. In the case where the alarm is to be sounded each time a specified item occurs rather than when the item has occurred a specified number of times, the symbol is entered in the "alarm value" box. For example, when the alarm value is "3", the alarm will sound when the specified alarm conditions have occurred three times and will thereafter sound each time the specified alarm conditions occur.

Figure 100:
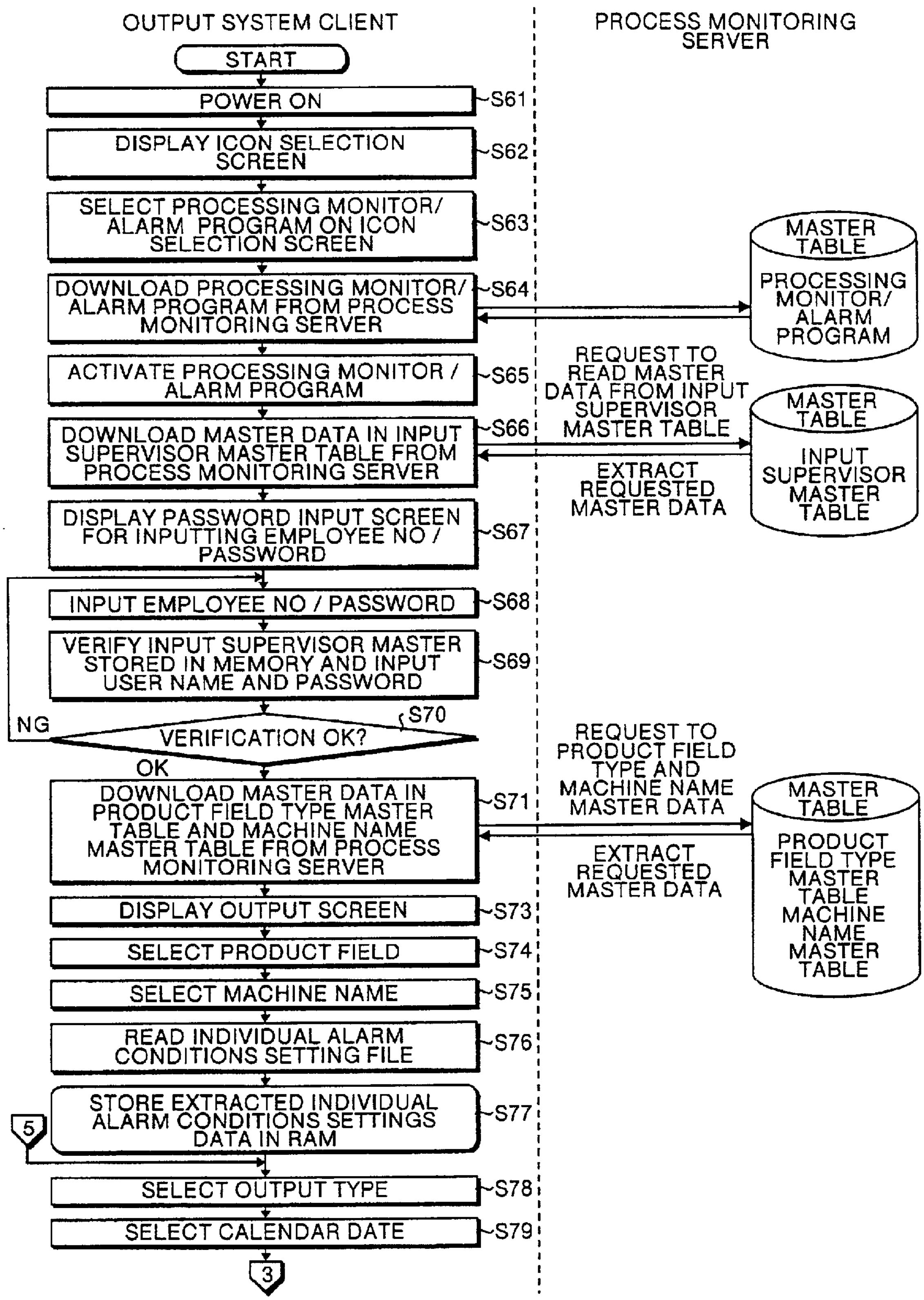
FIG. 100 is a flowchart showing a step-monitoring/alarm process of an output system client.

Subsequently, the step-monitoring/alarm processing will be explained based on the flowcharts of FIG. 100 to FIG. 105. In FIG. 100, when the supervisors of the manufacturing and production check section 3401, the component check section 3402, and the manufacturing technical section 3403 switch ON the power of the output system clients 3501 to 3503 (step S61), the program for production management system 3607*b* stored in the recording medium 3607 is opened into the RAM 3605 and activated, whereby the icon selection screen shown in FIG. 85 is displayed in the display section 3602 (step S62). When the step-monitoring/alarm program 3602*b* is selected from the icon selection screen (step S63), the step-monitoring/alarm program 3707*d* is downloaded from the step-monitoring server 3300*a* and stored in the RAM 3605 (step S64).

When the step-monitoring/alarm program 3708*c* stored in the RAM 3605 is activated (step S65), the master data of the input supervisor master table 3708*g* (employee No., name, password) is downloaded from the step-monitoring server 3300*a* and stored in the RAM 3605 (step S66). A password input screen such as that shown in FIG. 86 is displayed in the display section 3602 (step S66). The operators enter their passwords and employee numbers (step S67).

The password and employee number which have been input are compared with the master data (employee no., name, password) of the input supervisor master table 3708*g* stored in the RAM 3605 (step S68) to determine whether they are correct (step S68). When the input password and employee number are correct, processing proceeds to step S71. On the other hand, when the input password and employee number are incorrect, the processing returns to step S68 and the password and employee number are entered a second time.

Then, in step S71, master data from the product field master table 3708*c* (product field) and the name of machine type master table 3708*r* ("name of machine type", "Product field", "Production point", "Date when production started", "Server Name", "IP_Address", "DBName", "Head_NO_Flg" and "Mail Transmission") of the step-monitoring server 3300*a* are downloaded and stored in the RAM 3605 (step S72). As a result, a screen such as that shown in FIG. 106 is displayed (step S73). The product field master data of the product field master table 3708*c* is displayed in the "product field selection box" of the output screen, the name of machine type master data of the name of machine type master table 3708*a* is displayed in the "machine type selection box" 5003, and the machine type code data of the machine type code name master table 3708*a* is displayed in the "machine type code selection box" 5004. Furthermore, the output category data which is written in the step-monitoring/alarm program 3707*c* is displayed in the output category selection box 5005.

The product field of the "product field selection box" 5002 is selected (step S74) and the name of machine type is selected in the "machine type selection box" 5003 (step S75). The individual alarm conditions setting file which is stored in the recording medium 3607 is read (step S76) and the individual alarm conditions setting data is stored in the RAM 3605 (step S77). The output category is selected in the "output category selection box" 5005 (step S78) and the date is selected in the calendar 5006 (step S79).

Subsequently, in step S80 of FIG. 101, it is determined whether the retrieval conditions which are set in the "set update method" dialogue box 5020 (see FIG. 107) specify automatic retrieval or manual retrieval (step S80).

When it is determined that automatic retrieval has been set, it is determined whether the predetermined time interval has elapsed (step S81). When the predetermined time interval has elapsed, the processing shifts to step S81. On the other hand, when manual retrieval has been set, it is determined whether the execute retrieval key 5011 has been pressed (step S82). When the execute retrieval key 5001 has been pressed, the processing shifts to step S83.

In step S83, the alarm value master table 3708*t* ("No.", "Management sector", "Defective sector", "Name of step", "Defective Item", "Defect content 1", "Defect content 2", "Defect content 3", "LineOut", "Something strange", "Lank", "Responsible sector 1" "Responsible sector 2", "Responsible sector 3", "Repair supervisor", "Reoccurrence Prevention Contents", "Countermeasure supervisor", "Alarm value", "Alarm result", "Alarm time", and "Date of Mail transmission") of the step-monitoring server 3300*a* is downloaded (step S83) and stored in the RAM 3605 (step S84).

Quality data of the machine type and date which were specified in steps S74, S75, S78 and S79 are downloaded from the main data table 3709*d* ("No.", "Management sector", "Defective sector", "Name of step", "Defective Item", "Defect content 1", "Defect content 2", "Defect content 3", "LineOut", "Something strange", "Lank", "Responsible sector 1", "Responsible sector 2", "Responsible sector 3", "Repair supervisor", "Reoccurrence Prevention Contents", "Countermeasure supervisor", "Alarm value", "Alarm result", "Alarm time", and "Date of Mail transmission") and the in-processing defect content data table 3709*f* (name of machine type, factory name, No., defective item, defect content 1, defect content 2, defect content 3) of the step-monitoring server 3300*a* (step S85) and stored in the RAM 3605 (step S86). The quality data stored in the RAM 3605 is totalled in accordance with the output target selected in the "output category selection box" 5005 and the total result is stored in the RAM 3605 (step S87).

Figure 103:
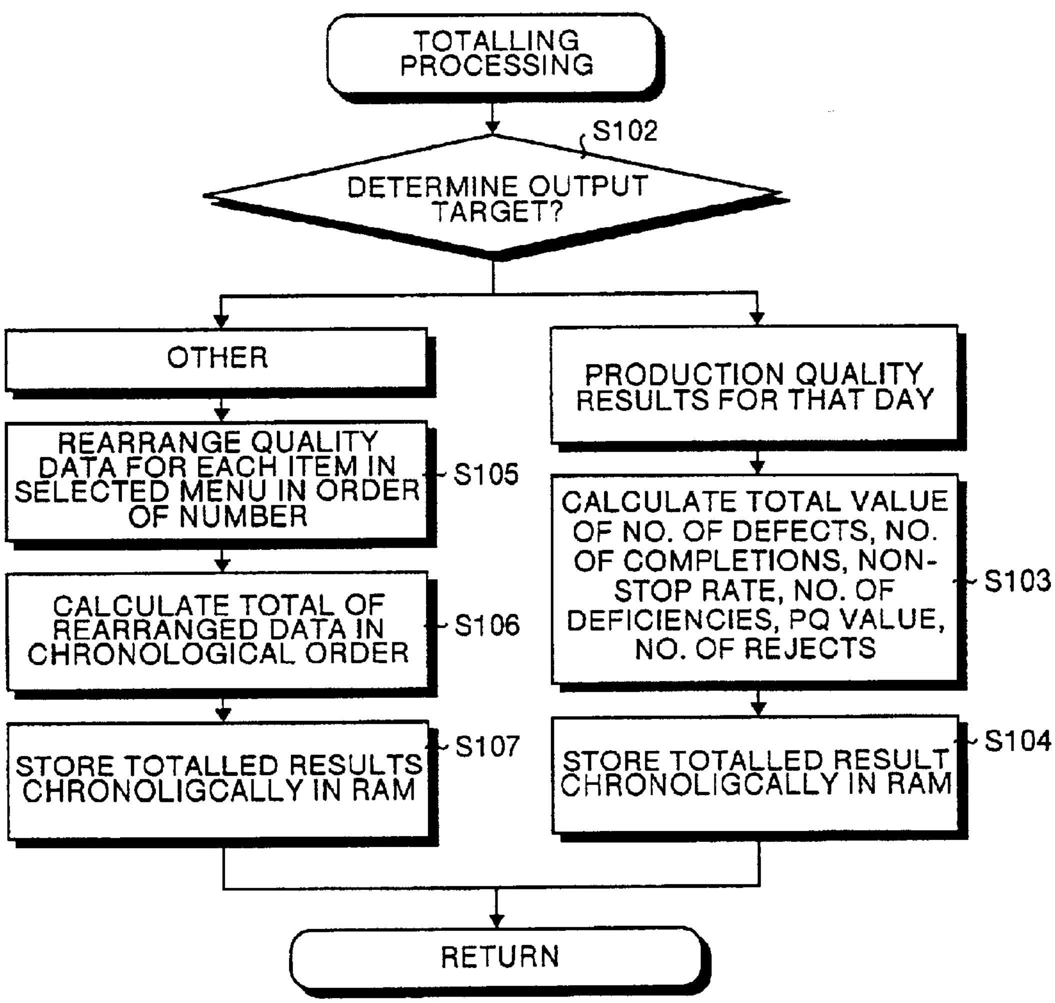
FIG. 103 is a flowchart showing a step-monitoring/alarm process of an output system client.

The processing contents of the above-mentioned step S87 will be explained more specifically based on the flowchart of FIG. 103. In FIG. 103, the output target selected in the "output category selection box" 5005 is determined (step S102), and when the output target selected in the "output category selection box" 5005 is "that day's production and quality results information", total values of the number of defects, the number of completions, the number of straight-throughs, the number of defectives, PQ value and the number of line rejects are calculated (step S103). The calculated total values are stored in chronological order in the RAM 3605 (step S104).

On the other hand, when the output target selected in the "output category selection box" 5005 is other than "that day's production and quality results information", the quality data for each of the items of the selected output target are arranged in order of the their frequency (step S105), and the arranged data are totalled in chronological order (step S106). Then, the totalled results are stored in the RAM 3605 in chronological order (step S107). Thereafter, in the step S88 of FIG. 101, the quality data and chronological totalled results which are RAM 3605 are displayed on the screen (step S88).

Figure 110:
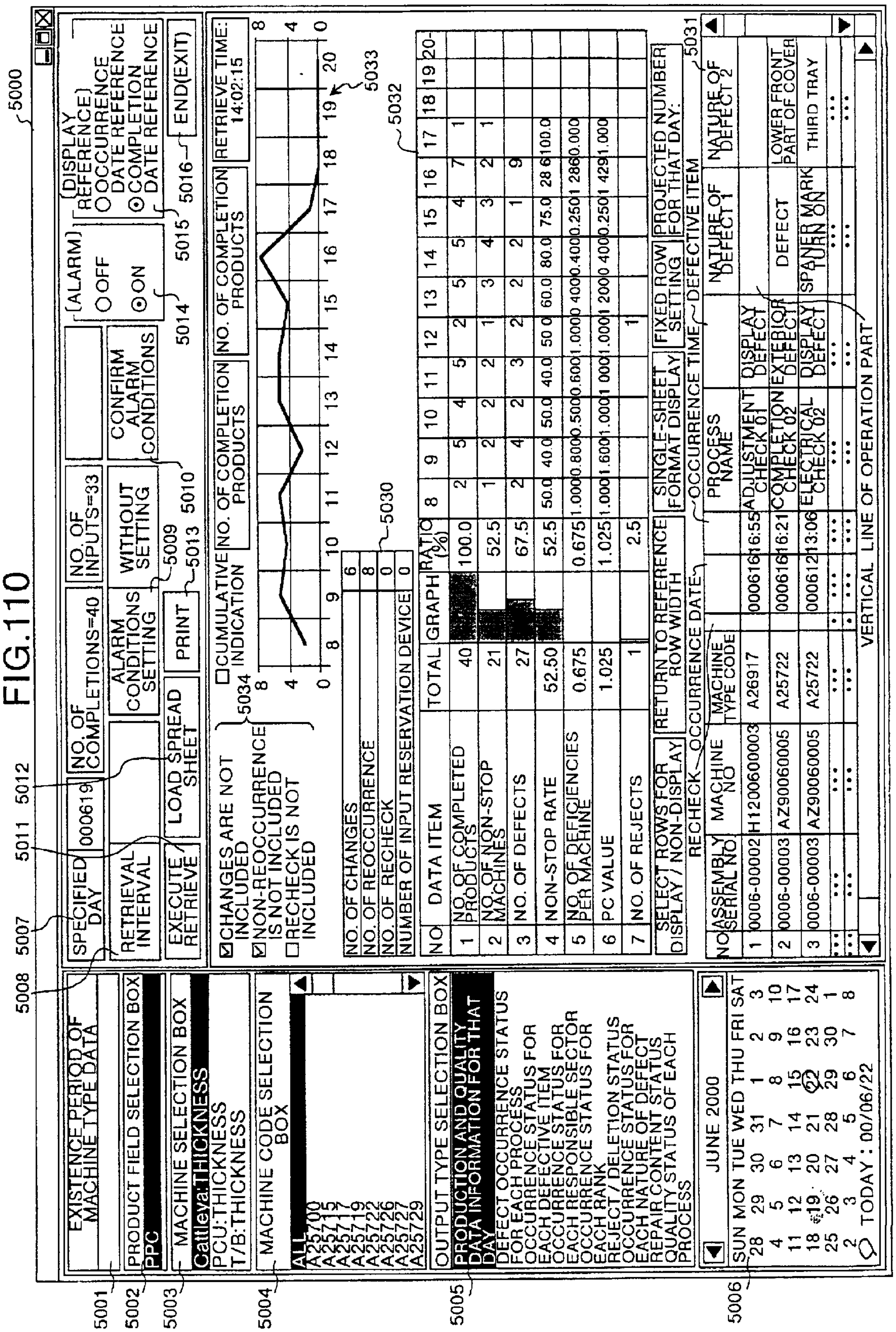
FIG. 110 is a flowchart showing a step-monitoring/alarm process of an output system client.

FIG. 110 shows an example of a screen display of quality data and chronological total results. In the example shown in FIG. 110, a list of the quality data (retrieved data and raw data) corresponding to the specified "name of machine type, machine type code and specified date" is displayed in the retrieved data display box 5031. The retrieved data display box 5031 contains items such as "No.", "installation serial number", "machine no.", "head no.", "redetection", "occurrence date", "process name", "defective item", "defect content", "line reject", "lank", "responsible sector", "cause of defect", "repair contents", "repair date", "reoccurrence prevention contents", "date of countermeasure", "time of countermeasure", and "supervisor". The operator can freely set which of these items to display in the retrieved data display box 5031. The operator can choose to display or not display data of specified items (rows) by specifying an item (row) in the retrieved data display box 5031 and pressing the "select display/do not display row" key 3203.

A list of the chronological total results is displayed in an output target display box 5032. The (calculation) conditions of the total number of defects displayed in the output target display box 5032 are specified in a check box 5034. A number of defects which excludes "something stranges" and "non-reoccurrences" can be obtained by selecting "do not include something stranges" and "do not include reoccurrences" in the check box 5034. The chronological data of an item selected from the items displayed in the output target display box 5032 is displayed in broken-line graph format in a graph display box 5033. More than one item may be displayed in broken-line graph format in a graph display box 5033, and chronological data of multiple items selected from the items displayed in the output target display box 5032 can be displayed. "Number of something stranges", "number of non-reoccurrences", "number of redetections" and "number of input holds" are displayed in a number display box 5030.

Figure 111:
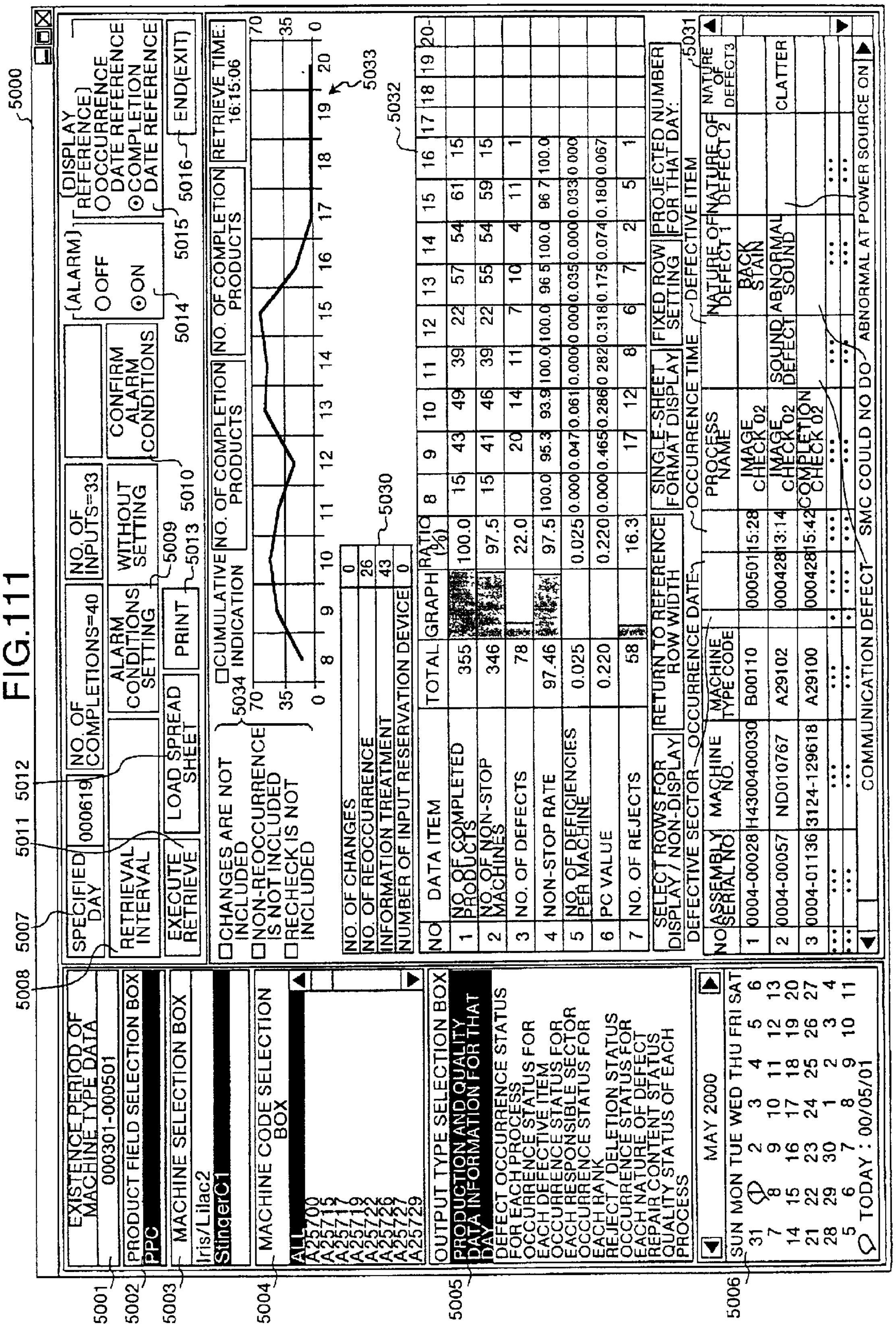
FIG. 111 is a flowchart showing a step-monitoring/alarm process of an output system client.

FIG. 111 shows a case when "all" is selected as the "machine type code", "May 1 (Step S1)," is selected as the specified date, and "that day's production and quality results information" is selected as the "output category". In the output target display box 5032 of FIG. 111, "Total number", "ratio", "line graph", "number of occurrences per time intervals (6 a.m. to 8 p.m.) are displayed in correspondence with the data items (number of products (completions), number of straight-throughs, number of defects, straight-through rate, defective rating, PQ value, number of rejects). Furthermore, the graph display box 5033 shows an example of the graph display when "number of product completions" is selected in the output target display box 5020.

The method for calculating the data items (1. number of products (completions), 2. number of straight-throughs, 3. number of defects, 4. straight-through rate, 5. defective rating, 6. PQ value, 7. number of rejects) displayed in the output target display box 5032 in the case when "that day's production and quality results information" is selected as the output category in the "output category selection box" 5005 will be explained in detail.

1. Number of completed products

The number of occurrences where "completion date" (or "completion time) is entered in main data table 3709*d* is counted and the total is displayed in the "Total" item. Further, (total number of completed products) (number of completed products)*100 is displayed numerically in the "ratio" item. The total result of the above "ratio" is displayed in graph format in the "line graph" item. Moreover, the number of shifts in the number of occurrences per time interval on the specified date is displayed in the "number of occurrences per time interval" item. This time interval can be set to one-hour or thirty minutes (the screen display shows a one-hour interval). The "number of occurrences per time interval" is counted by using the "completion time" of the main data table 3709*d*.

2. Number of Straight-Throughs

The number calculated by (total number of completed products)−(count number of products for which "number of defects" in the main data table is entered) is displayed in the "total" item. The numerical result of (number of straight-throughs number of completed products)*100 is displayed in the "ratio" item. The calculated total of the ratio is displayed in the "line graph" item. The reference length of the "line graphs is the above "number of completed products". The "number of occurrences per time interval" is counted by using the "completion time" of the main data table 3709*d* to count the number of completed products.

3. Number of defects

Figure 112:
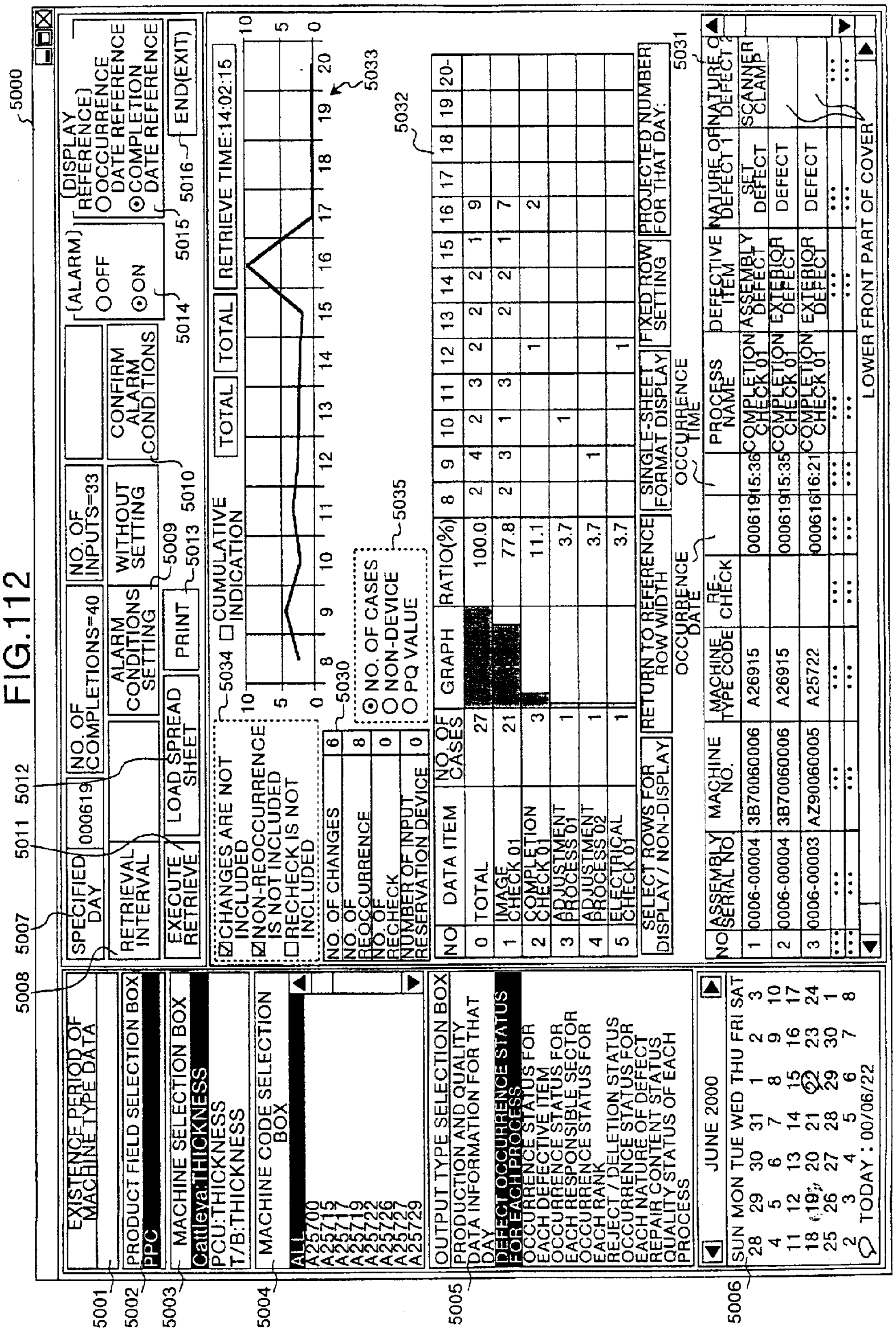
FIG. 112 is a flowchart showing a step-monitoring/alarm process of an output system client.

The calculated result of (count value of the "defective item" in the in-processing defect data table 3709*f*)−(count value of items having a flag for "something strange" or "non-reoccurrence" in the in-processing defect data table 3709*f*) is displayed numerically as the "total" of the "number of defects". In this case, as shown in FIG. 112, check marks for "do not include something stranges" and "do not include non-reoccurrences" are inserted beforehand in the check box 5034 prior to activation, hence the above equation for calculation. The equation calculated when these check marks are not inserted will be explained later. ("Total" number of defects) ("total" number of completed products) *100 is displayed numerically in the "ratio" item. The result of the above "ratio" is displayed in graph format in the "line graph" item. The "number of occurrences per time interval is obtained by counting and displaying the number of defects based on the "occurrence time" in the in-processing defect content data table 3709*f*.

When the mark for "do not include something stranges" is not inserted in the check box 5034, the "number of something stranges" in the main data table 3709*d* is also used, whereby the equation for calculating "number of defects" becomes "number of defects"+"number of something stranges". When the mark for "do not include non-reoccurrences" is not inserted in the check box 5034, the "number of non-reoccurrences" in the main data table 3709*d* is also used, whereby the equation for calculating "number of defects" becomes "number of defects"+"number of non-reoccurrences".

When the mark for "do not include redetections" is not inserted in the check box 5034, the "number of redetections" in the main data table 3709*d* is also used, whereby the equation for calculating "number of defects" becomes "number of defects"+"number of redetections". Multiple items can be selected in the check box 5034. In each case, the calculation for "number of defects" becomes "number of defects"−(added value of checked cases). FIG. 72 shows an example of the display when "do not include something stranges", "do not include reoccurrences" and "do not include redetections" are not checked in the check box 5034.

4. Straight-Through Rate ("Total" number of straight-throughs) ("total" number of completed products)*100 is displayed numerically as the "Total". The "ratio" is the same as the "total". The "ratio" is displayed in graph format in the "line graph" item. The display method is the same as that described above. The result per hour is displayed numerically in each hourly cell by calculating (hourly number of straight-throughs) (hourly number of completed products)*100.

5. Defective Rating

The result of the calculation ("total number of defects") (total number of completed products) is displayed in the "total" item. The same number is displayed in the "ratio" item. The "line graph" is not displayed. The result of the calculation (hourly result of "number of defects") (hourly result of "number of completed products") is displayed in each cell of "number of occurrences per hour".

6. PQ value

The result of the calculation (number of "defective items" in the in-processing defect data table) (total number of "completed products") is displayed in the "total" item. The same number is displayed in "ratio". The "line graph" is not displayed. The numbers displayed in the specified hourly and daily cells of the "hourly number of occurrences" are obtained from the result of the calculation (value obtained by counting the "defective item" in the "in-processing defect data table" per specified hours/days by using the "occurrence time" {or "occurrence date"}) (value obtained by counting the "number of completed products" per specified hours/days).

7. Number of Rejects

The data in the main data table 3709*d* which have an entry for "line output Flg" ("1" representing a line rejection, "2" representing a reject which has been returned to the line) are counted and displayed numerically in the "total" box. The result of the calculation ((the above "Total" number") (the "total" number of completed products))*100 is displayed in the "ratio" box. A graph based on the "ratio" is displayed in the "line graph" box. the "completion time" (or "completion date") in the main data table 3709*d* when there is a "line out" in the main data table 3709*d* is displayed in the hourly and daily cells of the "number of occurrences per hour" box.

FIG. 112 shows an example of the output screen in the case where "in-processing defect occurrence state" has been selected in the output category selection box 5005. As shown in FIG. 112, when "in-processing defect occurrence state" has been selected, the "number of occurrences", "line graph", "ratio", and "hourly number of occurrences" are displayed in the output target display box 5032 for each of the step names (total, image check 01, adjustment step 02, electrical check 01, completion check 01).

Here, the "step names" are counted by using the "step name", "occurrence date", and "occurrence time" in the in-processing defect content data table 3709*f*. The number of step names and the number of totals are displayed. The number of occurrences here is obtained by counting the "step names"*"occurrence date". The "ratio" is calculated by the equation (number of step names Total number of occurrences)*100. The "ratio" of the Total is "Total number of occurrences Total number of occurrences"*100. The "line graph" is obtained by using this "ratio". The number of occurrences at each time is counted for "step names"* "occurrence date"*"occurrence time" and displayed numerically in each cell.

As described above, by selecting "do not include something strange" and "do not include non-reoccurrences" in the check box 5034, these can be excluded in counting the number of defects. By selecting "do not include redetections" in the check box 5034, the "redetections" can be excluded from the count of "step names" by using the "redetections" of the in-processing defect content data table 3709*f*.

In FIG. 112, a radio button 5035 is provided for selecting the category of data to be displayed in the output target display box 5032. The data of items ("number of occurrences", "defectives" "PQ value") selected by the radio button 5035 is displayed in the output target display box 5032. The equation calculated in each case is the same as the "that day's production and quality result information" mentioned above. FIG. 112 shows an example wherein "number of occurrences" has been selected by using the radio button 5035.

Figure 113:
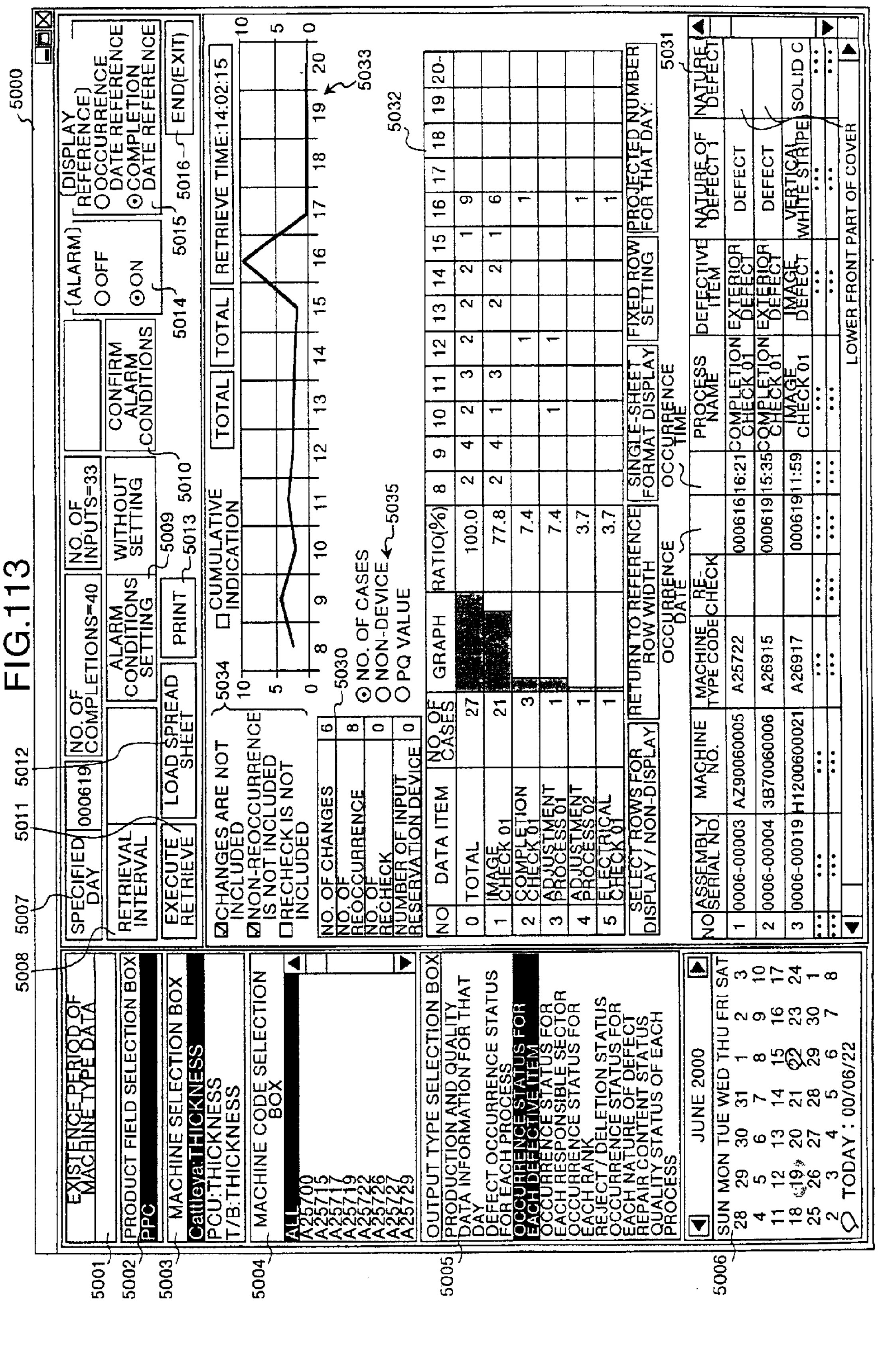
FIG. 113 is a flowchart showing a step-monitoring/alarm process of an output system client.

FIG. 113 shows an example of an output screen which is displayed when "occurrence states for individual defective items" has been selected in the output category selection box 5005. As shown in FIG. 113, when "occurrence states for individual defective items" has been selected, "number of occurrences", "line graph", "ratio" and "number of occurrences per time interval" for each of the defective item names (total, image defect, display defect, operation defect, carrying defect, installation defect, abnormal sound, and adjustment defect) are displayed in the output target display box 5032.

The "defective item names" are counted by using the "defective item", "date of occurrence" and "time of occurrence" in the in-processing defect content data table 3709*f*. The "total" number of occurrences obtained by totalling the number of occurrences of each item and the number of items is displayed. The number of occurrences is counted by calculating the equation "defective items"*"date of occurrence". The "ratio" is calculated by the equation (number of cases in the steps Total number of cases)*100. The total ratio number becomes (Total number of cases Total number of cases)*100. The "line graph" comprises a graph obtained by using the "ratio" number. In "number of cases per time", the number of cases in each time is counted in "defective items"*"date of occurrence"*"time of occurrence" and displayed numerically in each cell.

When "number of cases", "number of defectives" and "PQ value" are selected by the radio button 5035, the contents of the defective items are displayed in correspondence with the selected information. The equations are the same as that for "that's production and quality result information" described above. FIG. 74 shows an example where "number of cases" has been selected by the radio button 5053.

A number of defects excluding something stranges and non-reoccurrences can be calculated by selecting the check boxes for "do not include something stranges" and "do not include non-reoccurrences" in the check box 5034. The exclusive equation is the same as that mentioned above. When "do not include redetections" is selected in the check box 5034, "defective items" without the "number of redetections" entered therein is selected and by using the "number of redetections" of the in-processing defect data table 3709*f*, and the various calculations are carried out.

Figure 114:
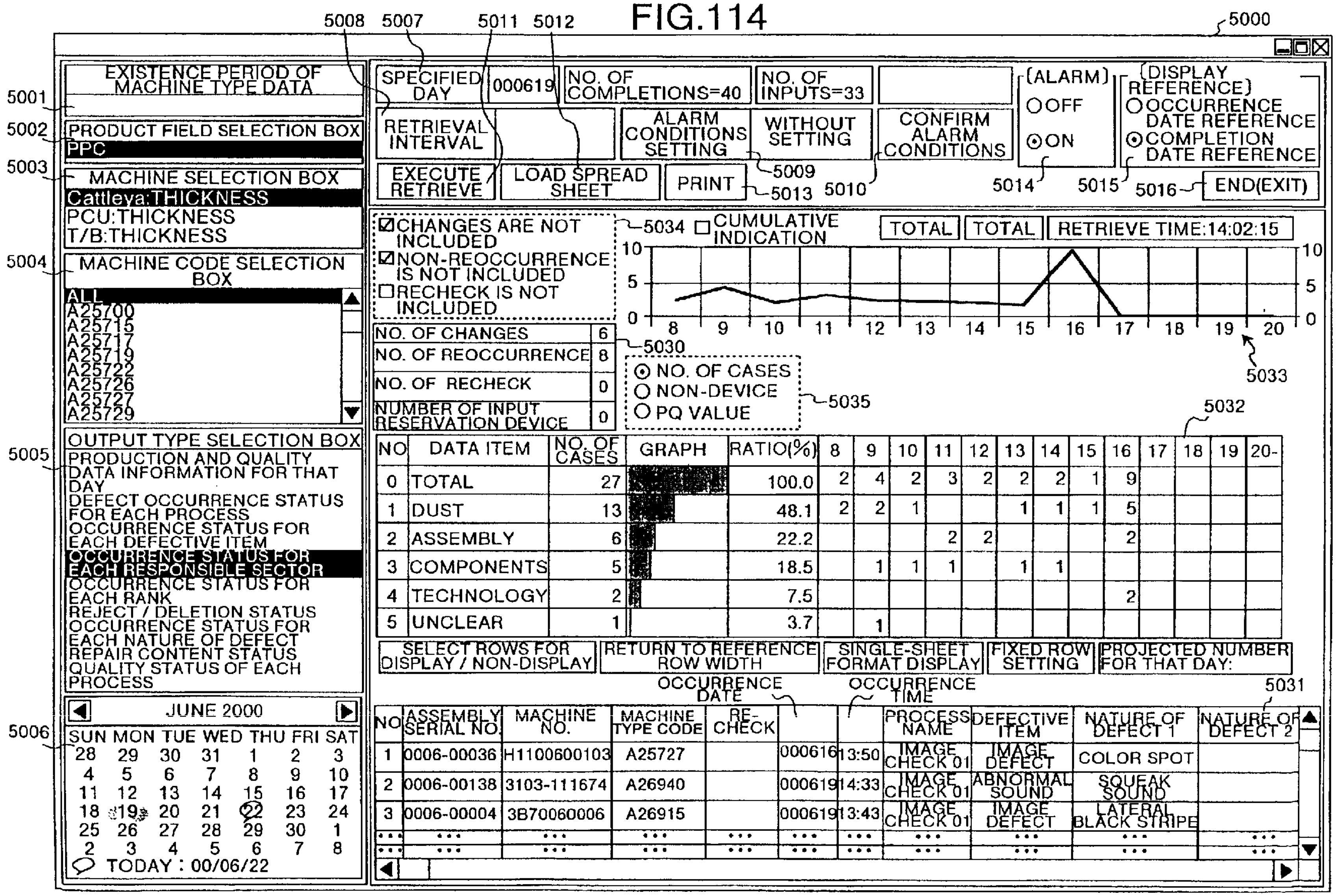
FIG. 114 is a flowchart showing a step-monitoring/alarm process of an output system client.

FIG. 114 shows an example of a display on an output screen when "occurrence status for individual responsible sector" is selected in the output category selection box 5005. As shown in FIG. 114, when "occurrence status for individual responsible sector" is selected, "number of cases", "line graph", "ratio", and "number of cases per time" are displayed in the output target display box 5032 for each of the responsible sectors (total, garbage, assembly, technology, unknown, non-input responsible sector, and component).

The "total" and "items" of the "responsible sector" are counted by using the "responsible sectors 1, 2 and 3," "date of occurrence" and "time of occurrence" of the in-processing defect data table 3709*f*. The "number of cases" of each item displays the total number. The equation counts the "number of cases" by calculating "responsible sectors 1, 2 and 3"*"date of occurrence". The "ratio" number is calculated by (number of cases in the steps Total number of cases)*100. The "line graph" comprises a graph obtained by using this "ratio" number. In "number of cases per time", the number of cases per time is counted in "responsible sectors 1, 2 and 3"*"date of occurrence"*"time of occurrence" and displayed numerically in each cell.

When "number of cases", "number of defectives" and "PQ value" are selected by the radio button 5035, the contents of the defective items are displayed in correspondence with the selected information. The equations are the same as that for "that's production and quality result information" described above. FIG. 114 shows an example where "number of cases" has been selected by the radio button 5053.

A number of defects excluding something stranges and non-reoccurrences can be calculated by selecting the check boxes for "do not include something stranges" and "do not include non-reoccurrences" in the check box 5034. The exclusive equation is the same as that mentioned above. When "do not include redetections" is selected in the check box 5034, "defective items" without the "number of redetections" entered therein is selected by using the "number of redetections" of the in-processing defect data table 3709*f*, and the various calculations are carried out.

Figure 115:
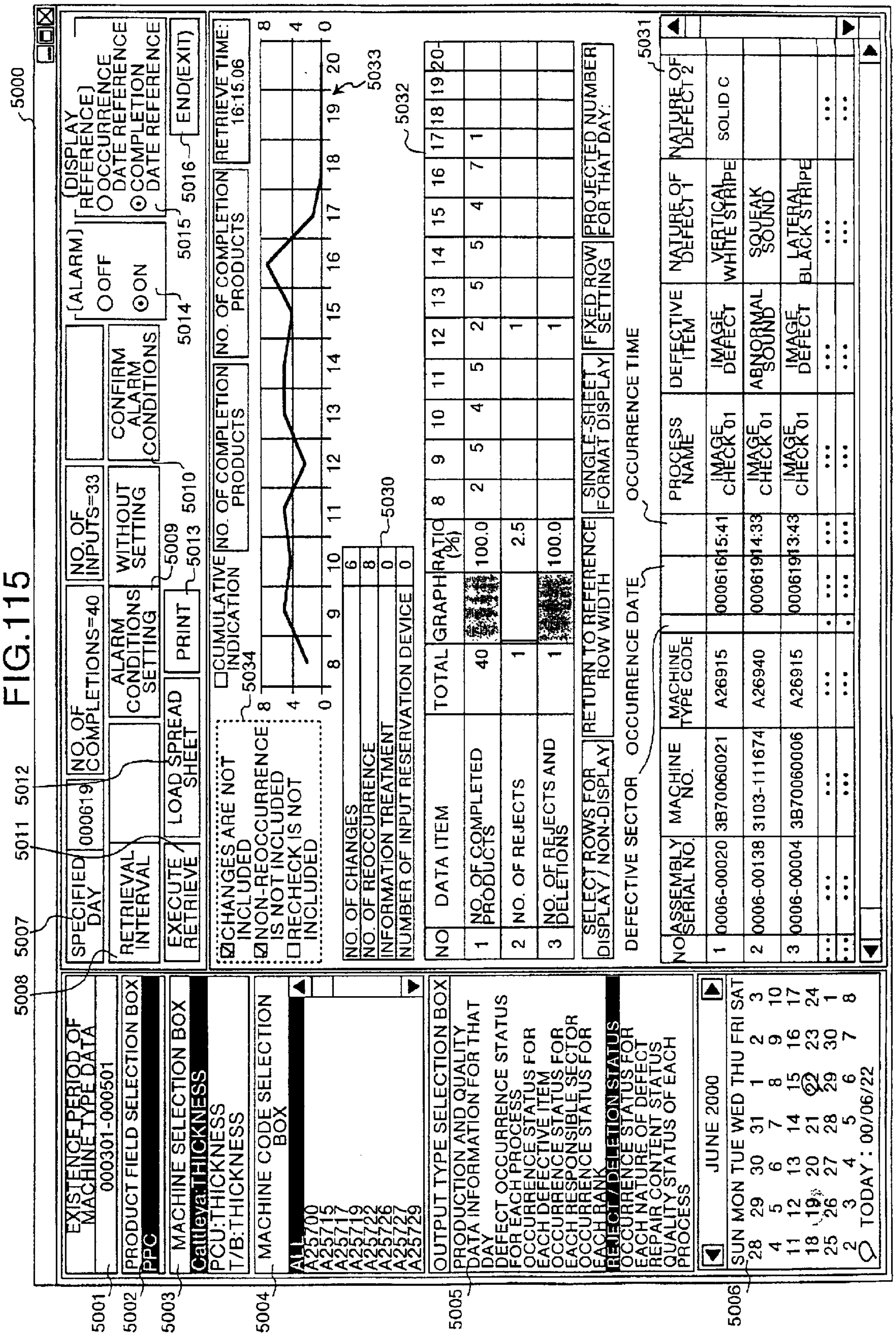
FIG. 115 is a flowchart showing a step-monitoring/alarm process of an output system client.

FIG. 115 shows an example of a display on an output screen when "line reject/elimination status" has been selected in the output category selection box 5005. As shown in FIG. 115, when "line reject/elimination status" has been selected, "number of cases", "line graph", "ratio", and "number of cases per time" are displayed in the output target display box 5032 for each of the data items (number of completed products, number of line rejects, number of line eliminations).

The "number of completed products", "number of line rejects" and "number of line eliminations" of the "data items" are counted by using the "LineoutFlg", "date of installation start", "time of installation start", "completion date" and "completion time" of the main data table 3709*d*. The "number of cases" of, the "number of completed products" is the number of "completion dates" in the main data table 3709*d*. The "ratio" of the "number of completed products" is divided by the number of "completion dates" in the main data table 3709*d* and displayed as a percentage. The "number of cases per time" of the "number of completed products" is counted by using the "completion time" of the main data table 3709*d*. The "number of cases" of the "number of line rejects" counts the "LineoutFlg"*"Installation start date" of the main data table 3709*d*. The ratio (percentage) of the "number of line rejects" numerically displays the result of the calculation ((number of line rejects) (number of completed products))*100. The "number of cases per time" of the "number of line rejects" is counted by using the "installation start time" of the main data table 3709*d*, and is numerically displayed in each time cell. The "number of cases" of "number of line eliminations" is counted by calculating "LineoutFlg"*"completion date" in the main data table 3709*d*. The "ratio" (percentage) of the "number of line eliminations" is obtained by calculating the equation (number of cases of "number of line eliminations" number of cases of "number of completed products")*100, and the numerical result is displayed. The "number of cases per time" of the "number of line eliminations" is counted by using the "completion time" in the main data table 3709*d*, and is displayed numerically in each time cell.

A number of defects which excludes something strange and non-reoccurrences can be calculated by selecting the check boxes for "do not include something stranges" and "do not include non-reoccurrences" in the check box 5034. The exclusive equation is the same as that mentioned above. When "do not include redetections" is selected in the check box 5034, "responsible sectors 1, 2 and 3" without the " number of redetections" entered therein is selected by using the "number of redetections" of the in-processing defect data table 3709*f*, and the various calculations are carried out.

Figure 116:
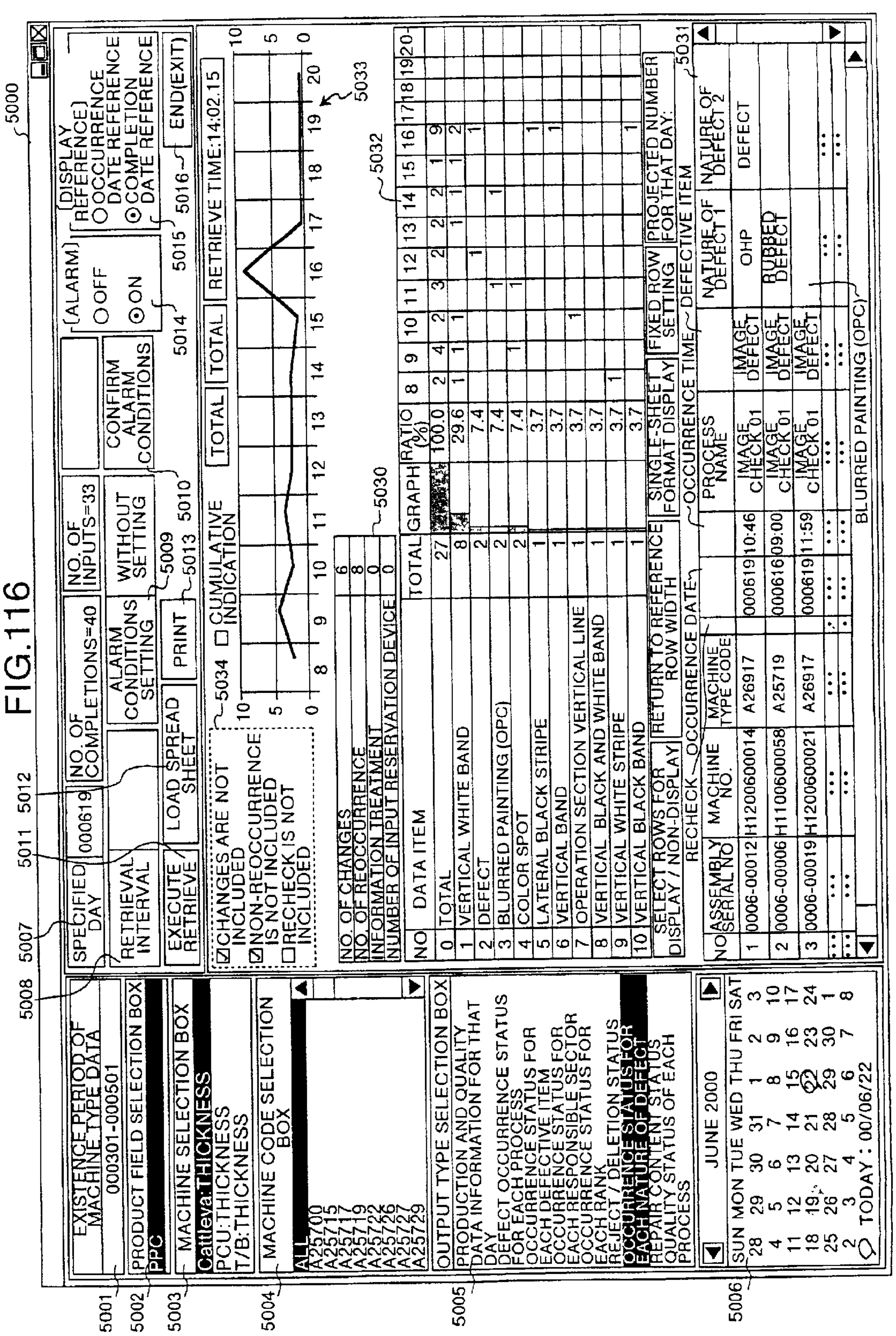
FIG. 116 is a flowchart showing a step-monitoring/alarm process of an output system client.

FIG. 116 shows an example of a display on the output screen when "individual defect content occurrence status"

has been selected in the output category selection box 5005. As shown in FIG. 116, when "individual defect content occurrence status" has been selected, the "number of cases", "line graph", "ratio" and "number of cases per time" are displayed in the output target display box 5032 for each of the defect contents (total, vertical white band, scratch, paint unevenness (OPC), color scattering, horizontal black numbers, vertical band, operating section vertical line vertical white and black band, vertical white numbers, vertical black band).

The "defect content names" are counted by using the "defect contents 1, 2 and 3", the "occurrence date" and "occurrence time" in the in-processing defect content data table 3709*f*. The "number of cases" of the items and the total number are displayed. The "ratio" becomes (number of cases of the contents Total number of cases)*100. The total "ratio" number becomes (total number of cases total number of cases)*100. The "line graph" displays this "ratio" number in graph format. The "number of cases per time" is obtained by counting the number of cases in each time by the calculation "defect contents 1, 2 and 3"*"date of occurrence"*"time of occurrence", and these are numerically displayed in each cell.

A number of defects which excludes something strange and non-reoccurrences can be calculated by selecting the check boxes for "do not include something stranges" and "do not include non-reoccurrences" in the check box 5034. The equation is the same as that described above. When "do not include redetections" is selected in the check box 5034, "responsible sectors 1, 2 and 3" without the "number of redetections" entered therein is selected by using the "number of redetections" of the in-processing defect data table 3709*f*, and the various calculations are carried out.

Figure 117:
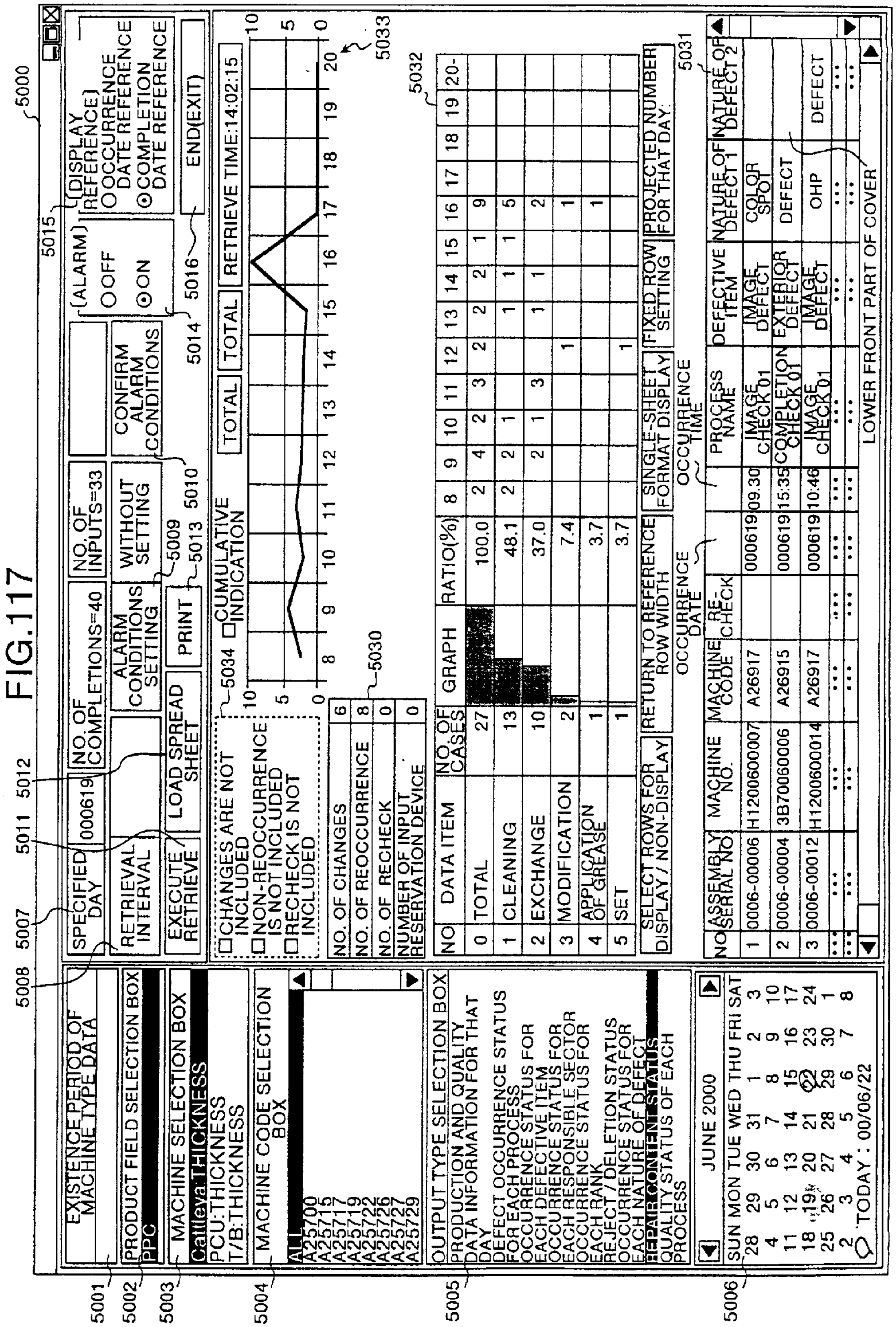
FIG. 117 is a flowchart showing a step-monitoring/alarm process of an output system client.

FIG. 117 shows an example of a display on the output screen when "repair content status" has been selected in the output category selection box 5005. As shown in FIG. 117, when "repair content status" has been selected, the "number of cases", "line graph", "ratio" and "number of cases per time" are displayed in the output target display box 5032 for each of the defect contents (total, cleaning, replacement, revision, grease coating, set).

The "repair contents names" are counted by using "repair contents 1, 2 and 3", "repair date", and "repair time" in the in-processing defect data table 3709*f*. The "number of cases" of the items and the total number of cases are displayed. The calculated to obtain the "ratio" becomes (number of cases of the contents Total number of cases)*100. The total "ratio" number becomes (total number of cases total number of cases) *100. The "line graph" displays this "ratio" number in graph format. The "number of cases per time" is obtained by counting the number of cases in each time by the calculation "repair contents 1, 2 and 3"*"repair date"*"repair time", and these are numerically displayed in each cell.

A number of defects which excludes something strange and non-reoccurrences can be calculated by selecting the check boxes for "do not include something strange" and "do not include non-reoccurrences" in the check box 5034. The equation is the same as that described above. When "do not include redetections" is selected in the check box 5034, "responsible sectors 1, 2 and 3" without the "number of redetections" entered therein is selected by using the "number of redetections" of the in-processing defect data table 3709*f*, and the various calculations are carried out.

Figure 118:
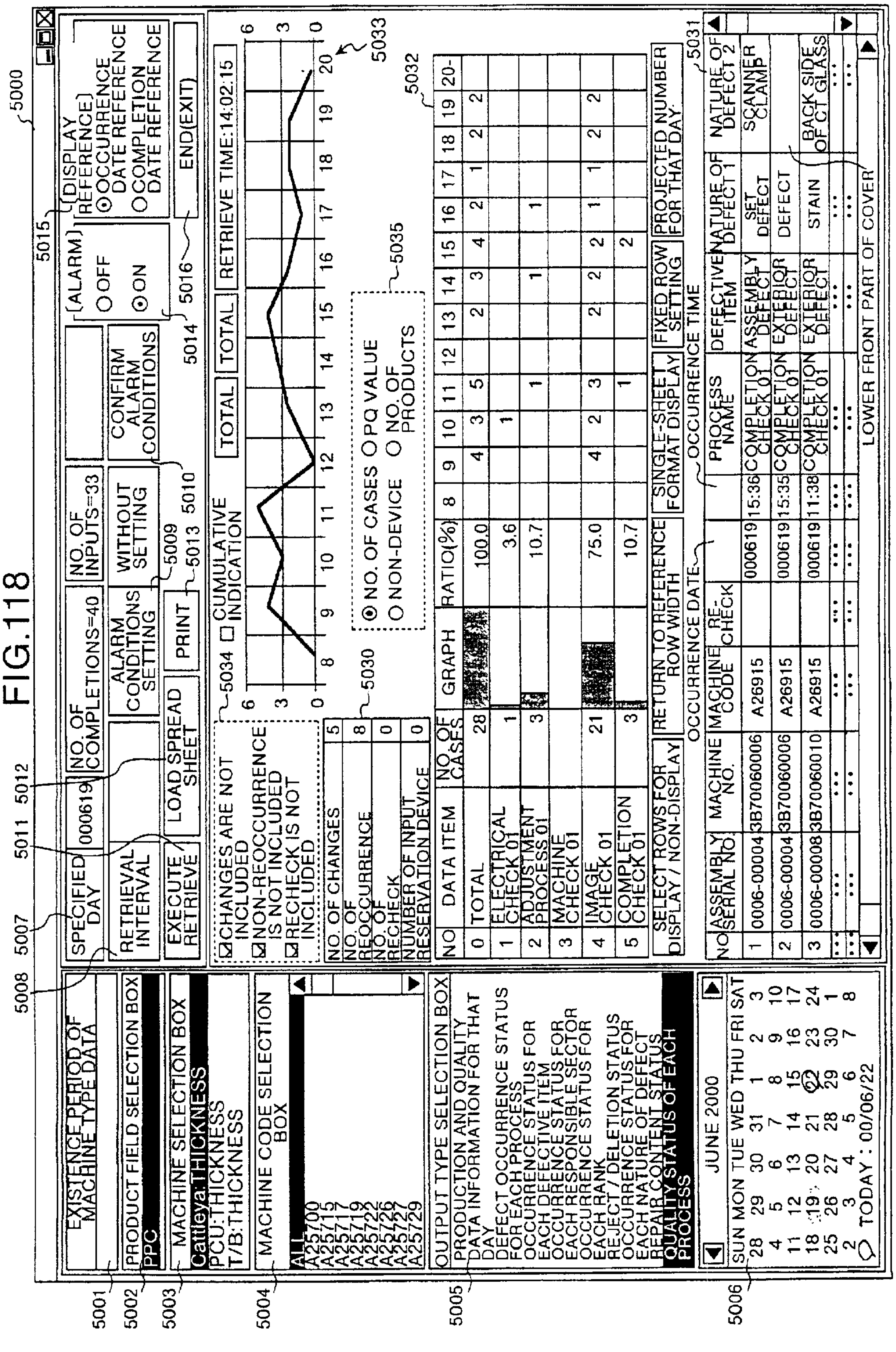
FIG. 118 is a flowchart showing a step-monitoring/alarm process of an output system client.
Figure 119:
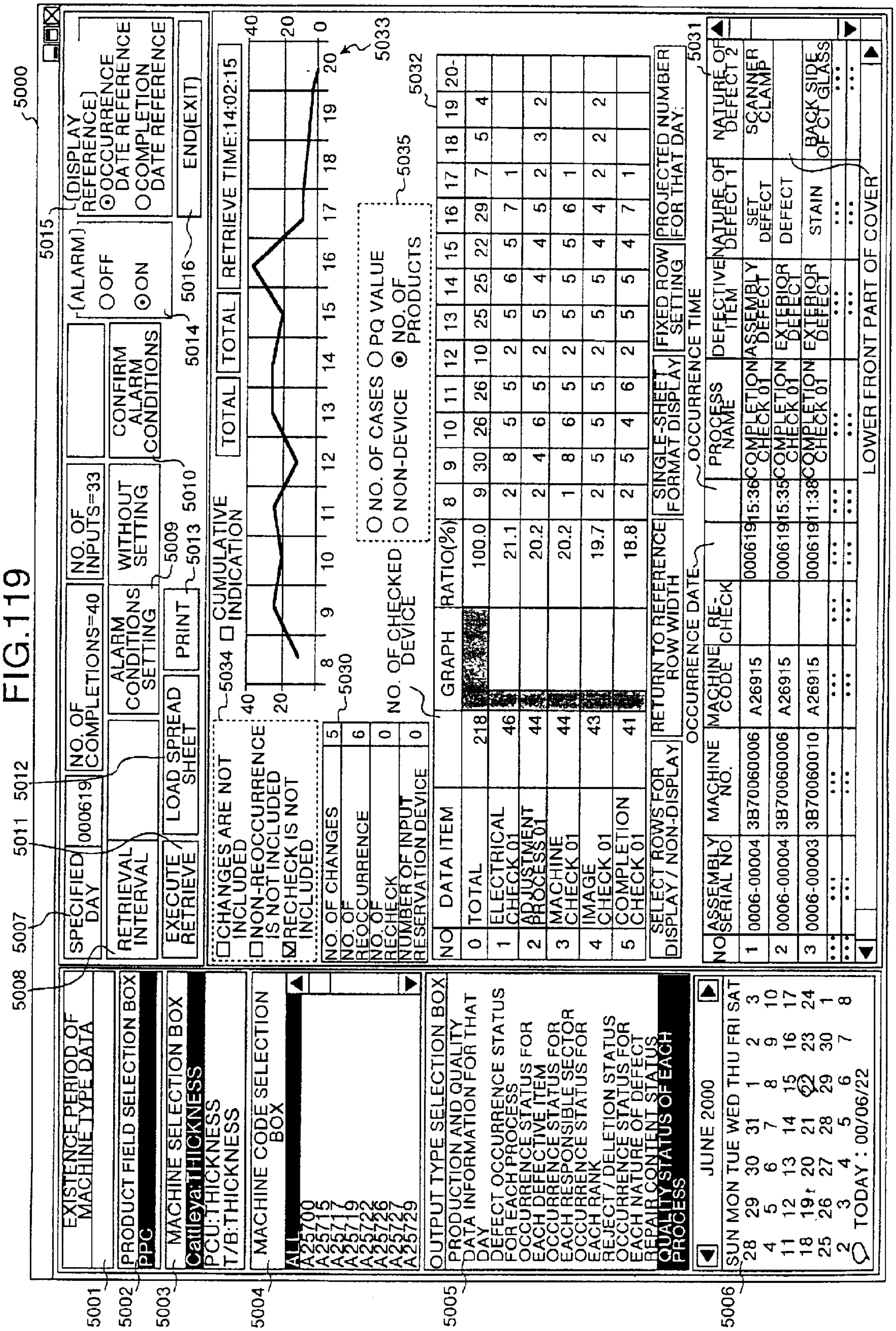
FIG. 119 is a flowchart showing a step-monitoring/alarm process of an output system client.
Figure 120:
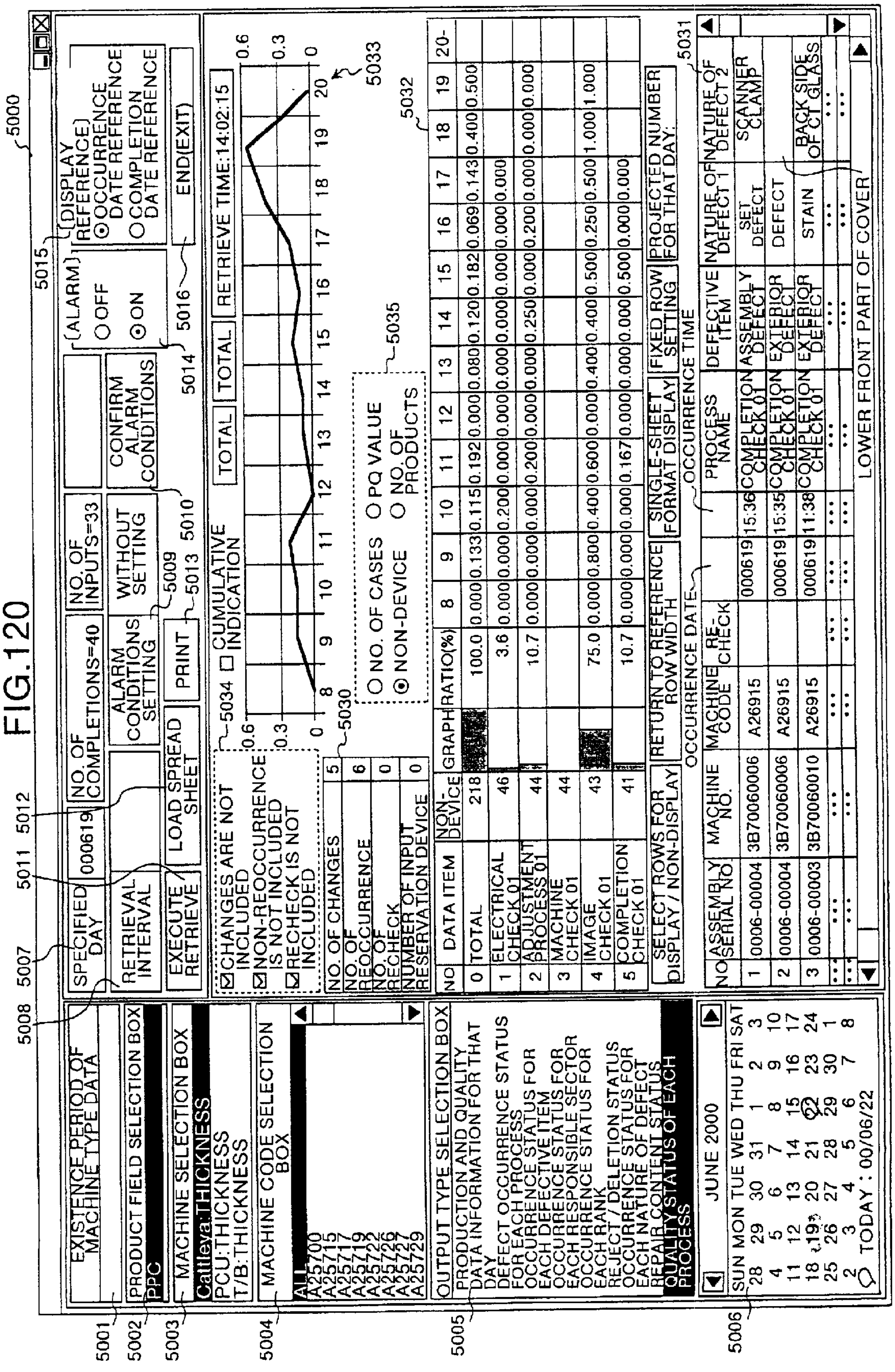
Figure 121:
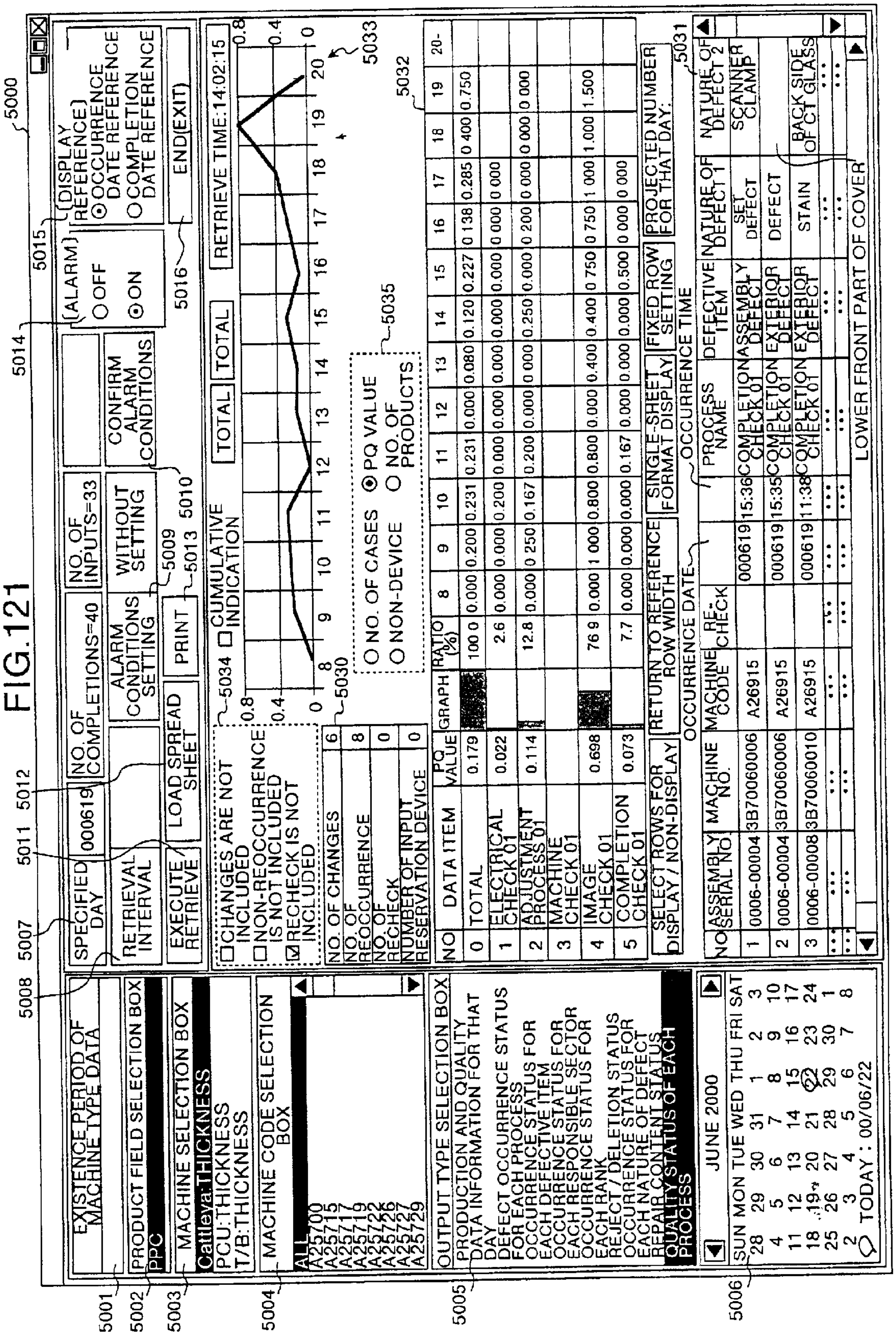

FIG. 118 to FIG. 121 are diagrams showing examples of displays on the output screen when "individual step quality status" is selected in the output category selection box 5005. As shown in FIG. 118 to FIG. 121, when "individual step quality status" has been selected, "number of cases, defectives, PQ value, and number of units", "line graph", "ratio", "number of cases per time" are displayed in the output target display box 5032 for each of the steps (total, electrical check 01, adjustment check 01, mechanical check 01, image check 01, completion check 01). FIG. 118 shows an example in which "do not include something stranges", "do not include non-reoccurrences" and "do not include redetections" have been selected in the check box 5034, and "number of cases" has been selected in the radio button 5035. FIG. 119 shows an example in which "do not include redetections" has been selected in the check box 5034 and "number of units" has been selected in the radio button 5035. FIG. 120 shows an example in which "do not include something stranges", "do not include non-reoccurrences" and "do not include redetections" have been selected in the check box 5034, and "defectives" has been selected in the radio button 5035. FIG. 121 shows an example in which "do not include redetections" has been selected in the check box 5034 and "PQ value" has been selected in the radio button 5035.

Figure 101:
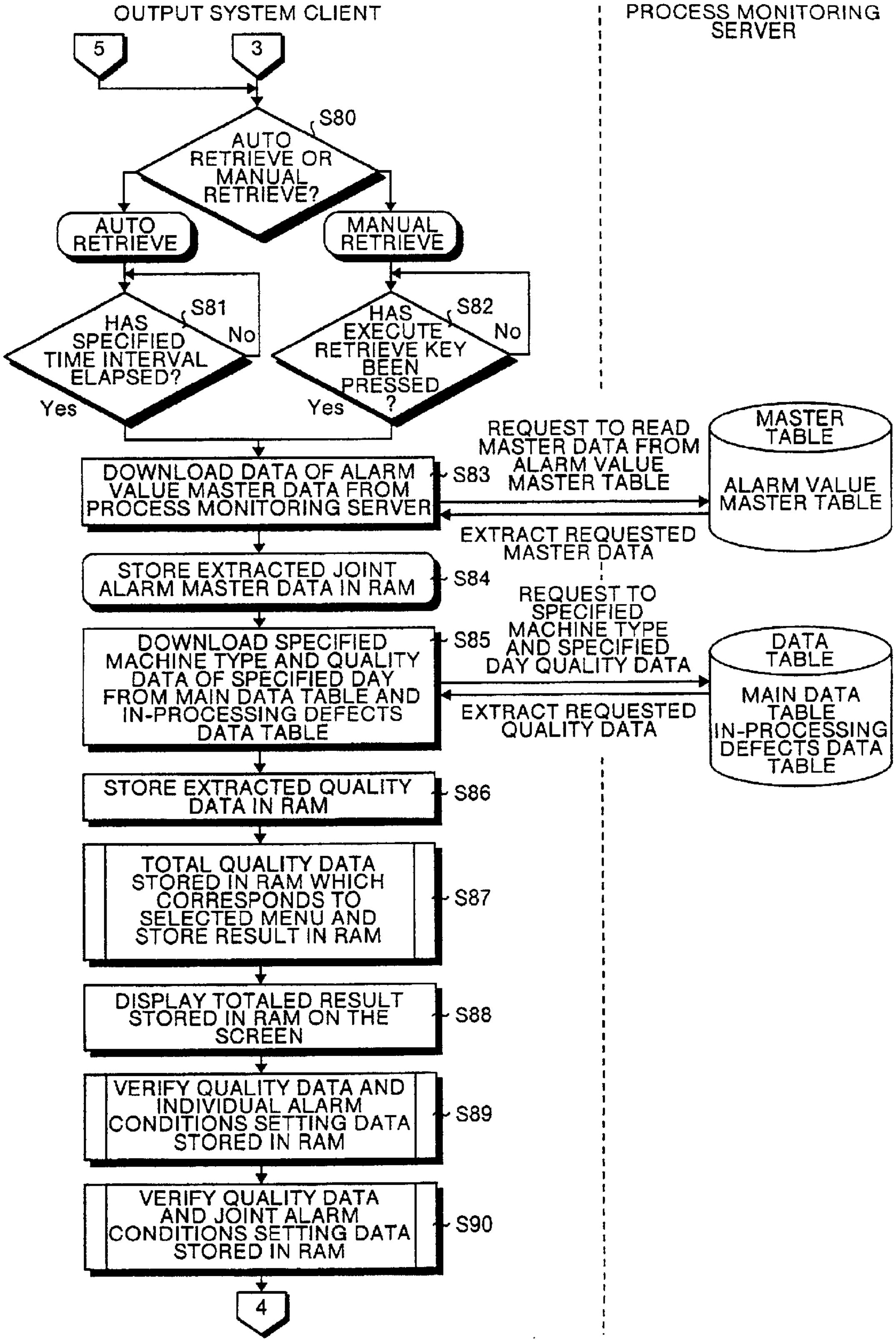
FIG. 101 is a flowchart showing a step-monitoring/alarm process of an output system client.
Figure 104:
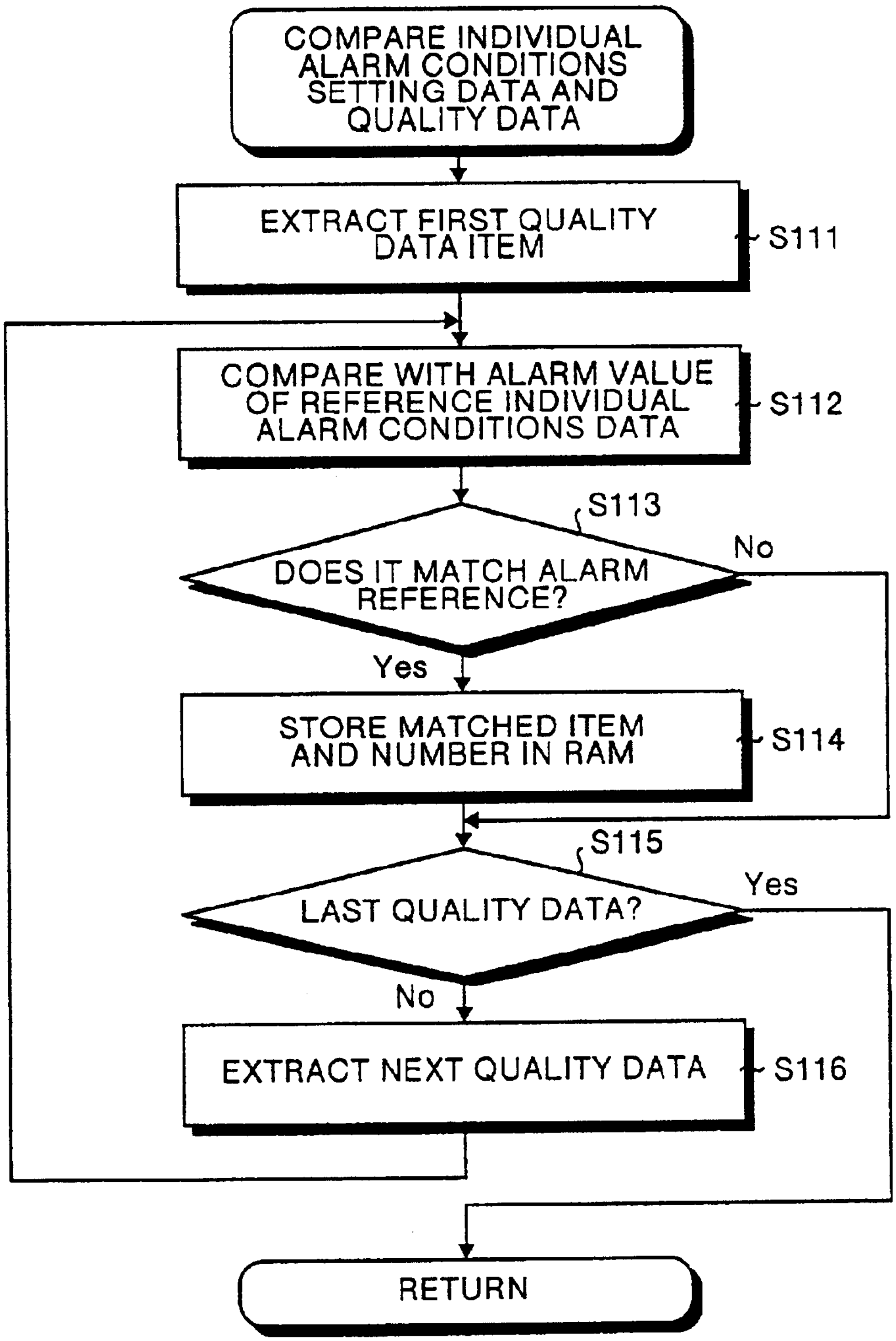
FIG. 104 is a flowchart showing a step-monitoring/alarm process of an output system client.

In step S89 of FIG. 101, the identification information conditions setting data stored in the RAM 3605 is compared with the quality data. The specific contents of this process will be explained based on the flowchart of FIG. 104. In FIG. 104, the first data of the quality data is extracted (step S111) and compared with the alarm reference of the individual alarm conditions data (step S112) in order to determine whether the data corresponds to the alarm reference (step S113). When it is determined that the data does not correspond to the alarm reference, the processing shifts to step S115. On the other hand, when the data does correspond to the reference, the corresponding item and number of cases are stored in the RAM 3605 (step S114) before proceeding to step S115.

In step S115, it is determined whether this is the last quality data, and if so, the process returns. On the other hand, when this is not the last quality data, the next data is extracted (step S116) and the sequence returns to step S112 and the same processes are repeated until the quality data ends.

Figure 105:
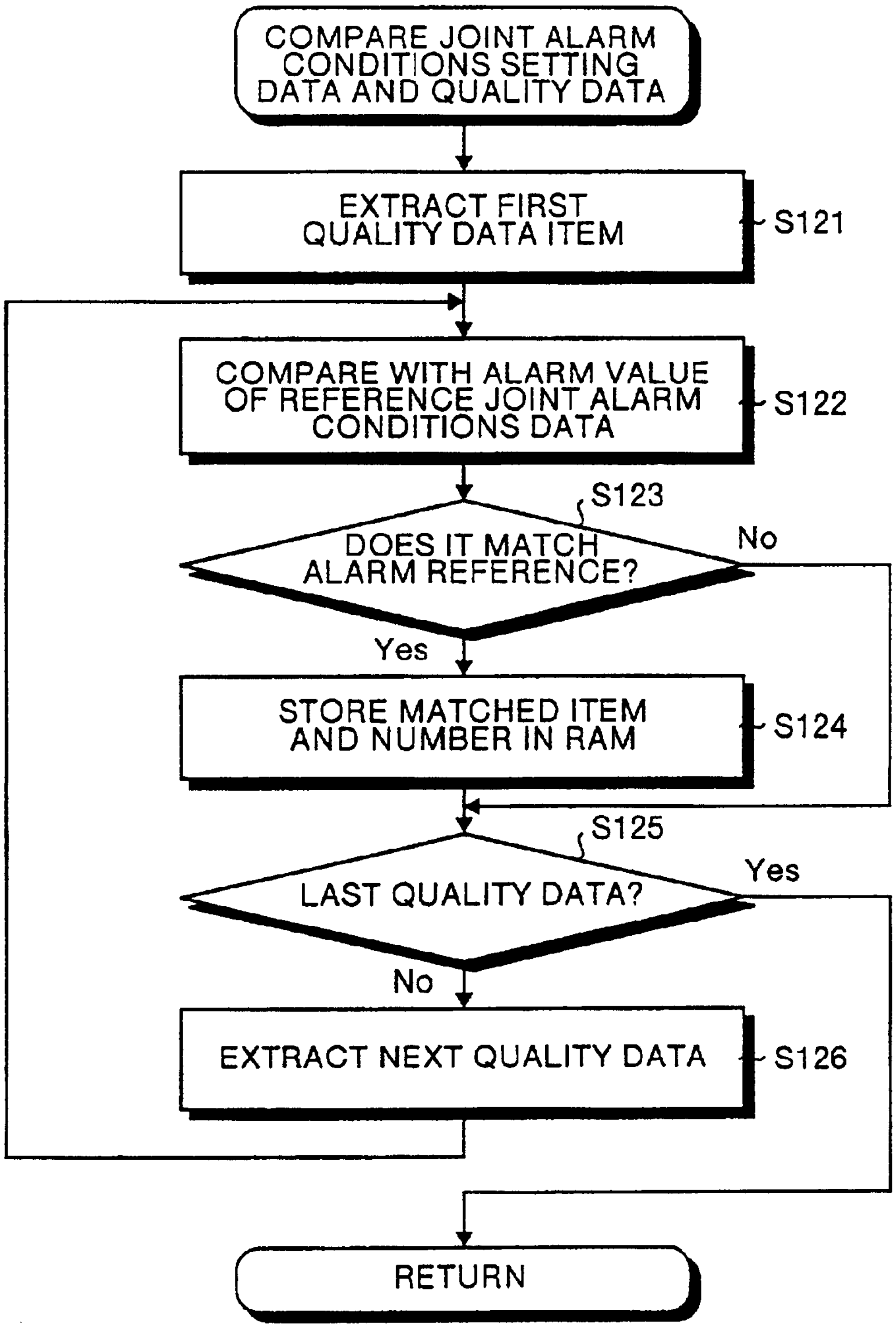
FIG. 105 is a flowchart showing a step-monitoring/alarm process of an output system client.

In step S90 of FIG. 101, the common alarm conditions setting data stored in the RAM 3605 is compared with the quality data. The specific contents of the step S90 will be explained based on the flowchart of FIG. 105. In FIG. 105, the first data of the quality data is extracted (step S121) and compared with the alarm reference (alarm item) of the common alarm conditions data (step S122) in order to determine whether the data corresponds to the alarm reference (step S123). When it is determined that the data does not correspond to the alarm reference, the processing shifts to step S125. On the other hand, when the data does correspond to the reference, the corresponding item and number of cases are stored in the RAM 3605 (step S124) before proceeding to step S125. Instep S125, it is determined whether this is the last quality data, and if so, the process returns. On the other hand, when this is not the last quality data, the next data is extracted (step S126) and the sequence returns to step S122 and the same processes are repeated until the quality data ends.

Figure 102:
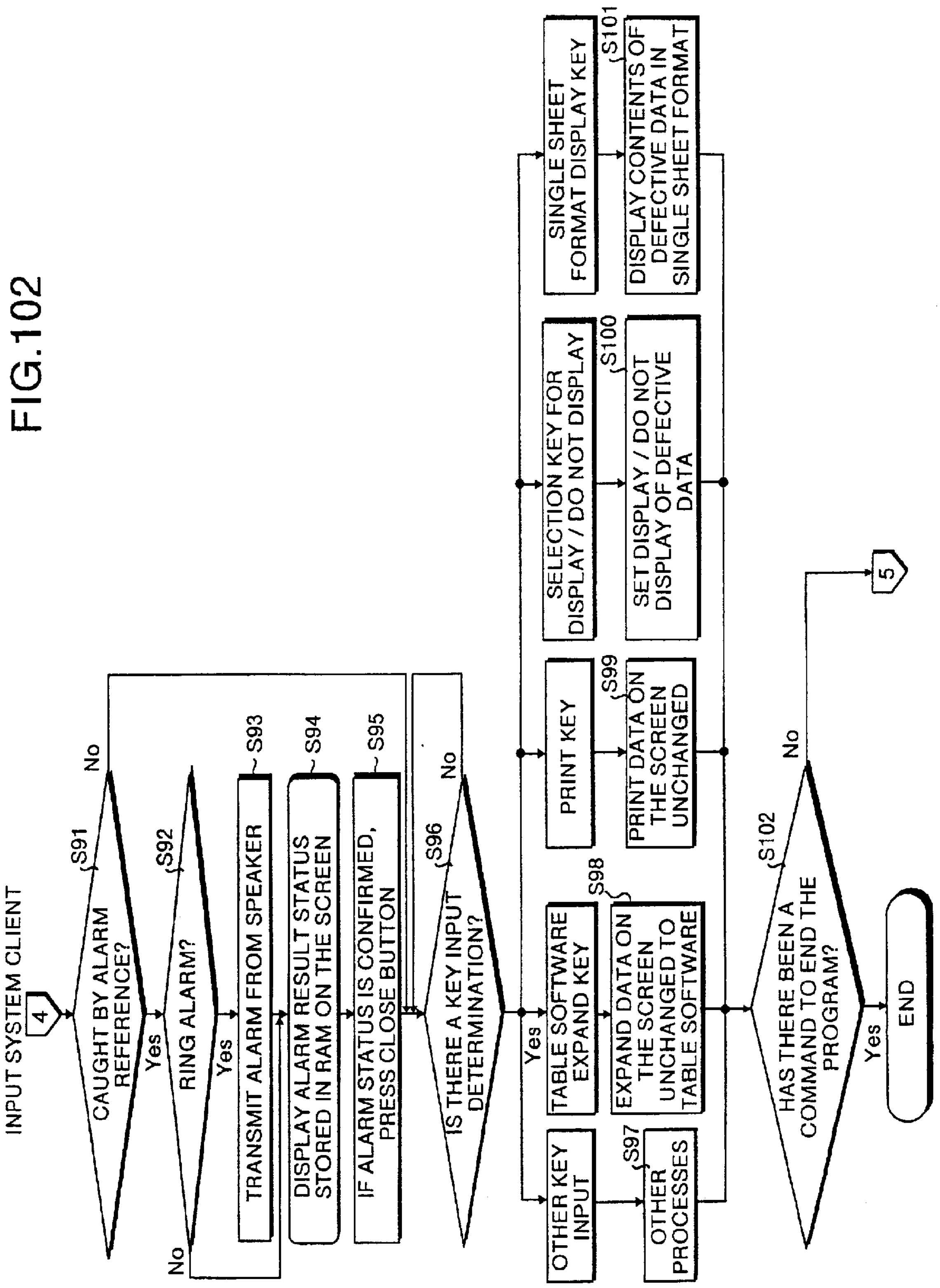
FIG. 102 is a flowchart showing a step-monitoring/alarm process of an output system client.

Then, in the step S91 of FIG. 102 it is determined whether there is any quality data which is caught by the alarm value by referring to items and numbers thereof which correspond to the alarm reference stored in the RAM 3605. When no quality data is caught by the alarm value, the sequence shifts to step S96. On the other hand, when there is quality data caught by the alarm value, it is determined whether or not "sound the alarm" is set in the alarm sound setting box 5014 (step S92). When "sound the alarm" has been set, the processing shifts to step S93 in which the alarm is sounded from the speaker 3607. In addition, the items and numbers thereof (alarm result status) which correspond to the alarm reference stored in the RAM 3605 are displayed on the screen (step S94). On the other hand, when "sound the alarm" is not set in the alarm sound setting box 5014, the processing shifts to step S94 without sounding the alarm, and the items and numbers thereof (alarm result status) which correspond to the alarm reference stored in the RAM 3605 are displayed on the screen (step S94).

Figure 122:
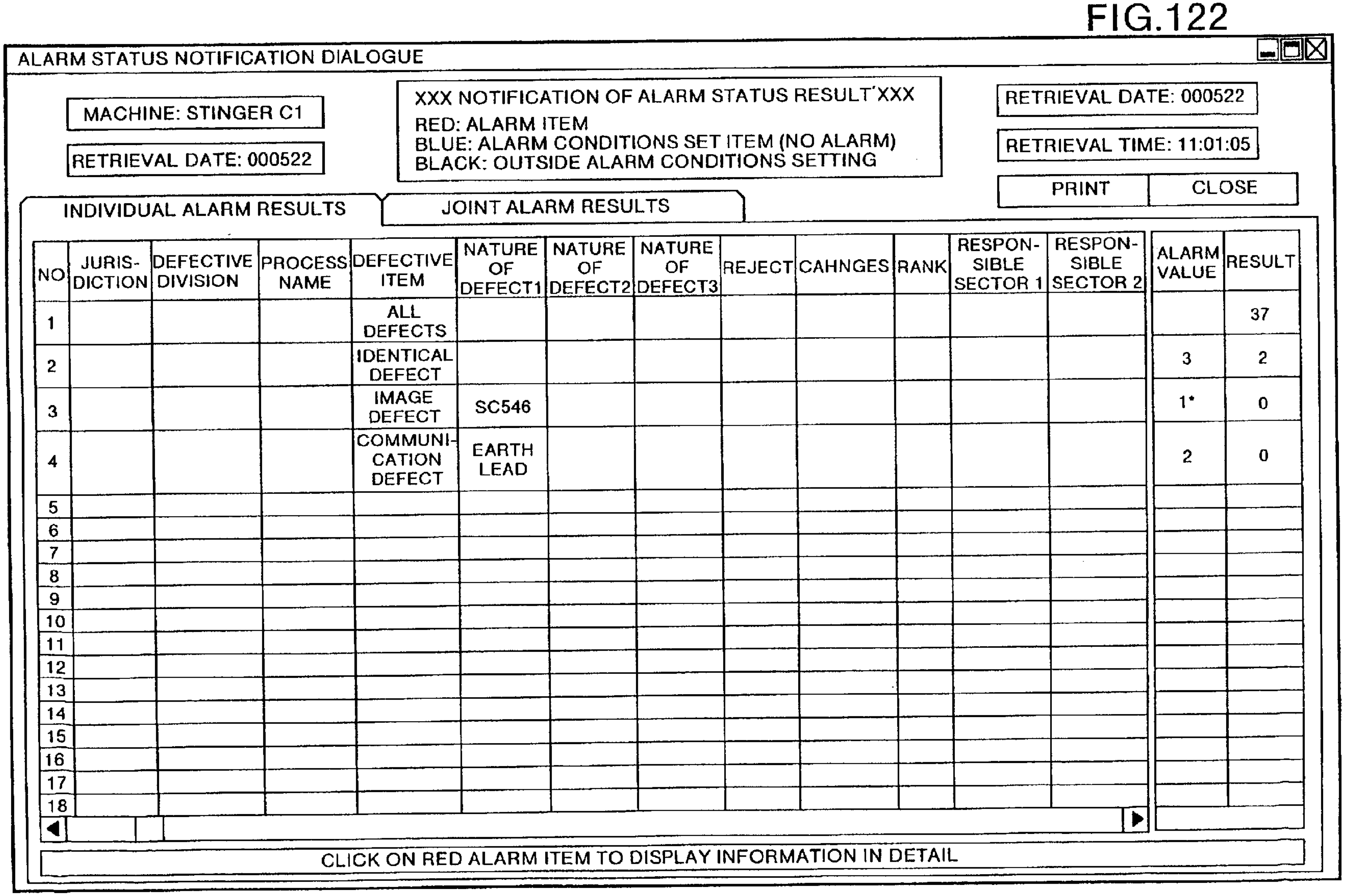
Figure 125:
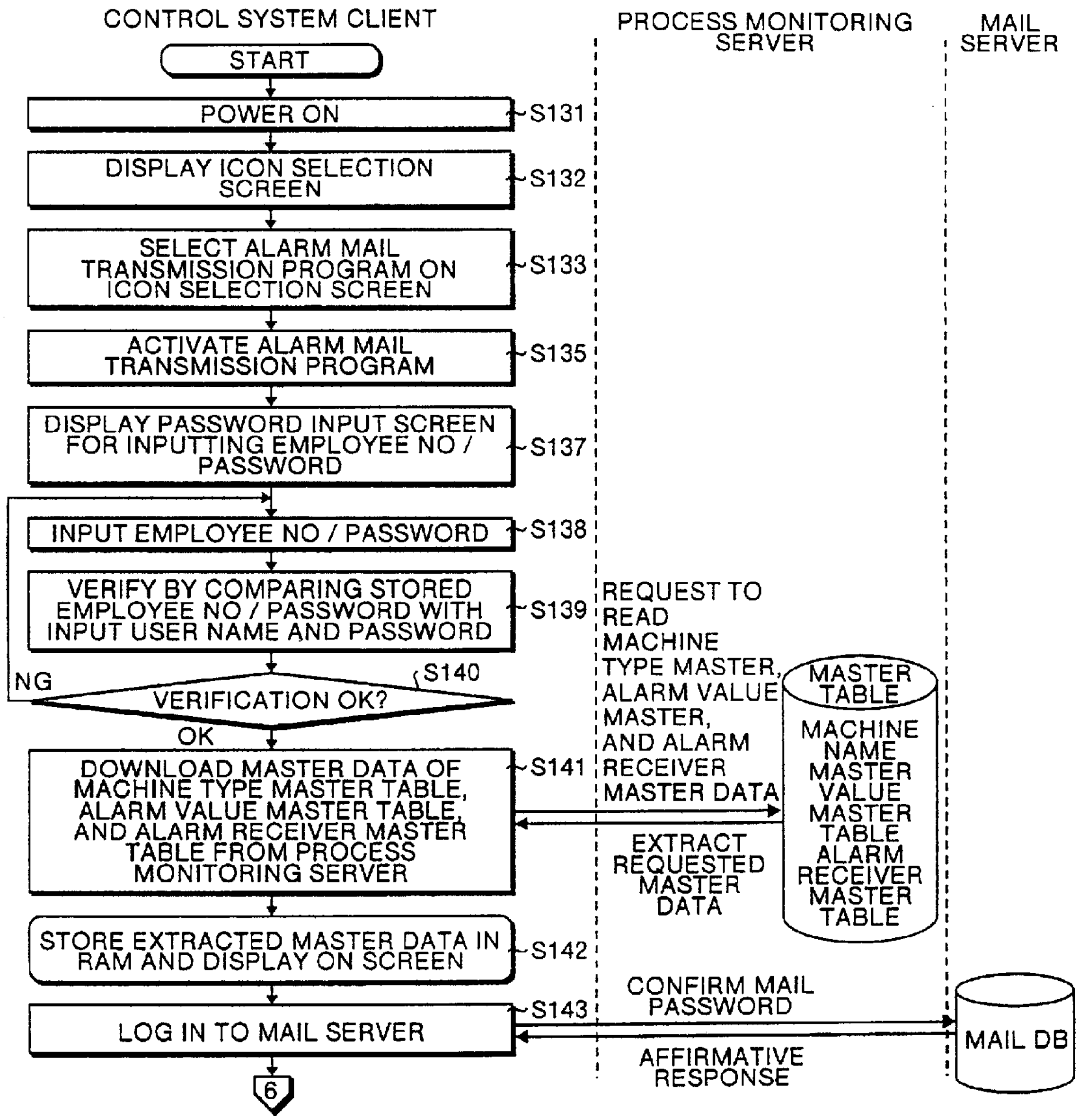

FIG. 122 and FIG. 124 show examples of screens displaying the alarm result status. FIG. 122 shows an example of the individual alarm generation status, and FIG. 124 shows an example of the common alarm generation status. In FIG. 122 and FIG. 124, the number of generations is displayed in the "result" box. Items which were caught by the alarm value are displayed in red. When an item is selected on this screen, detail alarm contents such as those shown in FIG. 123 are displayed.

Having confirmed the alarm status, the system user presses the close button (step S95) to close the screen displaying the alarm result status. Subsequent processing depends on the operation status of the system user. In step S96, when there has been a key input, the content of the key input is determined. When the "open chart software" key 5012 has been selected, the data on the screen is opened directly onto the sheet of the table-calculating software (step S98). When the print key 5013 has been selected, the data on the screen is printed (step S99). When the "select display/not-display row" key has been pressed, a setting screen for setting whether to display or not-display a row of defect data is displayed, and this screen is used to select items of the defect data (step S100). When the "select display in single-sheet format" key has been pressed, the contents of the defect data are displayed in single-sheet format (step S101). When a key other than those mentioned above is pressed, another process is executed (step S97).

It is determined whether there has been a command to end the program (step S102). If so, the program ends. If not, the processing returns to step S78 of FIG. 100.

Alarm Mail Transmission by Management System Client

Alarm mail transmission processes executed by the output system clients will be explained based on the flowcharts of FIG. 125 to FIG. 129 and with reference to the examples of screen displays during the alarm mail transmission of FIG. 130 to FIG. 135. FIG. 125 to FIG. 129 are flowcharts showing alarm mail transmission processes executed by the output system clients, and FIG. 130 to FIG. 135 are diagrams showing examples of screen displays during the alarm mail transmission processes.

In alarm mail transmission, the system side is monitored in real time to determine whether defect data which has occurred during a manufacturing step and is data of a quality problem review request, and alarm setting data which is common to all divisions, have been generated. When such data has been generated, the status of the data is displayed in real time on the screen, and the defect content is e-mailed directly to the alarm mail transmission target. Consequently, the supervisor who has received the mail can link-up with the sectors which he is responsible for and related divisions so as to speedily solve the quality problem.

Figure 130:
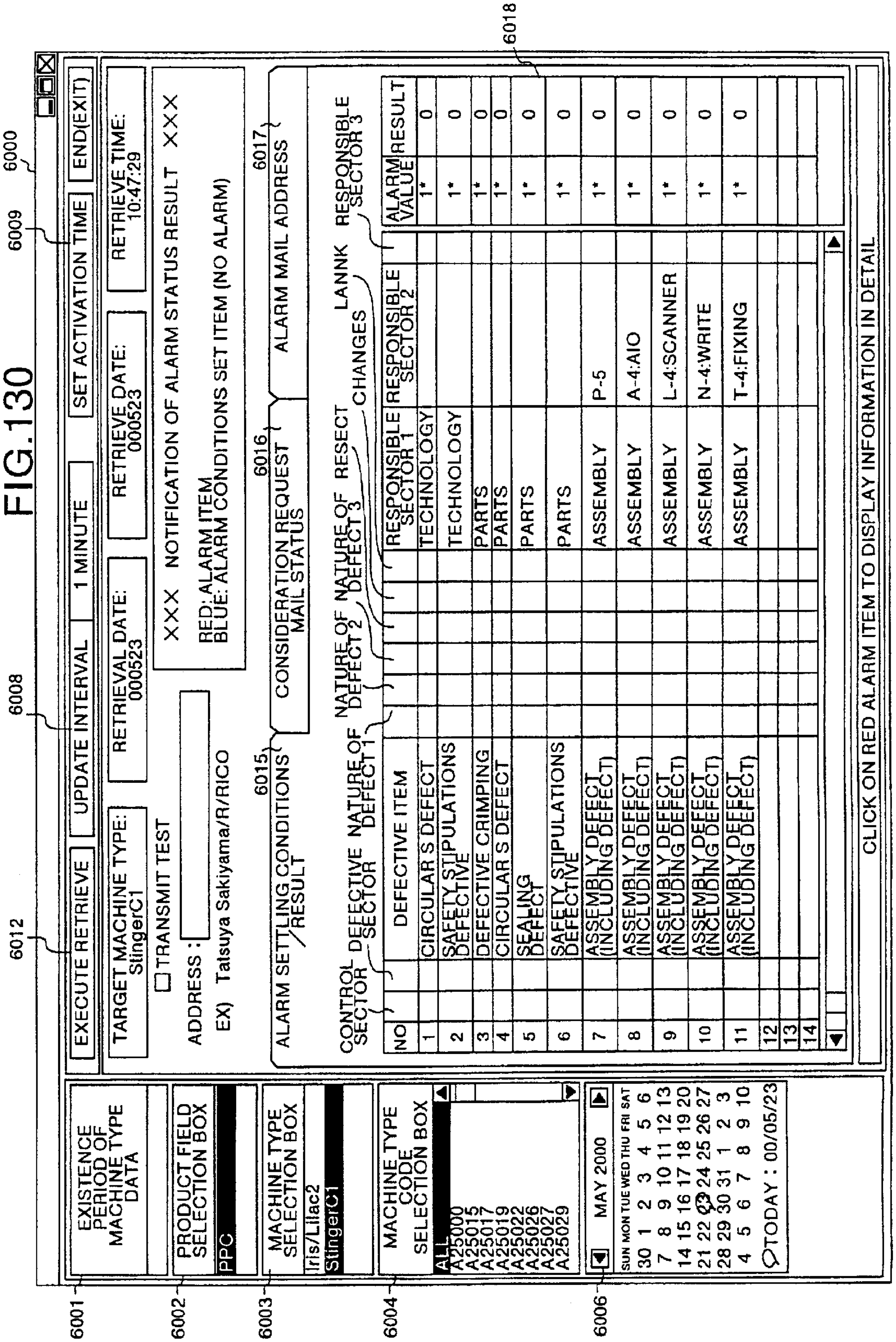

FIG. 130 is an example of a display screen 5000 displayed on the display section 3802 when the alarm mail transmission program 3807*b* has been activated. In FIG. 130, reference numeral 6001 represents a key for displaying the data duration of the selected machine type. When the key 6001 is pressed, the data duration of the selected machine type is displayed. Reference numeral 6002 represents a product field selection box for selecting the "product field" for retrieval, reference numeral 6003 represents a machine type selection box for selecting the "machine type" to be retrieved, reference numeral 6004 represents a machine code selection box for selecting the "machine code" to be retrieved, and reference numeral 6006 represents a calendar for selecting a "date" for the retrieval.

Reference numeral 6008 represents a "retrieval interval" key for specifying the data retrieval interval. When the "retrieval interval" key 6008 has been selected, a subscreen for setting the updating method identical to that of FIG. 107 is displayed. In this subscreen the operator selects whether to automatically update the information retrieval, and sets the interval (in minutes) when automatically updating. Automatic update is a function whereby the system automatically retrieves information at a predetermined time interval and displays it on the screen without the "execute retrieval" key 6012 having been pressed. The information matching the retrieval conditions can be retrieved and displayed on the screen by pressing the "execute retrieval" key 6012.

Reference numeral 6009 represents a "set activation time" key for setting the activation conditions. When the "set activation time" key 6009 is selected, a subscreen 6021 for setting the activation time such as that shown in FIG. 133 is displayed on the screen. "Name of target machine type", "mail server" and "name of mail file" are entered in this subscreen 6021, and when "set OK" is selected, the "name of target machine type", "mail server" and "name of mail file" are set and stored in the recording medium 3807. The "name of target machine type", "mail server" and "name of mail file" are set only when the system first becomes operational and when changing settings.

In FIG. 130, reference numeral 6015 represents an "alarm setting status/result" key for displaying common alarm setting status and common alarm results, reference numeral 6016 represents a "review request mail status" key for displaying the review request mail status, and reference numeral 6017 represents an "alarm mail destination" key for displaying the destination of the alarm mail. It is possible to selectively switch the displays of "alarm setting status/result", the "review request mail status" and the "alarm mail destination" by selecting one of the "alarm setting status/result" key 6015, the "review request mail status" key 6016 and the "alarm mail destination" key 6017.

Figure 131:
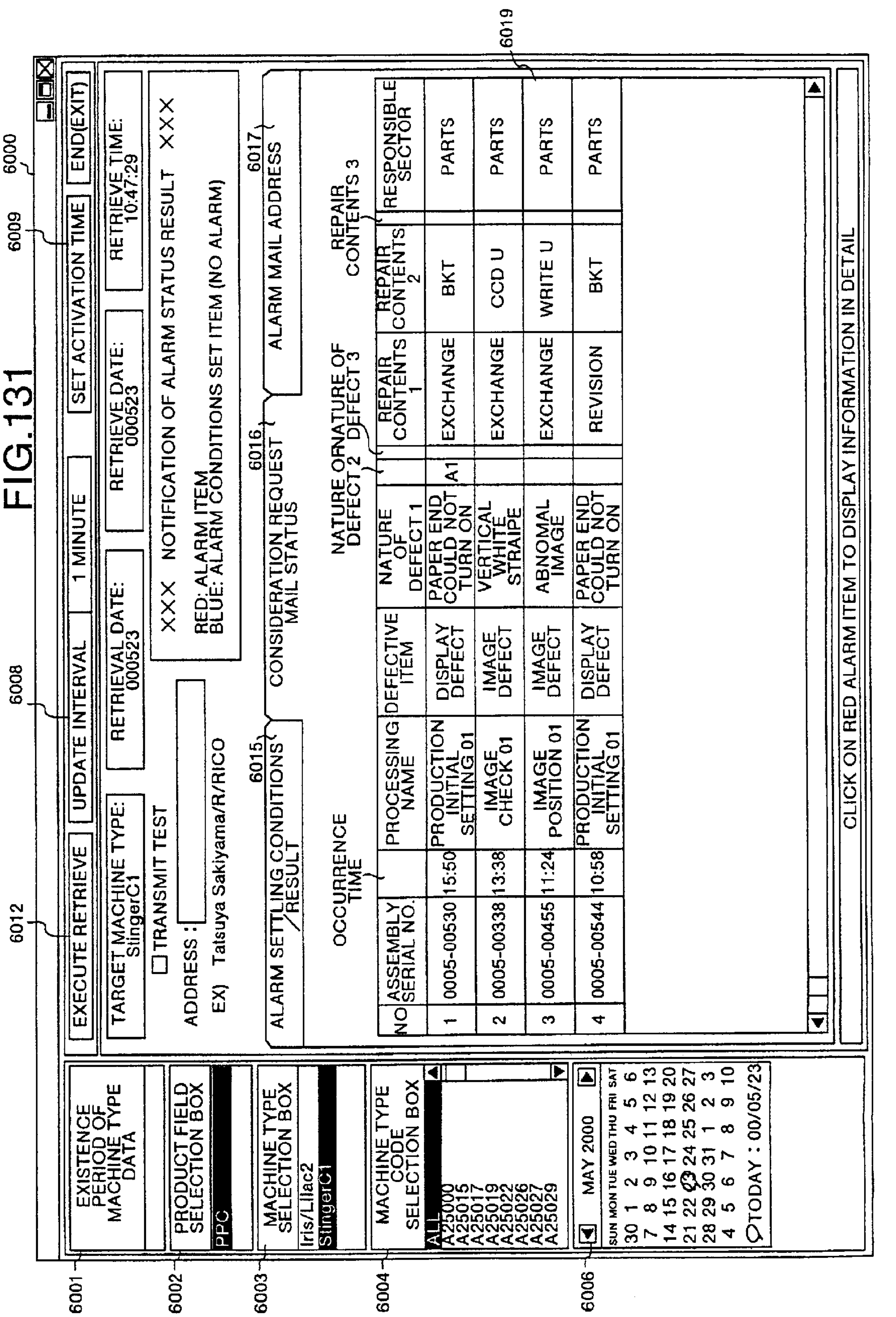

FIG. 130 shows a case where the "alarm setting status/result" key 6015 has been selected and the data of the alarm value master table 3708*t* is displayed in an alarm setting status/result display region 6018. When the "review request mail status" key 6016 is selected, the data of the in-processing defect content data table 3709*f* is displayed in a review request mail status display region as shown in FIG. 131. When the "alarm mail destination" key 6017 is selected, the data of the alarm receiver master table 3708*o* is displayed in an alarm mail destination display region 6020 as shown in FIG. 132. The review request mail is transmitted from the management system client 3600 when "review request" has been input in the "repair step input screen" described above. FIG. 134 shows an example of a single-sheet display screen 6022 of defect contents used by the input system clients 3201 to 3208. FIG. 135 shows an example of the review request mail 6022.

Figure 126:
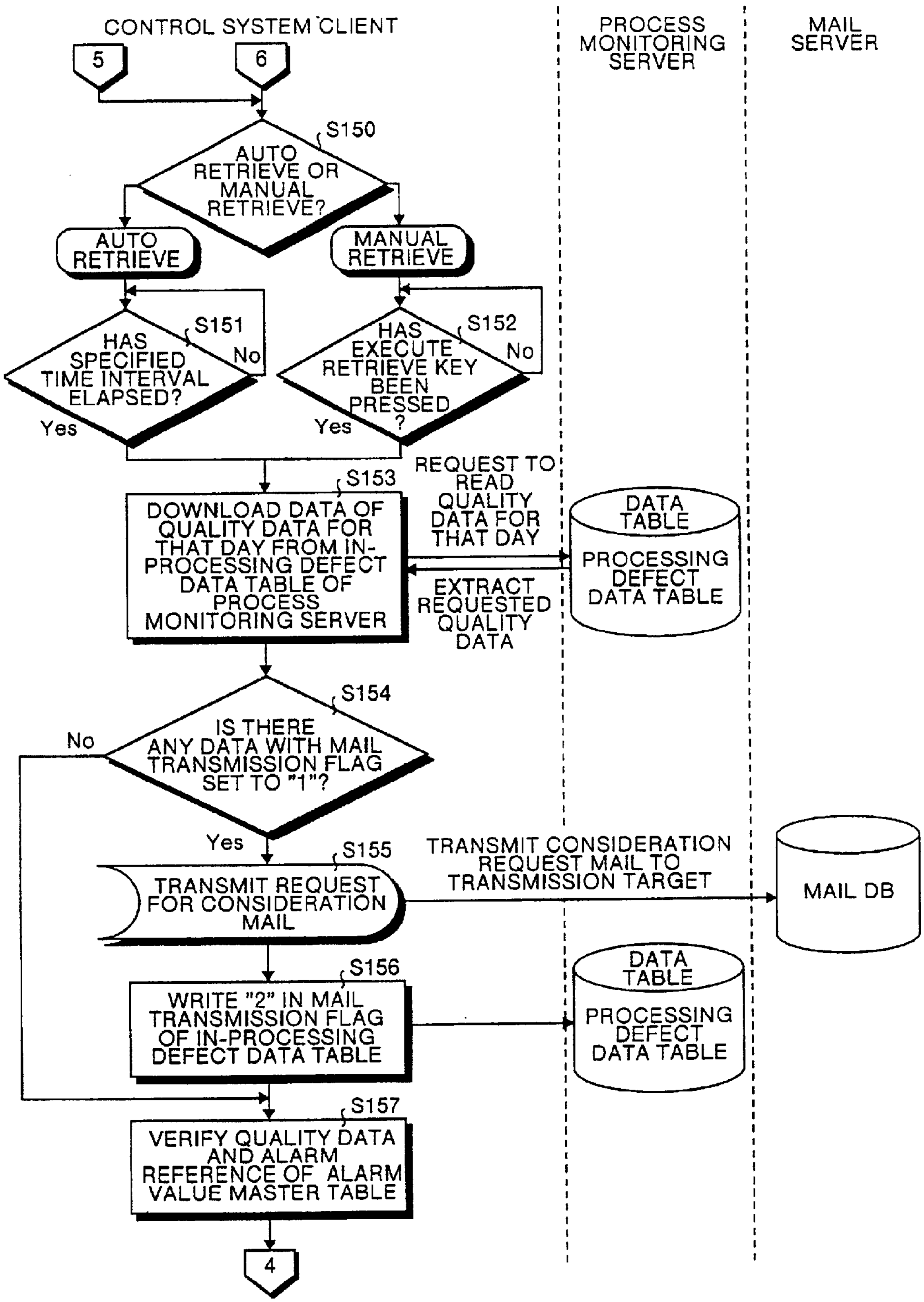

Subsequently, the process of transmitting the alarm mail will be explained based on the flowcharts of FIG. 125 to FIG. 129. In FIG. 126, when the employee who is responsible for the management system switches the power of the management system client 3600 ON (step S131), an icon selection screen for selecting a program is displayed (step S132). When the alarm mail transmission program is selected in this icon selection screen (step S133), the alarm mail transmission program 3807*b* is read from the recording medium 3607 and opened into the RAM 3805, whereby the alarm mail transmission program 3807*b* is activated (step S135). When the alarm mail transmission program 3807*b* is activated, a password input screen such as that shown in FIG. 91 is displayed (step S137). The operator enters his password and employee number (step S137).

The input password is compared with a predetermined password (step S139) to determine whether the password is correct (step S140). When the input password is correct, processing proceeds to step S141. On the other hand, when the input password is incorrect, the processing returns to step S138 and the password is entered a second time.

In step S141, the step-monitoring server 3300*a* downloads master data of the machine type master table 3708*r* ("name of machine type", "Product field", "Production point", "Date when production started", "Server Name", "IP_Address", "DBName", "Head_NO_Flg" and "Mail Transmission"), the alarm value master table 3708*t* ("No.", "Management sector", "Defective sector", "Name of step", "Defective Item", "Defect content 1", "Defect content 2", "Defect content 3", "LineOut", "Something strange", "Lank", "Responsible sector 1", "Responsible sector 2", "Responsible sector 3", "Repair supervisor", "Reoccurrence Prevention Contents", "Countermeasure supervisor", "Alarm value", "Alarm result", "Alarm time", and "Date of Mail transmission"), and the alarm receiver master table 3708*o* ("No.", "Responsible sector 1", "Responsible sector 2", "Responsible sector 3", "Notes_ID", "Transmission category") and stores these in the RAM 3605 (step S141).

A screen such as that shown in FIG. 130 is displayed. The master data of the machine type master table 3708*r*, the alarm value master table 3708*t*, and the alarm receiver master table 37080 are displayed in corresponding areas of the screen is (step S142).

The operator then logs in to the server (step S143). When the mail password is authenticated as correct, the mail server 3300*b* transmits an affirmative response.

It is determined whether the retrieval conditions which are set in the "set update method" dialogue box specify automatic or manual retrieval (step S150). When automatic retrieval is specified, the program shifts to step S151 and it is determined whether a specified time interval has elapsed. When the specified time interval has elapsed, the program shifts to step S153. On the other hand, when manual retrieval is set in step S150, the program shifts to step S152 and it is determined whether the execute retrieval key has been pressed. When the execute retrieval key has been pressed, the program shifts to step S153.

In step S153, the quality data (master data) for that day is downloaded from the in-processing defect content data table 3709*f* ("Factory name", "Product field", "Name of machine type", Production step", "Line No.", "Machine type code", "Installation serial number", "Machine number", "defect serial number", "Machine number", "Defective sector", "Number of reoccurrences", "Date of Occurrence", "Time of Occurrence", "Name of step", "Defective Item", "Defect content 1", "Defect content 2", ÷Defect content 3", "Lineout", "Lank", "Something strange", "Responsible sector 1", "Responsible sector 2", ÷Responsible sector 3", "Non-reoccurrence", "Cause of defect", "Repair contents 1", "Repair contents 2", "Repair contents 3", "Repair Date", "Repair time", "Repair supervisor", "Reoccurrence prevention Contents", "Date of Countermeasure", "Time of Countermeasure", "Countermeasure supervisor", "Date of Latest update", "Mail transmission flag") of the step-monitoring server 3300*a* and stored in the RAM 3605 (step S153).

It is determined whether there is any quality data for which the mail transmission flag is set to "1" (set to transmit review request mail) (step S154). When there is no quality data for which the mail transmission flag is set to "1", the process shifts to step S157. On the other hand, when there is quality data for which the mail transmission flag is set to "1", the review request mail is transmitted to the target (the transmission destination specified in the alarm receiver master table 3708*o*) (step S155). FIG. 135 shows an example of the review request mail The mail transmission flag of the in-processing defect data table 3709*f* of the step-monitoring server 3300*a* is changed to "2" (step S156).

Figure 128:
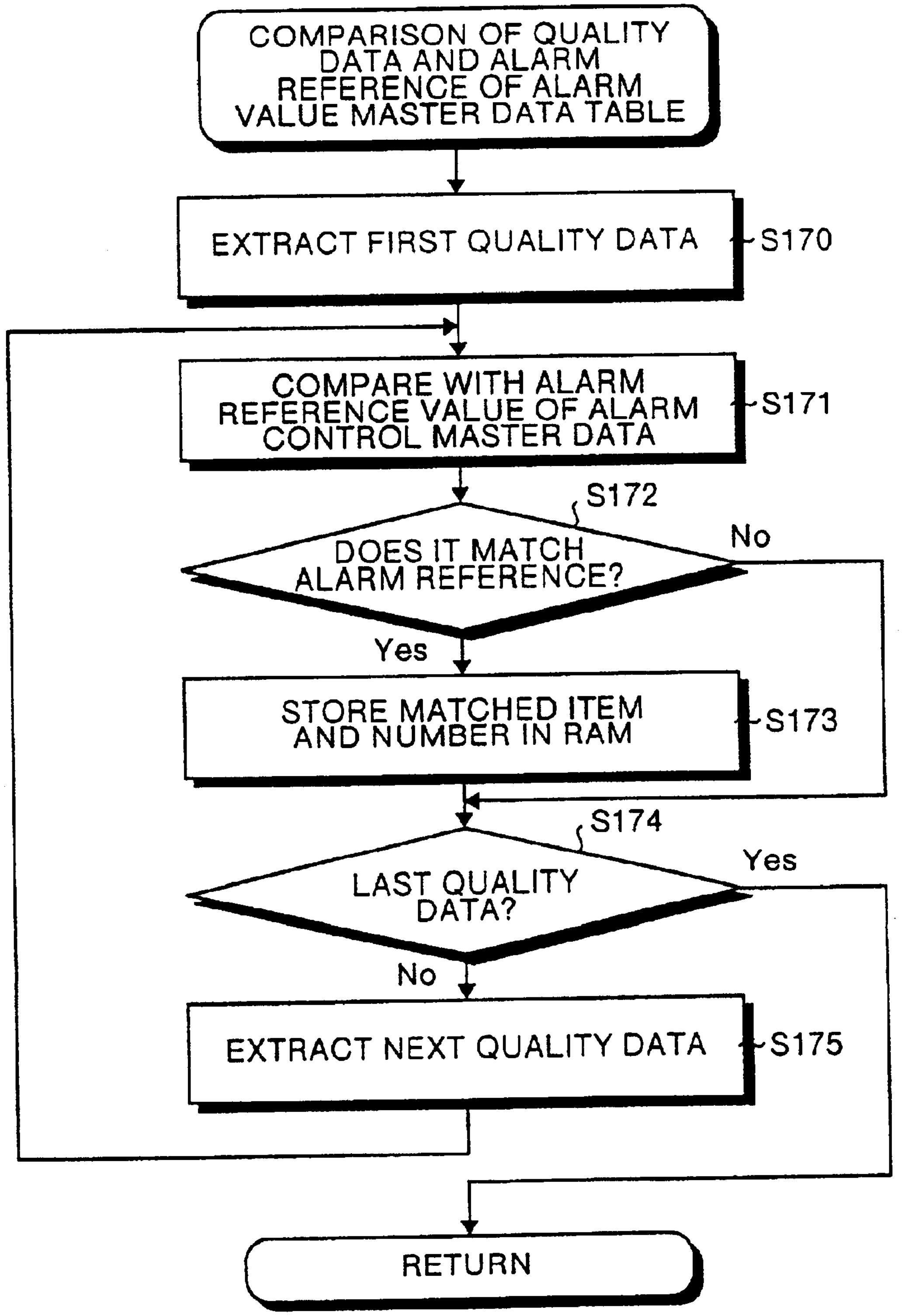

In step S157, the alarm reference of the alarm value master table is compared with the quality data. The specific contents of the step S157 will be explained based on the flowchart of FIG. 128. In FIG. 128, the first data of the quality data is extracted (step S170) and compared with the alarm reference (step S171) in order to determine whether the data matches the alarm reference (step S172). When it is determined that the data does not match the alarm reference, the processing shifts to step S174. On the other hand, when the data does match the alarm reference, the matching item and number of cases are stored in the RAM 3605 (step S173) before proceeding to step S174. In step S174, it is determined whether this is the last quality data, and if so, the process returns. On the other hand, when this is not the last quality data, the next data is extracted (step S175) and the sequence returns to step S171 and the same processes are repeated until the quality data ends.

Figure 127:
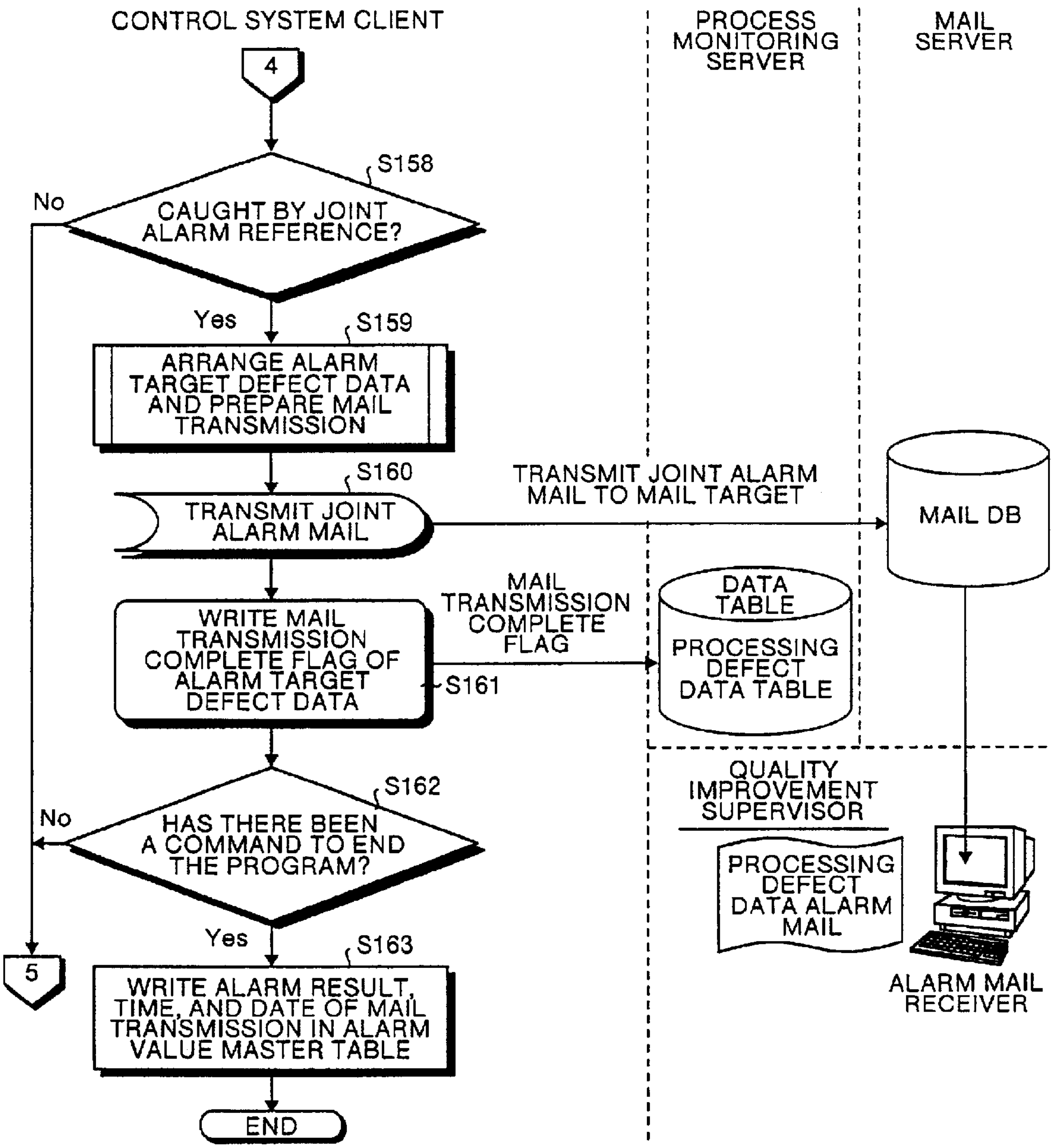

In the step S158 of FIG. 127, it is determined whether there is any quality data which is caught by the alarm value. When no quality data is caught by the alarm value, the sequence shifts to step S150 of FIG. 126. On the other hand, when there is quality data caught by the alarm value, the alarm target defect data is arranged and preparations for transmitting the mail are carried out (step S160).

Figure 129:
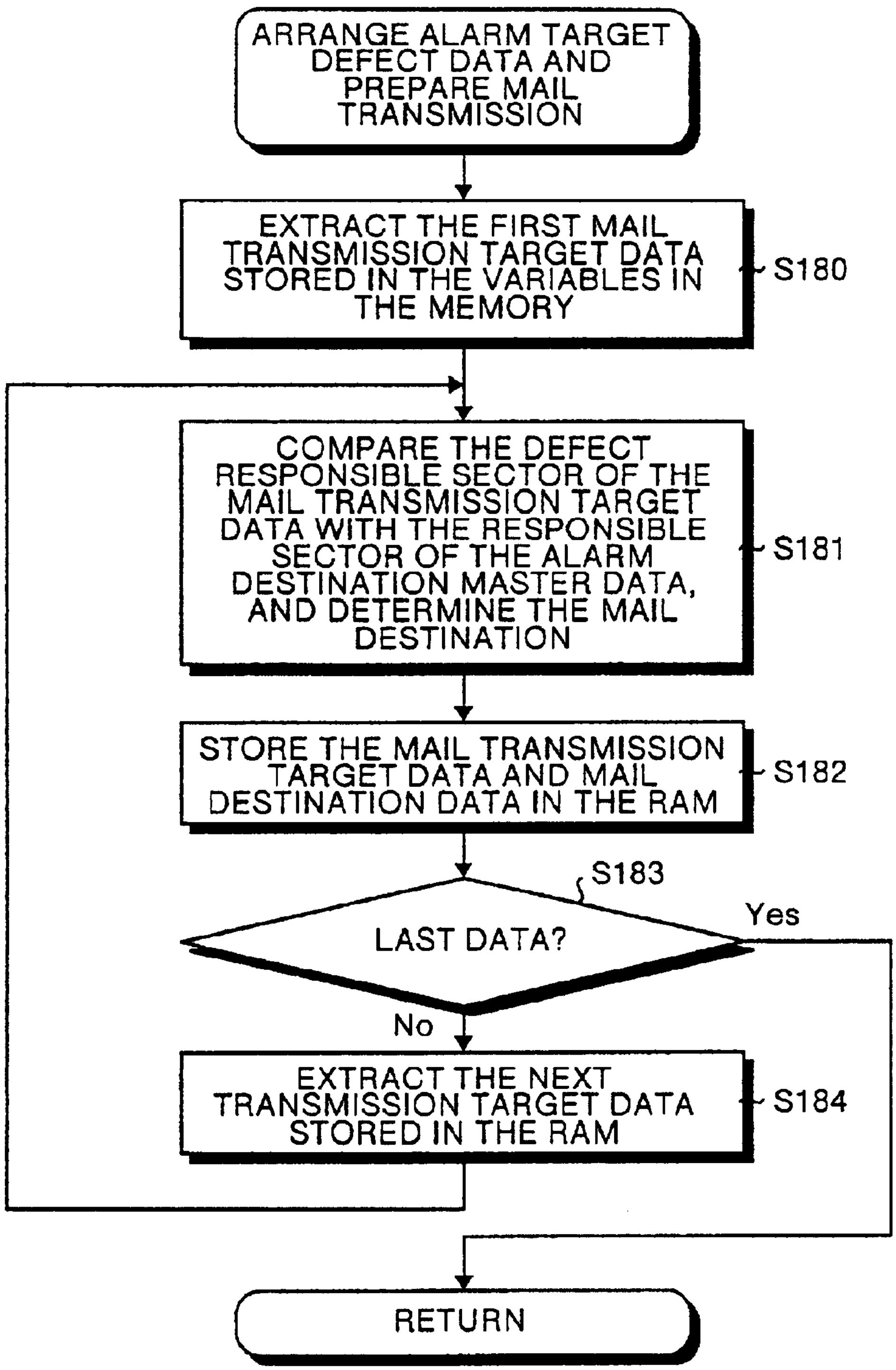

The specific contents of the step S150 will be explained based on the flowchart of FIG. 129. In FIG. 129, the first quality data for the mail transmission target stored in the RAM 3605 is extracted (step S180). The defect responsible sector of the mail transmission target data is compared with the destination data of the individual responsible sector of the alarm receiver master data (step S181). The mail transmission target data and the mail destination data are stored in the RAM 3605 (step S182). It is determined whether this is the last quality data (step S183), and if so, the process returns. On the other hand, when this is not the last quality data, the next data is extracted (step S184) and the sequence returns to step S181 and the same processes are repeated until the quality data ends.

In the step S160 of FIG. 127, the common alarm mail is transmitted to the mail server 3300*b* in order to transmit the common alarm mail of the defect data to the transmission target of the common alarm mail (step S160). Thereafter, the mail server 3300*b* transmits the common alarm mail to the transmission target.

It is determined whether a command to end the program has been issued (step S162). When no command to end the program has been issued, the program returns to step S150. On the other hand, when a command to end the program has been issued, the alarm result, time and mail transmission date are written in the alarm value table 3708*t* of the step-monitoring server 3300*a* (step S163) and the program ends.

As described above, in the second embodiment, the input system clients 3201 to 3208 transmits machine type codes and installation serial numbers appended to the pieces to be assembled, and data such as quality data and check table data, to the step-monitoring server 3300*a*. The step-monitoring server 3300*a* stores the data input from the input system clients 3201 to 3208 in the corresponding tables (in-processing defect content data table 3709*f*, check table data table 3709*a*, main data table 3709*d*, etc.). The output system clients 3401 to 3403 specify machine type code and dates, and retrieve data which matches the specified conditions from the corresponding tables of the step-monitoring server 3300*a* (in-processing defect content data table 3709*f* and main data table 3709*d*), and chronologically process and display the retrieved data on the screen in accordance with the output items stipulated in the selected output categories. Therefore, products which are manufactured on a production and assembly line can be efficiently and speedily managed. Further, since the retrieved data is chronologically processed for output items stipulated by set output targets, the products can be managed in each time band.

The present invention is not limited to the embodiments described above, and various modifications can be made which do not alter the main features of the invention.

The above embodiments described an example of a production line for manufacturing color copiers, but this invention is not limited to this and can be applied in the management of all other types of production lines such as black-and-white copiers, facsimiles, automobiles, and the like.

As described above according to this invention, data relating to production and assembly in each of a plurality of steps of producing and assembling components, units and main bodies is input; and check result data of each of a plurality of steps of checking the components, units and main bodies following the steps of producing and assembling is input. The data input by the first and second input units is held, and retrieval conditions are specified by a retrieval conditions specifying unit. A data retrieving unit retrieves data from that held by the data holding unit based on the retrieval conditions specified by the retrieval conditions specifying unit. An output target specifying unit specifies an output target for the data retrieved by the data retrieving unit, and a data processing unit chronologically processes the data retrieved by the data retrieving unit based on the output target specified by the output target specifying unit. An output unit outputs the data processed by the data processing unit. Therefore, products which are manufactured on a production and assembly line can be efficiently and speedily managed.

The present document incorporates by reference the entire contents of Japanese priority documents, 11-249182 filed in Japan on Sep. 2, 1999, 2000–232532 filed in Japan on Jul. 31, 2000 and 2000-243459 filed in Japan on Aug. 10, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A production management system which manages a) assembly data when one or more components are attached to a product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, said production management system comprising:

a plurality of input sections, provided on said production and assembly lines, which input and output said assembly data, said quality data, said check data, management numbers with which each of said product under assembly can be identified, and group codes (named as names of product under assembly and a generic name of machine type codes) of said product under assembly obtained by dividing said product under assembly according to their types in a step of assembling said product under assembly and a checking step of checking said product under assembly according to said check items;

a first storage section which stores said management numbers and said group codes input by said input sections in correlation with the date and time on which assembly of said product under assembly started and the date and time on which the assembly of said product under assembly is completed as assembly data;

a second storage section which sequentially stores said check data in correlation with said management numbers and said group codes;

a third storage section which sequentially stores said quality data in correlation with said management numbers and said group codes;

a first display/selecting section which allows display and selection of group code of said product under assembly;

a second display/selecting section which allows display and selection of a date and time;

a third display/selecting section which allows display and selection of extraction conditions to extract desired data out of said check date and said quality data stored in said second and third storage sections and output information related to the extraction conditions;

a retrieving section which retrieves and extracts data stored in said first, second, and third storage sections according to said group codes of said product under assembly, the specified date and time, and the output information selected by said first, second, third display/selecting sections;

a fourth storage section which stores the information retrieved and extracted by said retrieving section;

a data processing section which chronologically processes the data stored in said fourth storage section based on said group codes of said product under assembly, the specified date and time, and the output information selected by said first, second, third display/selecting sections; and a first display section which displays the data chronologically processed by said data processing section for each item to be output based on the output information.

2. The production management system according to claim 1, wherein said first display section numerically displays the chronological data for the items to be output and converts the chronological data for at least one of the items to be output to a bar graph.

3. The production management system according to claim 2 further comprising:

a selecting section which selects any of item name of the items to be output displayed by said first display section; and a graph preparing section which converts the chronological data for the item selected by said selecting section to a bar graph.

4. The production management system according to claim 1, further comprising a second display section which displays said check data or said quality data extracted by said retrieving section and stored in said second or third storage section.

5. The production management system according to claim 4, further comprising a third display section which displays said check data or said quality data for only a product under assembly corresponding to said data displayed by said second display section.

6. The production management system according to claim 1, further comprising an executing section which allows said retrieving section to execute, by which any group code of said product under assembly, the specified date and time, and the output information selected by said first, second, and third display/selecting section are uploaded.

7. The production management system according to claim 1, further comprising an executing section which allows said retrieving section to automatically execute at predetermined time intervals, by which any group code of the said product under assembly, the specified date and time, and the output information selected by said first, second, and third display/selecting section are uploaded.

8. The production management system according to claim 1 further comprising:

a monitoring/setting section which monitors whether said check data or said quality data extracted by said retrieving section and stored in said second or third storage section is added up to a specified number and sets the data; and a notifying section which notifies of that the information monitored and set by said monitoring/setting section reaches to the specified number of items.

9. A production management system which manages a) assembly data when components to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, said production management system comprising a host server, an input client, an output client, wherein A) said host server has at least (1) a master table of said product under assembly, (2) a quality contents master table, (3) a main data table, (4) a quality contents table, and (5) a check contents table, (1) said master table of said product under assembly stores data for group codes of said product under assembly obtained by dividing said product under assembly for each type, (2) said quality contents master table stores data about group codes of said product under assembly and quality items related to said product under assembly in correlation with each other, (3) said main data table stores data about management numbers with which respective said product under assembly can be identified and group codes of said product under assembly in correlation with line information, such as the data and time on which assembly of said product under assembly is started, and the date and time on which the assembly of said product under assembly is completed on said production assembly line, obtainable by executing their assembly and checking on said production and assembly line, (4) said quality contents table stores data about said management numbers and said group codes of said product under assembly, quality items in said quality contents master table, quality information based on said quality items, its entry date and time, assembly, checking and fixing steps whose data is entered in correlation with each other, and (5) said check contents table stores data about said management numbers and said group codes of said product under assembly in correlation with check items related to said product under assembly and the results of checking based on said check items, B) said input client displays and inputs previously specified table information from said master table of said product under assembly, said check contents data table, and said quality contents master table transferred from said host server, and transfers the information to said main data table, said quality contents data table, and said check contents data table according to the displayed and entered information, C) said output client displays a selecting/display control section for said product under assembly, an output type selecting/display control section, a date selecting/display control section, and a data output/display control section on its display section, a data transfer section transfers specified data from said host server, and a data processing section processes the data transferred by said transfer section, (C1) said selecting/display control section for said product under assembly can display and select any group code of said product under assembly based on the information in said master table of said product under assembly, (C2) said output type selecting/display control section can display and select items to be output based on the information in said quality contents master table, (C3) said date display control section can display a calendar and specify a date, (C4) said data transfer section transfer the data from said host server based on the conditions selected by said selecting/display control section for said product under assembly, said output type selecting/display control section, and said date selecting/display control section, (C5) said data processing section collects the data transferred by said data transfer section for each chronological base, and (C6) said data output/display control section displays the chronological data of said data processing section for each item.

10. The production management system according to claim 9, wherein said host server having a check contents master table which 5) stores a management number with which each of said product under assembly can be identified, said group codes, check items for checking said product under assembly on said production assembly lines, and the checking step that utilises said check items in a correlated manner, wherein said input client can display or input information contained in said check contents master table.

11. The production management system according to claim 9, wherein said host server having a process-wise display/input master table which 6) stores each of the processes on said production and assembly line and said tables in said host server that can be displayed and input by each of said input clients, wherein display or input of information in said input client is limited based on the information contained in said process-wise display/input master table.

12. The production management system according to claim 9, wherein said data processing section calculates the total number of cases of each data.

13. The production management system according to claim 9, wherein said data output display control section prepares a table of the items related to output type selecting/display control section and number of cases of the items that has been chronologically processed by said data processing section and displays the prepared table.

14. The production management system according to claim 13, wherein said data output display control section prepares a bar graph of the number of cases of the items that has been chronologically processed by said data processing section and displays the prepared table.

15. The production management system according to claim 13, wherein said output client comprises a graph generation section which (C7) prepares a graph of the items related to output type selecting/display control section and the number of cases of the items that has been chronologically processed by said data processing section.

16. The production management system according to claim 9, wherein said output client comprises a regular executing section which (C8) sends a command to said data transmitting section at every predetermined time interval.

17. The production management system according to claim 9, wherein said output client comprises a warning setting/generating section which (C9) can display and select the contents of said quality contents master table, sets the number of accumulated cases for generating a warning about those items, and displays a warning based on the calculation result by said data transmitting section and said data processing section.

18. The production management system according to claim 9, wherein said output client comprises a quality contents data display control section which (C10) display all the data out of the data transmitted by said data transmitting section that is contained in said quality contents data table.

19. The production management system according to claim 18, wherein said output client comprises a single-component quality contents data display control section which (C11) selects one out of the contents displayed in said quality contents data display control section, and displays quality contents related to said group codes of product under assembly or names of the selected item.

20. A production and management method which manages a) assembly data when components to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly line, said method comprising the steps of:

inputting a plurality of data for inputting and outputting said assembly data, said quality data, said check data, management numbers with which each of said product under assembly can be identified, and group codes of said product under assembly obtained by dividing said product under assembly according to their types in a step of assembling said product under assembly and a checking step of checking said product under assembly according to said check items, sequentially storing assembly data that correlates a date and time on which said product under assembly is started to be assembled and a date and time when said product under assembly is completed to said management number and said group code of said product under assembly that are input in the inputting step, the check data in a state of correlation with said management number and said group code of said product under assembly, and the quality data in a state of correlation with said management number and said group code of said product under assembly, to a host storage medium;

selecting respective desired items from said group codes of said product under assembly, specified dates and times, and a plurality of output information correlated to extraction conditions in order to extract desired data from the plurality of quality data and check data stored in said storage medium;

retrieving/extracting the data stored in said storage medium according to each item of the information for grouping said product under assembly, the specified date and time, and the output information selected in the selecting step;

storing the data retrieved and extracted in the retrieving/extracting step in a client storage mediums chronologically processing the data stored in said client storage medium based on the items of said group code of said product under assembly, the specified date and time, and the output information selected in the selecting step; and displaying the chronological data processed in the data processing step for each item to be output based an the output information.

21. The production management method according to claim 20 further comprising the steps of;

selecting each of the items displayed in the display step; and creating a graph of the item selected in the selection step based on chronological data.

22. The production management method according to claim 20 further comprising the step of:

displaying said quality data stored in said client storage medium.

23. The production management method according to claim 22 further comprising the steps of:

selecting some data displayed in the quality data display step; and displaying quality data of only said product under assembly singularly.

24. The production management method according to claim 20 further comprising the step of:

automatically executing the retrieving/extracting step at a specified predetermined time interval.

25. The production management method according to claim 20 further comprising the steps of:

setting a particular number of cases with respect to the quality data extracted and stored in said client storage medium in said retrieving/extracting step; and checking whether the set item matches with said particular number of cases, and generating and outputting a warning when the set item matches with said particular number of cases.

26. A production management method for managing a) assembly data when parts to be attached to a product under assembly are attached to said product under assembly, b) quality data regarding whether the quality of said product under assembly is good or bad, and c) check data obtained when said product under assembly in checked based on certain prespecified check items, when obtaining a finished product by attaching one or more components such as parts, units, or other finished products to said product under assembly on one or more of production assembly lines, wherein A) a host server has (1) a master table of said product under assembly, (2) a quality contents master table, (3) a main data table, (4) a quality contents data table, and (5) a check contents data table, wherein (1) said master table of said product under assembly stores data for group codes of said product under assembly obtained by dividing said product under assembly for each type, (2) said quality contents master table stores data for group codes of said product under assembly and quality items related to said product under assembly, (3) said main data table stores data for management numbers with which respective said product under assembly can be identified and group codes of said product under assembly in correlation with line information, such as the data and time on which assembly of said product under assembly is started, and the date and time on which the assembly of said product under assembly is completed on said production assembly line, obtainable by executing their assembly and checking on said production assembly line, (4) said quality contents data table stores data for management numbers with which respective said product under assembly can be identified and said group codes of said product under assembly, quality items of said quality contents master tables, quality information based on said quality items, its entry date and time, assembly, checking and fixing steps whose data is entered in correlation with each other, and (5) said check contents data table stores data for management numbers with which respective said product under assembly can be identified and said group codes of said product under assembly in correlation with check items related to said product under assembly and the results of checking based on said check items, B) an input client displays and inputs previously specified table information from said master table of said product under assembly, said check contents data table, and said quality contents master table transferred from said host server, and transfers the information to said main data table, said quality contents data table, and said check contents data table according to the displayed and entered information, C) an output client displays areas as follows;

(C1) a name of said product under assembly or a group code of said product under assembly is selected from a selection area of said product under assembly based on the information in said master table of said product under assembly, (C2) an item to be output is selected from a selection area of output types based on the information according to said quality contents master table, and (C3) a date to be output is selected from a date display area, and D) further, the specified data based on the selected information is transferred from said output client to said host server, E) the data is stored in said output client, F) the stored data is processed to chronological data for each item selected in said output selection area, and G) the chronological data is displayed for each item.

27. The production management method as described in claim 26, wherein

F) a total number of cases of each item is further added and processed in the data processing step, and G) the total number of cases of each item is further displayed together with the chronological data in the display step.

28. The production management method as described in claim 26, wherein

H) the chronological data processed in the data processing step is converted to a graph.

29. The production management method as described in claim 26, wherein

I) said output client executes the data transfer at predetermined intervals.

30. The production management method as described in claim 26, wherein

J) said output client sets a quality item of said quality contents master table and an accumulation number of cases for the item, and displays a warning based on the data processing and the result of computing the data transfer.

31. The production management method as described in claim 26, wherein

K) said output client displays all the data for said quality contents data table of the data transferred in the step of data transfer.

32. The production management method as described in claim 31, wherein

L) said output client selects one of the plurality of quality contents displayed by said quality contents data display control section, and M) said output client also displays a list of the quality contents in correlation with said group code of said product under assembly of said selected item.

33. A production management client system which manages a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, said production management client system comprising:

using an integrated storage medium which stores 1) management numbers with which each of said product under assembly can be identified and group codes of said product under assembly obtained by dividing said product under assembly according to their types, 2) quality data and check data correlating the quality information and the result of checking in a step of assembling parts to be attached to a product under assembly and a checking step of checking said product under assembly according to said check items on said production assembly line with said management number and said group code of said product under assembly as groups of tables, respectively, a first display/selecting section which allows display and selection of a group code of said product under assembly;

a second display/selecting section which allows display and selection of a date and time;

a third display/selecting section which allows display and selection of extraction conditions to extract desired data out of said check data and said quality data stored in said integrated storage medium and a plurality of output information related to said extraction conditions;

a retrieving section which retrieves and extracts data stored in said integrated storage medium according to said group codes of said product under assembly, the specified date and time, and the output information selected by said first, second, third display/selecting sections;

a storage section which stores the information retrieved and extracted by said retrieving section;

a data processing section which chronologically processes the data stored in said storage section based on said group codes of said product under assembly, the specified date and time, and the output information selected by said first, second, third display/selecting sections; and a first display section which displays the data chronologically processed by said data processing section for each item to be output based on the output information.

34. The production management client system according to claim 33, wherein said first display section numerically displays the chronological data for said items to be output, prepares a graph of said chronological data for at least one of said items, and displays the graph.

35. The production management client system according to claim 34 further comprising:

a selecting section which selects any of item name of said items to be output displayed by said first display section; and a graph preparing section which prepares a bar graph of said chronological data for the item selected by said selecting section.

36. The production management client system according to claim 33, further comprising a second display section which displays said check data or said quality data extracted by said retrieving section and stored in said integrated storage medium.

37. The production management client system according to claim 36, further comprising a third display section which displays said check data or said quality data for only a product under assembly corresponding to said data displayed by said second display section and selected.

38. The production management client system according to claim 33, further comprising an executing section which allows said retrieving section to execute, by which any group code of said product under assembly, the specified date and time, and the output information selected by said first, second, and third display/selecting section are uploaded.

39. The production management client system according to claim 33, further comprising an executing section which allows said retrieving section to automatically execute at predetermined time intervals, and utilizes said executing section to upload output information such as group code of said product under assembly, particular time and data selected by said first, second, and third display/selecting section.

40. The production management client system according to claim 33, further comprising a monitoring/setting section which monitors and sets information regarding check data or said quality data extracted by said retrieving section and stored in said second or third storage section; and a posting section which posts a notice when the number of information monitored and set by said monitoring/setting section matches a predetermined number.

41. A production management client system which manages a) assembly data when parts to be attached to a product under assembly are attached to said product under assembly, b) quality data regarding whether the quality of said product under assembly is good or bad, and a) check data obtained when said product under assembly is checked based on certain prespecified check items, when obtaining a finished product by attaching one or more components such as parts, units, or other finished products to said product under assembly on one or more of production assembly lines, wherein using a host server having tables as follows;

(1) a master table of said product under assembly stores data for group codes of said product under assembly obtained by dividing said product under assembly for each type, (2) a quality contents master table stores data about group codes of said product under assembly in correlation between quality items related to said product under assembly and quality contents in the production processes of said product under assembly, (3) a main data table stores data about management numbers with which respective said product under assembly can be identified and group codes of said product under assembly in correlation with line information, such as the date and time on which assembly of said product under assembly is started, and the date and time on which the assembly of said product under assembly is completed on said production assembly line, obtainable by executing their assembly and checking on said production assembly line, (4) a quality contents data table stores data about said management numbers and said group codes of said product under assembly, quality items in said quality contents master table, quality information based on said quality items, its entry date and time, assembly, checking and fixing steps whose data is entered in correlation with each other, and (5) a check contents data table stores data about said management numbers and said group codes of said product under assembly in correlation with check items related to said product under assembly and the results of checking based on said check items, an output client displays a selecting/display control section for said product under assembly, an output type selecting/display control section, a date selecting/display control section, and a data output/display control section on its display section, a data transfer section transfers specified data from said host server, and a data processing section processes the data transferred by said transfer section, (C1) said selecting/display control section for said product under assembly can display and select any group code of said product under assembly based on the information in said master table of said product under assembly, (C2) said output type selecting/display control section can display and select items to be output related to the information for said quality contents data table and said check contents data table, (C3) said date display control section can display a calendar and specify a date, (C4) said data transfer section transfers the data from said host server based on the conditions selected by said selecting/display control section for said product under assembly, said output type selecting/display control section, and said date selecting/display control section, (C5) said data processing section collects the data transferred by said data transfer section for each chronological base, and (C6) said data output/display control section displays the chronological data of said data processing section for each item.

42. The production management client system according to claim 41, wherein said data processing section calculates the total number of Cases of each data.

43. The production management client system according to claim 41, wherein said data output display control section prepares a table of the items related to output type selecting/display control section and number of cases of the items that has been chronologically processed by said data processing section and displays the prepared table.

44. The production management client system according to claim 43, wherein said data output display control section prepares a bar graph of the number of cases of the items that has been chronologically processed by said data processing section and displays the prepared table.

45. The production management client system according to claim 44, wherein said output client comprises a graph generation section which (C7) prepares a graph of the item, related to output type selecting/display control section and the number of cases of the items that has been chronologically processed by said data processing section.

46. The production management client system according to claim 41, wherein said output client comprises a regular executing section which (C8) sends a command to said data transmitting section at every predetermined time interval.

47. The production management client system according to claim 41, wherein said output client comprises a warning setting/generating section which (C9) can display and select the contents of said quality contents master table, sets the number of accumulated cases for generating a warning about those items, and displays a warning based on the calculation result by said data transmitting section and said data processing section.

48. The production management client system according to claim 41, wherein said output client comprises a quality contents data display control section which (C10) display all the data out of the data transmitted by said data transmitting section that is contained in said quality contents data table.

49. The production management client system according to claim 48, wherein said output client comprises a single-component quality contents data display control section which (C11) selects one out of the contents displayed in said quality contents data display control section, and displays quality contents related to said group codes of product under assembly or names of the selected item.

50. A production management retrieval and display method for retrieving and displaying a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or sore of production assembly lines, said production management retrieval and display method comprising the steps of:

using an integrated storage medium which stores 1) management numbers with which each of said product under assembly can be identified and group codes of said product under assembly obtained by dividing said product under assembly according to their types, 2) quality data and check data correlating the quality information and the result of checking in a step of assembling parts to be attached to a product under assembly and a checking step of checking said product under assembly according to said check items on said production assembly line with said management number and said group code of said product under assembly as groups of tables, respectively, displaying and selecting extraction conditions and a plurality of output information related to the extraction conditions to extract desired data out of 1) said group code of product under assembly, 2) a desired date and time, and 3) said quality data and said check data stored in said integrated storage medium;

instructing said integrated storage medium to transfer so as to transfer the data stored in said integrated storage medium according to said group code of said product under assembly, the specified date and time, and the output information selected in the displaying/selecting step;

storing the data transferred in the transfer instructing stop in said storage medium;

chronologically processing the data stored in said storing step based on said group code of said product under assembly, the specified date and time, and the output information selected in the displaying/selecting step; and displaying the data chronologically processed in the data processing step for each item to be output based on the output information.

51. The production management retrieval and display method according to claim 50, wherein the display step numerically displays the chronological data for the items to be output, prepares a graph of the chronological data for at least one of the items, and displays the graph.

52. The production management retrieval and display method according to claim 51 further comprising the steps of:

selecting each of the items displayed in the display step; and creating a graph of the item selected in the selection step based on chronological data.

53. The production management retrieval and display method according to claim 51, wherein said check data or said quality data extracted by said retrieving section and stored in said integrated storage medium is also displayed in the display step.

54. The production management retrieval and display method according to claim 53, further comprising a step of displaying in detail said check data or said quality data for only a product under assembly corresponding to said data displayed in the display step by selecting some particular data.

55. The production management retrieval and display method according to claim 50, wherein the retrieval step is executed continuously.

56. The production management retrieval and display method according to claim 50 further comprising the steps of:

monitoring and setting information regarding check data or said quality data extracted by said retrieving section and stored on said second or third storage section; and posting a notice when the number of information monitored and set by said monitoring/setting section matches a predetermined number.

57. A production management retrieval and display method for retrieving and displaying a) assembly data when components to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly line, wherein using a host server having tables as follows:

(1) a master table of said product under assembly stores data for management numbers with which each of said product under assembly can be identified and group codes of said product under assembly obtained by dividing said product under assembly for each type, (2) a quality content master table stores data about said group codes of said product under assembly in correlation with quality items related to said product under assembly, (3) a main data table stores data about said management numbers and said group codes of said product under assembly in correlation with line information, such as the date and time on which assembly of said product is started, and the date and time on which the assembly of said product under assembly is completed on said production assembly line, obtainable by executing their assembly and checking on said production assembly line, (4) a quality contents data table stores data about said management numbers and said group codes of said product under assembly, quality items in said quality content master table, quality information based on the quality items, its entry date and time, assembly, checking and fixing steps whose data is entered in correlation with each other, and (5) a check content data table stores data about said management numbers and said group codes of said product under assembly in correlation with check items related to said product under assembly and the results of checking based on said check items, an output client displays a selecting/display control section for said product under assembly, an output type selecting/display control section, a date selecting/display control section, and a data output/display control section on its display section, a data transfer section transfers specified data from said host server, and a data processing section processes the data transferred by said transfer section, (C1) said selecting/display control section for said product under assembly can display and select any group code of said product under assembly based on the information in said master table of said product under assembly, (C2) said output type selecting/display control section can display and select items to be output based on the information corresponding said quality content data table or said check content data table, (C3) said date display control section can display a calendar and specify a date, (C4) said data transfer section transfers the data from said host server based on the conditions selected by said selecting/display control section for said product under assembly, said output type selecting/display control section, and said date selecting/display control section, (C5) said data processing section collects the data transferred by said data transfer section for each chronological base, and (C6) said data output/display control section displays the chronological data of said data processing section for each item.

58. The production management retrieval and display method according to claim 57, wherein said data processing section calculates the total number of cases of each data.

59. The production management retrieval and display method according to claim 57, wherein said data output display control section prepares a table of the items related to output type selecting/display control section and number of cases of the items that has been chronologically processed by said data processing section and displays the prepared table.

60. The production management retrieval and display method according to claim 59, wherein said data output display control section prepares a bar graph of the number of cases of the items that has been chronologically processed by said data processing section and displays the prepared table.

61. The production management retrieval and display method according to claim 60 further comprising the step of:

(C7) preparing a graph of the items related to output type selecting/display control section and the number of cases of the items that has been chronologically processed by said data processing section.

62. The production management retrieval and display method according to claim 57 further comprising the step of:

(C8) sending a command to said data transmitting section at every predetermined time interval.

63. The production management retrieval and display method according to claim 57 further comprising the step of:

(C9) displaying and selecting the contents of said quality contents master table, and setting the number of accumulated cases for generating a warning about those items, and displays a warning based on the calculation result by said data transmitting section and said data processing section.

64. The production management retrieval and display method according to claim 57 further comprising the step of a:

(C10) displaying all the data out of the data transmitted by said data transmitting section that is contained in said quality contents data table.

65. The production management retrieval and display method according to claim 64 further comprising the step of:

(C11) selecting one out of the contents displayed in said quality contents data display control section, and displays quality contents related to said group codes of product under assembly or names of the selected item.

66. A recording medium which allows execute a program for retrieving and displaying a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, said program comprising the steps of:

using an integrated storage medium which stores A) management numbers with which each of aid product under assembly can be identified and group codes of said product under assembly obtained by dividing said product under assembly according to their types, B) quality data and check data correlating the quality information and the result of checking in a step of assembling components and units or the like to a product under assembly and a checking step of checking said product under assembly according to the prespecified check items on said production assembly line with said management number and said group code of said product under assembly as groups of tables, respectively, displaying extraction conditions and a plurality of output information related to said extraction conditions to extract desired data out of 1) said management numbers with which each of said product under assembly can be identified and said group code of product under assembly obtained by dividing said product under assembly for each type, 2) a desired date and time, and 3) a plurality of said quality data and said check data stored in said integrated storage medium;

enabling selection of the displayed extraction conditions;

instructing said integrated storage medium so as to transfer the data stored in said integrated storage medium according to the information selected from the extraction conditions;

storing the transferred extraction data that is retrieved by said integrated storage medium in said storage medium;

chronologically processing the data stored in said storage medium based on said group code of said product under assembly, the specified date and time, and the output information selected in the displaying/selecting step; and displaying the chronologically processed data for each item to be output based on the output information.

67. The program stored in said recording medium according to claim 66 further executing the step of numerically displaying the chronological data for the items to be output and preparing a graph of the chronological data for at least one of the items.

68. The program stored in said recording medium according to claim 67 further executing the step of:

selecting each of the items displayed in the display step; and creating a graph of the item selected in the selection step based on chronological data.

69. The program stored in said recording medium according to claim 68 further executing the stop of:

displaying said check data or said quality data extracted by said retrieving section and stored in said integrated storage medium.

70. The program stored in said recording medium according to claim 68 further executing the step of:

displaying said check data or said quality data for only a product under assembly corresponding to said data displayed by said second display section and selected.

71. The program stored in said recording medium according to claim 66 further executing the step of:

continuously executing the retrieving/extracting step.

72. The program stored in said recording medium according to claim 66 further executing the step of:

monitoring and setting information regarding check data or said quality data extracted by said retrieving section and stored in said second or third storage section; and posting a notice when the number of information monitored and set by said monitoring/setting section matches a predetermined number.

73. A recording medium which contains a computer program which when executed causes a computer to execute the steps of retrieving and displaying a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, said program further causing the computer to execute the steps of:

using a host server having tables as follows:

(1) data about group codes of said product under assembly obtained by dividing said product under assembly for each type is stored in a master table of said product under assembly, (2) data about group codes of said product under assembly is stored in a quality contents master table in correlation with quality items related to said product under assembly, (3) data about management numbers and group codes of said product under assembly is stored in a main data table in correlation with line information, such as the date and time on which assembly of said product under assembly is started, and the date and time on which the assembly of said product under assembly is completed on said production assembly line, obtainable by executing their assembly and checking on said production assembly line, (4) data about said management numbers and said group codes of said product under assembly is stored in a quality contents data table in correlation with quality items in said quality contents master table, quality information based on said quality items, its entry date and time, assembly, checking and fixing steps whose data is entered, and (5) data about said management numbers and said group codes of said product under assembly is stored in a check contents data table in correlation with check items related to said product under assembly and the results of checking in a production process of said product under assembly, enabling display of a selection area of said product under assembly, an output type selection area, a date selection area, and a data output area;

(C1) group codes of said product under assembly based on the information in said master table of said product under assembly can be displayed and selected in said selection area of said product under assembly, (C2) items to be output based on the information according to said quality contents master table can be displayed and selected in said output type selection area, and (C3) a calendar can be displayed and a date can be specified in said date display area, transferring the specified data in said areas from said host server;

enabling selection of the items displayed in said areas;

instructing so as to transfer the data from said host server based on the items in each selected area;

storing the data transferred from said host servers collecting the stored transfer data on each chronological base; and chronologically displaying the data as the result of collection for each display item in correlation with the item to be output specified in said output type selection area.

74. The program stored in said recording medium according to claim 73 further causing the computer to execute the step of:

calculating the total number of cases of each data.

75. The program stored in said recording medium according to claim 73 further causing the computer to execute the step of:

displaying in a tabular form the display items correlated to the display items specified based on said output type selecting area and the number of cases processed in a chronological order for each item.

76. The program stored in said recording medium according to claim 75 further causing the computer to execute the step of:

creating a graph of the number of cases processed in a chronological order.

77. The program stored in said recording medium according to claim 76 further causing the computer to execute the step of:

creating a graph of the display items correlated to the display items specified based on said output type selecting area against the chronologically processed data.

78. The program stored in said recording medium according to claim 73 further causing the computer to execute the step of:

executing the data transmission at each predetermined time interval.

79. The program stored in said recording medium according to claim 73 further causing the computer to execute the step of:

selecting a quality item in said quality contents master table;

setting a number of accumulation number with respect to the selected quality item; and displaying a warning when the accumulated data exceed the set accumulation number.

80. The program stored in said recording medium according to claim 73 further causing the computer to execute the step of:

displaying all the data out of the data transmitted that in contained in said quality contents data table.

81. The program stored in said recording medium according to claim 80 further causing the computer to execute the step of:

selecting only one data from said quality contents data table;

displaying in a list fashion said group code of said product under assembly and the quality contents related to said product under assembly.

82. A production management host server system which retrieves and displays a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, wherein (1) a master table of said product under assembly stores data for group codes of said product under assembly obtained by dividing said product under assembly for each type, (2) a quality contents master table stores data for group codes of said product under assembly in correlation with quality items related to said product under assembly, (3) a main data table stores data for management numbers with which respective said product under assembly can be identified and group codes of said product under assembly in correlation with line information, such as the date and time on which assembly of said product under assembly is started, and the date and time on which the assembly of said product under assembly is completed on said production assembly line, obtainable by executing their assembly and checking on said production assembly line, (4) a quality contents data table stores data for said management numbers and said group codes of said product under assembly, quality items in said quality contents master table, quality information based on said quality items, its entry date and time, assembly, checking and fixing steps whose data is entered in correlation with each other, and (5) a check contents data table stores data about said management numbers and said group codes of said product under assembly in correlation with check items related to said product under assembly and the results of checking based on said check items, wherein when the following operations are selected at an output client:

(C1) a group code of said product under assembly is selected based on the information in said master table of said product under assembly, (C2) an output request based on the information according to said quality contents master table it selected, (C3) a specific date is selected, and (C4) an instruction of data transfer based on the selected condition received, the data based on the data for transfer instruction is retrieved and extracted from the group of tables, and the extracted data is transferred to said output client.

83. The production management host server system according to claim 52 further comprising a check contents master table which (6) stores therein in a correlated manner data about management numbers with which respective said product under assembly can be identified, group codes of said product under assembly, check items for checking said product under assembly on said production assembly line, and the process that make use of said check items.

84. The production management host server system according to claim 83, wherein when said input client requests information in said master table of said product under assembly, said check contents data table, and said quality contents master table, the requested information in said main data table, said quality contents table, and said check contents data table is transmitted to said input client.

85. A production management data transfer method for retrieving and displaying a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, wherein data is stored in respective tables as followed:

(1) data for group codes of said product under assembly obtained by dividing said product under assembly for each type is stored in a master table of said product under assembly, (2) data for group codes of said product under assembly is stored in a quality contents master table in correlation with quality items related to said product under assembly and quality contents in said production assembly process of said product under assembly, (3) data for management numbers with which respective said product under assembly can be identified and group codes of said product under assembly is stored in a main data table in correlation with line information, such as the date and time on which assembly of said product under assembly is started, and the date and time on which the assembly of said product under assembly is completed on said production assembly line, obtainable by executing their assembly and checking on said production assembly line, (4) data for said management numbers and said group codes of said product under assembly in stored in a quality contents data table in correlation with the information entered on said production assembly line, its entry date and time, assembly, checking and fixing steps whose data is entered out of said master table said product under assembly, and (5) data about said management numbers and said group codes of said product under assembly is stored in a check contents data table in correlation with check items related to said product under assembly and said quality contents in the production process of said product under assembly, wherein when the following operations are selected at an output client:

(C1) a group code of said product under assembly based on the information in said master table of said product under assembly is selected, (C2) an output request based on the information according to said quality contents master table is selected, (C3) a specific date is selected, and (C4) an instruction on data transfer based on the selected condition is received, the data based on the data for transfer instruction is retrieved and extracted from the group of tables, and the data extracted in the extracting step is transferred to said output client.

86. The production management data transfer method according to claim 85 further comprising a stop of:

(6) storing data about management numbers with which respective said product under assembly can be identified, group codes of said product under assembly, check items for checking said product under assembly on said production assembly line, and the process that make use of said check items in said check contents master table in a correlated manner.

87. The production management data transfer method according to claim 85 further comprising a step of:

transmitting a requested information in said main data table, said quality contents table, and said check contents data table is transmitted to said input client when said input client requests information in said master table of said product under assembly, said check contents data table, and said quality contents master table.

88. A recording medium which contains a computer program which when executed causes a computer to execute the steps of retrieving and displaying a) assembly data when parts to be attached to a product under assembly are attached to said product under assembly, b) quality data regarding whether the quality of said product under assembly is good or bad, and c) check data obtained when said product under assembly is checked based on certain prespecified check items, when obtaining a finished product by attaching one or more components such as parts, units, or other finished products to said product under assembly on one or more of production assembly lines, wherein data is stored in respective tables as followed:

(1) data for group codes of said product under assembly obtained by dividing said product under assembly for each type is stored in a master table of said product under assembly, (2) data for group codes of said product under assembly is stored in a quality contents master table in correlation with quality items related to said product under assembly and the quality contents in the production process of said product under assembly, (3) data about management numbers with which respective said product under assembly can be identified and group codes of said product under assembly is stored in a main data table in correlation with line information, such as the date and time on which assembly of said product under assembly is started, and the date and time on which the assembly of said product under assembly is completed on said production assembly line, obtainable by executing their assembly and checking on said production assembly line, (4) data about said management numbers and said group codes of said product under assembly is stored in a quality contents data table in correlation with the information entered on said production assembly line, its entry date and time, assembly, checking and fixing steps whose data is entered in said quality contents master table, and (5) data about said management numbers and said group codes of said product under assembly is stored in a check contents data table in correlation with check items related to said product under assembly and the result of checking in the production process of said product under assembly, wherein when the following operations are selected at an output client:

(C1) a group code of said product under assembly based on the information in said master table of said product under assembly is selected, (C2) an output request based on the information according to said quality contents master table is selected, (C3) a specific date is selected, and (C4) data transfer based on the selected condition is instructed, operations are allowed to be executed so that the data based on the data for transfer instruction is retrieved and extracted from the group of tables, and the extracted data is transferred to said output client.

89. The program stored in said recording medium according to claim 88 further causing the computer to execute the step of:

(6) storing data about management numbers with which respective said product under assembly can be identified, group codes of said product under assembly, check items for checking said product under assembly on said production assembly line, and the process that make use of said check items in a check contents master table in a correlated manner.

90. The program stored in said recording medium according to claim 89 further causing the computer to execute the step of:

transmitting a requested information in said main data table, said quality contents table, and said check contents data table is transmitted to said input client when said input client requests information in said master table of said product under assembly, said check contents data table, and said quality contents master table.

* * * * *